US012246539B2

(12) United States Patent
Nakano et al.

(10) Patent No.: US 12,246,539 B2
(45) Date of Patent: Mar. 11, 2025

(54) DEVICE, BOARD, LIQUID ACCOMMODATION CONTAINER, AND PRINTING SYSTEM

(71) Applicant: SEIKO EPSON CORPORATION, Tokyo (JP)

(72) Inventors: Shuichi Nakano, Shiojiri (JP); Yasuhiko Kosugi, Matsumoto (JP); Jun Sato, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/909,268

(22) Filed: Oct. 8, 2024

(65) Prior Publication Data

US 2025/0026128 A1 Jan. 23, 2025

Related U.S. Application Data

(63) Continuation of application No. 18/237,161, filed on Aug. 23, 2023, which is a continuation of application No. 17/980,222, filed on Nov. 3, 2022, now Pat. No. 11,820,150, which is a continuation of application (Continued)

(51) Int. Cl.
*B41J 2/175* (2006.01)

(52) U.S. Cl.
CPC ....... *B41J 2/17546* (2013.01); *B41J 2/17513* (2013.01); *B41J 2/17523* (2013.01); *B41J 2/17543* (2013.01)

(58) Field of Classification Search
CPC ................ B41J 2/04543; B41J 2/04546; B41J 2/04541; B41J 2/0458; B41J 2/04581; B41J 2/04586; B41J 2/1601; B41J 2/1607; B41J 2/17513; B41J 2/17523; B41J 2/17546; B41J 2/17543
See application file for complete search history.

(56) References Cited

U.S. PATENT DOCUMENTS 6,000,773 A 12/1999 Murray et al.
6,039,428 A 3/2000 Juve
6,164,743 A 12/2000 Hmelar et al.

(Continued)

FOREIGN PATENT DOCUMENTS

JP H10-337879 A 12/1998
JP 2000-269988 A 9/2000

(Continued)

OTHER PUBLICATIONS

U.S. Appl. No. 17/717,857, filed Apr. 11, 2022 in the name of Shuichi Nakano et al.

(Continued)

*Primary Examiner* — Thinh H Nguyen
(74) *Attorney, Agent, or Firm* — Oliff PLC

(57) ABSTRACT

A device outputs a first low voltage to a first terminal at a first timing in a period in which a voltage input to a second terminal is a high voltage. After outputting the first low voltage, the device outputs a second high voltage to the first terminal at a second timing in a period in which the voltage input to the second terminal is a low voltage. After outputting the second high voltage, the device outputs a second low voltage to the first terminal at a third timing in a period in which the voltage input to the second terminal is a high voltage.

27 Claims, 61 Drawing Sheets

Related U.S. Application Data

No. 17/717,753, filed on Apr. 11, 2022, now Pat. No. 11,535,037.

(56) References Cited

U.S. PATENT DOCUMENTS

| | | | | |
|---|---|---|---|---|
| 6,502,917 | B1 | 1/2003 | Shinada et al. | |
| 6,648,445 | B2 | 11/2003 | Ishizawa et al. | |
| 7,264,334 | B2 | 9/2007 | Shinada et al. | |
| 7,967,415 | B2 | 6/2011 | Asauchi et al. | |
| 8,033,629 | B2 | 10/2011 | Asauchi | |
| 8,764,172 | B2 * | 7/2014 | Asauchi | G03G 15/0863 347/86 |
| 11,535,037 | B1 | 12/2022 | Nakano et al. | |
| 11,535,038 | B1 | 12/2022 | Nakano et al. | |
| 11,820,150 | B2 | 11/2023 | Nakano et al. | |
| 2005/0237355 | A1 | 10/2005 | Fukano et al. | |
| 2007/0149044 | A1 | 6/2007 | Asauchi | |
| 2009/0085939 | A1 | 4/2009 | Asauchi | |
| 2009/0085942 | A1 | 4/2009 | Asauchi | |
| 2009/0262161 | A1 | 10/2009 | Nishihara | |
| 2010/0091070 | A1 | 4/2010 | Kimura | |
| 2010/0257305 | A1 | 10/2010 | Asauchi | |
| 2010/0289847 | A1 | 11/2010 | Ishizawa et al. | |
| 2011/0205589 | A1 | 8/2011 | Sato | |
| 2011/0208991 | A1 | 8/2011 | Sato | |
| 2012/0056954 | A1 | 3/2012 | Asauchi et al. | |
| 2012/0074031 | A1 | 3/2012 | Sato | |
| 2012/0272018 | A1 | 10/2012 | Sato | |
| 2013/0050308 | A1 | 2/2013 | Asauchi | |
| 2015/0237145 | A1 | 8/2015 | Koseki et al. | |
| 2016/0140077 | A1 | 5/2016 | Yoshida | |
| 2020/0398579 | A1 | 12/2020 | Gardner et al. | |

FOREIGN PATENT DOCUMENTS

| | | | |
|---|---|---|---|
| JP | 2005-190324 | A | 7/2005 |
| JP | 2007-196664 | A | 8/2007 |
| JP | 2010-060978 | A | 3/2010 |
| JP | 2010-111116 | A | 5/2010 |
| JP | 2010-221484 | A | 10/2010 |
| JP | 2011-170740 | A | 9/2011 |
| JP | 2011-189730 | A | 9/2011 |
| JP | 2012-069033 | A | 4/2012 |
| JP | 2014-056577 | A | 3/2014 |
| JP | 2015-154260 | A | 8/2015 |
| JP | 2016-095629 | A | 5/2016 |
| WO | 99/059823 | A1 | 11/1999 |
| WO | 2012/029311 | A1 | 3/2012 |

OTHER PUBLICATIONS

Jun. 13, 2022 Notice of Allowance issued in U.S. Appl. No. 17/717,857.

Aug. 19, 2022 Notice of Allowance issued in U.S. Appl. No. 17/717,857.

Sep. 7, 2023 Notice of Allowance issued in U.S. Appl. No. 17/988,307.

Nov. 6, 2024 Notice of Allowance issued in U.S. Appl. No. 18/237,161.

* cited by examiner

FIG. 12

| | FIRST TIMING t1 | SECOND TIMING t2 | THIRD TIMING t3 | COUPLING STATE | DETERMINATION RESULT |
|---|---|---|---|---|---|
| EXPECTED VALUE | L (FIRST EXPECTED VALUE) | H (SECOND EXPECTED VALUE) | L (THIRD EXPECTED VALUE) | — | — |
| DETECTED VALUE | L | H | L | MOUNTING-COMPLETED STATE | CONTAINER PROVIDED |
| | L | L | L | NON-MOUNTING-COMPLETED STATE | NO CONTAINER |
| | H | L | H | STATE OF SHORT CIRCUIT BETWEEN DATA TERMINAL AND CLOCK TERMINAL | SHORT CIRCUIT OCCURRING |
| | H | H | H | STATE OF SHORT CIRCUIT BETWEEN DATA TERMINAL AND POWER SOURCE TERMINAL OR STATE OF SHORT CIRCUIT BETWEEN DATA TERMINAL AND RESET TERMINAL | SHORT CIRCUIT OCCURRING |

| | t1 | t2 | t3 |
|---|---|---|---|
| EXPECTED VALUE | L | H | L |
| DETECTED VALUE | H | H | H |

| COUPLING STATE | DETERMINATION |
|---|---|
| STATE OF SHORT CIRCUIT BETWEEN DATA TERMINAL AND POWER SOURCE TERMINAL | SHORT CIRCUIT OCCURRING |

| | t1 | t2 | t3 | COUPLING STATE | DETERMINATION |
|---|---|---|---|---|---|
| EXPECTED VALUE | L | H | L | STATE OF SHORT CIRCUIT BETWEEN DATA TERMINAL AND RESET TERMINAL | SHORT CIRCUIT OCCURRING |
| DETECTED VALUE | H | H | H | | |

| | t1 | t2 | t3 | COUPLING STATE | DETERMINATION |
|---|---|---|---|---|---|
| EXPECTED VALUE | L | H | L | NON-MOUNTING-COMPLETED STATE | NO CONTAINER |
| DETECTED VALUE | L | L | L | | |

FIG. 20C

| | TIMING t1 | TIMING t2 | TIMING t3 | COUPLING STATE | DETERMINATION | No. |
|---|---|---|---|---|---|---|
| EXPECTED VALUE | L | H | L | — | | |
| DETECTED VALUE | H | L | H | STATE OF SHORT CIRCUIT BETWEEN DATA TERMINAL AND CLOCK TERMINAL OCCURS AT t<t1 | SHORT CIRCUIT OCCURRING | 1 |
| | L | L | H | STATE OF SHORT CIRCUIT BETWEEN DATA TERMINAL AND CLOCK TERMINAL OCCURS AT t1<t<t2 | SHORT CIRCUIT OCCURRING | 2 |
| | L | H | H | STATE OF SHORT CIRCUIT BETWEEN DATA TERMINAL AND CLOCK TERMINAL OCCURS AT t2<t<t3 | SHORT CIRCUIT OCCURRING | 3 |
| | H | H | L | STATE OF SHORT CIRCUIT BETWEEN DATA TERMINAL AND CLOCK TERMINAL IS ELIMINATED AT t1<t<t2 | SHORT CIRCUIT OCCURRING | 4 |
| | H | L | L | STATE OF SHORT CIRCUIT BETWEEN DATA TERMINAL AND CLOCK TERMINAL IS ELIMINATED AT t2<t<t3 | SHORT CIRCUIT OCCURRING | 5 |
| | H | H | H | STATE OF SHORT CIRCUIT BETWEEN DATA TERMINAL AND POWER SOURCE TERMINAL OR BETWEEN DATA TERMINAL OR RESET TERMINAL OCCURS AT t<t1 | SHORT CIRCUIT OCCURRING | 6 |
| | L | H | H | STATE OF SHORT CIRCUIT BETWEEN DATA TERMINAL AND POWER SOURCE TERMINAL OR BETWEEN DATA TERMINAL OR RESET TERMINAL OCCURS AT t1<t<t2 | SHORT CIRCUIT OCCURRING | 7 |
| | L | H | H | STATE OF SHORT CIRCUIT BETWEEN DATA TERMINAL AND POWER SOURCE TERMINAL OR BETWEEN DATA TERMINAL OR RESET TERMINAL OCCURS AT t2<t<t3 | SHORT CIRCUIT OCCURRING | 8 |
| | H | H | L | STATE OF SHORT CIRCUIT BETWEEN DATA TERMINAL AND POWER SOURCE TERMINAL OR BETWEEN DATA TERMINAL OR RESET TERMINAL IS ELIMINATED AT t1<t<t2 | SHORT CIRCUIT OCCURRING | 9 |
| | H | H | L | STATE OF SHORT CIRCUIT BETWEEN DATA TERMINAL AND POWER SOURCE TERMINAL OR BETWEEN DATA TERMINAL OR RESET TERMINAL IS ELIMINATED AT t2<t<t3 | SHORT CIRCUIT OCCURRING | 10 |

FIG. 21A

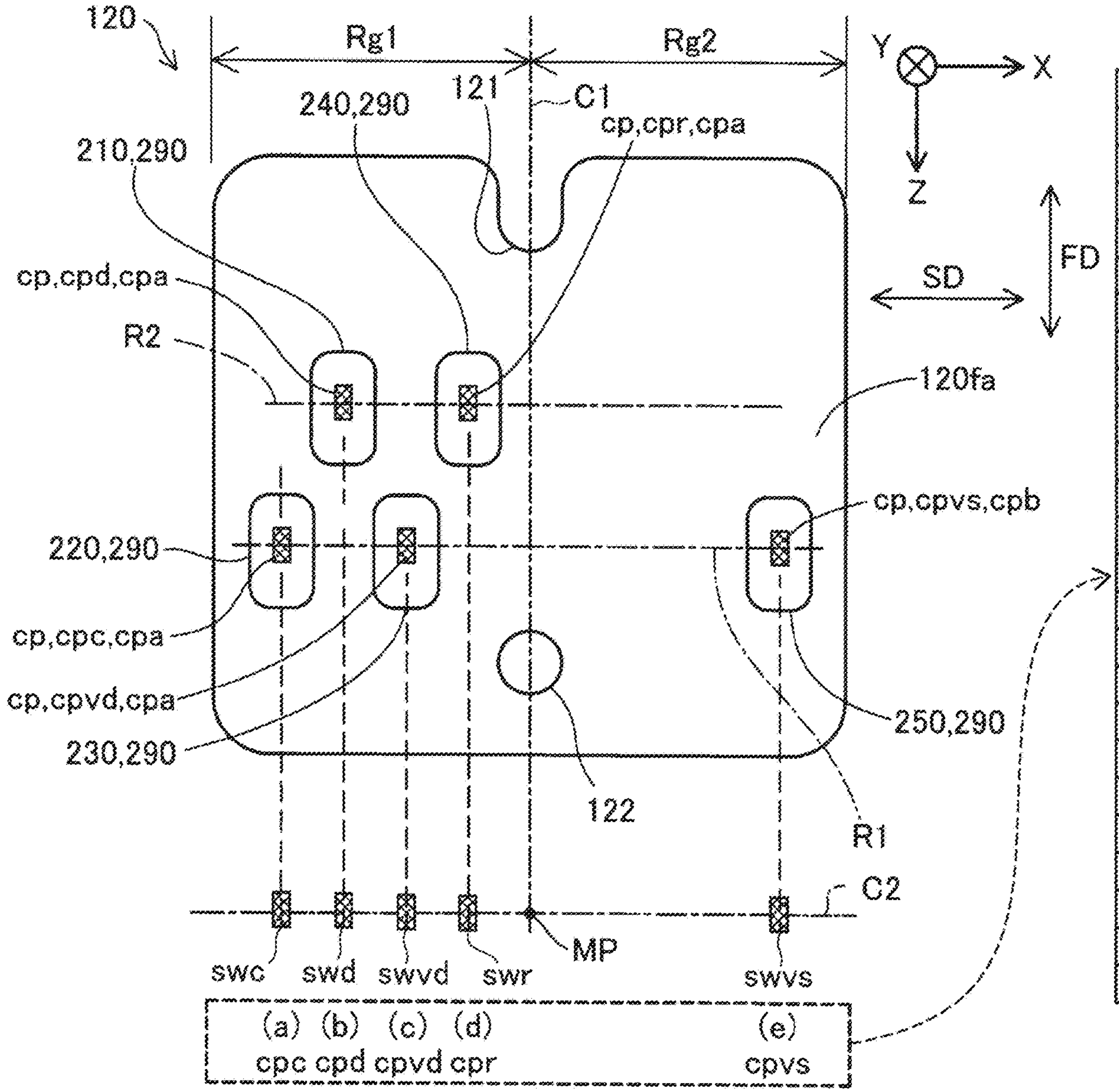

| No. | (a) | (b) | (c) | (d) | (e) |
|---|---|---|---|---|---|
| 1 | cpc | cpd | cpvd | cpr | cpvs |
| 2 | cpr | cpd | cpvd | cpc | cpvs |
| 3 | cpc | cpd | cpr | cpvd | cpvs |
| 4 | cpvd | cpd | cpr | cpc | cpvs |
| 5 | cpr | cpd | cpc | cpvd | cpvs |
| 6 | cpvd | cpd | cpc | cpr | cpvs |
| 7 | cpd | cpvd | cpc | cpr | cpvs |
| 8 | cpd | cpvd | cpr | cpc | cpvs |
| 9 | cpd | cpc | cpvd | cpr | cpvs |
| 10 | cpd | cpr | cpvd | cpc | cpvs |
| 11 | cpd | cpc | cpr | cpvd | cpvs |
| 12 | cpd | cpr | cpc | cpvd | cpvs |
| 13 | cpc | cpvd | cpd | cpr | cpvs |
| 14 | cpr | cpvd | cpd | cpc | cpvs |
| 15 | cpvd | cpr | cpd | cpc | cpvs |
| 16 | cpc | cpr | cpd | cpvd | cpvs |
| 17 | cpvd | cpc | cpd | cpr | cpvs |
| 18 | cpr | cpc | cpd | cpvd | cpvs |
| 19 | cpvd | cpc | cpr | cpd | cpvs |
| 20 | cpvd | cpr | cpc | cpd | cpvs |
| 21 | cpc | cpvd | cpr | cpd | cpvs |
| 22 | cpr | cpvd | cpc | cpd | cpvs |
| 23 | cpc | cpr | cpvd | cpd | cpvs |
| 24 | cpr | cpc | cpvd | cpd | cpvs |

DEVICE, BOARD, LIQUID ACCOMMODATION CONTAINER, AND PRINTING SYSTEM

CROSS-REFERENCE TO RELATED APPLICATION(S)

This application is a continuation of U.S. application Ser. No. 18/237,161 filed Aug. 23, 2023, which is a continuation of U.S. application Ser. No. 17/980,222 filed Nov. 3, 2022, which is a continuation of U.S. application Ser. No. 17/717,753 filed Apr. 11, 2022, which is based on, and claims priority from JP Application Serial Number 2021-214139, filed Dec. 28, 2021 and JP Application Serial Number 2021-214129, filed Dec. 28, 2021, the disclosures of which are hereby incorporated by reference herein in their entirety.

BACKGROUND

1. Technical Field

The present disclosure relates to a device, a board, a liquid accommodation container, a printing system, and a use of the board or the liquid accommodation container.

2. Related Art

In the related art, there is known a technique for detecting mounting of an ink cartridge detachably mounted in a printing apparatus by using a mounting detection terminal of a terminal group (International Publication No. 2012-029311). The terminal group includes five memory terminals and four mounting detection terminals including a terminal to which a high voltage higher than a power source voltage is applied. The mounting detection terminals are arranged at the four corners of the terminal group so as to surround the memory terminals. In International Publication No. 2012-029311, when it is detected that the mounting detection terminal is electrically coupled to an apparatus-side terminal, the printing apparatus determines that the ink cartridge is mounted in the printing apparatus.

Further, there is known a technique for detecting the mounting of an ink cartridge detachably mounted in a printing apparatus by using a memory terminal (JP-A-2011-170740). A storage device such as a memory provided in the ink cartridge outputs a response signal for notifying that the storage device is coupled to a host device such as a printing apparatus, to a host terminal via any of a reset terminal, a clock terminal, and a data terminal. The host device uses the response signal from the storage device to determine whether or not the storage device is coupled to the host device, without using a terminal dedicated for coupling detection.

However, International Publication No. 2012-029311 and JP-A-2011-170740 do not mention short-circuit detection between the memory terminals. In International Publication No. 2012-029311, when a short circuit occurs between the memory terminals, even though it is determined that the ink cartridge is mounted in the printing apparatus, there is a possibility that the printing apparatus does not operate normally, or reading/writing on the memory of the ink cartridge is not performed normally. In JP-A-2011-170740, when a short circuit occurs between the memory terminals, there is a possibility that it is not possible for the memory to output an original signal to the printing apparatus, and it is not possible for the printing apparatus to determine that the memory is appropriately coupled to the printing apparatus.

SUMMARY

An advantage of some aspects of the disclosure is to detect that a short circuit does not occur between terminals in a liquid accommodation container such as an ink cartridge. Alternatively, another advantage of some aspects of the disclosure is to provide a technique capable of detecting that the liquid accommodation container is mounted. Alternatively, still another advantage of some aspects of the disclosure is to provide a technique capable of detecting a short circuit even when a short circuit occurs between the terminals. Another advantage of some aspects of the disclosure is to suppress an occurrence of a short circuit between the terminals.

According to a first aspect of the present disclosure, there is provided a device that is configured with a processor, the device configured to be electrically coupled to a plurality of terminals of a liquid accommodation container that can be mounted in an accommodation section of a printing apparatus, the printing apparatus further including a printing head, and the accommodation section provided with: (i) the liquid introduction portion that introduces a liquid to the printing head, and (ii) a plurality of apparatus-side terminals, wherein the processor of the device programmed to satisfy I, II, III, and IV as follows.

I: Output to a first data terminal provided in the plurality of terminals, a first response signal containing a first low voltage and output a second response signal containing a second high voltage and a second low voltage lower than the second high voltage.

I: The first response signal and the second response signal are output at a predetermined timing such that, in relation to a clock signal, the first response signal and the second response signal indicating to the printing apparatus that the data terminal does not have a short circuit with other terminals other than the data terminal among the plurality of terminals and that the liquid accommodation container is being mounted in the printing apparatus.

III: Output to the first data terminal the first response signal followed by the second response signal.

IV: Receive at a clock terminal provided in the other terminals, the clock signal in which a low voltage and a high voltage alternately repeat with a predetermined cycle, the first low voltage is output to the data terminal at a first time in a cycle in which a voltage received at the clock terminal is the high voltage, after the first low voltage is output, the second high voltage is output to the data terminal at a second time in a cycle in which the voltage received at the clock terminal is the low voltage, and after the second high voltage is output, the second low voltage is output to the data terminal at a third time in a cycle in which the voltage received at the clock terminal is the high voltage.

BRIEF DESCRIPTION OF THE DRAWINGS

FIG. 12 is a diagram illustrating an outline of the coupling state determination processing executed by a main control unit.

FIG. 20C is a diagram illustrating another specific example of the coupling state determination processing.

FIG. 21A is a diagram illustrating a board as Embodiment 1.

DESCRIPTION OF EXEMPLARY EMBODIMENTS

A. First Embodiment

A1. Hardware Configuration

Figure 1:
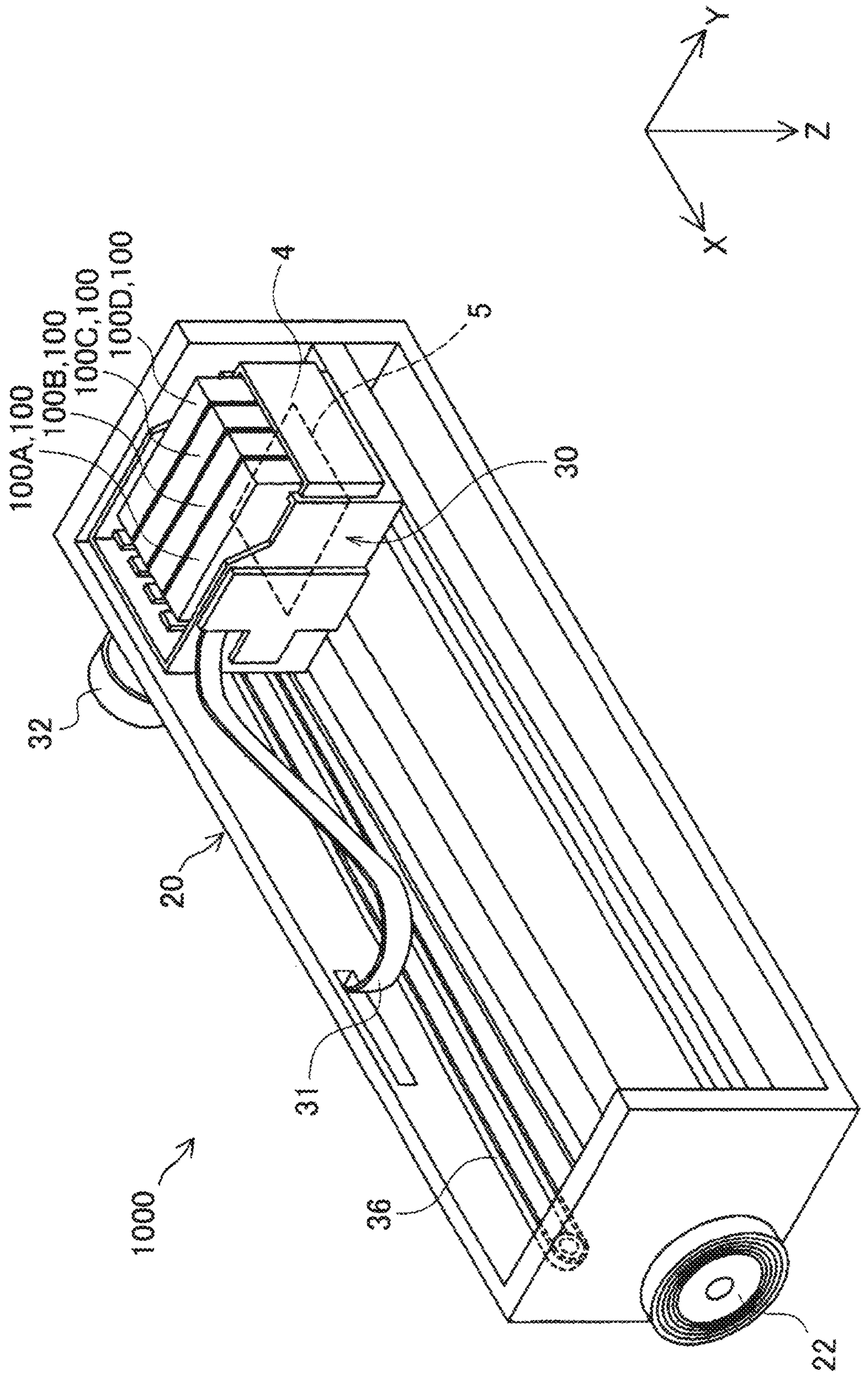
FIG. 1 is a perspective view illustrating a hardware configuration of a printing system.
Figure 2:
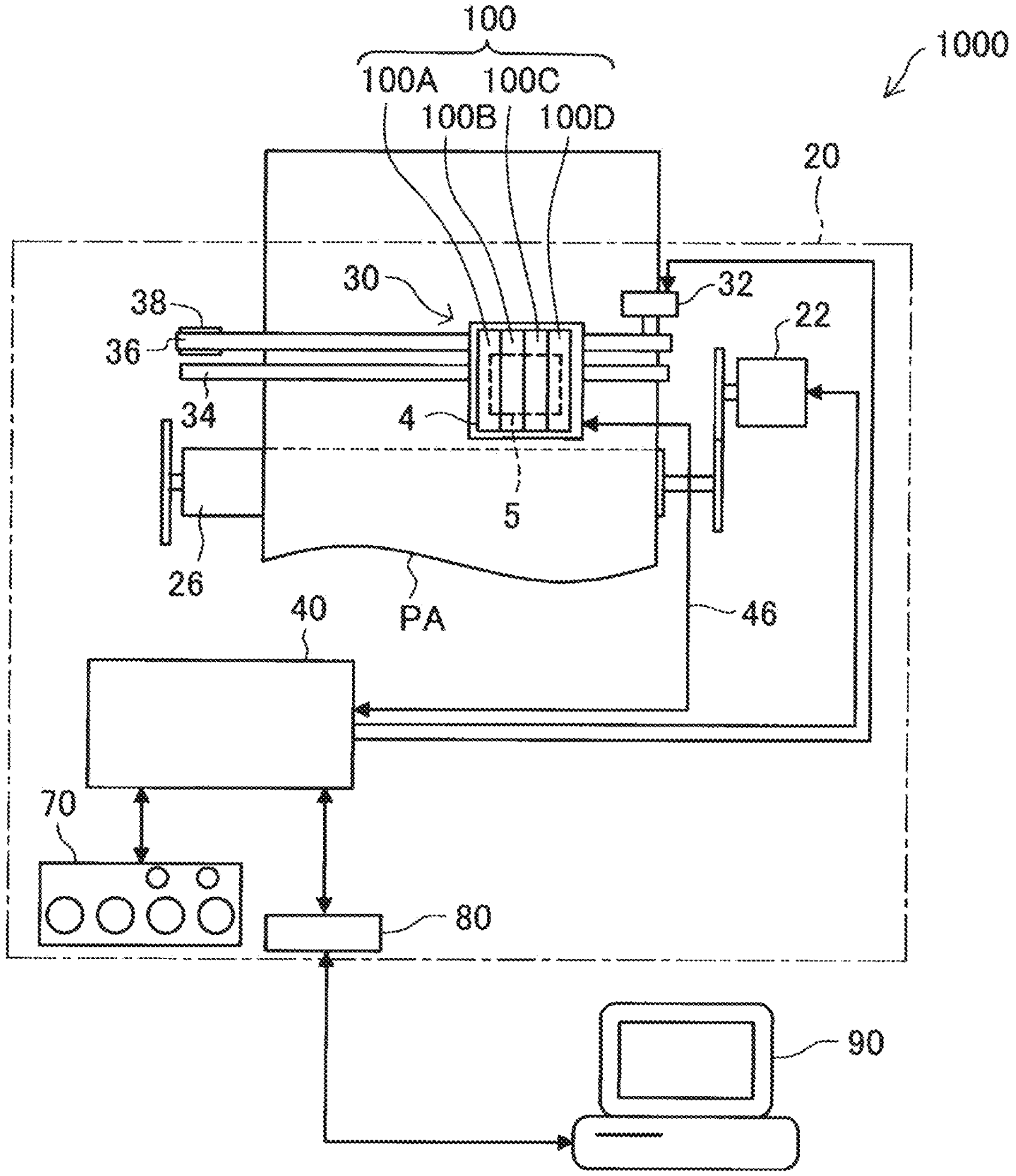
FIG. 2 is a schematic diagram illustrating a configuration of the printing system.

The outline of a printing system 1000 will be described with reference to FIGS. 1 and 2. FIG. 1 is a perspective view illustrating a hardware configuration of the printing system 1000. FIG. 2 is a schematic diagram illustrating a configuration of the printing system 1000. In FIG. 1, an X-axis, a Y-axis, and a Z-axis that are perpendicular to each other are indicated. Directions in which arrows of the X-axis, the Y-axis, and the Z-axis are directed indicate positive directions along the X-axis, the Y-axis, and the Z-axis, respectively. The positive directions along the X-axis, the Y-axis, and the Z-axis are a +X direction, a +Y direction, and a +Z direction, respectively. Directions opposite to the directions in which the arrows of the X-axis, the Y-axis, and the Z-axis are directed indicate negative directions along the X-axis, the Y-axis, and the Z-axis, respectively. The negative directions along the X-axis, the Y-axis, and the Z-axis are a −X direction, a −Y direction, and a −Z direction, respectively. When positiveness and negativeness in the directions along the X-axis, the Y-axis, and the Z-axis do not matter, the directions may be referred to as an X-direction, a Y-direction, and a Z-direction, respectively. The same applies to the drawings and description made below. The X-axis, the Y-axis, and the Z-axis drawn in the other drawings correspond to the X-axis, the Y-axis, and the Z-axis in FIG. 1, respectively. In FIG. 1, in the normal use posture of the printing system 1000, the front direction of the printing system 1000 is set as the +Y direction, the +Z direction is the gravity direction, and the −Z direction is the antigravity direction.

The printing system 1000 includes a printing apparatus 20 and a plurality of liquid accommodation containers 100. Specifically, the printing apparatus 20 is an ink jet printer, and the liquid accommodation container 100 is an ink cartridge. The printing apparatus 20 includes a head drive mechanism, a main scanning feeding mechanism, and a sub-scanning feeding mechanism.

The head drive mechanism includes a carriage 30. The carriage 30 includes an accommodation section 4 and a printing head 5. The accommodation section 4 is configured to detachably mount four liquid accommodation containers 100. In the present disclosure, the sentence that "the liquid accommodation container 100 is mounted in the printing apparatus 20" means that the liquid accommodation container 100 is physically attached to the printing apparatus 20 and a contact portion cp of a terminal 290 on the container-side, described later, is electrically coupled to an apparatus-side terminal 490, also described later. Each of the four liquid accommodation containers 100 is accommodated at a predetermined position of the accommodation section 4. In the present embodiment, the four liquid accommodation containers 100 accommodate liquids of colors different from each other. The liquid can be an ink, and is referred to as an ink below. When the four liquid accommodation containers 100 are distinguished from each other, the four liquid accommodation containers are referred to as liquid accommodation containers 100A to 100D. The carriage 30 is configured to be movable to a replacement position at which replacement of the liquid accommodation container 100 is possible and a standby position at which the replacement of the liquid accommodation container 100 is not possible.

The printing head 5 is provided on the surface of the carriage 30 that faces in the +Z direction. A plurality of nozzles for discharging ink droplets are provided on the surface of the printing head 5, which faces the +Z direction. Each nozzle is coupled to any of the liquid accommodation containers 100A to 100D mounted on the accommodation section 4 via a flow path in the carriage 30. The accommodation section 4 is provided with a liquid introduction portion 6, described later, and a coupling mechanism 400, also described later. The liquid introduction portion 6 is configured to be detachable from a liquid supply port (described later) 104*op* of the liquid accommodation container 100. At the liquid introduction portion 6, an ink is supplied from the liquid accommodation container 100, and the ink is introduced into the printing head 5 via the flow path in the carriage 30. The coupling mechanism 400 includes a plurality of apparatus-side terminals 490, described later.

The main scanning feeding mechanism includes a drive belt 36, a carriage motor 32, a sliding shaft 34, and a pulley 38. The drive belt 36 is an endless belt and is stretched between the carriage motor 32 and the pulley 38. The carriage 30 is fixed to the drive belt 36. The sliding shaft 34 is provided in parallel with the shaft of a paper feeding roller 26, described later, and holds the carriage 30 slidably. As the carriage motor 32 rotates, the carriage 30 fixed to the drive belt 36 moves in the +X direction and the −X direction along the sliding shaft 34.

The sub-scanning feeding mechanism includes a paper feeding motor 22 and the paper feeding roller 26. As the paper feeding motor 22 rotates, the paper feeding roller 26 transports a print medium PA in the Y-direction.

The printing apparatus 20 further includes a main control unit 40. The main control unit 40 is coupled to the carriage 30 by a cable 31. A bus 46 is formed in the cable 31, and the main control unit 40 is electrically coupled to a sub-control board 500 (described later) of the carriage 30 via the bus 46.

The main control unit 40 controls each of the above mechanisms to realize printing processing. For example, the main control unit 40 receives a print job of a user from a computer 90 via a connector 80, and performs printing based on the content of the received print job. A print medium PA is transported in the +Y direction by the paper feeding roller 26, and the printing head 5 provided on the carriage 30 is moved in the +X direction and the −X direction by the drive belt 36. In this manner, an ink is charged from the printing head 5 in the +Z direction. The discharged ink lands at a certain place on the print medium PA, and an image is formed. In the present disclosure, an "image" includes characters and symbols, among other things. In the present disclosure, the +X direction and the −X direction in which the carriage 30 moves are collectively referred to as a "main scanning direction". The −Y direction and +Y direction in which the print medium PA is fed are collectively referred to as a "sub-scanning direction".

The printing apparatus 20 further includes an operation portion 70. The user makes various settings of the printing apparatus 20 or checks the status of the printing apparatus 20, by using the operation portion 70.

As described above, the printing apparatus 20 includes the printing head 5, the liquid introduction portion 6 for introducing a liquid into the printing head 5, the accommodation section 4 that is provided with the liquid introduction portion 6 and accommodates the liquid accommodation container 100, and the plurality of apparatus-side terminals 490. The printing head 5 is provided in the printing apparatus 20. The printing head 5 is not provided in the liquid accommodation container 100. A form in which the printing head 5 is provided in the liquid accommodation container 100 differs from the present disclosure in the technical field.

Figure 3:
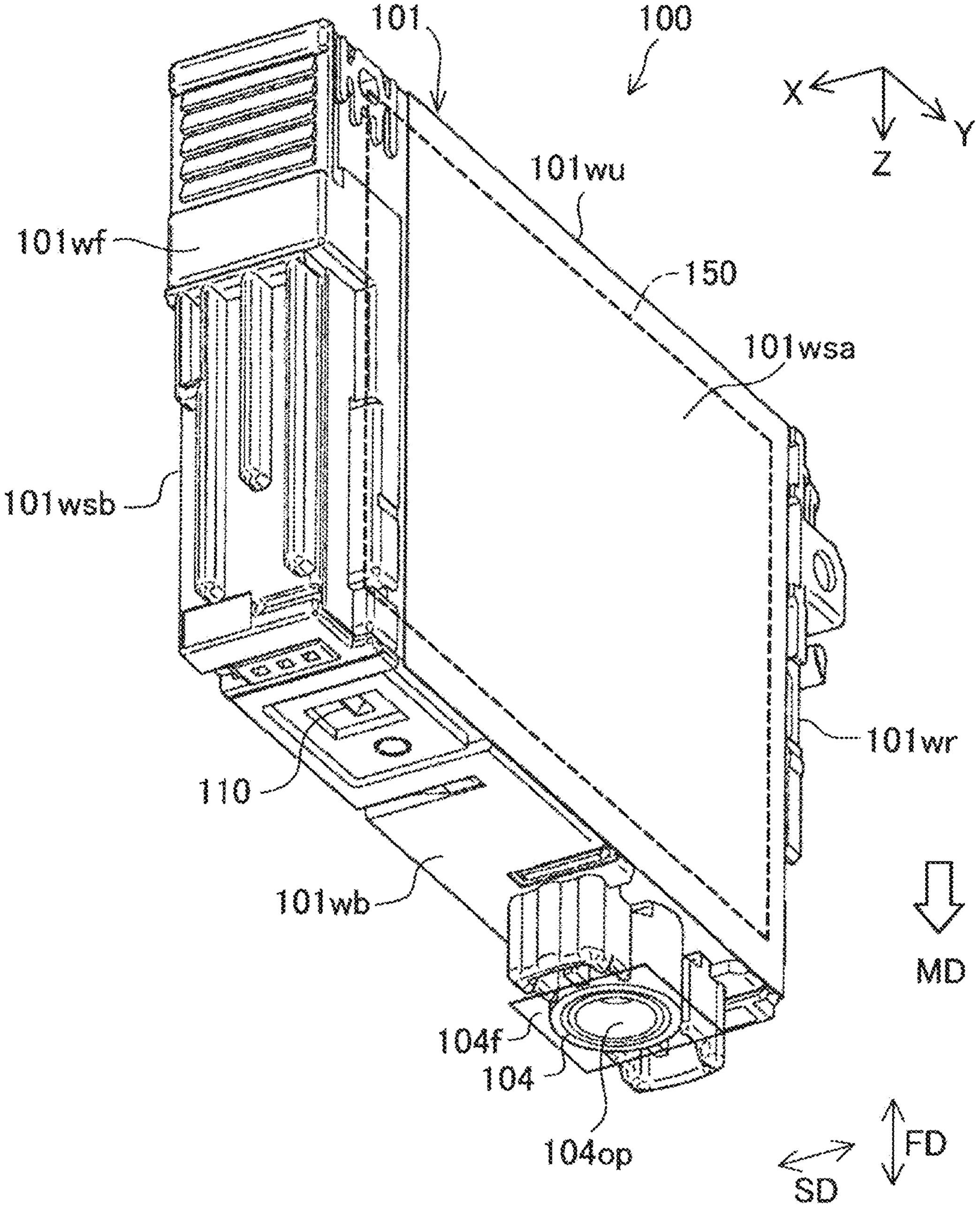
FIG. 3 is a first perspective view illustrating a configuration of a liquid accommodation container.
Figure 4:
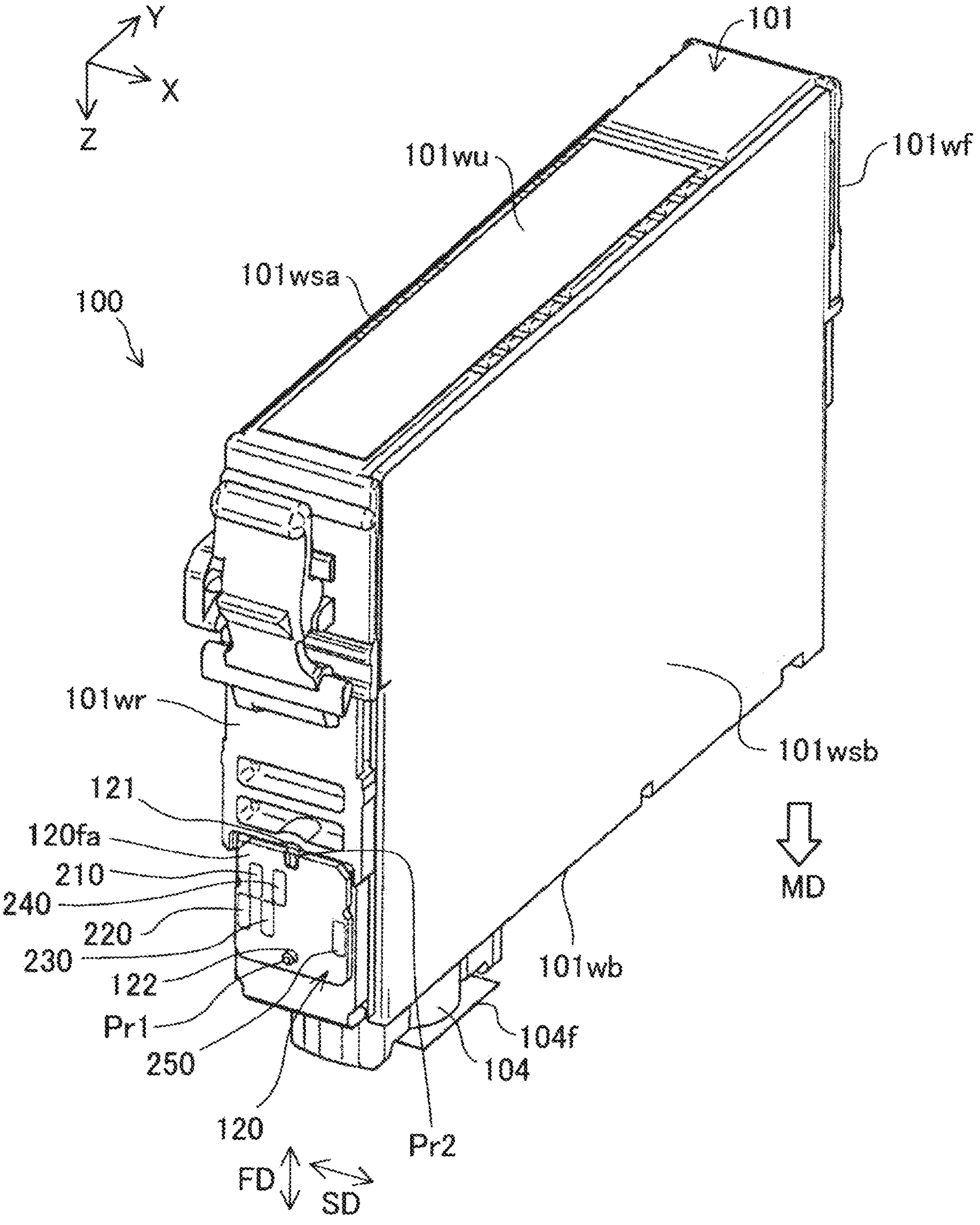
FIG. 4 is a second perspective view illustrating the configuration of the liquid accommodation container.

The configuration of the liquid accommodation container 100 will be described with reference to FIGS. 3 and 4. FIG. 3 is a first perspective view illustrating the configuration of the liquid accommodation container 100. FIG. 4 is a second perspective view illustrating the configuration of the liquid accommodation container 100. The directions of the X-axis, Y-axis, and Z-axis for the liquid accommodation container 100 are set based on a state where the printing apparatus 20 is arranged on a horizontal plane parallel to the X-direction and the Y-direction, and the liquid accommodation container 100 is mounted in the printing apparatus 20, as illustrated in FIG. 1.

As illustrated in FIGS. 3 and 4, the external shape of the liquid accommodation container 100 is a substantially rectangular parallelepiped shape. As illustrated in FIGS. 3 and 4, the liquid accommodation container 100 includes a liquid accommodation body 101 capable of accommodating an ink as a liquid, a liquid supply portion 104 having a liquid supply port 104*op*, and a board 120.

The liquid accommodation body 101 forms the outer shell of the liquid accommodation container 100. The liquid accommodation body 101 has a first wall 101*wf*, a second wall 101*wr*, a third wall 101*wb*, a fourth wall 101*wu*, a fifth wall 101*wsa*, and a sixth wall 101*wsb*. An ink chamber 150 that accommodates an ink is formed inside the liquid accommodation body 101 by the six walls 101*wf*, 101*wr*, 101*wb*, 101*wu*, 101*wsa*, and 101*wsb*. The first wall 101*wf* is a wall on the +Y direction side and forms a front wall. The front wall is directed to the front side of the printing system 1000. The second wall 101*wr* faces the first wall 101*wf*. The second wall 101*wr* is a wall on the −Y direction side and forms a rear wall. The rear wall is directed to the rear side of the printing system 1000. The third wall 101*wb* intersects with the first wall 101*wf* and the second wall 101*wr*, and is substantially perpendicular to the first wall 101*wf* and the second wall 101*wr* in the present embodiment. The third wall 101*wb* is a wall on the +Z direction side and forms a bottom wall. The fourth wall 101*wu* intersects with the first wall 101*wf* and the second wall 101*wr*, and is substantially perpendicular to the first wall 101*wf* and the second wall 101*wr* in the present embodiment. The fourth wall 101*wu* faces the third wall 101*wb*. The fourth wall 101*wu* is a wall on the −Z direction side and forms an upper wall. The fifth wall 101*wsa* intersects with the first wall 101*wf* to the fourth wall 101*wu* and is substantially perpendicular to the first wall 101*wf* to the fourth wall 101*wu* in the present embodiment. The fifth wall 101*wsa* is a wall on the −X direction side and forms a right side wall. The sixth wall 101*wsb* intersects with the first wall 101*wf* to the fourth wall 101*wu* and is substantially perpendicular to the first wall 101*wf* to the fourth wall 101*wu* in the present embodiment. The sixth wall 101*wsb* faces the fifth wall 101*wsa*. The sixth wall 101*wsb* is a wall on the +X direction side and forms a left side wall.

The liquid supply portion 104 is a tubular member that protrudes from the third wall 101*wb*. The liquid supply port 104*op* is located on the tip side of the liquid supply portion 104. The liquid supply port 104*op* is in fluid communication with the ink chamber 150 of the liquid accommodation body 101. When the liquid accommodation container 100 is mounted on the carriage 30 of the printing apparatus 20, an ink is supplied to the liquid introduction portion 6 (described later) of the carriage 30 through the liquid supply port 104*op*. The liquid supply port 104*op* is sealed by a film 104*f*. The liquid supply port 104*op* is configured to be detachable from the liquid introduction portion 6. When the liquid accommodation container 100 is mounted on the carriage 30, the film 104*f* is broken by the liquid introduction portion 6. The ink accommodated in the ink chamber 150 is supplied to the printing head 5 of the printing apparatus 20 via the liquid introduction portion 6. As the ink in the ink chamber 150 is consumed, air is introduced into the ink chamber 150 through an atmospheric air opening hole (not illustrated).

A direction in which the liquid accommodation container 100 is mounted on the carriage 30 of the printing apparatus 20 is set as a mounting direction MD. The mounting direction MD is also a direction in which the board 120 is mounted on the carriage 30 of the printing apparatus 20. In the present embodiment, the mounting direction MD is the +Z direction. Two directions perpendicular to each other are referred to as a first direction FD and a second direction SD. The first direction FD is a direction including at least a component of the mounting direction MD. In the present embodiment, the first direction FD is the Z-direction and the second direction SD is the X-direction. The first direction FD extends substantially along a front surface 120*fa* of the board 120.

The first direction FD is also defined as follows. For example, the first direction FD is perpendicular to a virtual plane including the liquid supply port 104*op*. For example, the first direction FD is a direction in which the apparatus-side terminal 490 of the printing apparatus 20 described later passes over a terminal 290 described later when the liquid accommodation container 100 or the board 120 is mounted on the carriage 30. For example, the first direction FD is a direction orthogonal to a direction in which a plurality of apparatus-side terminals 490 of the printing apparatus 20 are arranged. In other embodiments, when the front surface 120*fa* is inclined from the mounting direction MD, the first direction FD is a direction different from the mounting direction MD.

The board 120 is used for the liquid accommodation container 100. In the present embodiment, as illustrated in FIG. 4, the board 120 is provided on the second wall 101*wr* of the liquid accommodation body 101. Details of the board 120 will be described later.

Two protrusions Pr1 and Pr2 are formed on the second wall 101*wr*. The protrusions Pr1 and Pr2 protrude in the −Y direction. A hole 122 and a notch 121 for receiving the protrusions Pr1 and Pr2 are formed in the board 120, respectively. The hole 122 is formed at the center of an end portion of the board 120 on the liquid supply portion 104 side. The notch 121 is formed at the center of an end portion of the board 120 on an opposite side of the liquid supply portion 104. When the board 120 is fixed to the second wall 101*wr*, the protrusions Pr1 and Pr2 are inserted into the hole 122 and the notch 121, respectively. Then, the tips of the protrusions Pr1 and Pr2 are crushed. As a result, the board 120 is fixed to the second wall 101*wr*. The ways for fixing the board 120 to the second wall 101*wr* is not limited to the above description.

In the present embodiment, when the liquid accommodation container 100 is viewed from a direction perpendicular to the second wall 101*wr* on which the board 120 is provided, in a plan view of the board, the board 120 is arranged such that the central axis of the liquid supply port 104*op* overlaps a first virtual line C1 described later. A contact portion cp, which will be described later, is not arranged to overlap the central axis of the liquid supply port 104*op* in the plan view.

As illustrated in FIG. 3, the liquid accommodation container 100 further includes a liquid detection member 110. The liquid detection member 110 is fixed in the liquid accommodation body 101. The liquid detection member 110 is a member used when the printing apparatus 20 detects the remaining amount of ink in the liquid accommodation container 100. For example, the liquid detection member 110 may be a prism for optically detecting the remaining amount of ink, a piezoelectric element in which a piezoelectric body is sandwiched between two electrodes facing each other, or two electrodes that detect the remaining amount of ink by a difference in resistance between the electrodes. In some embodiments, the liquid detection member 110 may not be provided.

Figure 5:
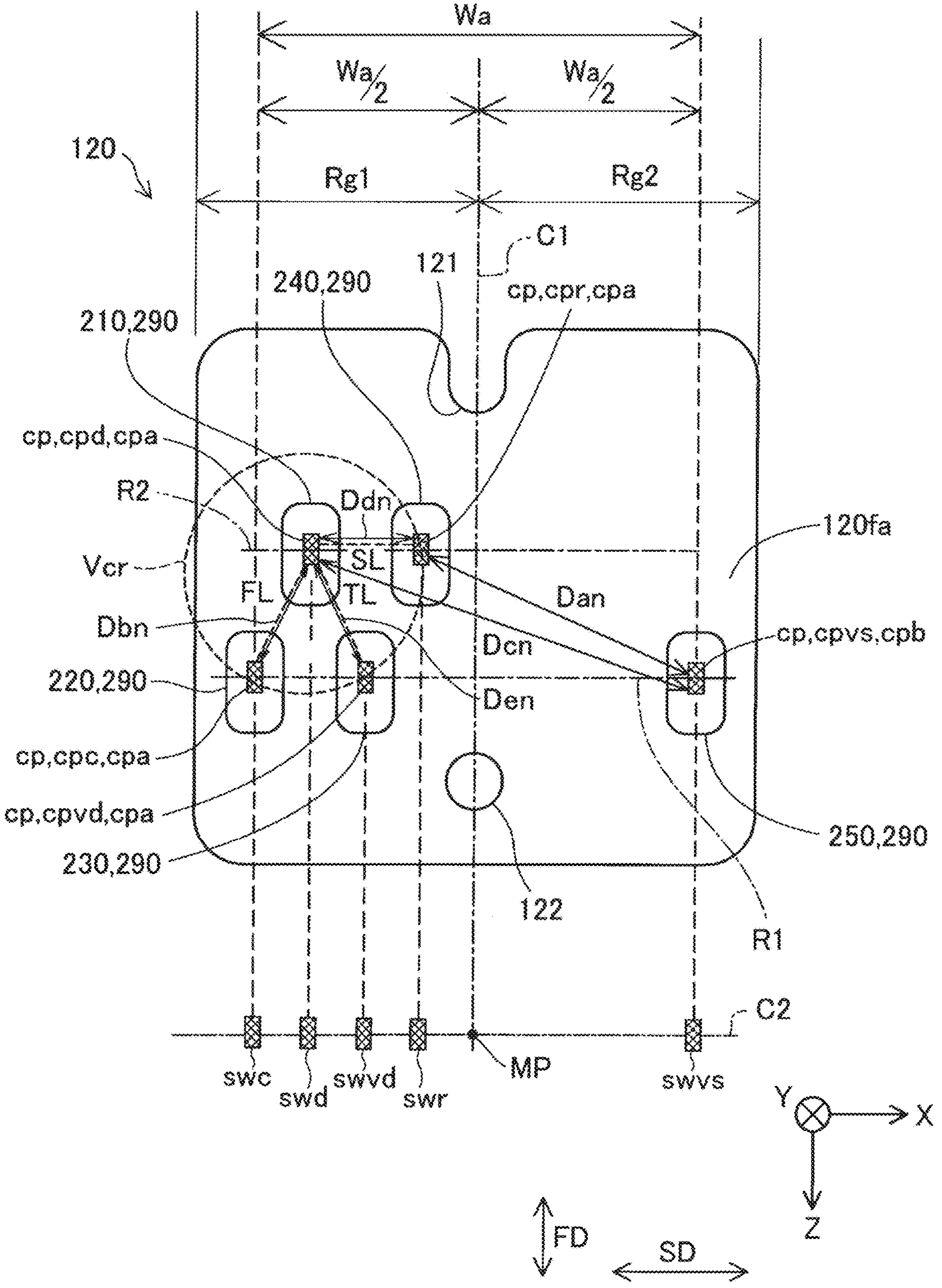
FIG. 5 is a first diagram illustrating a configuration of a board.
Figure 6:
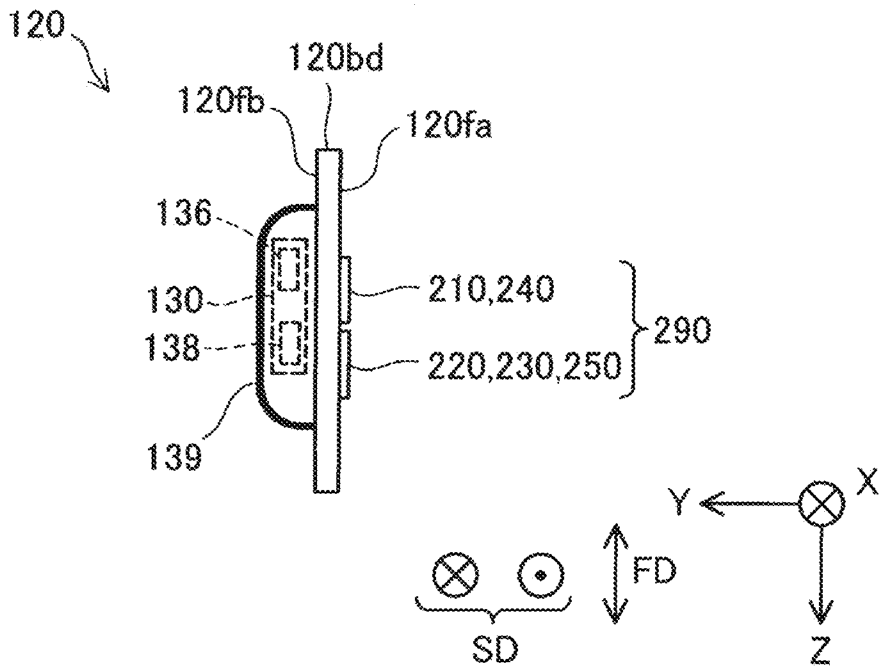
FIG. 6 is a second diagram illustrating the configuration of the board.

The details of the board 120 will be described with reference to FIGS. 5 and 6. FIG. 5 is a first diagram illustrating the configuration of the board 120. FIG. 6 is a second diagram illustrating the configuration of the board 120. As illustrated in FIG. 6, the board 120 includes a base member **120*bd*, a plurality of terminals 290, a device 130, and a wiring (not illustrated). The board 120 may include other components. The base member 120*bd* has the front surface 120*fa* and a back surface 120*fb*. In the present embodiment, the front surface 120*fa* and the back surface 120*fb* are each planar. The base member 120*bd* may be made of a material forming a rigid substrate, a flexible substrate, or the like. The terminal 290** is formed of a conductor such as a gold leaf.

In the present disclosure, in the context of the base member **120*bd*, the "surface" can refer to a surface of the base member 120*bd* that faces the apparatus-side terminal 490 (described later) when the liquid accommodation container 100 or the board 120 is mounted in the printing apparatus 20. For example, the "surface" can refer to a surface of the base member 120*bd*, on which the terminal 290 is formed, in addition to the surface facing the apparatus-side terminal 490 (described later) when the liquid accommodation container 100 or the board 120 is mounted in the printing apparatus 20. For example, the "surface" can refer to a surface of the base member 120*bd*, which includes the contact portion cp described later. In the present embodiment, the "surface" refers to the front surface 120*fa*. In other embodiments, the "surface" refers to the front surface 120*fa*** unless otherwise stated.

As illustrated in FIG. 5, the plurality of terminals 290 include a data terminal 210, a clock terminal 220, a power source terminal 230, a reset terminal 240, and a ground terminal 250. Each of the terminals 210, 220, 230, 240, and 250 is coupled to the device 130. Each of the terminals 210 to 250 is electrically coupled to the device 130 via a wiring pattern layer and a through-hole (not illustrated). The wiring pattern layer is provided on the front surface **120*fa* and the back surface 120*fb* of the base member 120*bd*. The through-hole is provided in the base member 120*bd*. The data terminal 210 is used to transmit and receive a data signal SDA between the device 130 and the printing apparatus 20. Here, the "signal" refers to a change in voltage. The signals transmitted and received via the data terminal 210 include, for example, signals indicating various types of data stored in a storage unit 138, described later, signals that are controlled by a processing unit 136, described later, that are not stored in the storage unit 138, and signals that are controlled by the main control unit 40 and a sub-control unit 50 of the printing apparatus 20 and are not stored in the storage unit 138. The clock terminal 220 is used to transmit a clock signal SCK from the printing apparatus 20 to the device 130. The power source terminal 230 is used to supply a power source voltage VDD from the printing apparatus 20 to the device 130. The reset terminal 240 is used to transmit a reset signal RST from the printing apparatus 20 to the device 130. The ground terminal 250 is grounded via an apparatus-side terminal 450 (described later) of the printing apparatus 20. Voltages supplied to the data terminal 210, the clock terminal 220, the power source terminal 230, and the reset terminal 240 are voltages enabled to be received by the device 130. The ranges of the voltage supplied to the respective terminals 210 to 240 are the same. In the present embodiment, the above ranges are about 0 V to about 3.3 V. The voltage enabled to be received by the device 130 is, for example, a voltage lower than a voltage used to drive the printing head 5, a voltage as high as the power source voltage VDD, a voltage lower than the withstand voltage of the device 130, a voltage at which the device 130 is not broken, or a voltage at which the device 130 does not perform an erroneous operation. Here, a check terminal used for the shipment inspection is not included in the terminals 290 in the present disclosure. A check terminal is a terminal that does not come into contact with the apparatus-side terminal 490 of the printing apparatus 20 when the liquid accommodation container 100 is mounted in the printing apparatus 20**. And a check terminal does not form any contact portion cp, described later.

The terminals 210, 220, 230, 240, and 250 include contact portions cp that are arranged to contact the corresponding apparatus-side terminals 410, 420, 430, 440, and 450 among a plurality of apparatus-side terminals 490 of the coupling mechanism 400 in the printing apparatus 20 when the liquid accommodation container 100 is mounted on the accommodation section 4. The contact portion cp of the data terminal 210 is also referred to as a data contact portion cpd. The contact portion cp of the clock terminal 220 is also referred to as a clock contact portion cpc. The contact portion cp of the power source terminal 230 is also referred to as a power-source contact portion cpvd. The contact portion cp of the reset terminal 240 is also referred to as a reset contact portion cpr. The contact portion cp of the ground terminal 250 is also referred to as a ground contact portion cpvs. The contact portions cp can be partial regions on the terminals 210, 220, 230, 240, and 250, which can contact the apparatus-side terminals 410, 420, 430, 440, and 450, respectively, when the liquid accommodation container 100 is mounted on the accommodation section 4. Although the contact portions cp are arranged to contact corresponding apparatus-side terminals of printing apparatus 20, the contact portions cp are regions of the liquid accommodation container 100, which is separate from the printing apparatus 20 and is often sold or supplied to users separately from the printing apparatus 20. The board 120 has the data contact portion cpd, the clock contact portion cpc, the power-source contact portion cpvd, the reset contact portion cpr, and the ground contact portion cpvs. The coupling between the terminal 290 and the apparatus-side terminal 490 of the printing apparatus 20 will be described later. The terminal 290 can include contact portions cp other than contact portions cp of the above terminals 210 to 250.

The data terminal 210 is used to detect whether or not the data terminal 210 has a short circuit with at least one of the clock terminal 220, the power source terminal 230, and the reset terminal 240. Specifically, the data terminal 210 is used to detect whether or not the data terminal 210 is in a short-circuited state (described later) with at least one of the clock terminal 220, the power source terminal 230, and the reset terminal 240. The data terminal 210 is also used to detect whether or not the liquid accommodation container 100 is mounted in the printing apparatus 20. Specifically, the data terminal 210 is used to detect whether the liquid accommodation container 100 is in a mounting-completed state, described later, or a non-mounting-completed state, also described later.

The board 120 illustrated in FIG. 5 is viewed in a plan view. As illustrated in FIG. 5, two orthogonal straight lines are referred to as a first virtual line C1 and a second virtual line C2. In the present embodiment, the first virtual line C1 extends along the first direction FD, and the second virtual line C2 extends along the second direction SD. In the present embodiment, these two orthogonal straight lines C1, C2 extend substantially along the surface 120*fa* of the base member 120*bd*.

The positions of all of the contact portions cp of all the terminals 290 provided on the base member 120*bd* of the board 120 can be projected onto the second virtual line C2. In the present embodiment, the positions of the data contact portion cpd, the clock contact portion cpc, the power-source contact portion cpvd, the reset contact portion cpr, and the ground contact portion cpvs can be projected onto the second virtual line C2. Regarding projection positions of the contact portions cp, the projection position of the data contact portion cpd is set as swd, the projection position of the clock contact portion cpc is set as swc, the projection position of the power-source contact portion cpvd is set as swvd, the projection position of the reset contact portion cpr is set as swr, and the projection position of the ground contact portion cpvs is set as swvs. The projection positions swd, swc, swvd, swr, and swvs indicate orthogonal projections obtained by projecting, in a direction perpendicular to the second virtual line C2, the positions of the respective contact portions cpd, cpc, cpvd, cpr, and cpvs onto the second virtual line C2. In this embodiment, the positions of all the contact portions cp are projected at different positions. The data contact portion cpd, the clock contact portion cpc, the power-source contact portion cpvd, the reset contact portion cpr, and the ground contact portion cpvs are arranged so that virtual lines extending along the same direction as the first virtual line C1, which pass through the respective contact portions cp, are parallel to each other instead of overlapping or intersecting with each other. The first virtual line C1 passes through the middle MP between the two farthest projection positions among the projection positions of all the contact portions cp. In the present embodiment, the first virtual line C1 passes through the middle MP between the projection position swvs of the ground contact portion cpvs and the projection position of the contact portion, which is arranged farthest from the projection position swvs of the ground contact portion cpvs, among the projection positions swd, swc, swvd, and swr of the data contact portion cpd, the clock contact portion cpc, the power-source contact portion cpvd, and the reset contact portion cpr. In the present embodiment, the first virtual line C1 passes through the middle between the projection position swc of the clock contact portion cpc and the projection position swvs of the ground contact portion cpvs.

The first virtual line C1 defines two regions on the base member 120*bd*. One region of the base member 120*bd* in the board 120 is first region Rg1, and the other region of the base member 120*bd* in the board 120 is second region Rg2. In the present embodiment, the first region Rg1 is a region on the −X direction side being the negative direction of the second direction SD from the first virtual line C1, and the second region Rg2 is a region on the +X direction side being the positive direction of the second direction SD from the first virtual line C1. The first region Rg1 is also one of regions of the base member 120*bd* sandwiching the first virtual line C1, and the second region Rg2 is also the other region of the base member 120*bd* sandwiching the first virtual line C1. Among all the contact portions cp, some contact portions cpa are arranged in the first region Rg1, and the remaining contact portions cpb are arranged in the second region Rg2. The some contact portions cpa arranged in the first region Rg1 include the data contact portion cpd, the clock contact portion cpc, the power-source contact portion cpv, and the reset contact portion cpr. The remaining contact portions cpb arranged in the second region Rg2 include the ground contact portion cpvs. Thus, the clock contact portion cpc, the data contact portion cpd, the reset contact portion cpr, and the power-source contact portion cpvd are arranged on one side of the first virtual line C1, and the ground contact portion cpvs is arranged on the other side. The some contact portions cpa are arranged on the board 120 in a first pattern in the first region Rg1 and the remaining contact portions cpb are arranged in a second pattern in the second region Rg2, and the first pattern is asymmetrical to the second pattern with respect to the first virtual line C1. None of the contact portions cp are positioned on the first virtual line C1.

The ground contact portion cpvs is arranged at the end of the plurality of contact portions cp in the +X direction being the positive direction of the second direction SD. Any one contact portion cp among the clock contact portion cpc, the data contact portion cpd, the power-source contact portion cpvd, and the reset contact portion cpr is arranged at the end of the plurality of contact portions cp in the −X direction being the negative direction of the second direction SD, and any one such contact portion cp is located on the one outermost side in the second direction SD among the plurality of contact portions cp. The ground contact portion cpvs is located on the other outermost side in the second direction SD among the plurality of contact portions cp. As shown in FIG. 5, Wa is a distance between the projection position swvs of the ground contact portion cpvs and a farthest projection position among the projection positions of the contact portions cp in the first region Rg1. In the present embodiment, the distance between the projection position swc of the clock contact portion cpc and the projection position swvs of the ground contact portion cpvs is Wa. In the present embodiment, a distance between the clock contact portion cp and the ground contact portion cpvs in the second direction SD is as the same as the distance Wa.

The data contact portion cpd, the clock contact portion cpc, the power-source contact portion cpvd, and the reset contact portion cpr are preferably positioned far away from the ground contact portion cpvs. For example, a distance between the projection position swvs of the ground contact portion cpvs and a nearest projection position among the projection positions of the contact portions cp in the first region Rg1 is equal to or more than Wa/2. In the present embodiment, a distance between the reset contact portion cpr and the ground contact portion cpvs in the second direction SD is equal to or more than Wa/2. In embodiments, among all of the contact portions cp coupled to the device 130 via terminal 290 that are located in the second region Rg2, the projection position swvs of the ground contact portion cpvs is closest to the first virtual line C1. In the present embodiment, there are no other contact portions cp coupled to the device 130 via the terminal 290 that are arranged between the reset contact portion cpr and the ground contact portion cpvs along the second direction SD. In the present embodiment, contact portions cpd, cpc, cpvd, cpr and the ground contact portions cpvs on the board 120 are not provided on the first virtual line C1.

At least one of the clock contact portion cpc, the power-source contact portion cpvd, and the reset contact portion cpr is arranged on the board 120 to be projected between the projection position swd of the data contact portion cpd and the projection position swvs of the ground contact portion cpvs. Preferably, any two or more contact portions cp among the clock contact portion cpc, the power-source contact portion cpvd, and the reset contact portion cpr are arranged on the board 120 to be projected between the projection position swd of the data contact portion cpd and the projection position swvs of the ground contact portion cpvs. In the present embodiment, the power-source contact portion cpvd and the reset contact portion cpr are arranged on the board 120 to be projected between the projection position swd of the data contact portion cpd and the projection position swvs of the ground contact portion cpvs.

The data contact portion cpd is arranged on the board 120 to be projected between the projection positions of any two contact portions cp among the power-source contact portion cpvd, the reset contact portion cpr, and the clock contact portion cpc. The data contact portion cpd is not the contact portion that is projected the farthest on the second virtual line C2 from the projection position swvs of the ground contact portion cpvs. In the present embodiment, the data contact portion cpd is arranged to be projected between the projection positions of the clock contact portion cpc and the power-source contact portion cpvd.

Either or both of the data contact portion cpd and the reset contact portion cpr are arranged on the board 120 to be projected between the projection position swvd of the power-source contact portion cpvd and the projection position swc of the clock contact portion cpc. The reset contact portion cpr is arranged so that the projection position swr is next to the projection position swvd of the power-source contact portion cpvd, among the projection positions swc, swd, and swvd. In the present embodiment, the data contact portion cpd is arranged on the board 120 to be projected between the projection position swvd of the power-source contact portion cpvd and the projection position swc of the clock contact portion cpc. The phrase "next to the projection position" does not necessarily mean that one contact portion and the other contact portion are closest to each other among all contact portions on the board 120. Other components may be arranged between one contact portion and the other contact portion in a range without departing from the gist of the present disclosure.

The power-source contact portion cpvd is arranged on the board 120 so that the projection position swvd is next to the projection position swd of the data contact portion cpd, among the projection positions swc, swd, and swr.

In the present embodiment, the clock contact portion cpc is arranged on the board 120 to be projected at the farthest position from the projection position swvs of the ground contact portion cpvs. Further, the data contact portion cpd, the power-source contact portion cpvd, and the reset contact portion cpr are arranged to be projected in order in a direction from the projection position swc of the clock contact portion cpc toward the projection position swvs of the ground contact portion cpvs on the second virtual line C2. The clock contact portion cpc is located at the end in the −X direction being the negative direction of the second direction SD. The contact portions cp other than the clock contact portion cpc are arranged in order of the data contact portion cpd, the power-source contact portion cpvd, and the reset contact portion cpr from the −X direction being the negative direction of the second direction SD to the +X direction being the positive direction of the second direction SD. The projection positions of the plurality of contact portions cp are arranged in order of the clock contact portion cpc, the data contact portion cpd, the power-source contact portion cpvd, the reset contact portion cpr, and the ground contact portion cpvs from the −X direction to the +X direction.

The clock contact portion cpc, the data contact portion cpd, the power-source contact portion cpvd, the reset contact portion cpr, and the ground contact portion cpvs are arranged on the board 120 to form a plurality of rows. The plurality of rows are parallel to the second virtual line C2 and perpendicular to the first virtual line C1. In the present embodiment, the plurality of contact portions cp are arranged to form two rows perpendicular to the first direction FD, and directions of the two rows are parallel to the second direction SD. A direction in which the two rows are arranged with respect to each other is the direction along the first virtual line C1, and the direction along the first direction FD in the present embodiment. The two rows are referred to as a first row R1 and a second row R2. The first row R1 is formed by the clock contact portion cpc, the power-source contact portion cpvd, and the ground contact portion cpvs. The second row R2 is formed by the data contact portion cpd and the reset contact portion cpr. The data contact portion cpd and the reset contact portion cpr forming the second row R2, and the clock contact portion cpc, the power-source contact portion cpvd, and the ground contact portion cpvs forming the first row R1 are configured to form a so-called staggered arrangement in which the data contact portion cpd and the reset contact portion cpr forming the second row R2, and the clock contact portion cpc, the power-source contact portion cpvd, and the ground contact portion cpvs forming the first row R1 are arranged in a staggered manner so the contact portions cp are not aligned with each other in the direction of the first virtual line C1. And any two of these contact portions cp that have projection positions that are next to each other on the second virtual line C2, are positioned in different rows. The data contact portion cpd and the ground contact portion cpvs are arranged in different rows. Any contact portion cp among the clock contact portion cpc, the power-source contact portion cpvd, and the reset contact portion cpr is arranged to be projected between the projection position swd of the data contact portion cpd and the projection position swvs of the ground contact portion cpvs. In the present embodiment, the reset contact portion cpr and the power-source contact portion cpvd are arranged to be projected between the projection position swd of the data contact portion cpd and the projection position swvs of the ground contact portion cpvs. In the present embodiment, the contact portions cp of the respective terminals 210 to 250 are arranged to form the first row R1 and the second row R2, but the present disclosure is not limited to this. For example, the contact portions cp of the respective terminals 210 to 250 may be arranged to form three rows or four rows. Rows may also be formed by one contact portion cp.

A distance between the ground contact portion cpvs and the reset contact portion cpr is set as a distance Dan. A distance between the data contact portion cpd and the clock contact portion cpc is set as a distance Dbn. A distance between the data contact portion cpd and the ground contact portion cpvs is set as a distance Dcn. A distance between the data contact portion cpd and the reset contact portion cpr is set as a distance Ddn. A distance between the data contact portion cpd and the power-source contact portion cpvd is set as a distance Den. In this case, the distance Dcn is longer than the distance Dbn. The distance Dcn is longer than the distance Den. The distance Dcn is longer than the distance Ddn. In the present embodiment, the distance Dbn is equal to the distance Den. A distance between the data contact portion cpd and the contact portion cp farthest to the data contact portion cpd among the plurality of contact portions cp other than the ground contact portion cpvs is either of the distance Dbn or the distance Den. In this case, the distance Dan is longer than either of the distance Dbn or the distance Den.

The clock contact portion cpc, the reset contact portion cpr, and the power-source contact portion cpvd are arranged to be adjacent to the data contact portion cpd so as to surround the data contact portion cpd between the data contact portion cpd and the ground contact portion cpvs. By disposing the data contact portion cpd inside a virtual circle Vcr passing through the clock contact portion cpc, the reset contact portion cpr, and the power-source contact portion cpvd, the clock contact portion cpc, the reset contact portion cpr, and the power-source contact portion cpvd surround the data contact portion cpd.

A virtual line segment connecting the clock contact portion cpc and the data contact portion cpd is set as a first line segment FL. A virtual line segment connecting the reset contact portion cpr and the data contact portion cpd is set as a second line segment SL. A virtual line segment connecting the power-source contact portion cpvd and the data contact portion cpd is set as a third line segment TL. On the first line segment FL, there are no contact portions cp of the terminal 290 other than the clock contact portion cpc and the data contact portion cpd. On the second line segment SL, there are no contact portions cp of the terminal 290 other than the reset contact portion cpr and the data contact portion cpd. On the third line segment TL, there are no contact portions cp of the terminal 290 other than the power-source contact portion cpvd and the data contact portion cpd.

In the present embodiment, the five terminals 210 to 250 also have the same positional relation as the above-described contact portions cpd, cpc, cpvd, cpr, and cpvs. That is, the data terminal 210, the clock terminal 220, the reset terminal 240, and the power source terminal 230 are arranged in the first region Rg1. The ground terminal 250 is arranged in the second region Rg2. There are no terminals 290 other than the clock terminal 220 and the data terminal 210 arranged on the first line segment FL. There are no terminals 290 other than the reset terminal 240 and the data terminal 210 arranged on the second line segment SL. There are no terminals 290 other than the power source terminal 230 and the data terminal 210 arranged on the third line segment TL.

As described above, the data terminal 210 is used to detect whether or not the data terminal 210 has a short circuit with the clock terminal 220, the reset terminal 240, and/or the power source terminal 250, and whether or not the liquid accommodation container 100 is mounted in the printing apparatus 20. At least a portion of the arrangement of the contact portions cp in the present disclosure is defined to enable such detections.

As illustrated in FIG. 6, the device 130 is configured to be provided on the base member 120*bd*. The device 130 includes a processing unit 136. In the present embodiment, the device 130 includes the processing unit 136 and a storage unit 138. The device 130 is molded (sealed) with resin 139. The device 130 may also be mounted at the base member 120*bd* by another method.

The processing unit 136 is configured by, for example, a circuit. The processing unit 136 is coupled to the terminals 210 to 250 and controls signals and voltages input/output to/from the terminals 210 to 250. The processing unit 136 may be a circuit having an advanced arithmetic processing function, such as a CPU. Details of the processing unit 136 will be described later.

The storage unit 138 is configured by, for example, a non-volatile memory such as a flash memory. The storage unit 138 stores information regarding the liquid accommodation container 100. The information regarding the liquid accommodation container 100 includes, for example, the ink consumption, the color of the ink, the date of manufacturing the liquid accommodation container 100, and identification information of the liquid accommodation container 100. In the present embodiment, “1” to “4” are assigned as the identification information to the liquid accommodation containers 100A to 100D, respectively.

Figure 7A:
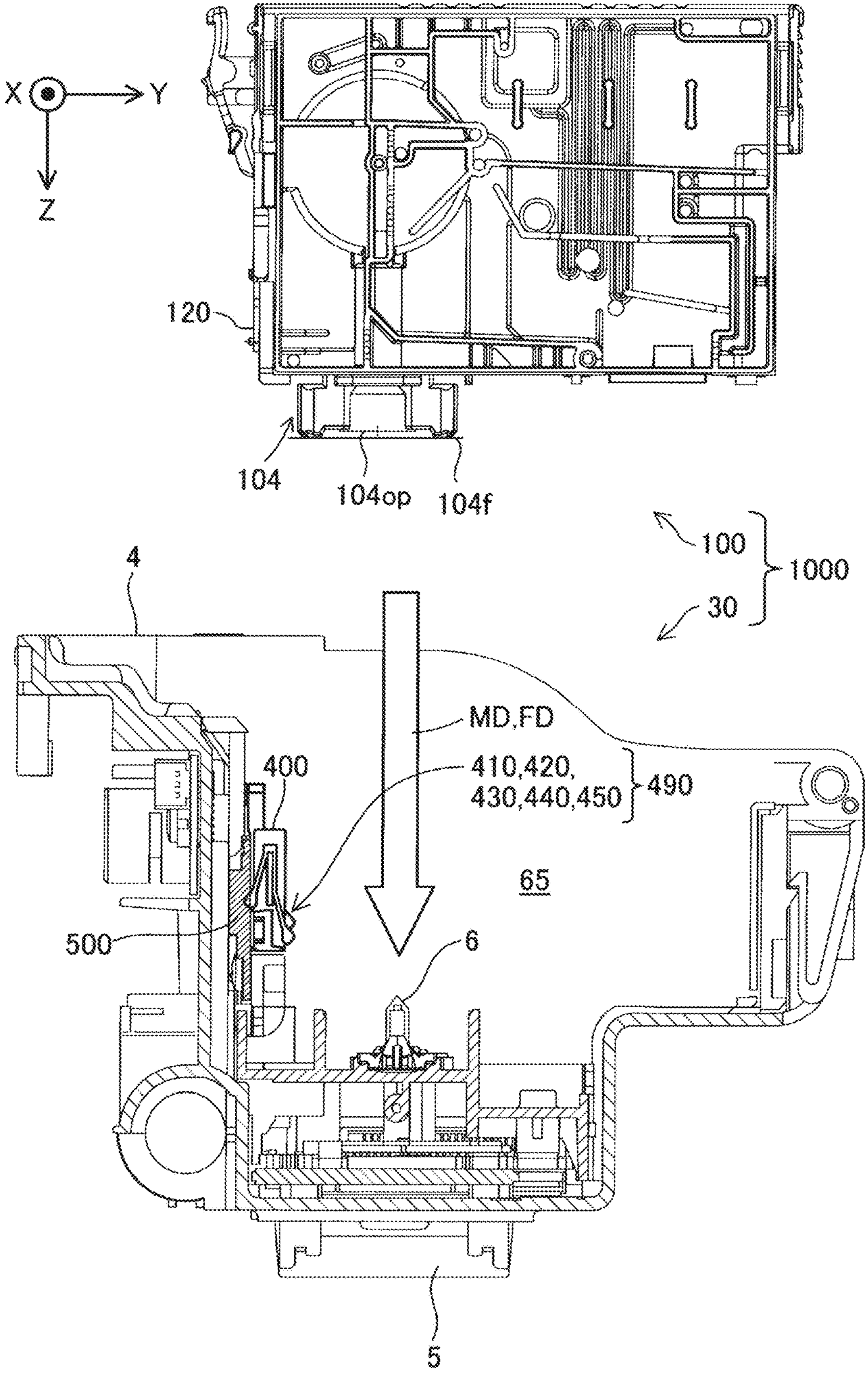
FIG. 7A is a diagram illustrating a form in which the liquid accommodation container is to be mounted on a carriage.
Figure 7B:
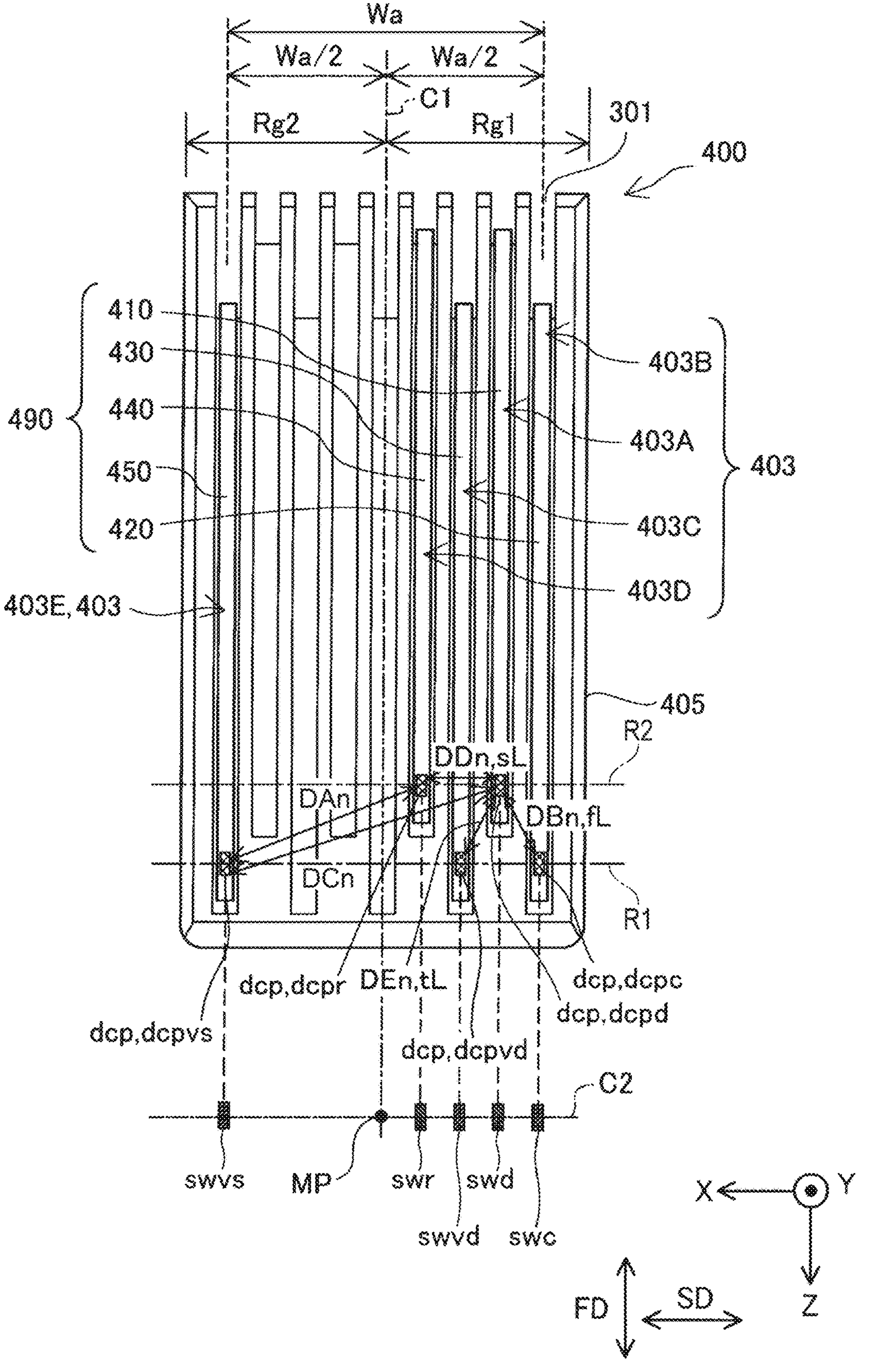
FIG. 7B is a first diagram illustrating a coupling mechanism.
Figure 7C:
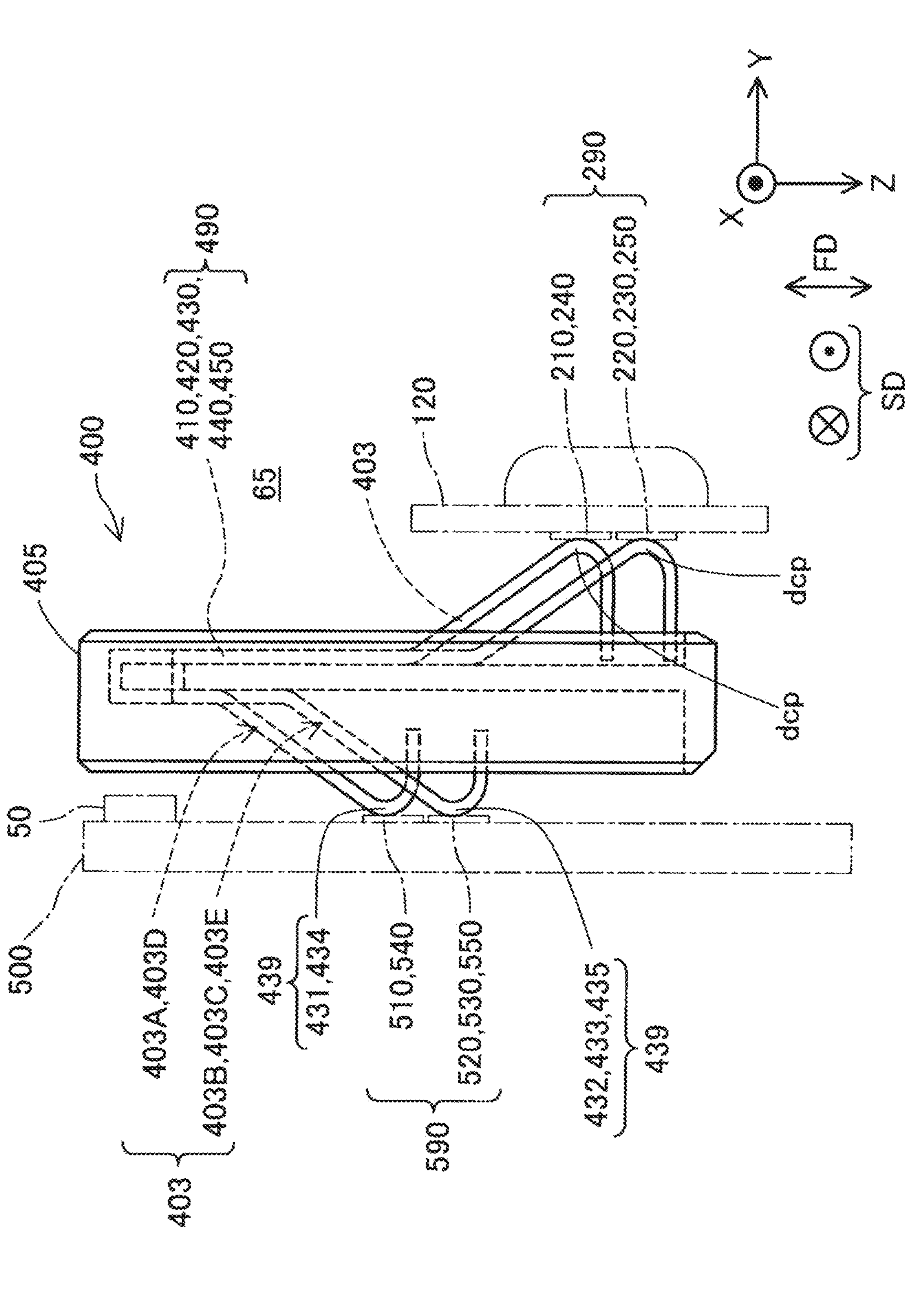
FIG. 7C is a second diagram illustrating the coupling mechanism.

The configuration of the carriage 30 and a form in which the liquid accommodation container 100 is mounted on the carriage 30 will be described with reference to FIGS. 7A to 7C. FIG. 7A is a diagram illustrating the manner in which the liquid accommodation container 100 is mounted on the carriage 30. FIG. 7B is a first diagram illustrating the coupling mechanism 400. FIG. 7C is a second diagram illustrating the coupling mechanism 400.

The carriage 30 includes the accommodation section 4 and the printing head 5. The accommodation section 4 is arranged on the printing head 5 and is configured to detachably mount a plurality of liquid accommodation containers 100. A mounting chamber 65 in which the liquid accommodation container 100 is mounted is formed in the accommodation section 4. In the present embodiment, four mounting chambers 65 are provided corresponding to the liquid accommodation containers 100A to 100D. The printing head 5 includes a plurality of nozzles and a plurality of piezoelectric elements. The printing head 5 discharges ink droplets from each nozzle in accordance with a voltage applied to each piezoelectric element to form dots on a print medium PA. The accommodation section 4 is provided with the liquid introduction portion 6, the sub-control board 500, and the coupling mechanism 400. The liquid introduction portion 6 is arranged over the printing head 5 in the normal use posture of the printing system 1000. Ink is introduced into the printing head 5 from the liquid supply port 104*op* of the liquid accommodation container 100 through the liquid introduction portion 6. In the present embodiment, four liquid introduction portions 6 are provided corresponding to the number of liquid accommodation containers 100A to 100D. A plurality of sub-control board terminals 510, 520, 530, 540, and 550 and the sub-control unit 50 are mounted on the sub-control board 500. When the plurality of sub-control board terminals 510, 520, 530, 540, and 550 are used without distinguishment, the reference sign 590 is used. The plurality of sub-control board terminals 590 are provided for each mounting chamber 65. The plurality of sub-control board terminals 590 are electrically coupled to the sub-control unit 50 via wirings of the sub-control board 500. The sub-control unit 50 is configured as, for example, a carriage circuit, and performs control related to the liquid accommodation container 100 in cooperation with the main control unit 40 illustrated in FIG. 2.

The liquid accommodation container 100 is inserted in the mounting direction MD to be mounted on the accommodation section 4 of the printing apparatus 20. The liquid accommodation container 100 is pulled out in a direction opposite to the mounting direction MD so as to be removed from the accommodation section 4. In this manner, the liquid accommodation container 100 is detachably mounted in the printing apparatus 20. When the liquid accommodation container 100 is mounted on the accommodation section 4, the device 130 is electrically coupled to the main control unit 40 via the terminals 290, the coupling mechanism 400, the sub-control board 500, and the bus 46 illustrated in FIG. 2.

As illustrated in FIGS. 7B and 7C, the coupling mechanism 400 includes a terminal holding portion 405 and a plurality of contact-portion forming members 403 held by the terminal holding portion 405. The coupling mechanism 400 is provided for each of the liquid accommodation containers 100A to 100D, that is, for each mounting chamber 65. As illustrated in FIG. 7B, the terminal holding portion 405 has a plurality of slits 301. The contact-portion forming member 403 is conductive and elastic. The contact-portion forming member 403 is fitted into the slit 301. In the present embodiment, for each coupling mechanism 400, five contact-portion forming members 403 of which the number is equal to the number of the terminals 290 are provided. As illustrated in FIG. 7B, when the five contact-portion forming members 403 are used separately, the reference signs "403A", "403B", "403C", "404D", and "404E" are used. In the present embodiment, nine slits 301 of the coupling mechanism 400 are provided and arranged at predetermined intervals. The number of the slits 301 may be set to be equal to the number of contact-portion forming members 403.

As illustrated in FIG. 7C, the contact-portion forming member 403 is a member that is electrically coupled to the terminal 290 and the sub-control board terminal 590 of the sub-control board 500. A portion of the contact-portion forming member 403, which faces the mounting chamber 65 side, forms the apparatus-side terminal 490. The apparatus-side terminal 490 includes a contact portion dcp of the apparatus-side terminal 490, which contacts the terminal 290. In the present embodiment, in the apparatus-side terminal 490, a portion of the contact-portion forming member 403, which faces the mounting chamber 65 side the closest, that is, the portion that protrudes the closest toward the mounting chamber 65, comes into contact with the terminal 290 to form the contact portion dcp of the apparatus-side terminal 490. The contact portion dcp of the apparatus-side terminal 490 is not limited to the present embodiment. For example, the terminal 290 may come into contact with a portion of the apparatus-side terminal 490 other than the portion that protrudes the closest to the mounting chamber 65. A portion of the contact-portion forming member 403, which protrudes toward the sub-control board 500, forms a relay terminal 439 that comes into contact with the sub-control board terminal 590.

When the apparatus-side terminals 490 are used separately, the reference signs "410", "420", "430", "440", and "450" are used. When the relay terminals 439 are used separately, the reference signs "431", "432", "433", "434" and "435" are used. The apparatus-side terminal 410 and the relay terminal 431 are formed on the contact-portion forming member 403A. The apparatus-side terminal 420 and the relay terminal 432 are formed on the contact-portion forming member 403B. The apparatus-side terminal 430 and the relay terminal 433 are formed on the contact-portion forming member 403C. The apparatus-side terminal 440 and the relay terminal 434 are formed on the contact-portion forming member 403D. The apparatus-side terminal 450 and the relay terminal 435 are formed on the contact-portion forming member 403E. The apparatus-side terminal 410 is also referred to as an apparatus-side data terminal. The apparatus-side terminal 420 is also referred to as an apparatus-side clock terminal. The apparatus-side terminal 430 is also referred to as an apparatus-side power source terminal. The apparatus-side terminal 440 is also referred to as an apparatus-side reset terminal. The apparatus-side terminal 450 is also referred to as an apparatus-side ground terminal.

The contact-portion forming member 403A electrically couples the data terminal 210 and the sub-control board terminal 510. The apparatus-side terminal 410 comes into contact with the data terminal 210, and the relay terminal 431 comes into contact with the sub-control board terminal 510. The contact-portion forming member 403B electrically couples the clock terminal 220 and the sub-control board terminal 520. The apparatus-side terminal 420 comes into contact with the clock terminal 220, and the relay terminal 432 comes into contact with the sub-control board terminal 520. The contact-portion forming member 403C electrically couples the power source terminal 230 and the sub-control board terminal 530. The apparatus-side terminal 430 comes into contact with the power source terminal 230, and the relay terminal 433 comes into contact with the sub-control board terminal 530. The contact-portion forming member 403D electrically couples the reset terminal 240 and the sub-control board terminal 540. The apparatus-side terminal 440 comes into contact with the reset terminal 240, and the relay terminal 434 comes into contact with the sub-control board terminal 540. The contact-portion forming member 403E electrically couples the ground terminal 250 and the sub-control board terminal 550. The apparatus-side terminal 450 comes into contact with the ground terminal 250, and the relay terminal 435 comes into contact with the sub-control board terminal 550.

When the liquid accommodation container 100 is mounted on the accommodation section 4, the terminals 210, 220, 230, 240, and 250 come into contact with the apparatus-side terminals 410, 420, 430, 440, and 450 to be electrically coupled, respectively. The apparatus-side terminals 410, 420, 430, 440, and 450 of the coupling mechanism 400 come into contact with the sub-control board terminal 590 on the sub-control board 500 to be electrically coupled. The sub-control board terminal 590 of the sub-control board 500 is electrically coupled to the sub-control unit 50 by wiring. Thus, the terminals 210, 220, 230, 240, and 250 are electrically coupled to the sub-control unit 50.

The positional relation of each contact portion cp in the liquid accommodation container 100 and the positional relation between each contact portion cp and another element, for example, the positional relation with the first virtual line C1 are similarly applied to the contact portions dcp of the apparatus-side terminals 410 to 450. The arrangement of the contact portions cp in the liquid accommodation container 100 has a mirror image relation with the arrangement of the contact portions dcp of the apparatus-side terminals 490. As illustrated in FIG. 7B, the contact portion dcp of the apparatus-side data terminal 410 is also referred to as an apparatus-side data contact portion dcpd. The contact portion dcp of the apparatus-side clock terminal 420 is also referred to as an apparatus-side clock contact portion dcpc. The contact portion dcp of the apparatus-side power source terminal 430 is also referred to as an apparatus-side power-source contact portion dcpvd. The contact portion dcp of the apparatus-side reset terminal 440 is also referred to as an apparatus-side reset contact portion dcpr. The contact portion dcp of the apparatus-side ground terminal 450 is also referred to as an apparatus-side ground contact portion dcpvs.

In FIG. 7B, the coupling mechanism 400 is viewed in a plan view. Two orthogonal straight lines are referred to as a first virtual line C1 and a second virtual line C2. In FIG. 7B, the first virtual line C1 is a direction along the first direction FD, and the second virtual line C2 is a direction along the second direction SD. In the present embodiment, these two orthogonal straight lines C1, C2 extend substantially along the surface of the terminal holding portion 405.

The positions of the contact portions dcp of all the apparatus-side terminals of the coupling mechanism 400 can be projected onto the second virtual line C2. In the present embodiment, the positions of the apparatus-side data contact portion dcpd corresponding to the data terminal 210, the apparatus-side clock contact portion dcpc corresponding to the clock terminal 220, the apparatus-side power-source contact portion dcpvd corresponding to the power source terminal 230, the apparatus-side reset contact portion dcpr corresponding to the reset terminal 240, and the apparatus-side ground contact portion dcpvs corresponding to the ground terminal 250 can be projected onto the second virtual line C2. Regarding projection positions of the contact portions dcp of the apparatus-side terminals, the projection position of the apparatus-side data contact portion dcpd is set as swd, the projection position of the apparatus-side clock contact portion dcpc is set as swc, and the projection position of the apparatus-side power-source contact portion dcpvd is set as swvd, the projection position of the apparatus-side reset contact portion dcpr is set as swr, and the projection position of the apparatus-side ground contact portion dcpvs is set as swvs. The projection positions swd, swc, swvd, swr, and swvs indicate orthogonal projections obtained by projecting, in a direction perpendicular to the second virtual line C2, the positions of the contact portions dcp of the respective apparatus-side terminals onto the second virtual line C2. In this embodiment, the positions of the contact portions dcp of all the apparatus-side terminals are projected at different positions. The positions of the apparatus-side data contact portion dcpd, the apparatus-side clock contact portion dcpc, the apparatus-side power-source contact portion dcpvd, the apparatus-side reset contact portion dcpr, and the apparatus-side ground contact portion dcpvs are projected at different positions. The apparatus-side data contact portion dcpd, the apparatus-side clock contact portion dcpc, the apparatus-side power-source contact portion dcpvd, the apparatus-side reset contact portion dcpr, and the apparatus-side ground contact portion dcpvs are arranged so that virtual lines extending along the same direction as the first virtual line C1, which pass through the contact portions dcp of the respective apparatus-side terminals, are parallel to each other instead of overlapping or intersecting with each other. The first virtual line C1 passes through the middle MP between the two farthest projection positions among the projection positions of the contact portions dcp of all the apparatus-side terminals. In the present embodiment, the first virtual line C1 passes through the middle MP between the projection position swvs of the apparatus-side ground contact portion dcpvs and the projection position of the contact portion positioned at the farthest position from the projection position swvs of the apparatus-side ground contact portion dcpvs among the projection positions swd, swc, swvd, and swr of the apparatus-side data contact portion dcpd, the apparatus-side clock contact portion dcpc, the apparatus-side power-source contact portion dcpvd, and the apparatus-side reset contact portion dcpr. In the present embodiment, the first virtual line C1 passes through the middle between the projection position swc of the apparatus-side clock contact portion dcpc and the projection position swvs of the apparatus-side ground contact portion dcpvs.

The first virtual line C1 defines two regions on the coupling mechanism 400. One region of the coupling mechanism 400 is a first region Rg1, and the other region of the coupling mechanism 400 is a second region Rg2. In this case, the apparatus-side terminals 410, 420, 430, and 440 are arranged in the first region Rg1, and the apparatus-side terminals 450 are arranged in the second region Rg2. In the present embodiment, the first region Rg1 is a region on the −X direction side being the negative direction of the second direction SD from the first virtual line C1, and the second region Rg2 is a region on the +X direction side being the positive direction of the second direction SD from the first virtual line C1. The first region Rg1 is also one of regions of the coupling mechanism 400 sandwiching the first virtual line C1, and the second region Rg2 is also the other region of the coupling mechanism 400 sandwiching the first virtual line C1. Among the contact portions dcp of all the apparatus-side terminals, some contact portions dcpa are arranged in the first region Rg1, and the remaining contact portions dcpb are arranged in the second region Rg2. The some contact portions dcpa arranged in the first region Rg1 include the apparatus-side data contact portion dcpd, the apparatus-side clock contact portion dcpc, the apparatus-side power-source contact portion dcpv, and the apparatus-side reset contact portion dcpr. The remaining contact portions dcpb arranged in the second region Rg2 include the apparatus-side ground contact portion dcpvs. The apparatus-side clock contact portion dcpc, the apparatus-side data contact portion dcpd, the apparatus-side reset contact portion dcpr, and the apparatus-side power-source contact portion dcpvd are arranged on one side of the first virtual line C1, and the apparatus-side ground contact portion dcpvs is arranged on the other side. The some contact portions dcpa are arranged in a first pattern on the coupling mechanism 400 in the first region Rg1 and the remaining contact portions dcpb are arranged in a second pattern on the coupling mechanism 400 in the second region Rg2, and the first pattern is asymmetrical to the second pattern with respect to the first virtual line C1. None of the contact portions dcp of the apparatus-side terminal are positioned on the first virtual line C1.

As illustrated in FIG. 7B, the apparatus-side ground contact portion dcpvs is arranged at the end of the contact portions dcp of the plurality of apparatus-side terminals in the +X direction being the positive direction of the second direction SD. The contact portion dcp of any one apparatus-side terminal among the apparatus-side clock contact portion dcpc, the apparatus-side data contact portion dcpd, the apparatus-side power-source contact portion dcpvd, and the apparatus-side reset contact portion dcpr is arranged at the end of the contact portions dcp of the plurality of apparatus-side terminals in the −X direction being the negative direction of the second direction SD. The contact portion dcp of such any one apparatus-side terminal is located on the one outermost side in the second direction SD among the contact portions dcp of the plurality of apparatus-side terminals. The apparatus-side ground contact portion dcpvs is located on the other outermost side in the second direction SD among the contact portions dcp of the plurality of apparatus-side terminals. As shown in FIG. 7B, Wa is a distance between the projection position swvs of the apparatus-side ground contact portion dcpvs and a farthest projection position among the projection positions of the apparatus-side contact portions dcp in the first region Rg1. In the present embodiment, the distance between the projection position swc of the apparatus-side clock contact portion dcpd and the projection position swvs of the apparatus-side ground contact portion dcpvs is Wa.

The apparatus-side data contact portion dcpd, the apparatus-side clock contact portion dcpc, the apparatus-side power-source contact portion dcpd, and the apparatus-side reset contact portion dcpr are preferably positioned far away from the apparatus-side ground terminal contact portion dcpvs. For example, a distance between the projection position swvs of the apparatus-side ground contact portion dcpvs and a nearest projection position among the projection positions of the apparatus-side contact portions dcp in the first region Rg1 is equal to or more than Wa/2. In embodiments, among all of the apparatus-side contact portions dcp located in the second region Rg2, the projection position swvs of the apparatus-side ground contact portion dcpvs is closest to the first virtual line C1. In the present embodiment, there are no other contact portions dcp of the other apparatus-side terminals that are arranged between the apparatus-side reset contact portion dcpr and the apparatus-side ground contact portion dcpvs along a direction SD. In the present embodiment, the contact portions dcp of the apparatus-side terminals 410 to 440 and the apparatus-side ground contact portion dcpvs are not positioned on the first virtual line C1.

The contact portion dcp of at least one apparatus-side terminal among the apparatus-side clock contact portion dcpc, the apparatus-side power-source contact portion dcpvd, and the apparatus-side reset contact portion dcpr is arranged to be projected between the projection position swd of the apparatus-side data contact portion dcpd and the projection position swvs of the apparatus-side ground contact portion dcpvs. Preferably, the contact portions dcp of any two or more apparatus-side terminals among the apparatus-side clock contact portion dcpc, the apparatus-side power-source contact portion dcpvd, and the apparatus-side reset contact portion dcpr are arranged to be projected between the projection position swd of the apparatus-side data contact portion dcpd and the projection position swvs of the apparatus-side ground contact portion dcpvs.

The apparatus-side data terminal dcpd is arranged to be projected between the projection positions of the contact portions dcp of any two apparatus-side terminals among the apparatus-side clock contact portion dcpc, the apparatus-side power-source contact portion dcpvd, and the apparatus-side reset contact portion dcpr. The apparatus-side data contact portion dcpd is not the contact portion that is projected the farthest on the second virtual line C2 from the projection position swvs of the apparatus-side ground contact portion dcpvs. In the present embodiment, the apparatus-side data contact portion dcpd is arranged to be projected between the projection positions of the apparatus-side clock contact portion dcpc and the apparatus-side power-source contact portion dcpvd.

Either or both of the apparatus-side data contact portion dcpd and the apparatus-side reset contact portion dcpr are arranged to be projected between the projection position swvd of the apparatus-side power-source contact portion dcpvd and the projection position swc of the apparatus-side clock contact portion dcpc. Further, the apparatus-side reset contact portion dcpr is arranged so that the projection position swr is next to the projection position swvd of the apparatus-side power-source contact portion dcpvd, among the projection positions swc, swd, and swvd. In the present embodiment, the apparatus-side data contact portion dcpd is arranged to be projected between the projection position swvd of the apparatus-side power-source contact portion dcpvd and the projection position swc of the apparatus-side clock contact portion dcpc.

The apparatus-side power-source contact portion dcpr is arranged so that the projection position swvd is next to the projection position swd of the apparatus-side data contact portion dcpd, among the projection positions swc, swd, and swr.

In the present embodiment, the apparatus-side clock contact portion dcpc is arranged to be projected at the farthest position from the projection position swvs of the apparatus-side ground contact portion dcpvs. The apparatus-side data contact portion dcpd, the apparatus-side power-source contact portion dcpvd, and the apparatus-side reset contact portion dcpr are arranged to be projected in order in a direction from the projection position swc of the apparatus-side clock contact portion dcpc toward the projection position swvs of the apparatus-side ground contact portion dcpvs on the second virtual line C2. The apparatus-side clock contact portion dcpc is located at the end in the −X direction being the negative direction of the second direction SD. The contact portions dcp of the apparatus-side terminals other than the apparatus-side clock contact portion dcpc are arranged in order of the apparatus-side data contact portion dcpd, the apparatus-side power-source contact portion dcpvd, and the apparatus-side reset contact portion dcpr from the −X direction being the negative direction of the second direction SD to the +X direction being the positive direction. The projection positions of the contact portions dcp of the plurality of apparatus-side terminals are arranged in order of the apparatus-side clock contact portion dcpc, the apparatus-side data contact portion dcpd, the apparatus-side power-source contact portion dcpvd, and the apparatus-side reset contact portion dcpr, and the apparatus-side ground contact portion dcpvs from the −X direction to the +X direction.

The apparatus-side clock contact portion dcpc, the apparatus-side data contact portion dcpd, the apparatus-side power-source contact portion dcpvd, the apparatus-side reset contact portion dcpr, and the apparatus-side ground contact portion dcpvs are arranged on the coupling mechanism 400 to form a plurality of rows. The plurality of rows are parallel to the second virtual line C2 and perpendicular to the first virtual line C1. In the present embodiment, the contact portions dcp of the plurality of apparatus-side terminals are arranged to form two rows perpendicular to the first direction FD, and directions of the two rows are parallel to the second direction SD. A direction in which the two rows are arranged with respect to each other is the direction along the first virtual line C1, and the direction along the first direction FD in the present embodiment. The two rows are referred to as a first row R1 and a second row R2. The first row R1 is formed by the apparatus-side clock contact portion dcpc, the apparatus-side power-source contact portion dcpvd, and the apparatus-side ground contact portion dcpvs. The second row R2 is formed by the apparatus-side data contact portion dcpd and the apparatus-side reset contact portion dcpr. The apparatus-side data contact portion dcpd and the apparatus-side reset contact portion dcpr forming the second row R2, the apparatus-side clock contact portion dcpc, the apparatus-side power-source contact portion dcpvd, and the apparatus-side ground contact portion dcpvs forming the first row R1 are configured to form a so-called staggered arrangement in which the apparatus-side data contact portion dcpd and the apparatus-side reset contact portion dcpr forming the second row R2, the apparatus-side clock contact portion dcpc, the apparatus-side power-source contact portion dcpvd, and the apparatus-side ground contact portion dcpvs forming the first row R1 are arranged in a staggered manner so the contact portions dcp are not aligned with each other in the direction of the first virtual line C1. Any two of these contact portions dcp that have projection positions that are next to each other on the second virtual line C2, are positioned in different rows. The apparatus-side data contact portion dcpd and the apparatus-side ground contact portion dcpvs are arranged in different rows. The contact portion dcp of any apparatus-side terminal among the apparatus-side clock contact portion dcpc, the apparatus-side power-source contact portion dcpvd, and the apparatus-side reset contact portion dcpr is arranged to be projected between the projection position swd of the apparatus-side data contact portion dcpd and the projection position swvs of the apparatus-side ground contact portion dcpvs. In the present embodiment, the apparatus-side reset contact portion dcpr and the apparatus-side power-source contact portion dcpvd are arranged to be projected between the projection position swd of the apparatus-side data contact portion dcpd and the projection position swvs of the apparatus-side ground contact portion dcpvs. In the present embodiment, the contact portions dcp of the respective apparatus-side terminals 410 to 450 are arranged to form the first row R1 and the second row R2, but the present disclosure is not limited to this. For example, the contact portions dcp of the respective apparatus-side terminals 410 to 450 may be arranged to form rows such as three rows or four rows. The row may also be formed by the contact portion dcp of one apparatus-side terminal.

A distance between the apparatus-side ground contact portion dcpvs and the apparatus-side reset contact portion dcpr is set as a distance DAn. A distance between the apparatus-side data contact portion dcpd and the apparatus-side clock contact portion dcpc is set as a distance DBn. A distance between the apparatus-side data contact portion dcpd and the apparatus-side ground contact portion dcpvs is set as a distance DCn. A distance between the apparatus-side data contact portion dcpd and the apparatus-side reset contact portion dcpr is set as a distance DDn. A distance between the apparatus-side data contact portion dcpd and the apparatus-side power-source contact portion dcpvd is set as a distance DEn. In this case, the distance DCn is longer than the distance DBn. The distance DCn is longer than the distance DEn. The distance DCn is longer than the distance DDn. In the present embodiment, the distance DBn is equal to the distance DEn. A distance between the apparatus-side data contact portion dcpd, and the contact portion dcp of the apparatus-side terminal farthest from the apparatus-side data contact portion dcpd among the contact portions dcp of the plurality of apparatus-side terminals other than the apparatus-side ground contact portion dcpvs is either of the distance DBn or the distance DEn. In this case, the distance DAn is longer than either of the distance DBn or the distance DEn.

A virtual line segment connecting the apparatus-side clock contact portion dcpc and the apparatus-side data contact portion dcpd is set as a first line segment fL. A virtual line segment connecting the apparatus-side reset contact portion dcpr and the apparatus-side data contact portion dcpd is set as a second line segment sL. A virtual line segment connecting the apparatus-side power-source contact portion dcpvd and the apparatus-side data contact portion dcpd is set as a third line segment tL. On the first line segment fL, there are no contact portions dcp of the apparatus-side terminals other than the apparatus-side clock contact portion dcpc and the apparatus-side data contact portion dcpd. On the second line segment sL, there are no contact portions dcp of the apparatus-side terminals other than the apparatus-side reset contact portion dcpr and the apparatus-side data contact portion dcpd. On the third line segment tL, there are no contact portions dcp of the apparatus-side terminals other than the apparatus-side power-source contact portion dcpvd and the apparatus-side data contact portion dcpd.

The data terminal 210 may also be referred to as a first terminal. The clock terminal 220 may also be referred to as a second terminal included in other terminals. The reset terminal 240 may also be referred to as a third terminal included in other terminals. The power source terminal 230 may also be referred to as a fourth terminal included in other terminals. The ground terminal 250 may also be referred to as a fifth terminal included in the other terminals. The data contact portion cpd may also be referred to as a first contact portion. The clock contact portion cpc may also be referred to as a second contact portion. The reset contact portion cpr may also be referred to as a third contact portion. The power-source contact portion cpvd may also be referred to as a fourth contact portion. The ground contact portion cpvs may also be referred to as a fifth contact portion. The terminals other than the first terminal may also be referred to as an other terminal group. The terminals provided on the board 120 and the liquid accommodation container 100, such as the terminals 210 to 250, may also be referred to as board-side terminals or container-side terminals.

The apparatus-side terminal 410 may also be referred to as a first apparatus-side terminal. The apparatus-side terminal 420 may also be referred to as a second apparatus-side terminal. The apparatus-side terminal 430 may also be referred to as a third apparatus-side terminal. The apparatus-side terminal 440 may also be referred to as a fourth apparatus-side terminal. The apparatus-side terminal 450 may also be referred to as a fifth apparatus-side terminal. The projection position of the first apparatus-side terminal 410 may be referred to as a first projection position. The projection position of the second apparatus-side terminal 420 may be referred to as a second projection position. The projection position of the third apparatus-side terminal 430 may be referred to as a third projection position. The projection position of the fourth apparatus-side terminal 440 may be referred to as a fourth projection position. The projection position of the fifth apparatus-side terminal 450 may be referred to as a fifth projection position.

A2. Description of Various States of Printing System

In the present disclosure, a “mounting-completed state” means a state in which the liquid accommodation container 100 is mounted in the printing apparatus 20 and no short circuit occurs between the terminals 290. As described above, in the present disclosure, the sentence that “the liquid accommodation container 100 is mounted in the printing apparatus 20” means that the liquid accommodation container 100 is physically attached to the printing apparatus 20 and the contact portion cp of the terminal 290 on the container-side is electrically coupled to the apparatus-side terminal 490. The mounting-completed state is a state in which communication is possible between the printing apparatus 20 and the device 130. A “non-mounting-completed state” means a state in which the liquid accommodation container 100 is not mounted on the accommodation section 4 of the printing apparatus 20, or a state in which the liquid accommodation container 100 is attached to the accommodation section 4 of the printing apparatus 20, but a poor contact occurs between the apparatus-side terminal 490 and the contact portion cp. A “short-circuited state” means a state in which the liquid accommodation container 100 is mounted on the accommodation section 4 of the printing apparatus 20, but a short circuit occurred between the terminals 290. For example, a case where the data terminal 210 has a short circuit with the clock terminal 220 means that “the data terminal 210 and the clock terminal 220 are in a short-circuited state”.

A “coupling state” is any one of (i) the mounting-completed state, (ii) the non-mounting-completed state, and (iii) the short-circuited state. “Determination of the coupling state” means determination of which state of the above-described (i) to (iii) the liquid accommodation container 100 is in.

A3. Electrical Configuration and Software Configuration

A3-1. Electrical Configuration

Figure 8:
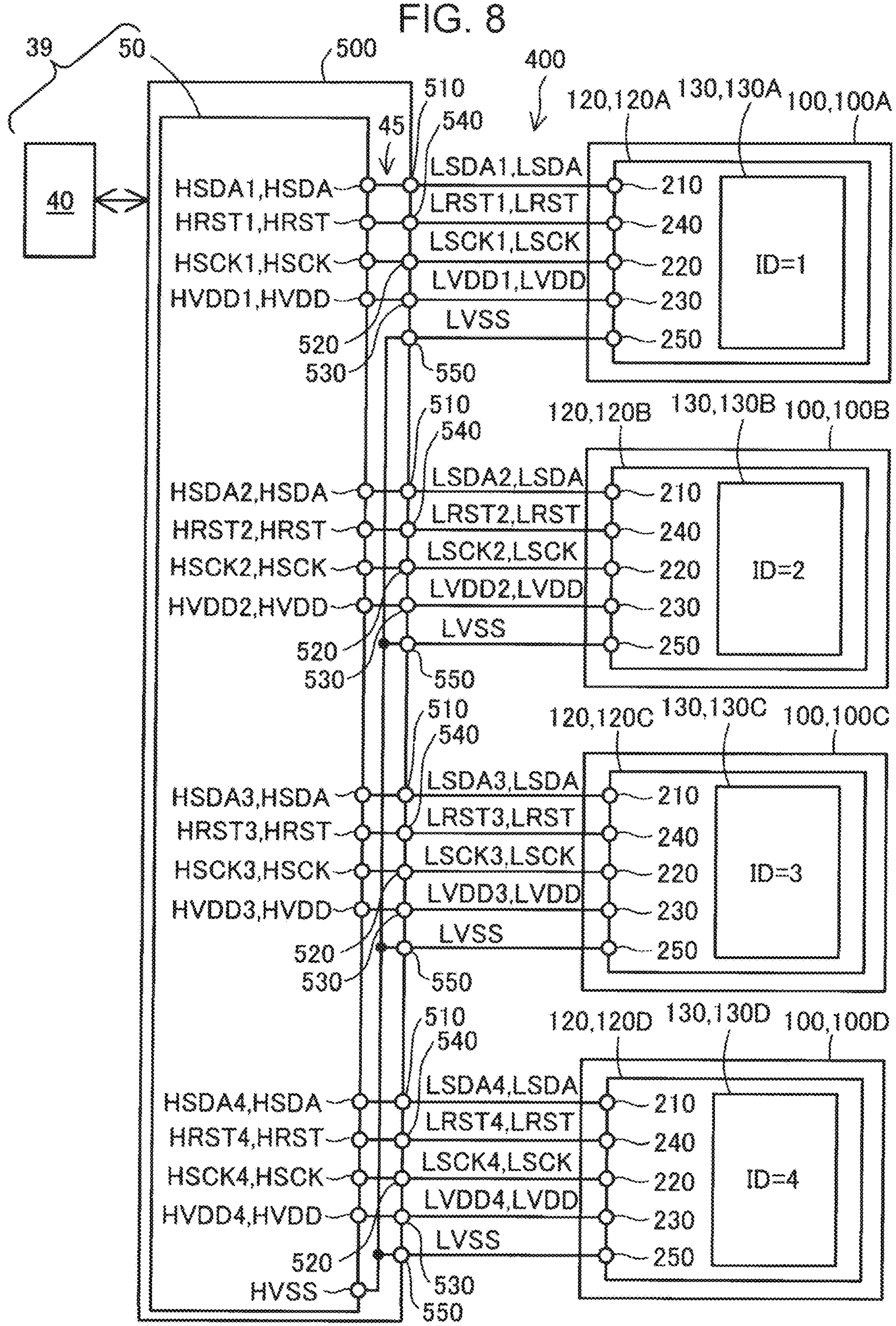
FIG. 8 is a schematic diagram illustrating an electrical configuration of the printing system.

FIG. 8 is a schematic diagram illustrating the electrical configuration of the printing system 1000. In FIG. 8, when the boards 120 and the devices 130 of the four liquid accommodation containers 100A, 100B, 100C, and 100D are intended to be distinguished, “A”, “B”, “C”, and “D” are added at the end. The devices 130A to 130D store identification information of the respective liquid accommodation containers 100A to 100D. For example, the devices 130A to 130D store information regarding liquids accommodated in the respective liquid accommodation containers 100A to 100D. The identification information is represented by ID=1 to 4 in FIG. 8. The main control unit 40 and the sub-control unit 50 form a control unit 39 that controls the operation of the printing apparatus 20.

The sub-control unit 50 is electrically coupled to the liquid accommodation containers 100A to 100D by a plurality of lines. The plurality of lines include a reset line LRST, a clock line LSCK, a power source line LVDD, a data line LSDA, and a ground line LVSS. In the present embodiment, the reset line LRST, the clock line LSCK, the power source line LVDD, and the data line LSDA are provided independently for each of the liquid accommodation containers 100A to 100D. In the present embodiment, ground line LVSS is commonly provided in the liquid accommodation containers 100A to 100D. When the lines electrically coupled to the corresponding liquid accommodation containers 100A to 100D regarding the reset line LRST, the clock line LSCK, the power source line LVDD, and the data line LSDA are intended to be distinguished, “1” to “4” are added at the end. “1” to “4” correspond to the pieces of identification information “1” to “4” of the liquid accommodation containers 100A to 100D.

In the sub-control unit 50, a terminal that outputs the reset signal RST is set as a host terminal HRST. A terminal that outputs the clock signal SCK is set as a host terminal HSCK. A terminal that outputs a power source voltage VDD is set as a host terminal HVDD. A terminal that outputs and inputs the data signal SDA is set as a host terminal HSDA. A host terminal HVSS is grounded. When the terminals coupled to the corresponding liquid accommodation containers 100A to 100D regarding the host terminals HSDA, HRST, HSCK, and HVDD are intended to be distinguished, “1” to “4” are added at the end. “1” to “4” correspond to the pieces of identification information “1” to “4” of the liquid accommodation containers 100A to 100D. The sub-control unit 50 is electrically coupled to the main control unit 40 via the bus 46. The sub-control unit 50 individually transmits various signals and voltages to the devices 130A to 130D of the liquid accommodation containers 100A to 100D via a coupling bus 45 including the lines LRST, LSCK, LVDD, LSDA, and LVSS.

The reset line LRST is a conductive line used when the control unit 39 transmits the reset signal RST to the device 130. The reset signal RST is a signal for making a state where receiving a request signal RS, which will be described later, is possible. When the reset signal RST transmitted to the device 130 by the control unit 39 changes from a high level to a low level, a portion of the processing unit 136, which receives the request signal RS, becomes an initial state. When the reset signal RST changes from the low level to the high level, a new request signal RS is enabled to be received. The clock line LSCK is a conductive line used when the control unit 39 transmits the clock signal SCK to the device 130. The clock signal SCK is a signal in which a low level and a high level are alternately repeated at a predetermined cycle. The data line LSDA is a conductive line used to transmit and receive the data signal SDA between the control unit 39 and the device 130. The data signal SDA is transmitted and received in synchronization with the clock signal SCK in order to synchronize between the control unit 39 and the device 130. For example, the data signal SDA is transmitted and received by using, as a trigger, the rising or falling edge of the clock signal SCK. The reset signal RST, the data signal SDA, and the clock signal SCK take either a high level or a low level. In the following description, the high level is also represented by the reference sign “H” or “1”, and the low level is also represented by the reference sign “L” or “0”. The host terminal HSDA coupled to the data line LSDA is grounded in the sub-control unit 50 via a pull-down resistor. Thus, when the data signal SDA is not transmitted/received between the sub-control unit 50 and the device 130, a drive state of the host terminal HSDA in the sub-control unit 50 is maintained at a low level.

The ground line LVSS is a conductive line for defining a ground potential VSS of the device 130. The ground potential VSS is set to, for example, 0 V. The power source line LVDD is a conductive line used when the control unit 39 supplies the power source voltage VDD as an operation voltage to the device 130. The power source voltage VDD is a voltage higher than a predetermined threshold value. In the present embodiment, as the power source voltage VDD, a potential of, for example, about 3.3 V with respect to the ground potential VSS is used. The potential used for the power source voltage VDD may have a different value depending on the type of the device 130.

Figure 9:
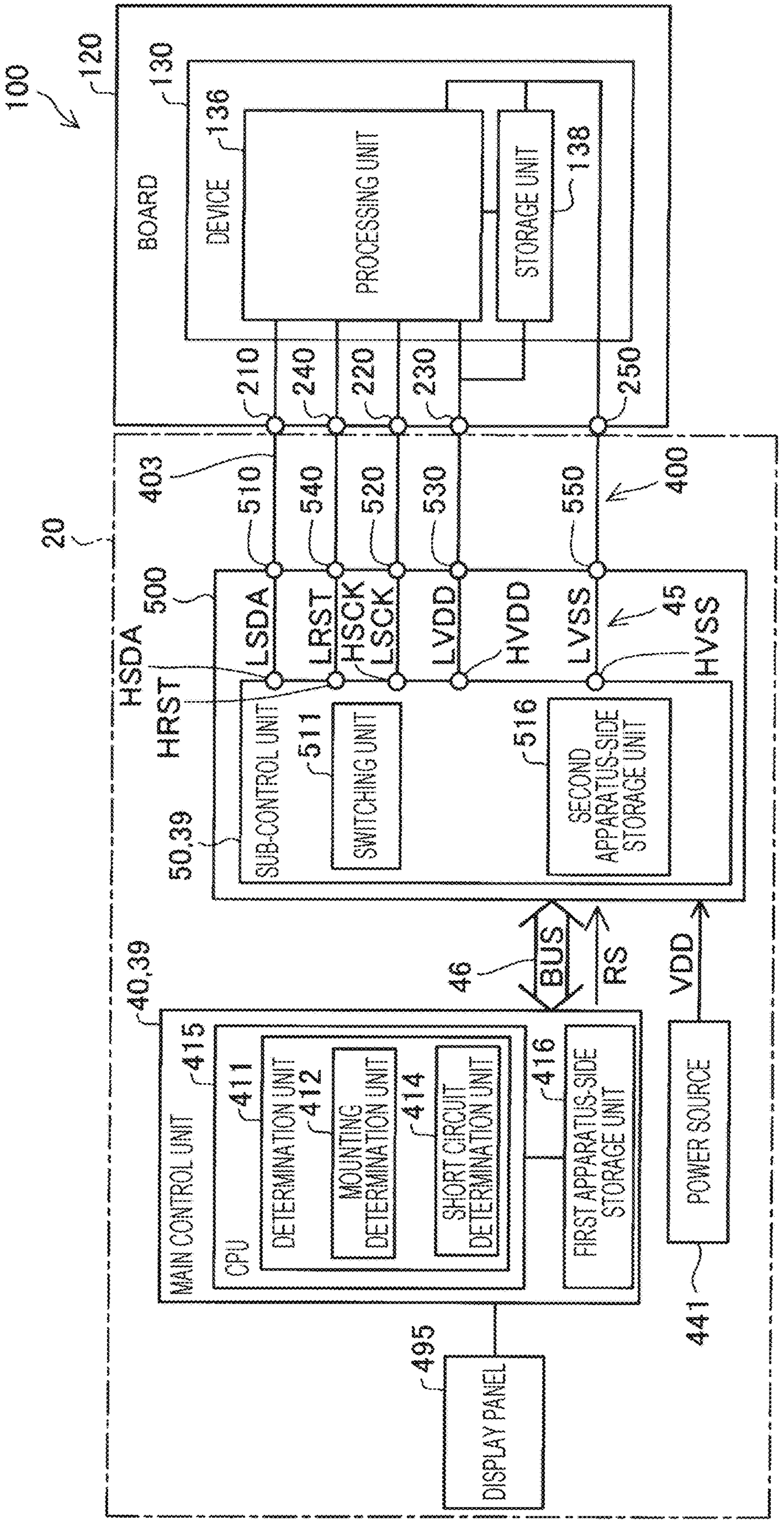
FIG. 9 is a diagram illustrating a functional configuration of a printing apparatus together with one liquid accommodation container.

FIG. 9 is a diagram illustrating the functional configuration of the printing apparatus 20 together with one liquid accommodation container 100. The printing apparatus 20 includes a display panel 495, a power source 441, the main control unit 40, and the sub-control unit 50. The display panel 495 is used to notify a user of an operation status of the printing apparatus 20, an error in the liquid accommodation containers 100A to 100D, the ink consumption stored in the device 130, the color of the ink, the manufacturing date, and the like. When the liquid accommodation container 100 is in the mounting-completed state, for example, a display informing the user that the liquid accommodation container 100 is mounted, a display indicating that the printing system 1000 is in a printable state, and a display of the remaining amount of the ink accommodated in the liquid accommodation container 100 are made on the display panel 495. The display panel 495 is provided, for example, in the operation portion 70 in FIG. 2. The power source 441 is a general power source used in a logic circuit and has a rating of 3.3 V. The voltage of the power source 441 is supplied to the sub-control unit 50, and is also supplied to other circuits as needed.

The main control unit 40 includes a CPU 415 and a first apparatus-side storage unit 416. The CPU 415 controls the operation of the printing apparatus 20 by executing various programs stored in the first apparatus-side storage unit 416. For example, the main control unit 40 controls the operation of the display panel 495 and controls the operation of the sub-control unit 50. The CPU 415 functions as a determination unit 411 by executing various programs stored in the first apparatus-side storage unit 416. The determination unit 411 includes a mounting determination unit 412 and a short circuit determination unit 414. The mounting determination unit 412 determines whether or not the liquid accommodation container 100 is mounted. The short circuit determination unit 414 determines whether or not a short circuit occurred between the terminals 290.

The sub-control unit 50 includes a switching unit 511 and a second apparatus-side storage unit 516. The switching unit 511 includes a register (not illustrated) and an analog switch (not illustrated) coupled to the register. When the CPU 415 writes "1" to the register, the analog switch becomes a conductive state. Thus, it is possible to switch the state to a state in which the CPU 415 and the board 120 are coupled to each other. When the CPU 415 writes "0" to the register, the analog switch becomes a non-conductive state. Thus, it is possible to switch the state to a state in which the CPU 415 and the board 120 are not coupled to each other.

The second apparatus-side storage unit 516 stores determination information. The determination information is information used in the coupling state determination processing described later. The determination information is information in which the voltage output from the data terminal 210 in response to the request signal RS described later is set to have a detected value. The determination unit 411 reads the determination information from the second apparatus-side storage unit 516 when performing coupling state determination processing.

The sub-control unit 50 transmits the request signal RS to the devices 130A to 130D of the liquid accommodation containers 100A to 100D via the coupling bus 45. The request signal RS is output from the host terminal HSDA of the sub-control unit 50 and input to the data terminal 210 of each of the liquid accommodation containers 100A to 100D. The request signal RS includes a command for enabling identification of the liquid accommodation containers 100A to 100D as a response target to the request signal RS, for each of the devices 130A to 130D. The determination unit 411 performs the coupling state determination processing of the liquid accommodation containers 100A to 100D by using the voltage output from the data terminal 210 of each of the liquid accommodation containers 100A to 100D in response to the request signal RS. Details of the request signal RS will be described later.

The processing unit 136 of the device 130 communicates with the printing apparatus 20 via the data line LSDA in synchronization with the clock signal SCK input from the printing apparatus 20 to the clock terminal 220. For example, a signal is transmitted/received triggered by using, as a trigger, the rising or falling edge of the clock signal SCK. The processing unit 136 controls signals and voltages input/output to/from the terminals 210 to 250. For example, response signals FS and SS are output to the data terminal 210 via the data line LSDA in response to the request signal RS. The processing unit 136 includes a three-state buffer. The three-state buffer has three drive states: a state where a low level voltage is output, a state where a high level voltage is output, and a high-impedance state. The three-state buffer is coupled to the data terminal 210. Thus, in the present disclosure, the "low level", the "high level", and the "high impedance" are used as terms indicating the drive state of the data terminal 210. The storage unit 138 includes a memory cell array in which a plurality of memory cells are arranged in a two-dimensional matrix. The processing unit 136 and the storage unit 138 are coupled by a bit line and a word line. The processing unit 136 is electrically coupled to each of the terminals 210 to 250 and the storage unit 138.

A3-2. Outline of Software Configuration (Coupling State Determination Processing)

Figure 10A:
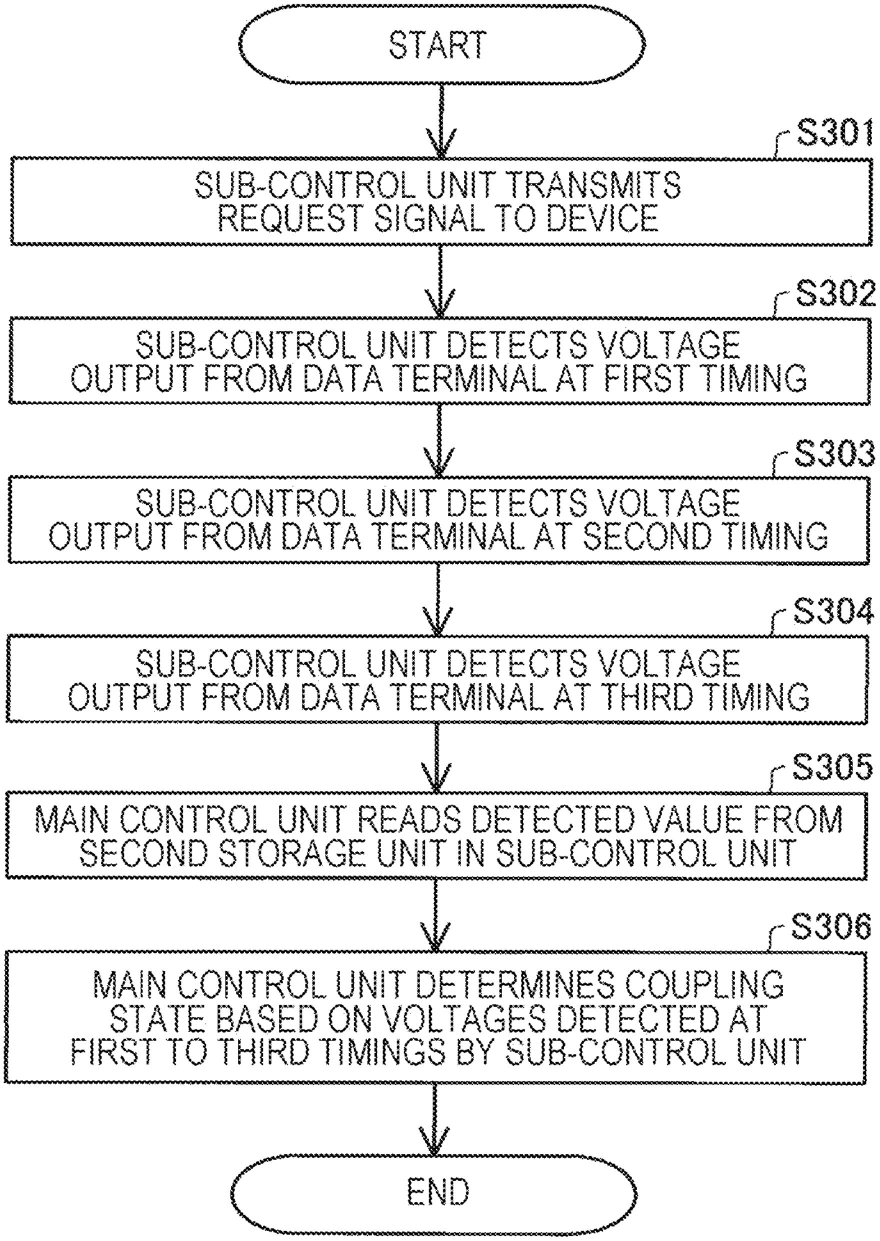
FIG. 10A is a flowchart illustrating a process executed by the printing apparatus in coupling state determination processing.
Figure 10B:
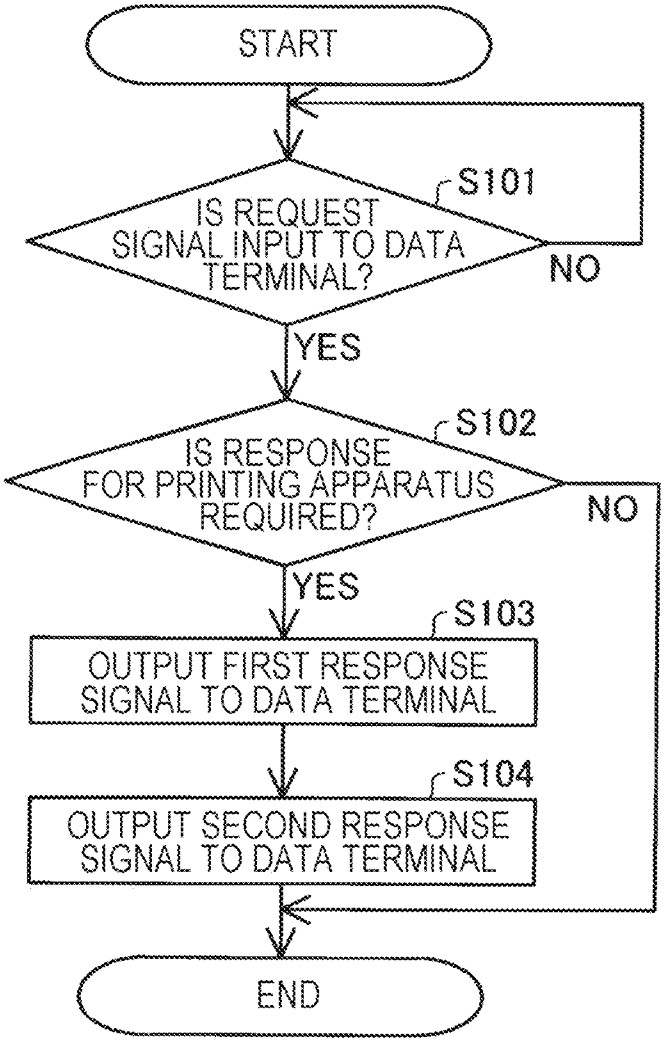
FIG. 10B is a flowchart illustrating a process executed by a device in the coupling state determination processing.

The coupling state determination processing performed by the printing system 1000 will be described with reference to FIGS. 10A and 10B. FIG. 10A is a flowchart illustrating a process executed by the printing apparatus 20 in the coupling state determination processing. FIG. 10B is a flowchart illustrating a process executed by the device 130 in the coupling state determination processing.

As illustrated in FIG. 10A, in the coupling state determination processing, the printing apparatus 20 executes processes as follows. In Step S301, the sub-control unit 50 transmits a request signal RS to the device 130 of the liquid accommodation container 100. Then, the sub-control unit 50 detects a voltage output from the data terminal 210 of the liquid accommodation container 100. Specifically, in Step S302, the sub-control unit 50 detects the voltage output from the data terminal 210 of the liquid accommodation container 100 at a predetermined first timing t1. In Step S303, the sub-control unit 50 detects the voltage output from the data terminal 210 of the liquid accommodation container 100 at a predetermined second timing t2. In Step S304, the sub-control unit 50 detects the voltage output from the data terminal 210 of the liquid accommodation container 100 at a predetermined third timing t3. The first timing t1 to the third timing t3 are timings that are different from one another. The voltages detected by the sub-control unit 50 at the first timing t1 to the third timing t3 are stored as detected values in the second apparatus-side storage unit 516 of the sub-control unit 50. In Step S305, the determination unit 411 of the main control unit 40 reads out the detected value from the second apparatus-side storage unit 516. In Step S306, the main control unit 40 determines the coupling state based on the detected values obtained by the detection of the sub-control unit 50 at the first timing t1 to the third timing t3.

As illustrated in FIG. 10B, in the coupling state determination processing, the device 130 executes processes as follows. In Step S101, the processing unit 136 of the device 130 determines whether or not the request signal RS is input from the printing apparatus 20 to the data terminal 210. When determining that the request signal RS is input to the data terminal 210, the processing unit 136 of the device 130 determines whether or not to request the response to the printing apparatus 20 in Step S102. When determining to request the response to the printing apparatus 20, the processing unit 136 of the device 130 outputs a first response signal FS to the data terminal 210 in Step S103. After outputting the first response signal FS, the processing unit 136 of the device 130 outputs a second response signal SS to the data terminal 210 in Step S104. The first response signal FS and the second response signal SS are output from the data terminal 210 to the printing apparatus 20. When it is determined in Step S102 that the response to the printing apparatus 20 is not requested, the processing unit 136 of the device 130 ends the processes.

Figure 11A:
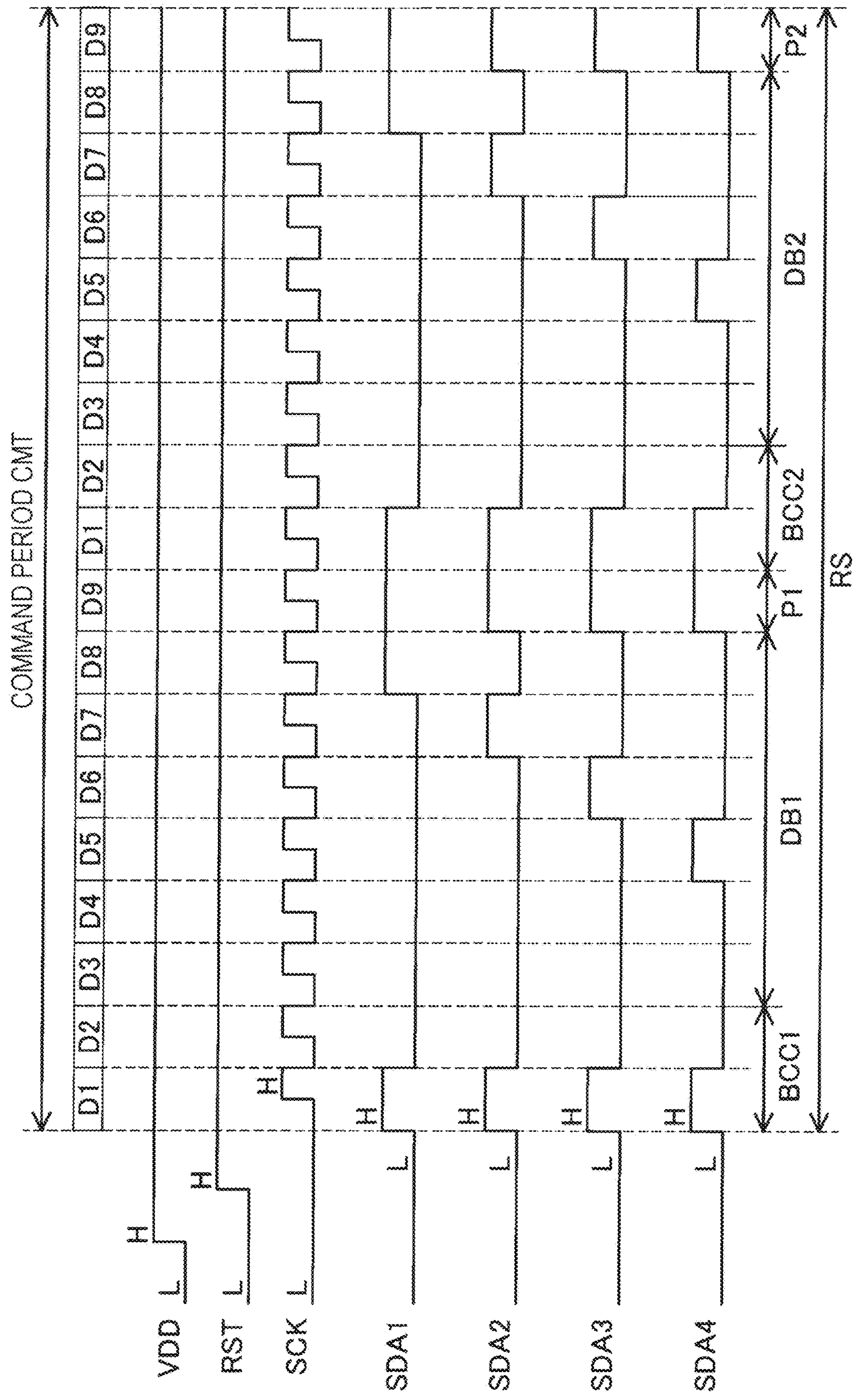
FIG. 11A is a timing chart when the printing apparatus outputs a request signal.
Figure 11B:
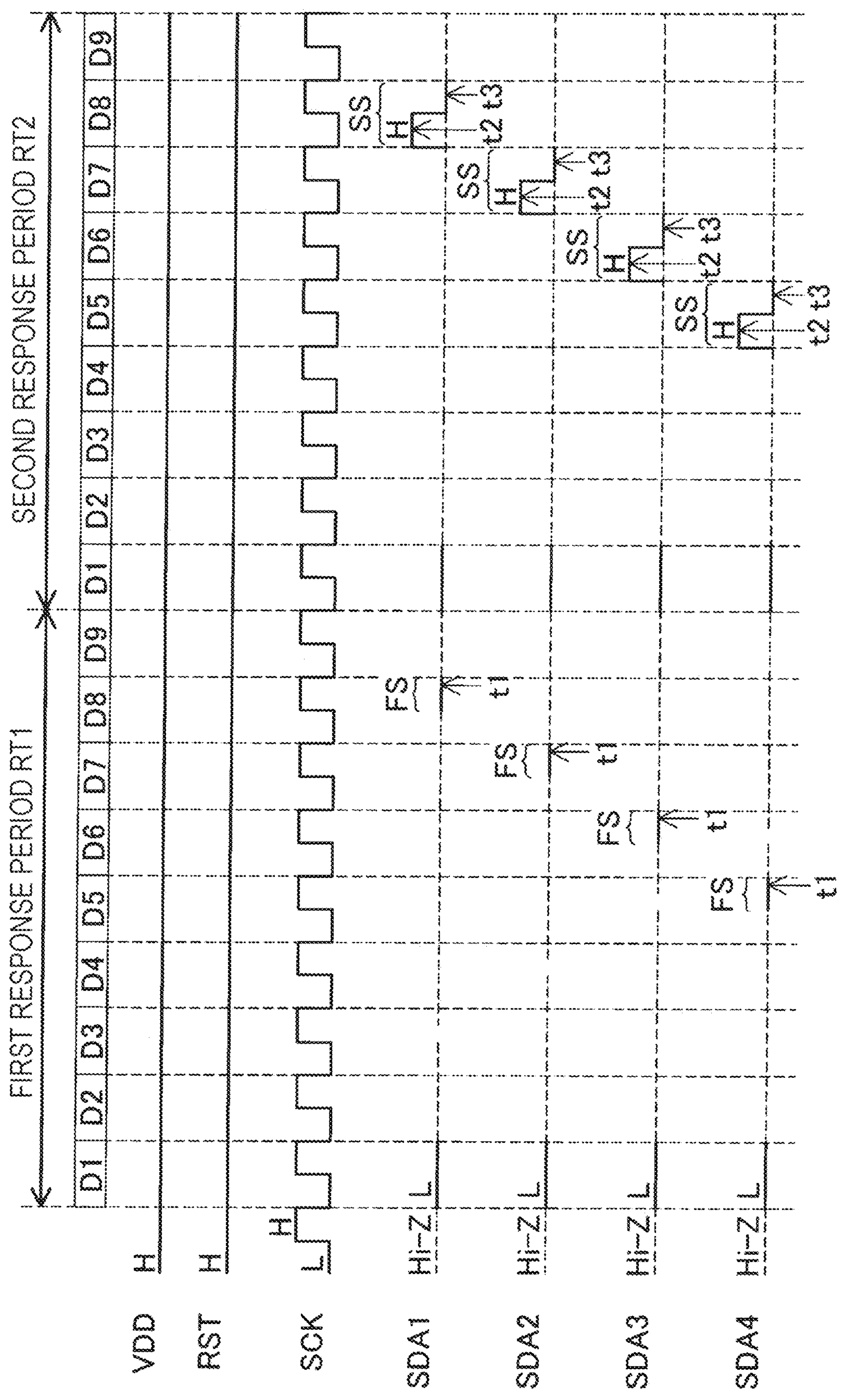
FIG. 11B is a timing chart when the device outputs a first response signal and a second response signal.
Figure 11C:
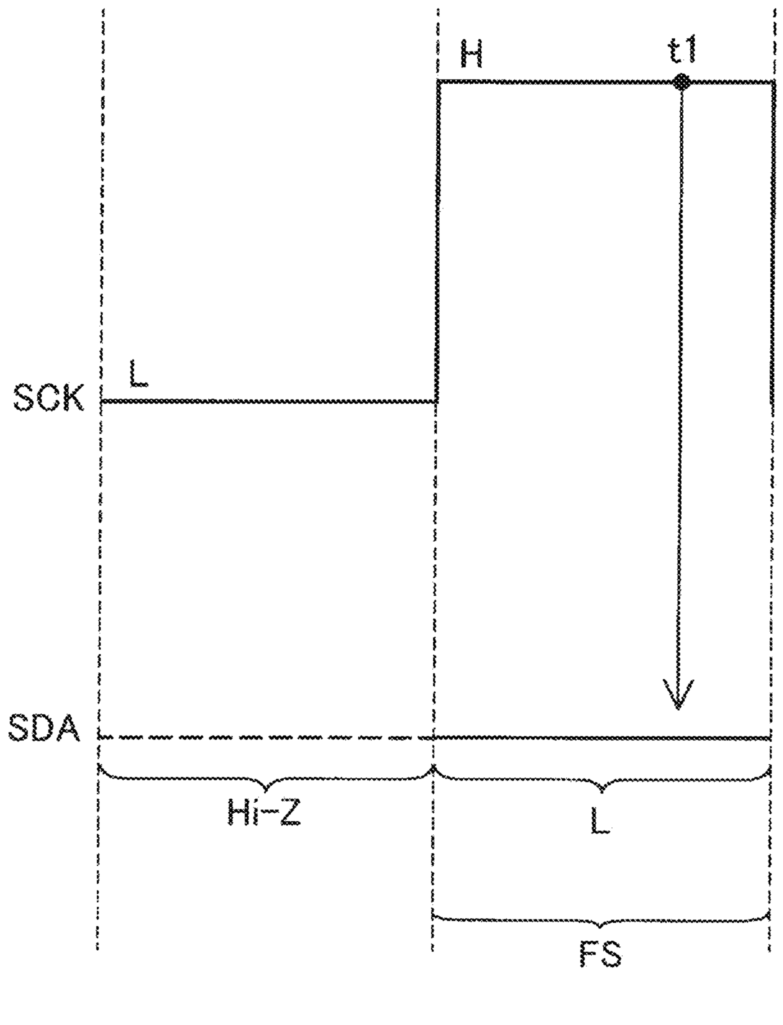
FIG. 11C is a diagram illustrating details of the first response signal.
Figure 11D:
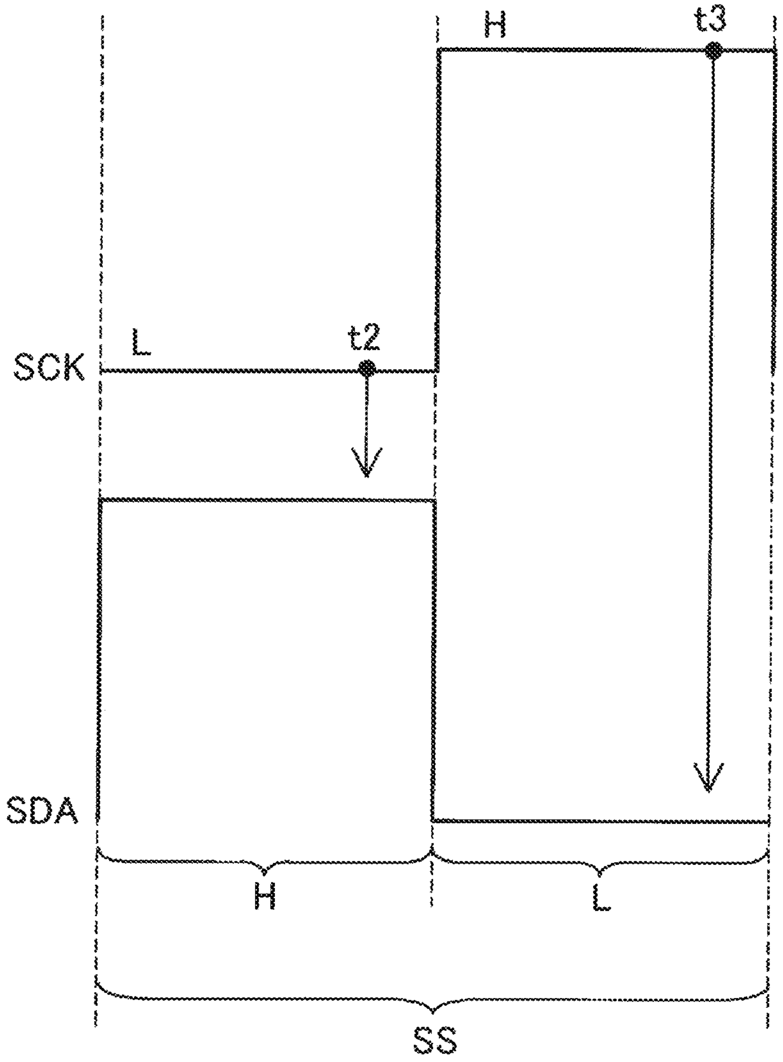
FIG. 11D is a diagram illustrating details of the second response signal.

The outline and output timings of the request signal RS, the first response signal FS, and the second response signal SS will be described with reference to FIGS. 11A to 11D. FIG. 11A is a timing chart when the printing apparatus 20 outputs the request signal RS to the data terminal 210. FIG. 11B is a timing chart when the device 130 outputs the first response signal FS and the second response signal SS to the data terminal 210. FIG. 11C is a diagram illustrating details of the first response signal FS. FIG. 11D is a diagram illustrating details of the second response signal SS. The timing chart illustrating FIG. 11B is executed following the timing chart illustrating FIG. 11A. In FIGS. 11A to 11D, "H" indicates that the signal is at a high level, and "L" indicates that the signal is at a low level. The dotted line indicates that the drive state of the terminal 290 is high impedance, and indicates that no signal is output from the terminal 290. The host terminal HSDA of the sub-control unit 50 is grounded via the pull-down resistor. Thus, it is not possible for the control unit 39 to distinguish between a case where the drive state of the terminal 290 is the high impedance and no signal is output from the terminal 290 and a case where a low level voltage is output from the terminal 290. For example, when a pull-up resistor coupling the data terminal 210 and the power source terminal 230 is used, it is recognized that the drive state of the data terminal 290 is the high impedance. VDD, RST, SCK, and SDA1 to SDA4 illustrated in FIG. 11A and the like mean signals transmitted to and received via the corresponding terminal 290 or voltages supplied, by the corresponding lines LVDD, LRST, LSCK, and LSDA1 to LSDA4. Cycles D1 to D9 in a command period CMT, a first response period RT1, and a second response period RT2 represent a unit period in which the low level and high level of the clock signal SCK are repeated in each period. The clock signal SCK in this unit period is referred to as a "cycle".

The timing charts illustrated in FIGS. 11A and 11B are executed by using a predetermined timing as a trigger. The predetermined timing is, for example, a timing at which the printing apparatus 20 is activated and the power source 441 turns ON, a timing at which the liquid accommodation container 100 is replaced, a timing at which an instruction from the user is received, and a timing at which the printing apparatus 20 does not perform printing and the carriage 30 is located at a home position. An example of performing triggering by the timing at which the power source 441 turns ON will be described below.

As illustrated in FIG. 11A, the control unit 39 first sets the power source voltage VDD to a high level. The control unit 39 changes the reset signal RST from a low level to the high level after a predetermined time elapses after the power source voltage VDD becomes the high level. The control unit 39 transmits the clock signal SCK to the device 130 after changing the reset signal RST to the high level. The control unit 39 transmits the request signal RS to the device 130 after changing the reset signal RST to the high level. The request signal RS includes a first execution command BCC1, first identification data DB1, first parity data P1, a second execution command BCC2, second identification data DB2, and second parity data P2.

The request signal RS will be described in detail. After changing the reset signal RST to the high level, the control unit 39 transmits the first execution command BCC1 to the devices 130A to 130D in the cycle D1 and the cycle D2 of the command period CMT. The first execution command BCC1 is 2-bit data, and is a command indicating that the main control unit 40 executes the coupling state determination processing. The control unit 39 generates the first execution command BCC1 by setting the voltage to the high level in the cycle D1 and the voltage to the low level in the cycle D2.

The control unit 39 transmits the first identification data DB1 to the devices 130A to 130D in the cycles D3 to D8, after the first execution command BCC1. The first identification data DB1 is 6-bit data and is used for identifying the liquid accommodation containers 100A to 100D that require a response. In the first identification data DB1, corresponding bits are assigned to each of the devices 130A to 130D. The cycle D3 which is the first bit and the cycle D4 which is the second bit may be used when six liquid accommodation containers 100 are mounted in the printing apparatus 20 in another embodiment. In the first identification data DB1, the cycle D5 which is the third bit corresponds to the liquid accommodation container 100D, the cycle D6 which is the fourth bit corresponds to the liquid accommodation container 100C, the cycle D7 which is the fifth bit corresponds to the liquid accommodation container 100B, and the cycle D8 which is the sixth bit corresponds to the liquid accommodation container 100A. The first identification data DB1 transmitted to the device 130A of the liquid accommodation container 100A is at a high level in the cycle D8 which is the sixth bit, and the remaining bits are at a low level. The first identification data DB1 transmitted to the device 130B of the liquid accommodation container 100B is at a high level in the cycle D7 which is the fifth bit, and the remaining bits are at a low level. The first identification data DB1 transmitted to the device 130C of the liquid accommodation container 100C is at a high level in the cycle D6 which is the fourth bit, and the remaining bits are at a low level. The first identification data DB1 transmitted to the device 130D of the liquid accommodation container 100D is at a high level in the cycle D5 which is the third bit, and the remaining bits are at a low level. The request signal RS has a different waveform for each of the devices 130A to 130D of the liquid accommodation containers 100A to 100D.

After the first identification data DB1, the control unit 39 transmits the first parity data P1 to the devices 130A to 130D in the cycle D9. The first parity data P1 is 1-bit data. In the present embodiment, the first parity data P1 is odd parity.

After the first parity data P1, the control unit 39 transmits the 2-bit second execution command BCC2 to the devices 130A to 130D. The second execution command BCC2 is the same data in which the first execution command BCC1 is not inverted. After the second execution command BCC2, the control unit 39 transmits the 6-bit second identification data DB2 to the devices 130A to 130D. The second identification data DB2 is the same data in which the first identification data DB1 is not inverted. After the second identification data DB2, the control unit 39 transmits the 1-bit second parity data P2 to the devices 130A to 130D.

The first execution command BCC1, the first identification data DB1, and the first parity data P1 are also collectively referred to as a first command. The second execution command BCC2, the second identification data DB2, and the second parity data P2 are also collectively referred to as a second command. A period in which the control unit 39 transmits the first command to the device 130 in the command period CMT is also referred to as a first command period. A period in which the control unit 39 transmits the second command to the device 130 in the command period CMT is also referred to as a second command period. The first command and the second command are not inverted from each other and are the same data. In other embodiments, the first and second commands may be inverted from each other.

As described above, in the device 130, firstly, the power source voltage VDD is input from the printing apparatus 20 to the power source terminal 230. A high reset voltage is input from the printing apparatus 20 to the reset terminal 240 in a manner that, in the device 130, the power source voltage VDD is input from the printing apparatus 20 to the power source terminal 230, and then the reset signal RST changes from a low reset voltage to the high reset voltage. In the device 130, after the high reset voltage is input from the printing apparatus 20 to the reset terminal 240, the clock signal SCK is input to the clock terminal 220 from the printing apparatus 20. In the device 130, after the high reset voltage is input from the printing apparatus 20 to the reset terminal 240, the request signal RS is input to the data terminal 210 from the printing apparatus 20. Here, the power source voltage VDD is a voltage as a high level higher than a threshold value. The reset signal RST is a signal containing a low reset voltage as a low level and a high reset voltage as a high level higher than the low reset voltage. The low reset voltage is a voltage lower than a reference reset voltage as the threshold value. The high reset voltage is a voltage higher than the reference reset voltage as the threshold value. The reference reset voltage is a voltage functioning as a reference for determining a high level and a low level. The clock signal SCK is a signal in which a low clock voltage as a low level and a high clock voltage as a high level higher than the low clock voltage are alternately repeated at a predetermined cycle. The low clock voltage is a voltage lower than a reference clock voltage as a threshold value. The high clock voltage is a voltage higher than the reference clock voltage as the threshold value. The reference clock voltage is a voltage functioning as a reference for determining a high level and a low level. Each threshold value is set, for example, between the potential of the power source 441 and the ground potential.

As illustrated in FIG. 11B, after the request signal RS is transmitted from the control unit 39 to the device 130, the device 130 requested to respond to the printing apparatus 20 outputs the first response signal FS and the second response signal SS to the data terminal 210. The first response signal FS and the second response signal SS are signals used by the printing apparatus 20 to determine that the data terminal 210 does not have a short circuit with the clock terminal 220, the power source terminal 230, and the reset terminal 240, and that the liquid accommodation container 100 is mounted in the printing apparatus 20. The request signal RS has a waveform for individually designating the liquid accommodation containers 100A to 100D in the first identification data DB1. When receiving the request signal RS in which the corresponding device is designated, from the printing apparatus 20, the devices 130A to 130D respectively output the first response signal FS and the second response signal SS to the data terminal 210. The first response signal FS is output in the first response period RT1. The second response signal SS is output in the second response period RT2 which is the period next to the first response period RT1.

In the first response period RT1, first, in the cycle D1 and the cycle D2, direction switching processing of a signal transmitted and received by the printing apparatus 20 via the data line LSDA is executed. After transmitting the request signal RS to the device 130, the control unit 39 discharges charges in the data line LSDA by setting the potential of the data line LSDA to 0 V in the cycle D1. Then, the control unit 39 sets the drive state of the host terminal HSDA in the sub-control unit 50 to the high impedance in the cycle D2. Thus, the printing apparatus 20 turns into a state where an input of signals is possible. After receiving the request signal RS in synchronization with the clock signal SCK, the processing unit 136 of the device 130 sets the drive state of each data terminal 210 to the high impedance in the cycle D1. This is to prevent an output of a signal from the data terminal 210 while the charges of the data line LSDA are discharged by the control unit 39 of the printing apparatus 20. Similarly, in the cycle D2, the processing unit 136 of the device 130 sets the drive state of the data terminal 210 to the high impedance. The first two bits in the first response period RT1 also function as dummy bits for making the number of bits of the request signal RS and the number of bits of the signal in the first response period RT1 be equal to each other. The number of cycles of the clock signal SCK forming the first response period RT1 is equal to the number of cycles of the clock signal SCK synchronized with the request signal RS.

Then, in the cycles D3 to D8, the processing unit 136 of each device 130 outputs the first response signal FS to the data terminal 210 at a predetermined timing. The first response signal FS is output from different processing units 136A to 136D for each cycle of the clock signal SCK. The first response signal FS includes a low level voltage. As illustrated in FIG. 11C, the first response signal FS is a signal output to the data terminal 210 during the period when the clock signal SCK is at a high level. The first response signal FS is at a low level during a period in which the clock signal SCK is at a high level. The processing unit 136 of the device 130 outputs a low level voltage to the data terminal 210 when the voltage received at the clock terminal 220 changes from a low level to a high level.

As described above, the first response signal FS includes a first low response voltage as a low level lower than the first reference response voltage as a threshold value. The first reference response voltage is a voltage functioning as a reference for determining a low level and a high level, and is set, for example, between the voltage of the power source 441 and the voltage of the ground potential.

As illustrated in FIG. 11B, the first timing t1 is set in a period in which the clock signal SCK is at a high level in each of the cycles D5 to D8 of the first response period RT1. The first timing t1 is set in a period in which the first response signal FS is at a low level. As illustrated in FIG. 11C, the device 130 begins to output a low level voltage to the data terminal 210 before the first timing t1 in a period in which the clock signal SCK is at a high level in one cycle of the clock signal SCK.

As illustrated in FIG. 11B, the cycle D9 of the first response period RT1 functions as a dummy bit for making the number of bits in the first command period and the number of bits in the first response period RT1 be equal to each other.

In the second response period RT2, as illustrated in FIG. 11B, the control unit 39 discharges charges in the data line LSDA by setting the potential of the data line LSDA to 0 V. In the cycle D1, the processing unit 136 of the device 130 sets the drive state of the data terminal 210 to the high impedance. Also in the cycle D2, the processing unit 136 of the device 130 sets the drive state of the data terminal 210 to the high impedance. The first two bits in the second response period RT2 also function as dummy bits for making the number of bits of the request signal RS and the number of bits of the signal in the second response period RT2 be equal to each other. The number of cycles of the clock signal SCK forming the second response period RT2 is equal to the number of cycles of the clock signal SCK synchronized with the request signal RS.

Then, in the cycles D5 to D8, the processing unit 136 of each device 130 outputs the second response signal SS to the data terminal 210 at a predetermined timing. The second response signal SS is output from different processing units 136A to 136D for each cycle of the clock signal SCK. The second response signal SS includes a low level voltage and a high level voltage. As illustrated in FIG. 11D, the waveform of the second response signal SS has a phase opposite to the phase of the waveform of the clock signal SCK input to the clock terminal 220. The second response signal SS includes a high level during a period in which the clock signal SCK is at a low level, and includes a low level during a period in which the clock signal SCK is at a high level.

As described above, the second response signal SS includes a second low response voltage as a low level and a second high response voltage as a high level higher than the second low response voltage. The second low response voltage is a voltage lower than a second reference response voltage as a threshold value, and the second high response voltage is a voltage higher than the second reference response voltage as the threshold value. The second reference response voltage is a voltage functioning as a reference for determining a low level and a high level, and is set, for example, between the voltage of the power source 441 and the voltage of the ground potential. The second reference response voltage may be equal to or different from the first reference response voltage. The waveform of the second response signal SS is different from the waveform of the first response signal FS.

As illustrated in FIG. 11B, the second timing t2 is set in a period in which the clock signal SCK is at a low level in each of the cycles D5 to D8 of the second response period RT2. The second timing t2 is set during a period in which the second response signal SS becomes a high level. The third timing t3 is set in a period in which the clock signal SCK is at a high level in each of the cycles D5 to D8 of the second response period RT2. The third timing t3 is set during a period in which the second response signal SS becomes a low level. As illustrated in FIG. 11D, the device 130 begins to output a high level voltage to the data terminal 210 before the second timing t2 in a period in which the clock signal SCK is at a low level in one cycle of the clock signal SCK. The device 130 begins to output a low level voltage to the data terminal 210 before the third timing t3 in a period of a high level in one cycle of the clock signal SCK.

As illustrated in FIG. 11B, the cycle D9 of the second response period RT2 functions as dummy-bit data for making the number of bits in the second command period and the number of bits in the second response period RT2 be equal to each other.

Output periods of the first response signal FS and the second response signal SS are different for each of the devices 130A to 130D of the liquid accommodation containers 100A to 100D. In the present embodiment, the device 130 outputs the first response signal FS and the second response signal SS in one cycle of the clock signal SCK corresponding to the identification information. As illustrated in FIG. 11B, the liquid accommodation container 100A outputs the first response signal FS and the second response signal SS to the data terminal 210 in each cycle D8 of the first response period RT1 and the second response period RT2. The liquid accommodation container 100B outputs the first response signal FS and the second response signal SS to the data terminal 210 in each cycle D7 of the first response period RT1 and the second response period RT2. The liquid accommodation container 100C outputs the first response signal FS and the second response signal SS to the data terminal 210 in each cycle D6 of the first response period RT1 and the second response period RT2. The liquid accommodation container 100D outputs the first response signal FS and the second response signal SS to the data terminal 210 in each cycle D5 of the first response period RT1 and the second response period RT2.

As illustrated in FIG. 11B, when the clock signal SCK having a predetermined number of cycles is input to the clock terminal 220, the device 130 switches the drive state of the data terminal 210 from the high impedance to the low level and outputs the first response signal FS. For example, as illustrated in FIG. 11B, when the clock signal SCK is input to the clock terminal 220 in the cycles D1 to D7 in the first response period RT1, the device 130A switches the drive state of the data terminal 210 from the high impedance to the low level, and outputs the first response signal FS. The device 130 switches the drive state of the data terminal 210 from the low level to the high impedance and ends the output of the first response signal FS. For example, as illustrated in FIG. 11B, the device 130A outputs the first response signal FS in the cycle D8 in the first response period RT1, and then switches the drive state of the data terminal 210 to the high impedance. Thus, the device 130A ends the output of the first response signal FS.

As illustrated in FIG. 11B, when the clock signal SCK having a predetermined number of cycles is input to the clock terminal 220, the device 130 switches the drive state of the data terminal 210 from the high impedance to the high level and outputs the second response signal SS. For example, as illustrated in FIG. 11B, when the clock signal SCK is input to the clock terminal 220 in the cycles D1 to D7 in the second response period RT2, the device 130A switches the drive state of the data terminal 210 from the high impedance to the high level, and outputs the second response signal SS. The device 130 switches the drive state of the data terminal 210 from the low level to the high impedance and ends the output of the second response signal SS. For example, as illustrated in FIG. 11B, the device 130A outputs the second response signal SS in the cycle D8 in the second response period RT2, and then switches the drive state of the data terminal 210 from the low level to the high impedance. Thus, the device 130A ends the output of the second response signal SS.

As described above, the device 130 outputs the first response signal FS to the data terminal 210 after the request signal RS is input to the data terminal 210. In addition, the device 130 outputs the first response signal FS, and then outputs the second response signal SS to the data terminal 210. The device 130 performs the following when the data terminal 210 does not have a short circuit with the clock terminal 220, the power source terminal 230, and the reset terminal 240. As illustrated in FIG. 11C, the device 130 outputs the first low response voltage as a first expected value to the data terminal 210 at a predetermined first timing t1 in a period in which the voltage received at the clock terminal 220 is a high clock voltage. As illustrated in FIG. 11D, after the device 130 outputs the first low response voltage, the device 130 outputs the second high response voltage as a second expected value to the data terminal 210 at a second timing t2 in which the voltage received at the clock terminal 220 is a low clock voltage. As illustrated in FIG. 11D, after the device 130 outputs the second high response voltage, the device 130 outputs the second low response voltage as a third expected value to the data terminal 210 at a third timing t3 in which the voltage received at the clock terminal 220 is a high clock voltage.

The first response signal FS is configured by a low level. The low level of the first response signal FS indicates that the data terminal 210 does not have a short circuit with the terminals 220, 230, 240, and 250 other than the data terminal 210. The second response signal SS is configured by a high level and a low level. The high level of the second response signal SS indicates that the liquid accommodation container 100 is mounted in the printing apparatus 20. The low level of the second response signal SS indicates that the data terminal 210 does not have a short circuit with the terminals 220, 230, 240, and 250 other than the data terminal 210.

A3-3. Details of Software Configuration (Coupling State Determination Processing)

The coupling state determination processing executed by the main control unit 40 will be described with reference to FIG. 12. FIG. 12 is a diagram illustrating an outline of the coupling state determination processing executed by the main control unit 40. As illustrated in FIG. 12, the main control unit 40 determines the coupling state by using a combination of the voltages output from the data terminal 210 of the liquid accommodation container 100 at the first timing t1 to the third timing t3. The first timing t1 to the third timing t3 are assigned to the periods of the cycles D5 to D8 in accordance with the liquid accommodation containers 100A to 100D as described above with reference to FIG. 11B. The expected value of the voltage output from the data terminal 210 of the liquid accommodation container 100 at each of the first timing t1 to the third timing t3 is the voltage output from the data terminal 210 when the liquid accommodation container 100 is in the mounting-completed state. The expected value is a low level at the first timing t1, a high level at the second timing t2, and a low level at the third timing t3. In a first case where the voltage output from the data terminal 210 of the liquid accommodation container 100 is equal to the expected value, the determination unit 411 of the main control unit 40 determines that the liquid accommodation container 100 is in the mounting-completed state, and thus determines "container provided".

In a second case where the voltage output from the data terminal 210 of the liquid accommodation container 100 has a low level at each of the first timing t1 to the third timing t3, the determination unit 411 of the main control unit 40 determines that the liquid accommodation container 100 is in the non-mounting-completed state, and thus determines "no container".

In a third case where the voltage output from the data terminal 210 of the liquid accommodation container 100 has a high level at the first timing t1, a low level at the second timing t2, and a high level at the third timing t3, the determination unit 411 of the main control unit 40 determines that the data terminal 210 and the clock terminal 220 are in the short-circuited state, and thus determines "short circuit occurring". When the data terminal 210 and the clock terminal 220 have a short circuit, the voltage of the data terminal 210 becomes substantially equal to the voltage of the clock terminal 220. Similar to the clock signal SCK in FIG. 11B, the voltage output from the data terminal 210 of the liquid accommodation container 100 has a high level at the first timing t1, a low level at the second timing t2, and a high level at the third timing t3. As described above, when the data terminal 210 and the clock terminal 220 have a short circuit among the data terminal 210, the power source terminal 230, the reset terminal 240, and the clock terminal 220, the voltage output, at the first timing t1 to the third timing t3, to the control unit 39 of the printing apparatus 20 from the data terminal 210 coupled to the device 130 is configured as follows. The voltage output from the data terminal 210 is different from the first expected value at the first timing t1, different from the second expected value at the second timing t2, and different from the third expected value at the third timing t3.

In a fourth case where the voltage output from the data terminal 210 of the liquid accommodation container 100 has a high level at each of the first timing t1 to the third timing t3, the determination unit 411 of the main control unit 40 determines at least one of that the data terminal 210 and the power source terminal 230 are in the short-circuited state and that the data terminal 210 and the reset terminal 240 are in the short-circuited state, and thus determines "short circuit occurring". When the data terminal 210 and the power source terminal 230 have a short circuit, or when the data terminal 210 and the reset terminal 240 have a short circuit, the voltage of the data terminal 210 becomes substantially equal to the voltage of the power source terminal 230 or the voltage of the reset terminal 240. As illustrated in FIG. 11B, in the first response period RT1 and the second response period RT2, the power source terminal 230 and the reset terminal 240 are at a high level. Thus, the voltage output from the data terminal 210 of the liquid accommodation container 100 has a high level at each of the first timing t1 to the third timing t3. As described above, in at least one of a case where the data terminal 210 and the power source terminal 230 have a short circuit and a case where the data terminal 210 and the reset terminal 240 have a short circuit, among the data terminal 210, the power source terminal 230, the reset terminal 240, and the clock terminal 220, the voltage output, at the first timing t1 to the third timing t3, to the control unit 39 of the printing apparatus 20 from the data terminal 210 coupled to the device 130 is configured as follows. The voltage output from the data terminal 210 is different from the first expected value at the first timing t1, equal to the second expected value at the second timing t2, and different from the third expected value at the third timing t3.

As described above, the printing apparatus 20 first detects that the data terminal 210 does not have a short circuit with the terminals 220, 230, 240, and 250 other than the data terminal 210, at the first timing t1. In this state, the printing apparatus 20 detects that the liquid accommodation container 100 is mounted in the printing apparatus 20, at the second timing t2. Further, the printing apparatus 20 checks again that the data terminal 210 does not have a short circuit with the terminals 220, 230, 240, and 250 other than the data terminal 210, at the third timing t3. By detecting the voltages output from the data terminal 210 at the first timing t1 to the third timing t3, it is checked that the liquid accommodation container 100 is in the mounting-completed state. As will be described later, a case where a short circuit between the data terminal 210 and the other terminals 220, 230, 240, and 250 occurs within the first response period RT1 and the second response period RT2 is also assumed. By detecting that the data terminal 210 does not have a short circuit with the other terminals 220, 230, 240, and 250, at the first timing t1 before the second timing t2 and at the third timing t3 after the second timing t2, it is checked with high accuracy that the liquid accommodation container 100 is in the mounting-completed state. As described above, the mounting detection mechanism and a short-circuit detection mechanism between the terminals 290, in the liquid accommodation container 100, are recognized as independent components.

When the printing apparatus 20 detects that the data terminal 210 and the clock terminal 220 do not have a short circuit, it is necessary to be able to distinguish the voltage detected by the printing apparatus 20 when the data terminal 210 and the clock terminal 220 have a short circuit, from the voltage detected by the printing apparatus 20 when the data terminal 210 and the clock terminal 220 do not have a short circuit. One cycle of the clock signal SCK has a low level period and a high level period. In a form in which, when the data terminal 210 and the clock terminal 220 do not have a short circuit, the device 130 outputs the voltage equal to the high level to the data terminal 210 in the low level period in the one cycle, the device 130 outputs the voltage equal to the high level even when the data terminal 210 and the clock terminal 220 have a short circuit. As a result, the printing apparatus 20 that detected the output from the data terminal 210 has a difficulty in determining whether or not the data terminal 210 and the clock terminal 220 have a short circuit. Since the device 130 outputs the voltage different from the voltage of the clock signal SCK to the data terminal 210 at the first timing t1 to the third timing t3, the printing apparatus 20 is able to distinguish the voltage detected by the printing apparatus when the data terminal 210 and the clock terminal 220 have a short circuit, from the voltage detected by the printing apparatus when the data terminal 210 and the clock terminal 220 do not have a short circuit. This is similarly applied to a case where the data terminal 210 and the power source terminal 230 have a short circuit and a case where the data terminal 210 and the reset terminal 240 have a short circuit.

Specific examples of the coupling state determination processing will be described with reference to FIGS. 13A to 20B. In a first specific example to a ninth specific example described below, one liquid accommodation container 100A will be described as an example. In a second specific example to the ninth specific example, waveforms illustrated in FIGS. 13A to 20B schematically illustrate an example of the voltage of the terminal 290, which was actually observed. The control unit 39 recognizes the voltage output from the data terminal 210 as either a high level or a low level, based on a predetermined threshold value.

First Specific Example

Figure 13A:
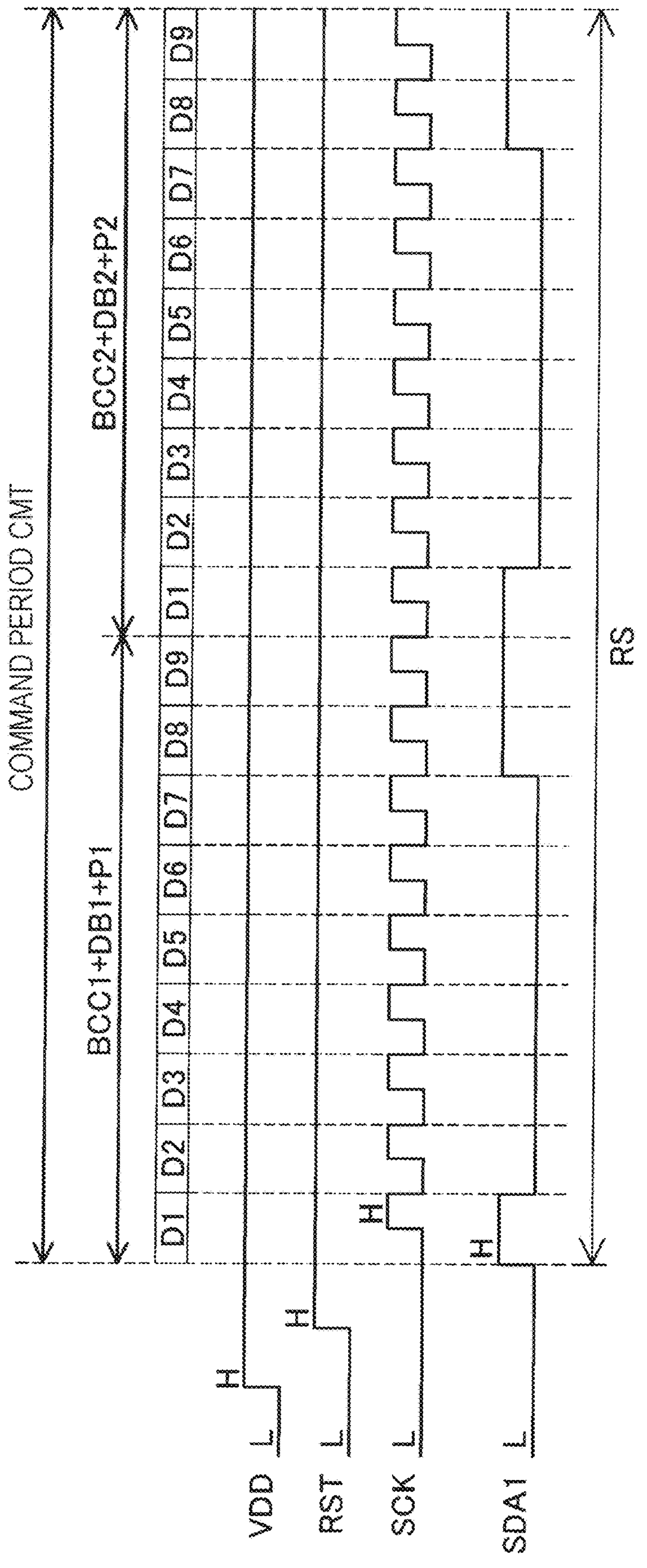
FIG. 13A is a first timing chart illustrating the coupling state determination processing.
Figure 13B:
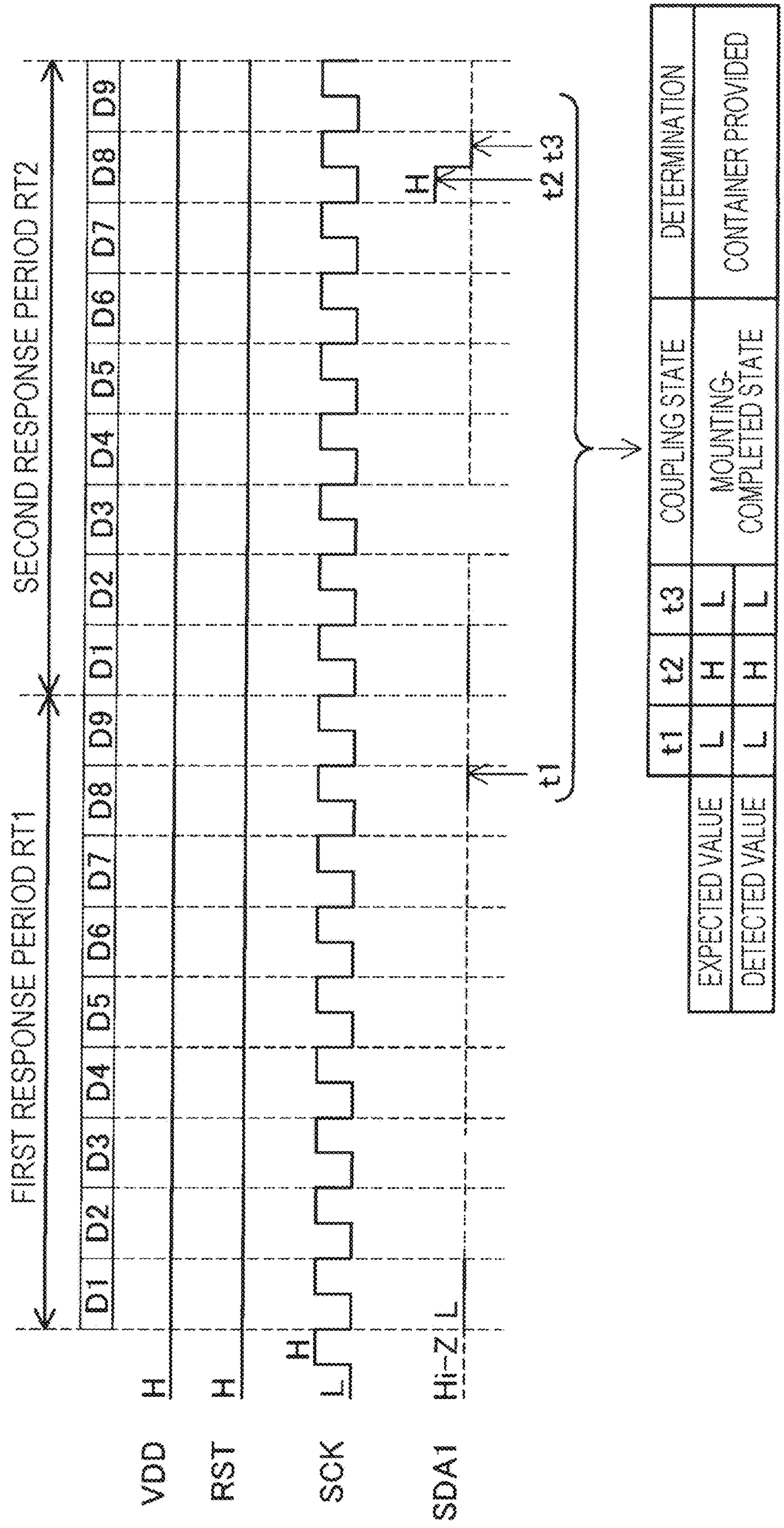
FIG. 13B is a second timing chart illustrating the coupling state determination processing.

In the first specific example, a case where the liquid accommodation container 100A is in the mounting-completed state will be described. FIG. 13A is a first timing chart illustrating the coupling state determination processing. FIG. 13B is a second timing chart illustrating the coupling state determination processing. As illustrated in FIG. 13A, the sub-control unit 50 transmits the request signal RS to the device 130A of the liquid accommodation container 100A in the command period CMT. The request signal RS transmitted to the device 130A has a high level in the bit of the cycle D8 in order to designate the liquid accommodation container 100A as a target. As illustrated in FIG. 13B, in the mounting-completed state, the sub-control unit 50 detects, from the data terminal 210, a low level at the first timing t1 in the cycle D8 in the first response period RT1, a high level at the second timing t2 in the cycle D8 in the second response period RT2, and a low level at the third timing t3 in the cycle D8 in the second response period RT2. In this case, the determination unit 421 of the main control unit 40 determines "container provided" for the liquid accommodation container 100A at the first timing t1 to the third timing t3 because the expected value is equal to the detected value.

Second Specific Example

Figure 14A:
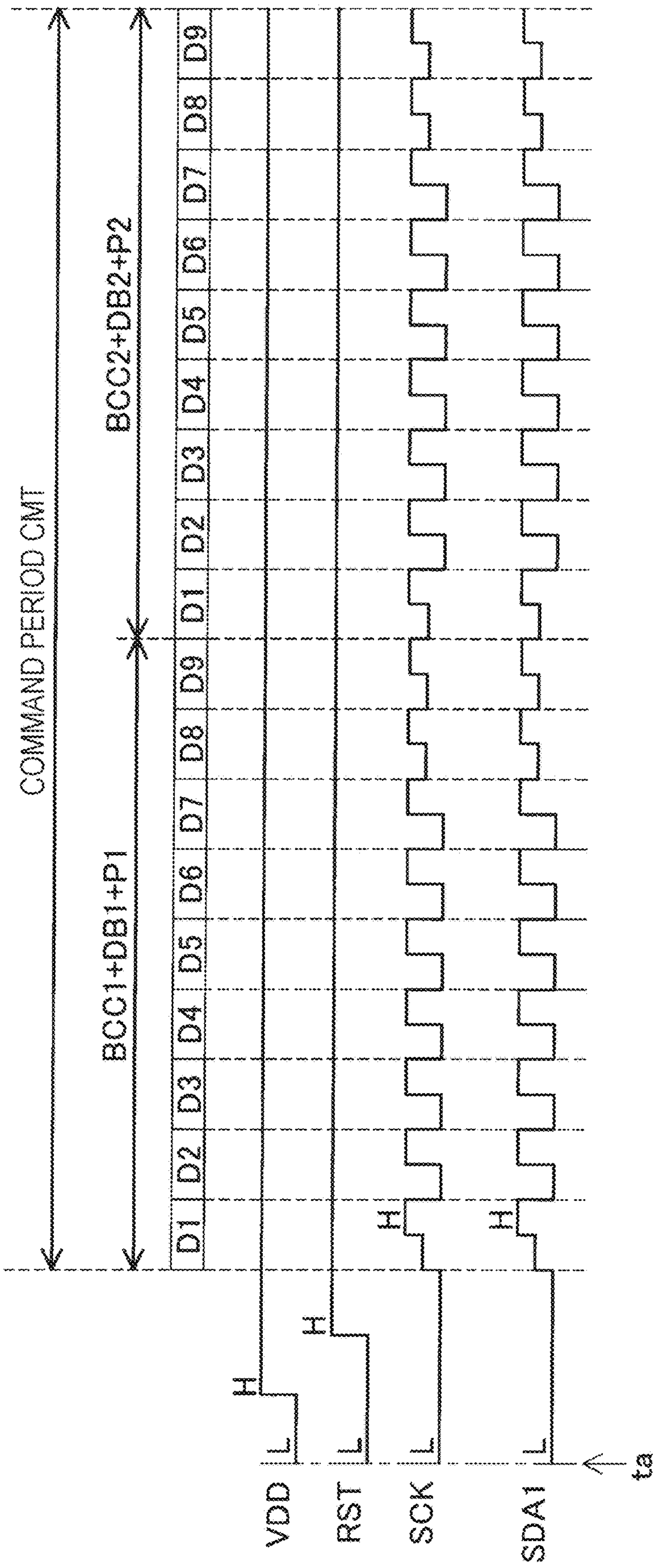
FIG. 14A is a third timing chart illustrating the coupling state determination processing.
Figure 14B:
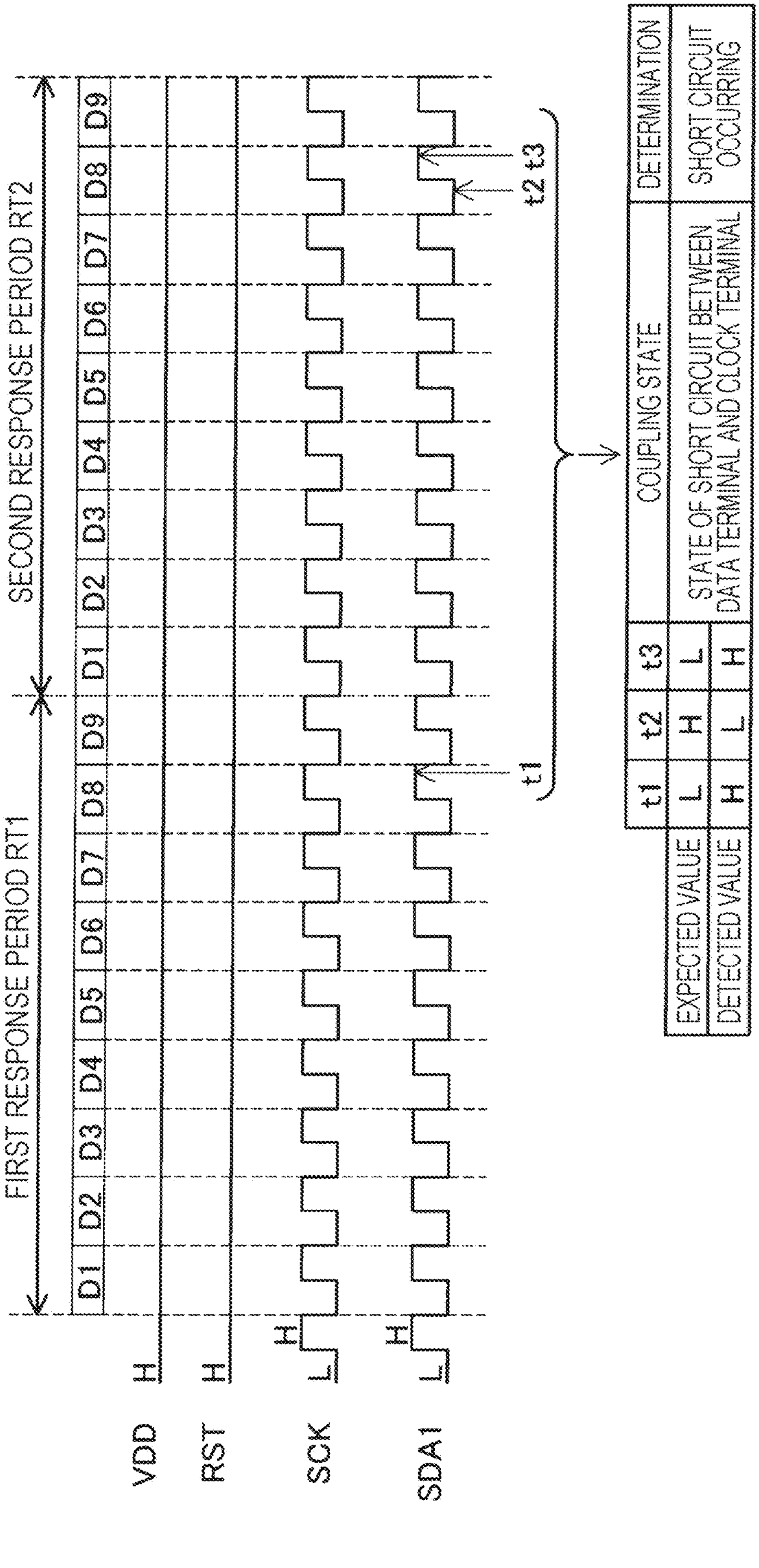
FIG. 14B is a fourth timing chart illustrating the coupling state determination processing.

In a second specific example, the coupling state determination processing when a short circuit between the data terminal 210 and the clock terminal 220 occurs will be described. FIG. 14A is a third timing chart illustrating the coupling state determination processing. FIG. 14B is a fourth timing chart illustrating the coupling state determination processing. In FIG. 14A, it is assumed that a short circuit occurs between the data terminal 210 and the clock terminal 220 of the liquid accommodation container 100A at a timing ta before the command period CMT. As illustrated in FIG. 14B, the change in the voltage output from the data terminal 210 is the same as a case of the signal of the clock terminal 220. The sub-control unit 50 detects, from the data terminal 210, a high level at the first timing t1 of the cycle D8 in the first response period RT1, a low level at the second timing t2 of the cycle D8 in the second response period RT2, and a high level at the third timing t3 of the cycle D8 in the second response period RT2. In this case, the data terminal 210 and the clock terminal 220 are in the short-circuited state, and thus the determination unit 411 of the main control unit determines "short circuit occurring".

Third Specific Example

Figure 15:
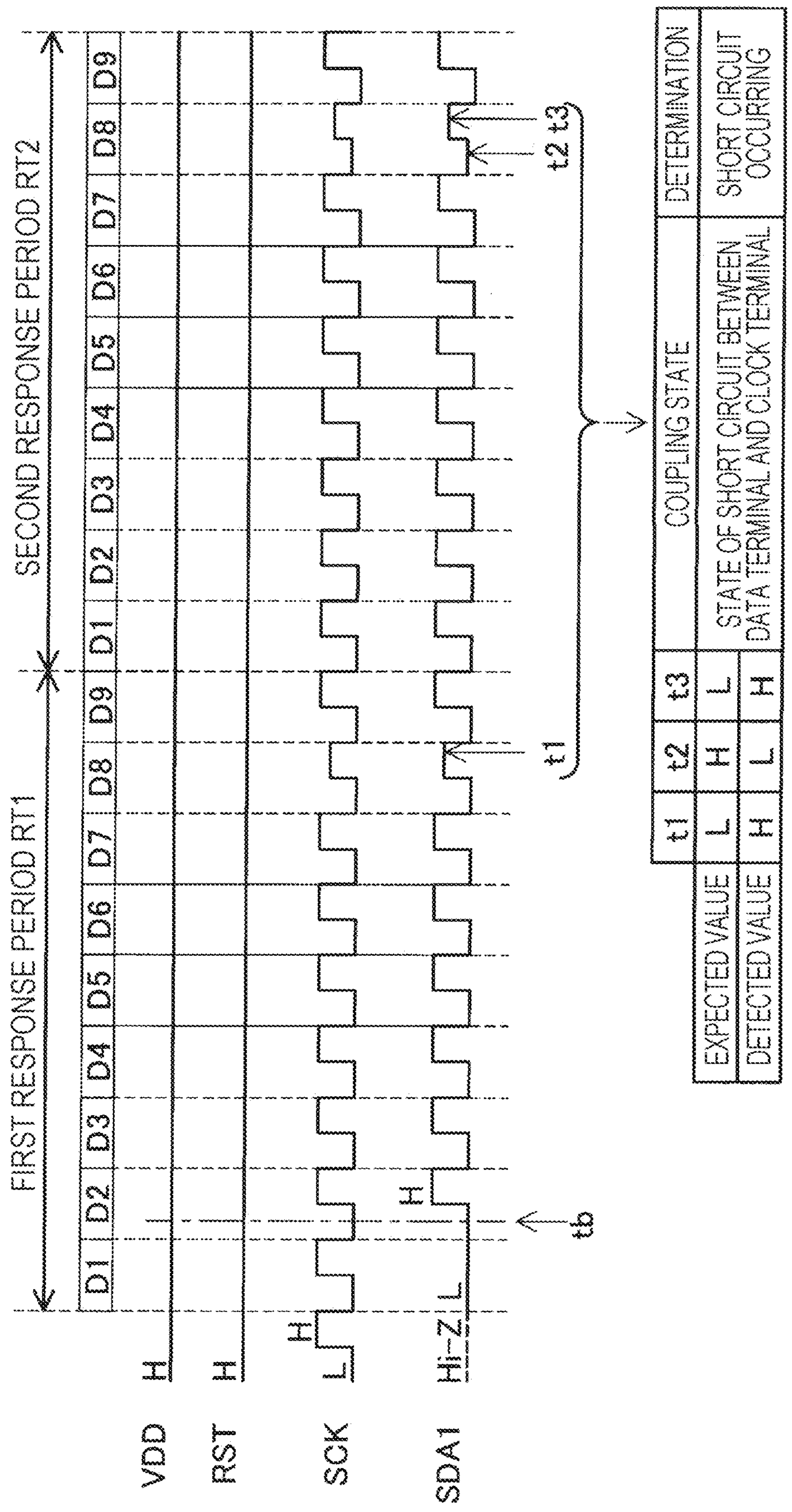
FIG. 15 is a fifth timing chart illustrating the coupling state determination processing.

In a third specific example, the coupling state determination processing when a short circuit between the data terminal 210 and the clock terminal 220 occurs will be described. The third specific example is different from the second specific example in that the device 130 receives the request signal RS, and then a short circuit occurs between the data terminal 210 and the clock terminal 220. FIG. 15 is a fifth timing chart illustrating the coupling state determination processing. It is assumed that a short circuit occurs between the data terminal 210 and the clock terminal 220 of the liquid accommodation container 100A at a timing tb of the first response period RT1. In this case, the signal output from the data terminal 210 is the same as the signal of the clock terminal 220. Thus, the sub-control unit 50 detects, from the data terminal 210, a high level at the first timing t1 of the cycle D8 in the first response period RT1, a low level at the second timing t2 of the cycle D8 in the second response period RT2, and a high level at the third timing t3 of the cycle D8 in the second response period RT2. In this case, regarding the liquid accommodation container 100A, the data terminal 210 and the clock terminal 220 are in the short-circuited state, and thus the determination unit 411 of the main control unit 40 determines "short circuit occurring".

Fourth Specific Example

Figure 16A:
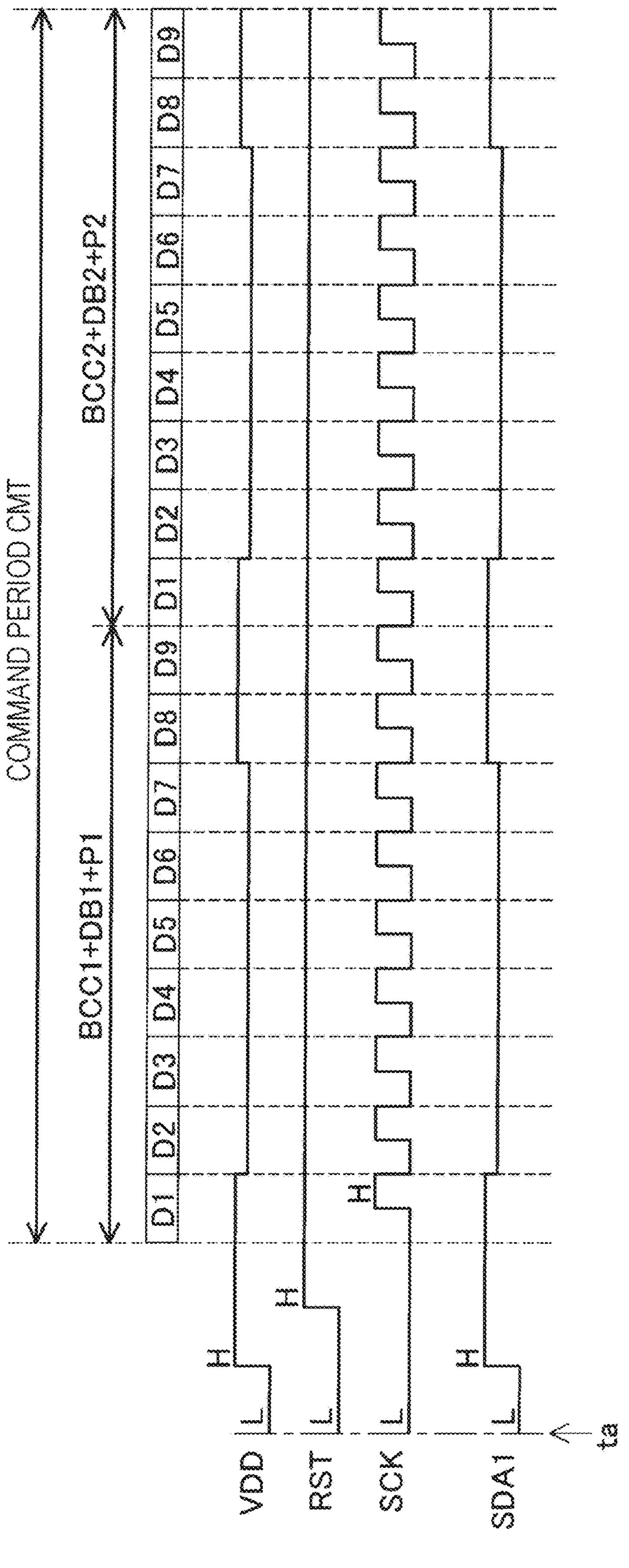
FIG. 16A is a sixth timing chart illustrating the coupling state determination processing.
Figure 16B:
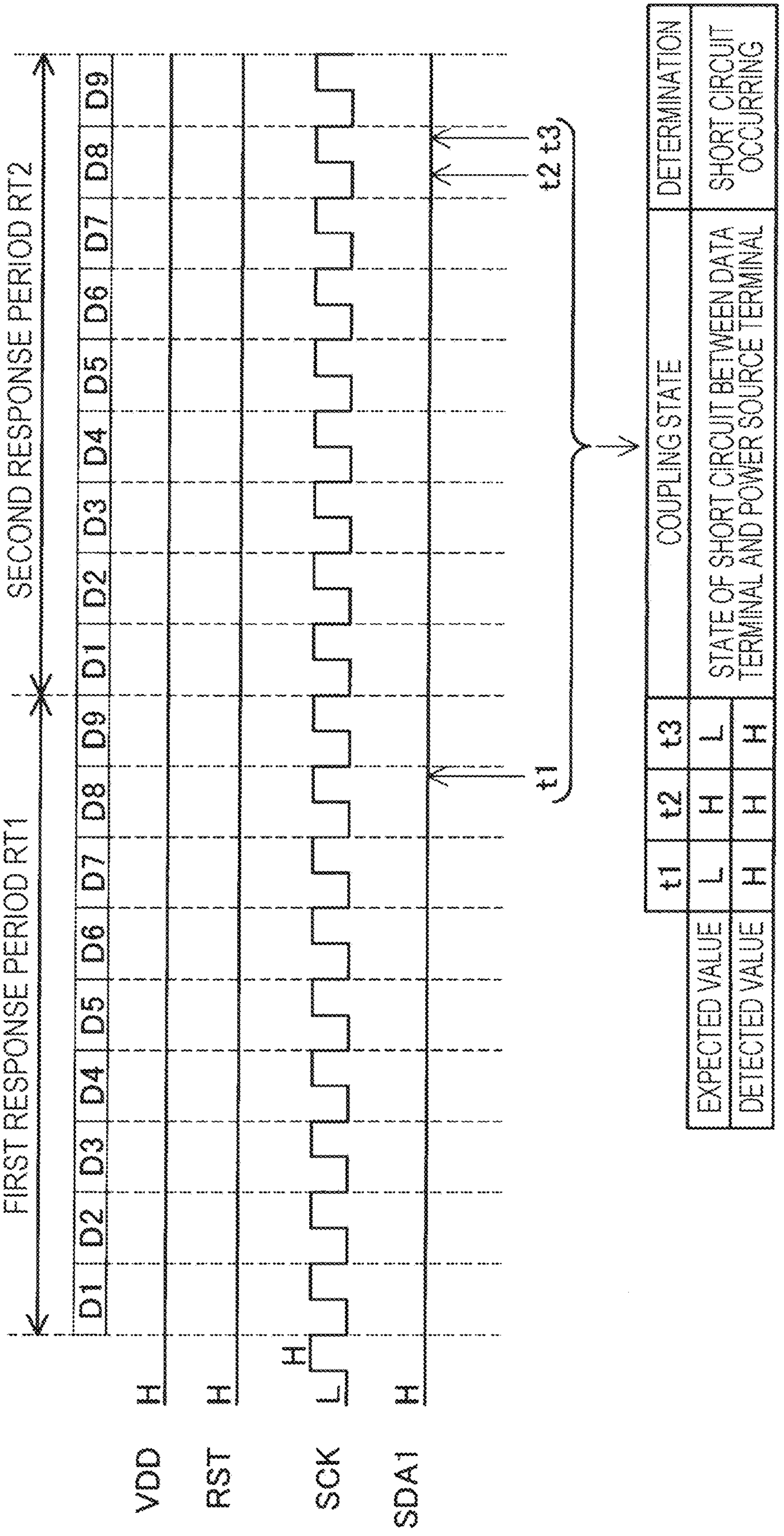
FIG. 16B is a seventh timing chart illustrating the coupling state determination processing.

In a fourth specific example, the coupling state determination processing when a short circuit between the data terminal 210 and the power source terminal 230 occurs will be described. FIG. 16A is a sixth timing chart illustrating the coupling state determination processing. FIG. 16B is a seventh timing chart illustrating the coupling state determination processing. In FIGS. 16A and 16B, it is assumed that a short circuit occurs between the data terminal 210 and the power source terminal 230 of the liquid accommodation container 100A at the timing ta before the command period CMT. As illustrated in FIG. 16B, the change in the voltage output from the data terminal 210 is the same as a case of the signal of the power source terminal 230. The sub-control unit 50 detects, from the data terminal 210, a high level at the first timing t1 of the cycle D8 in the first response period RT1, a high level at the second timing t2 of the cycle D8 in the second response period RT2, and a high level at the third timing t3 of the cycle D8 in the second response period RT2. In this case, regarding the liquid accommodation container 100A, the data terminal 210 and the power source terminal 230 are in the short-circuited state, and thus the determination unit 411 of the main control unit 40 determines "short circuit occurring".

Fifth Specific Example

Figure 17:
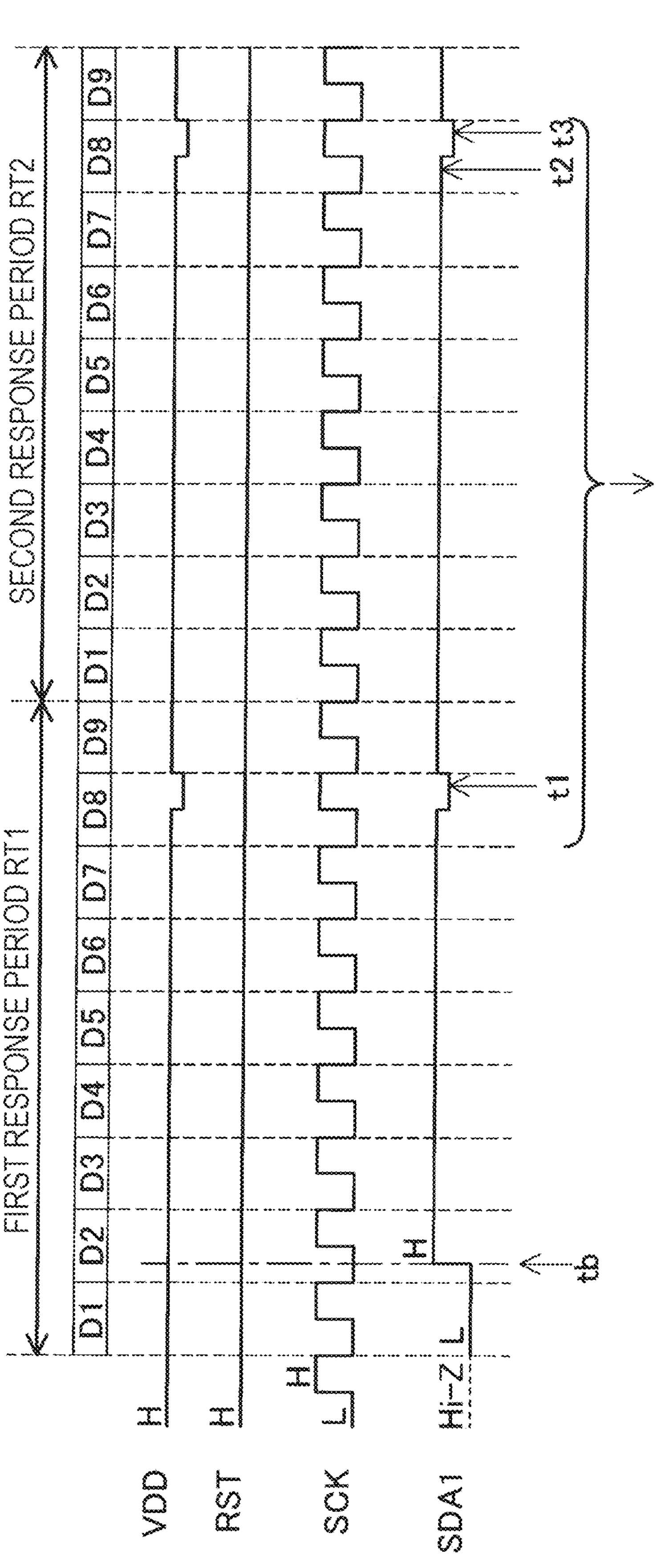
FIG. 17 is an eighth timing chart illustrating the coupling state determination processing.

In a fifth specific example, the coupling state determination processing when a short circuit between the data terminal 210 and the power source terminal 230 occurs will be described. The fifth specific example is different from the fourth specific example in that the device 130 receives the request signal RS, and then a short circuit occurs between the data terminal 210 and the power source terminal 230. FIG. 17 is an eighth timing chart illustrating the coupling state determination processing. It is assumed that a short circuit occurs between the data terminal 210 and the power source terminal 230 of the liquid accommodation container 100A at the timing tb of the first response period RT1. In this case, the signal output from the data terminal 210 is the same as the signal of the power source terminal 230. Thus, the sub-control unit 50 detects, from the data terminal 210, a high level at the first timing t1 of the cycle D8 in the first response period RT1, a high level at the second timing t2 of the cycle D8 in the second response period RT2, and a high level at the third timing t3 of the cycle D8 in the second response period RT2. In this case, regarding the liquid accommodation container 100A, the data terminal 210 and the power source terminal 230 are in the short-circuited state, and thus the determination unit 411 of the main control unit 40 determines "short circuit occurring".

Sixth Specific Example

Figure 18A:
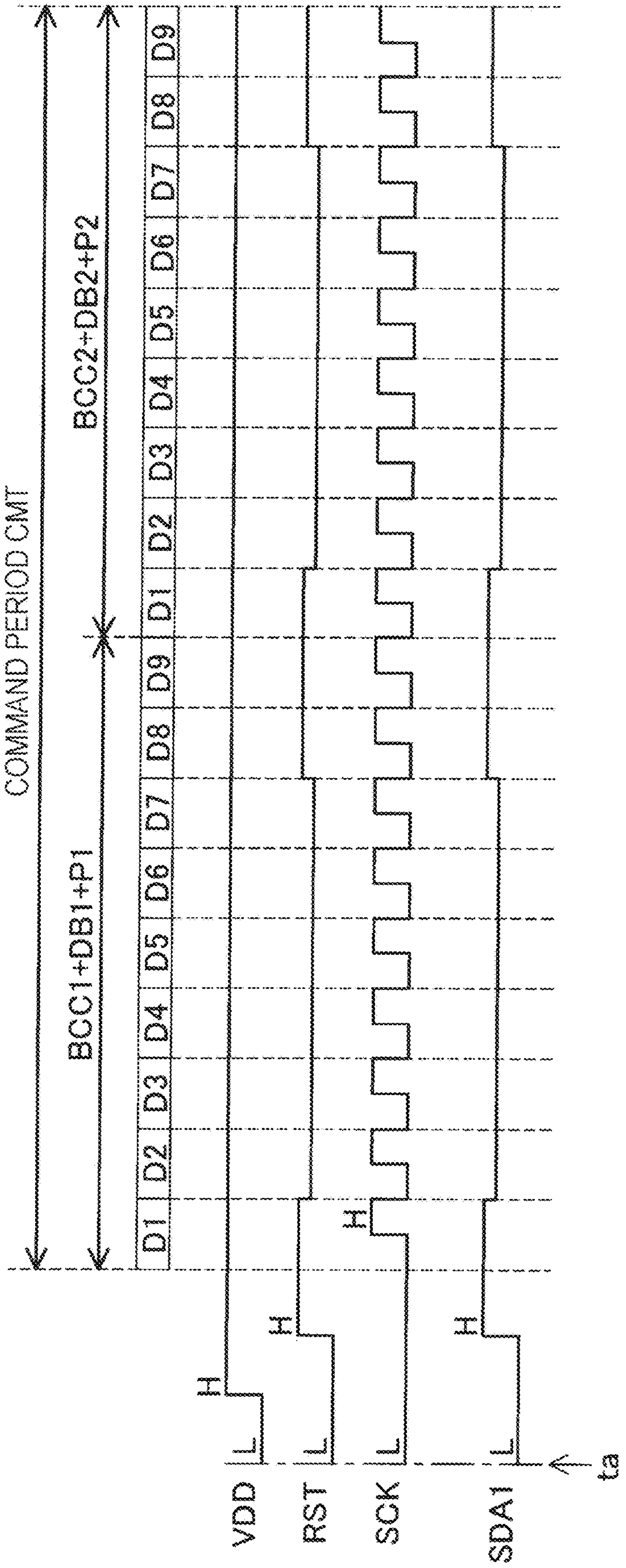
FIG. 18A is a ninth timing chart illustrating the coupling state determination processing.
Figure 18B:
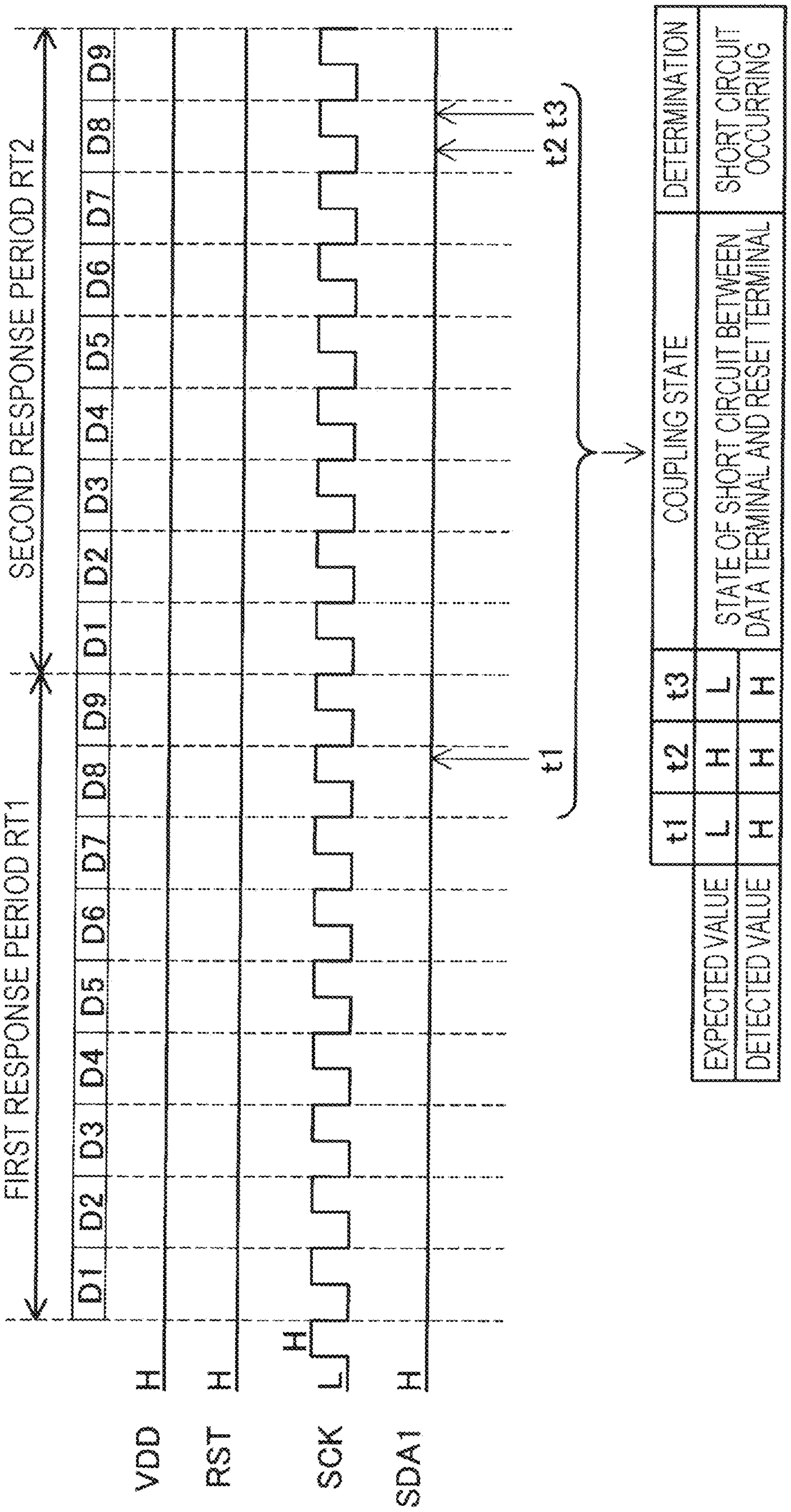
FIG. 18B is a tenth timing chart illustrating the coupling state determination processing.

In a sixth specific example, the coupling state determination processing when a short circuit between the data terminal 210 and the reset terminal 240 occurs will be described. FIG. 18A is a ninth timing chart illustrating the coupling state determination processing. FIG. 18B is a tenth timing chart illustrating the coupling state determination processing. In FIGS. 18A and 18B, it is assumed that a short circuit occurs between the data terminal 210 and the reset terminal 240 of the liquid accommodation container 100A at the timing ta before the command period CMT. As illustrated in FIG. 18B, the change in the voltage output from the data terminal 210 is the same as a case of the signal of the reset terminal 240. Thus, the sub-control unit 50 detects, from the data terminal 210, a high level at the first timing t1 of the cycle D8 in the first response period, a high level at the second timing t2 of the cycle D8 in the second response period, and a high level at the third timing t3 of the cycle D8 in the second response period. In this case, regarding the liquid accommodation container 100A, the data terminal 210 and the reset terminal 240 are in the short-circuited state, and thus the determination unit 411 of the main control unit 40 determines "short circuit occurring".

Seventh Specific Example

Figure 19:
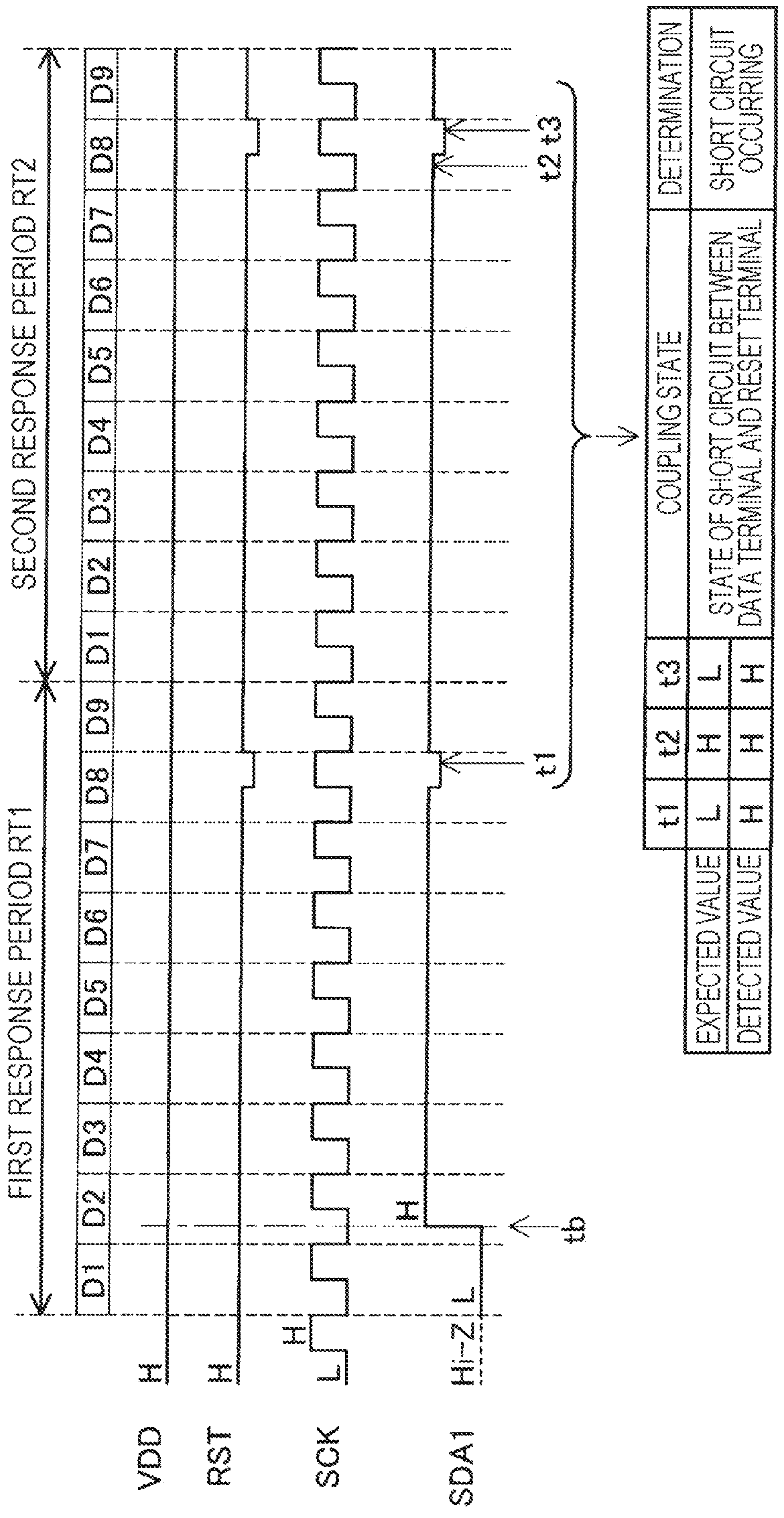
FIG. 19 is an eleventh timing chart illustrating the coupling state determination processing.

In a seventh specific example, the coupling state determination processing when a short circuit between the data terminal 210 and the reset terminal 240 occurs will be described. The seventh specific example is different from the sixth specific example in that the device 130 receives the request signal RS, and then a short circuit occurs between the data terminal 210 and the reset terminal 240. FIG. 19 is an eleventh timing chart illustrating the coupling state determination processing. It is assumed that a short circuit occurs between the data terminal 210 and the reset terminal 240 of the liquid accommodation container 100A at the timing tb of the first response period RT1. In this case, the signal output from the data terminal 210 is the same as the signal of the reset terminal 240. Thus, the sub-control unit 50 detects, from the data terminal 210, a high level at the first timing t1 of the cycle D8 in the first response period, a high level at the second timing t2 of the cycle D8 in the second response period, and a high level at the third timing t3 of the cycle D8 in the second response period. In this case, regarding the liquid accommodation container 100A, the data terminal 210 and the reset terminal 240 are in the short-circuited state, and thus the determination unit 411 of the main control unit 40 determines "short circuit occurring".

Eighth Specific Example

Figure 20A:
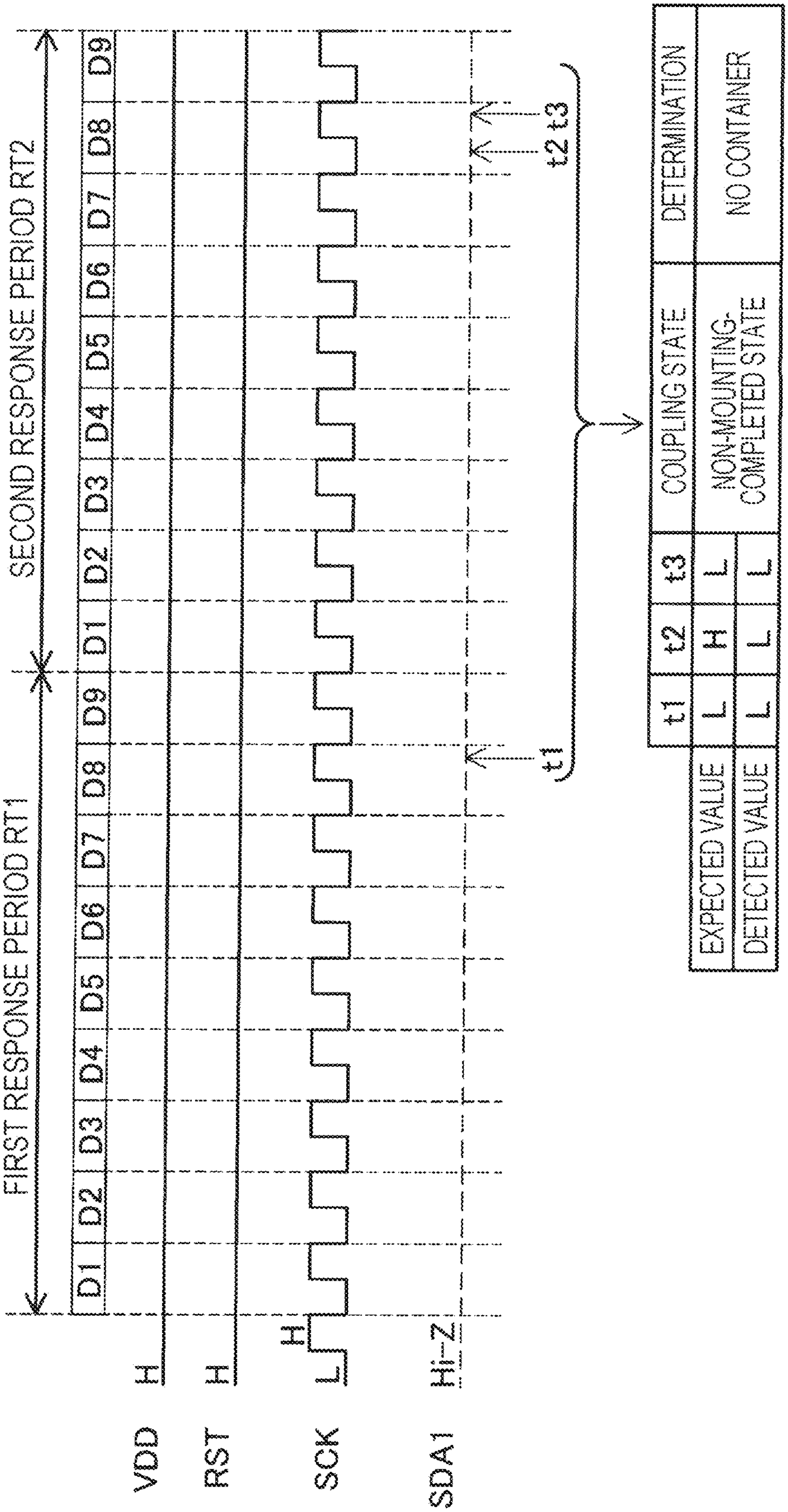
FIG. 20A is a twelfth timing chart illustrating the coupling state determination processing.

In an eighth specific example, a case where the liquid accommodation container 100A is in the non-mounting-completed state will be described. More specifically, in the eighth specific example, a case where the liquid accommodation container 100A is removed from the accommodation section 4 before the device 130A receives the request signal RS will be described. FIG. 20A is a twelfth timing chart illustrating the coupling state determination processing. When the liquid accommodation container 100A is not mounted on the accommodation section 4, the drive state of the host terminal HSDA1 of the sub-control unit 50 becomes a low level due to the coupled pull-down resistor. Thus, the sub-control unit 50 detects a low level at the first timing t1 of the cycle D8 in the first response period RT1, a low level at the second timing t2 of the cycle D8 in the second response period RT2, and a low level at the third timing t3 of the cycle D8 in the second response period RT2. In this case, the liquid accommodation container 100A is in the non-mounting-completed state, and thus the determination unit 421 of the main control unit 40 determines "no container".

Ninth Specific Example

Figure 20B:
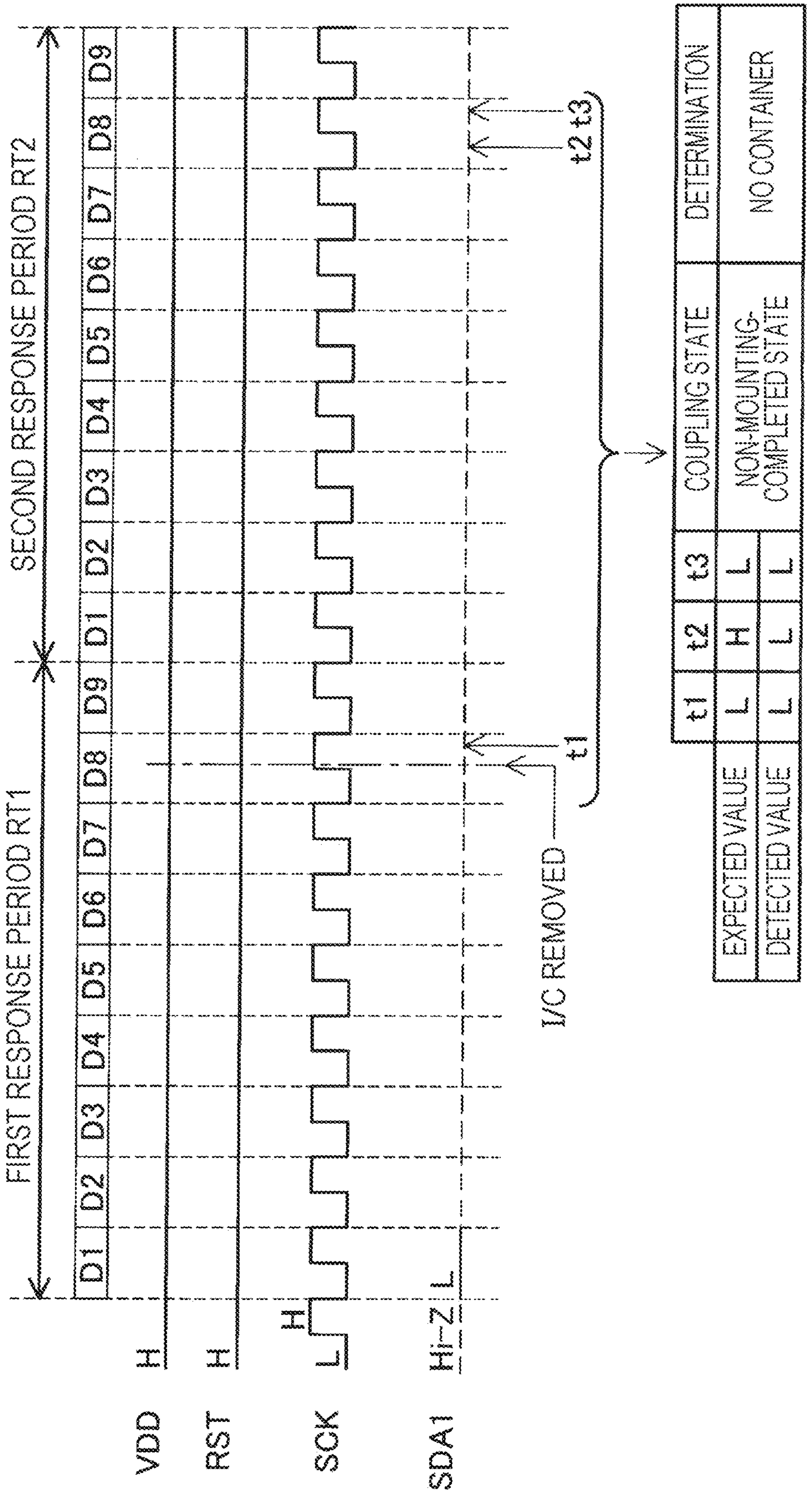
FIG. 20B is a thirteenth timing chart illustrating the coupling state determination processing.

In a ninth specific example, a case where the liquid accommodation container 100A is removed from the accommodation section 4 during the first response period RT1 will be described. FIG. 20B is a thirteenth timing chart illustrating the coupling state determination processing. The sub-control unit 50 detects a low level at the first timing t1 of the cycle D8 in the first response period RT1, a low level at the second timing t2 of the cycle D8 in the second response period RT2, and a low level at the third timing t3 of the cycle D8 in the second response period RT2. In this case, the liquid accommodation container 100A is in the non-mounting-completed state, and thus the determination unit 421 of the main control unit 40 determines "no container".

OTHER SPECIFIC EXAMPLES

In other specific examples, various coupling states and determination results by the determination unit 421 for the respective coupling states will be described. FIG. 20C is a diagram illustrating another specific example of the coupling state determination processing. In the coupling state determination processing, when at least one of the detected values at the first timing t1 and the third timing t3 is different from the expected value, the determination unit 411 of the main control unit 40 determines "short circuit occurring".

A case of No. 1 refers to a case where the data terminal 210 and the clock terminal 220 have a short circuit at a timing t before the first timing t1. In this case, the board 120 outputs, from the data terminal 210 to the printing apparatus 20, a high level voltage different from the first expected value at the first timing t1, a low level voltage different from the second expected value at the second timing t2, and a high level voltage different from the third expected value at the third timing t3. In this case, the determination unit 411 determines "short circuit occurring".

A case of No. 2 refers to a case where the data terminal 210 and the clock terminal 220 have a short circuit at a timing t before the second timing t2 after the first timing t1. In this case, the board 120 outputs, from the data terminal 210 to the printing apparatus 20, a low level voltage equal to the first expected value at the first timing t1, a low level voltage different from the second expected value at the second timing t2, and a high level voltage different from the third expected value at the third timing t3. In this case, the determination unit 411 determines "short circuit occurring".

A case of No. 3 refers to a case where the data terminal 210 and the clock terminal 220 have a short circuit at a timing t before the third timing t3 after the second timing t2. In this case, the board 120 outputs, from the data terminal 210 to the printing apparatus 20, a low level voltage equal to the first expected value at the first timing t1, a high level voltage equal to the second expected value at the second timing t2, and a high level voltage different from the third expected value at the third timing t3. In this case, the determination unit 411 determines "short circuit occurring".

A case of No. 4 refers to a case where a short circuit between the data terminal 210 and the clock terminal 220 is eliminated at a timing t before the second timing t2 after the first timing t1. In this case, the board 120 outputs, from the data terminal 210 to the printing apparatus 20, a high level voltage different from the first expected value at the first timing t1, a high level voltage equal to the second expected value at the second timing t2, and a low level voltage equal to the third expected value at the third timing t3. In this case, the determination unit 411 determines "short circuit occurring".

A case of No. 5 refers to a case where a short circuit between the data terminal 210 and the clock terminal 220 is eliminated at a timing t before the third timing t3 after the second timing t2. In this case, the board 120 outputs, from the data terminal 210 to the printing apparatus 20, a high level voltage different from the first expected value at the first timing t1, a low level voltage different from the second expected value at the second timing t2, and a low level voltage equal to the third expected value at the third timing t3. In this case, the determination unit 411 determines "short circuit occurring".

A case of No. 6 refers to at least one of a case where the data terminal 210 and the power source terminal 230 have a short circuit at a timing t before the first timing t1 and a case where the data terminal 210 and the reset terminal 240 have a short circuit at a timing t before the first timing t1. In this case, the board 120 outputs, from the data terminal 210 to the printing apparatus 20, a high level voltage different from the first expected value at the first timing t1, a high level voltage equal to the second expected value at the second timing t2, and a high level voltage different from the third expected value at the third timing t3. In this case, the determination unit 411 determines "short circuit occurring".

A case of No. 7 refers to at least one of a case where the data terminal 210 and the power source terminal 230 have a short circuit at a timing t before the second timing t2 after the first timing t1 and a case where the data terminal 210 and the reset terminal 240 have a short circuit at a timing t before the second timing t2 after the first timing t1. In this case, the board 120 outputs, from the data terminal 210 to the printing apparatus 20, a low level voltage equal to the first expected value at the first timing t1, a high level voltage equal to the second expected value at the second timing t2, and a high level voltage different from the third expected value at the third timing t3. In this case, the determination unit 411 determines "short circuit occurring".

A case of No. 8 refers to at least one of a case where the data terminal 210 and the power source terminal 230 have a short circuit at a timing t before the third timing t3 after the second timing t2 and a case where the data terminal 210 and the reset terminal 240 have a short circuit at a timing t before the third timing t3 after the second timing t2. In this case, the board 120 outputs, from the data terminal 210 to the printing apparatus 20, a low level voltage equal to the first expected value at the first timing t1, a high level voltage equal to the second expected value at the second timing t2, and a high level voltage different from the third expected value at the third timing t3. In this case, the determination unit 411 determines "short circuit occurring".

A case of No. 9 refers to a case where a short circuit between the data terminal 210 and the power source terminal 230 is eliminated, and a short circuit between the data terminal 210 and the reset terminal 240 is eliminated, at a timing t before the second timing t2 after the first timing t1. In this case, the board 120 outputs, from the data terminal 210 to the printing apparatus 20, a high level voltage different from the first expected value at the first timing t1, a high level voltage equal to the second expected value at the second timing t2, and a low level voltage equal to the third expected value at the third timing t3. In this case, the determination unit 411 determines "short circuit occurring".

A case of No. 10 refers to a case where a short circuit between the data terminal 210 and the power source terminal 230 is eliminated, and a short circuit between the data terminal 210 and the reset terminal 240 is eliminated, at a timing t before the third timing t3 after the second timing t2. In this case, the board 120 outputs, from the data terminal 210 to the printing apparatus 20, a high level voltage different from the first expected value at the first timing t1, a high level voltage equal to the second expected value at the second timing t2, and a low level voltage equal to the third expected value at the third timing t3. In this case, the determination unit 411 determines "short circuit occurring".

A3-4. Other Software Configuration

In the first embodiment, when the device 130 receives the request signal RS and the printing apparatus 20 receives a second printing instruction during printing based on a first printing instruction, the device 130 may output the first response signal FS and the second response signal SS to the data terminal 210 before printing is started based on the second printing instruction after printing based on the first printing instruction is ended. When the device 130 receives the request signal RS and the printing apparatus receives a cleaning instruction of the printing head 5, the device 130 may output the first response signal FS and the second response signal SS to the data terminal 210 before the cleaning is performed. When the device 130 receives the request signal RS, and the carriage 30 is at a replacement position at which replacement of the liquid accommodation container 100 is possible, the device 130 may output the first response signal FS and the second response signal SS to the data terminal 210. Further, when the device 130 receives the request signal RS, and the carriage 30 moves from the replacement position to a standby position at which the replacement of the liquid accommodation container 100 is not possible, the device 130 may output the first response signal FS and the second response signal SS to the data terminal 210. The replacement position is, for example, the position of the carriage 30 at the home position.

The first response signal FS may also be referred to as a first signal. The second response signal SS may also be referred to as a second signal. The first low response voltage may also be referred to as a first low voltage. The first high response voltage may also be referred to as a first high voltage. The second low response voltage may also be referred to as a second low voltage. The second high response voltage may also be referred to as a second high voltage. The low clock voltage may also be referred to as a low voltage. The high clock voltage may also be referred to as a high voltage. The low reset voltage may also be referred to as a low voltage. The high reset voltage may also be referred to as a high voltage.

A4. Other Embodiments of First Embodiment

A4-1. Embodiment 1 for Board

FIG. 21A is a diagram illustrating a board as Embodiment 1. FIG. 21A illustrates an example of a combination of arrangements of a plurality of contact portions cp. The arrangement of the data contact portion cpd, the clock contact portion cpc, the power-source contact portion cpvd, the reset contact portion cpr, and the ground contact portion cpvs is not limited to the first embodiment, and another arrangement may be used as illustrated in the combinations No. 1 to No. 24 in FIG. 21A. The combinations No. 1 to No. 24 include an arrangement in which the clock contact portion cpc, the data contact portion cpd, the power-source contact portion cpvd, and the reset contact portion cpr are arranged in the first region Rg1, and the ground contact portion cpvs is arranged in the second region Rg2. The table in FIG. 21A shows the order of the contact portions cp on the board 120 in a +X direction, i.e., corresponding to the order of the projection positions on the second virtual line C2 in the +X direction.

In the combinations No. 1 to No. 18 of the arrangements of the contact portions cp, at least one contact portion cp among the clock contact portion cpc, the power-source contact portion cpvd, and the reset contact portion cpr is arranged to be projected between the projection position swd of the data contact portion cpd and the projection position swvs of the ground contact portion cpvs. In the combinations No. 1 to No. 12 of the arrangements of the contact portions cp, any two or more contact portions cp among the clock contact portion cpc, the power-source contact portion cpvd, and the reset contact portion cpr are arranged to be projected between the projection position swd of the data contact portion cpd and the projection position swvs of the ground contact portion cpvs. In the combinations No. 1 to No. 6 and No. 13 to No. 18 of the arrangements of the contact portions cp, the data contact portion cpd is arranged to be projected between the projection positions of any two contact portions cp among the power-source contact portion cpvd, the reset contact portion cpr, and the clock contact portion cpc. In the combinations Nos. 1, 3, 8, 11, 14, 15, 20, and 23 of the arrangements of the contact portions cp, either or both of the data contact portion cpd and the reset contact portion cpr are arranged to be projected between the projection positions of the power-source contact portion cpvd and the clock contact portion cpc. And the reset contact portion cpr is arranged so that the projection position swr is next to the projection position swvd of the power-source contact portion cpvd. Here also, the phrase "next to the projection position" does not necessarily mean that one contact portion and the other contact portion are closest to each other among all contact portions on the board 120, and is instead used to refer to the closest contact portion among the other aforementioned contact portions cpc, cpd, cpvd, and/or cpr. In the combinations Nos. 1, 2, 6 to 8, 13, 14, 16, 23, and 24 of the arrangements of the contact portions cp, the power-source contact portion cpvd is arranged so that the projection position swvd is next to the projection position swd of the data contact portion cpd. In the combination No. 1 of the arrangements of the contact portions cp, the clock contact portion cpc is arranged to be projected at the farthest position from the projection position swvs of the ground contact portion cpvs. The data contact portion cpd, the power-source contact portion cpvd, and the reset contact portion cpr are arranged to be projected in order in a direction from the projection position swc of the clock contact portion cpc toward the projection position swvs of the ground contact portion cpvs on the second virtual line C2.

Figure 21B:
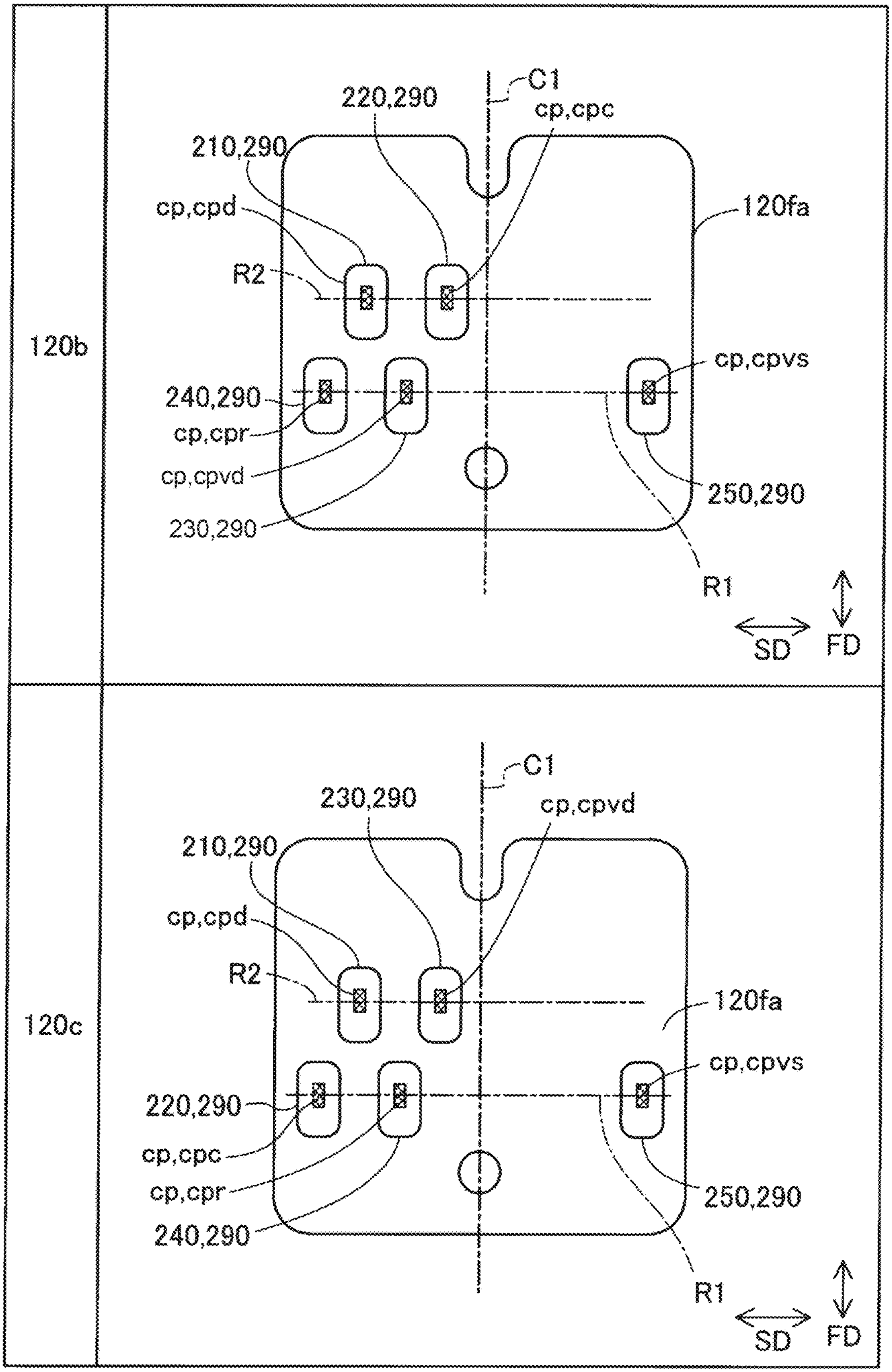
FIG. 21B is a diagram illustrating arrangement examples illustrated in No. 2 and No. 3 in FIG. 21A.

FIG. 21B illustrates arrangement examples indicated by combinations No. 2 and No. 3 in FIG. 21A. Aboard 120*b* corresponds to the arrangement example indicated by combination No. 2 in FIG. 21A. The board 120*b* is different from the board 120 illustrated in FIG. 5 in that the positional relation between the clock contact portion cpc and the reset contact portion cpr is changed. A board 120*c* corresponds to the arrangement example indicated by combination No. 3 in FIG. 21A. The board 120*c* is different from the board 120 illustrated in FIG. 5 in that the positional relation between the power-source contact portion cpvd and the reset contact portion cpr is changed.

The combination of arrangements of the contact portions cp illustrated in FIG. 21A may be similarly applied to the combination of arrangements of the data terminal 210, the clock terminal 220, the power source terminal 230, the reset terminal 240, and the ground terminal 250. The combination of the arrangements of the contact portions cp illustrated in FIG. 21A may also be applied to the combination of arrangements of the apparatus-side terminals 490.

In the first embodiment and FIGS. 21A and 21B, the ground contact portion cpvs is arranged in the second region Rg2, but the contact portions other than the ground contact portion cpvs may be arranged in the second region Rg2. For example, in some embodiments, the data contact portion cpd, the power-source contact portion cpvd, the reset contact portion cpr, and the ground contact portion cpvs may be arranged in the first region Rg1, and the clock contact portion cpc may be arranged in the second region Rg2. In other embodiments, the data contact portion cpd, the clock contact portion cpc, the power-source contact portion cpvd, and the ground contact portion cpvs may be arranged in the first region Rg1, and the reset contact portion cpr may be arranged in the second region Rg2. In other embodiments, the data contact portion cpd, the clock contact portion cpc, the reset contact portion cpr, and the ground contact portion cpvs may be arranged in the first region Rg1, and the power-source contact portion cpvd may be arranged in the second region Rg2. In other embodiments, the clock contact portion cpc, the power-source contact portion cpvd, the reset contact portion cpr, and the ground contact portion cpvs may be arranged in the first region Rg1, and the data contact portion cpd may be arranged in the second region Rg2. Also in the above forms, the arrangement relation between the contact portion cp arranged in the first region Rg1 and the contact portion cp arranged in the second region Rg2 is similar to the arrangement relation in the first embodiment.

A4-2. Embodiment 2 of Board

Figure 22:
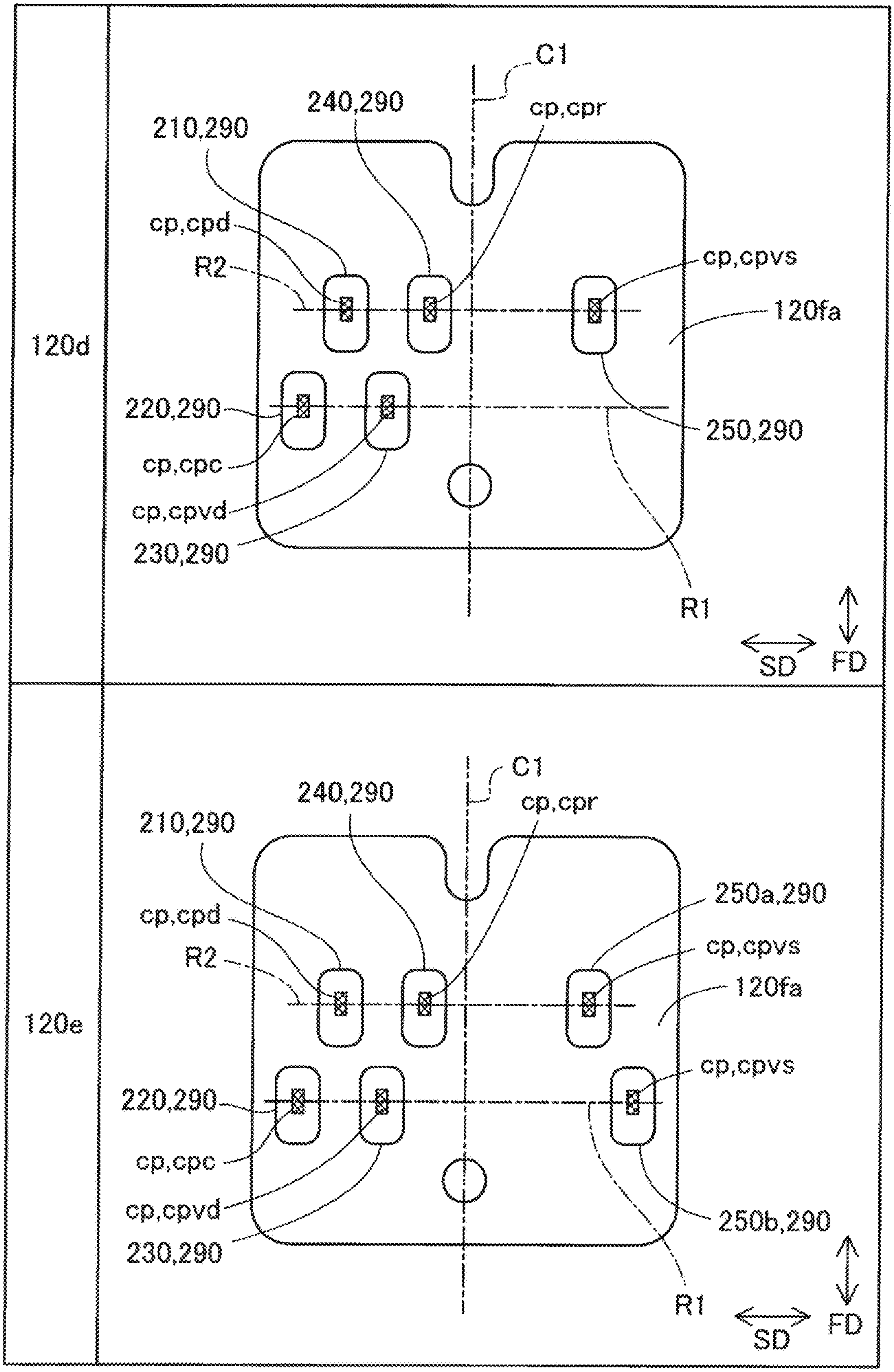
FIG. 22 is a diagram illustrating a board having two patterns as Embodiment 2.

FIG. 22 is a diagram illustrating boards 120*d* and 120*e* of two patterns as Embodiment 2. The disposition of the ground contact portion 250 is not limited to the above-described first embodiment, and other dispositions may be used. The arrangement of the ground contact portion cpvs in the board 120*d* is different from the arrangement in the board 120 illustrated in FIG. 5. The ground contact portion cpvs of the board 120*d* is arranged to form the second row R2. When the board 120*d* is used, the coupling mechanism 400 illustrated in FIGS. 7A and 7B includes an apparatus-side terminal corresponding to the ground contact portion cpvs of the board 120. The number of ground contact portions cpvs is not limited to the above-described first embodiment, and may be two or more. The number of ground contact portions cpvs in the board 120*e* is different from the board 120 illustrated in FIG. 5. The board 120*e* includes two ground terminals 250*a* and 250*b*, each of the ground terminals includes a ground contact portion cpvs. When the board 120*e* is used, the coupling mechanism 400 illustrated in FIGS. 7A and 7B includes two apparatus-side terminals corresponding to the two ground terminals 250*a* and 250*b*. The arrangement of the data contact portion cpd, the clock contact portion cpc, the power-source contact portion cpvd, and the reset contact portion cpr of the board 120*e* is the same as the arrangement in the board 120 illustrated in FIG. 5. The ground contact portion cpvs of the ground terminal 250*a* and the ground contact portion cpvs of the ground terminal 250*b* are arranged at different positions in the direction along the first virtual line C1. The ground contact portion cpvs of one ground terminal 250*a* is arranged to form the second row R2. The ground contact portion cpvs of the other ground terminal 250*b* is arranged to form the first row R1.

A4-3. Embodiment 3 of Board

Figure 23:
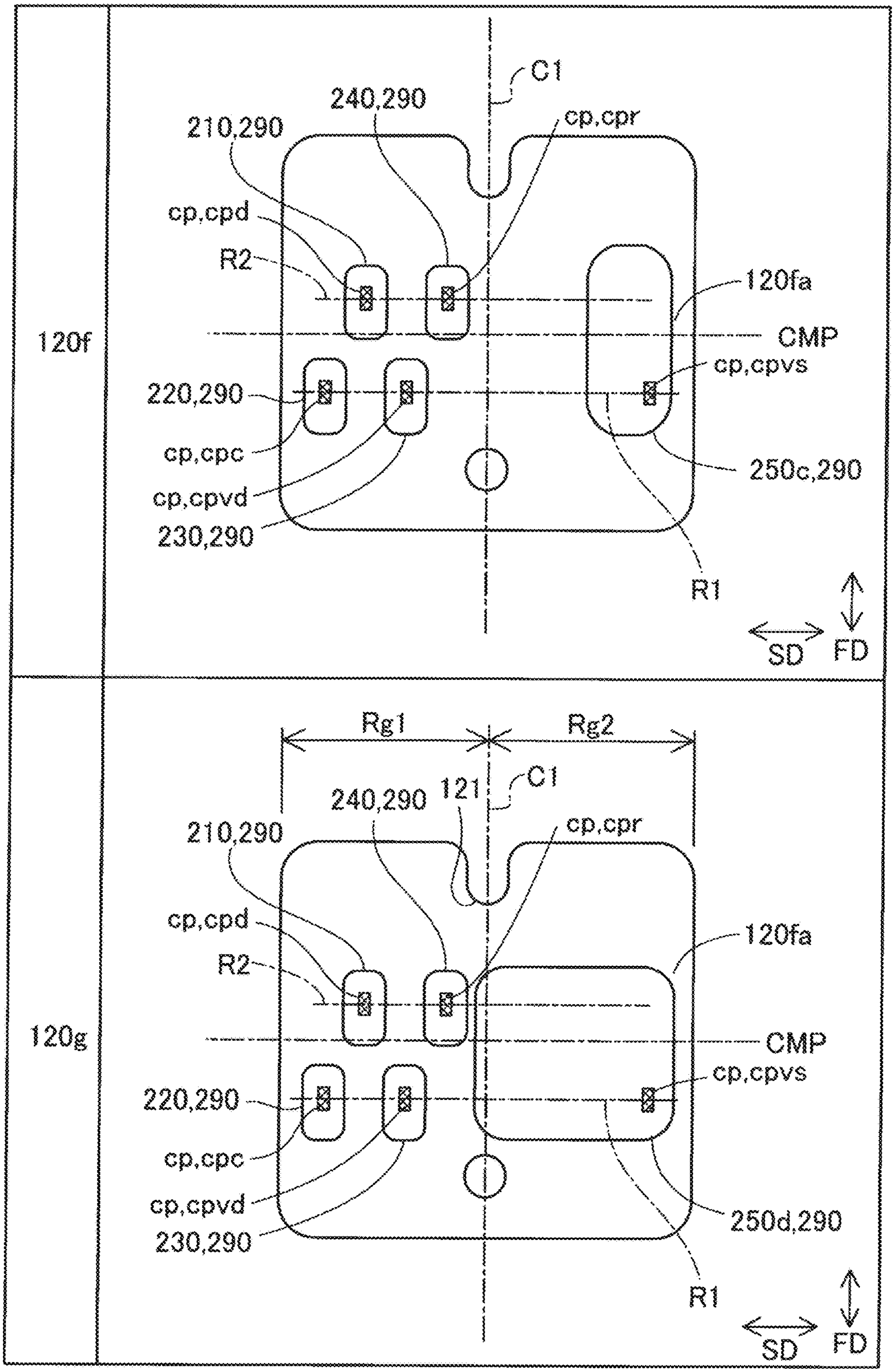
FIG. 23 is a diagram illustrating a board having two patterns as Embodiment 3.

FIG. 23 is a diagram illustrating boards 120*f* and 120*g* of two patterns as Embodiment 3. The size of the ground terminal 250 is not limited to the above-described first embodiment, and may have other sizes. A ground terminal 250*c* of the board 120*f* and a ground terminal 250*d* of the board 120*g* are larger than the ground terminal 250 illustrated in FIG. 5. The ground terminal 250*c* is formed over the first row R1 and the second row R2. The ground terminal 250*c* is arranged to straddle a central portion CMP of the board 120*f* in the direction along the first virtual line C1. The ground terminal 250*d* of the board 120*g* is further formed over the first region Rg1 and the second region Rg2. The ground terminal 250*d* is arranged to straddle the first virtual line C1.

A4-4. Embodiment 4 of Board

Figure 24:
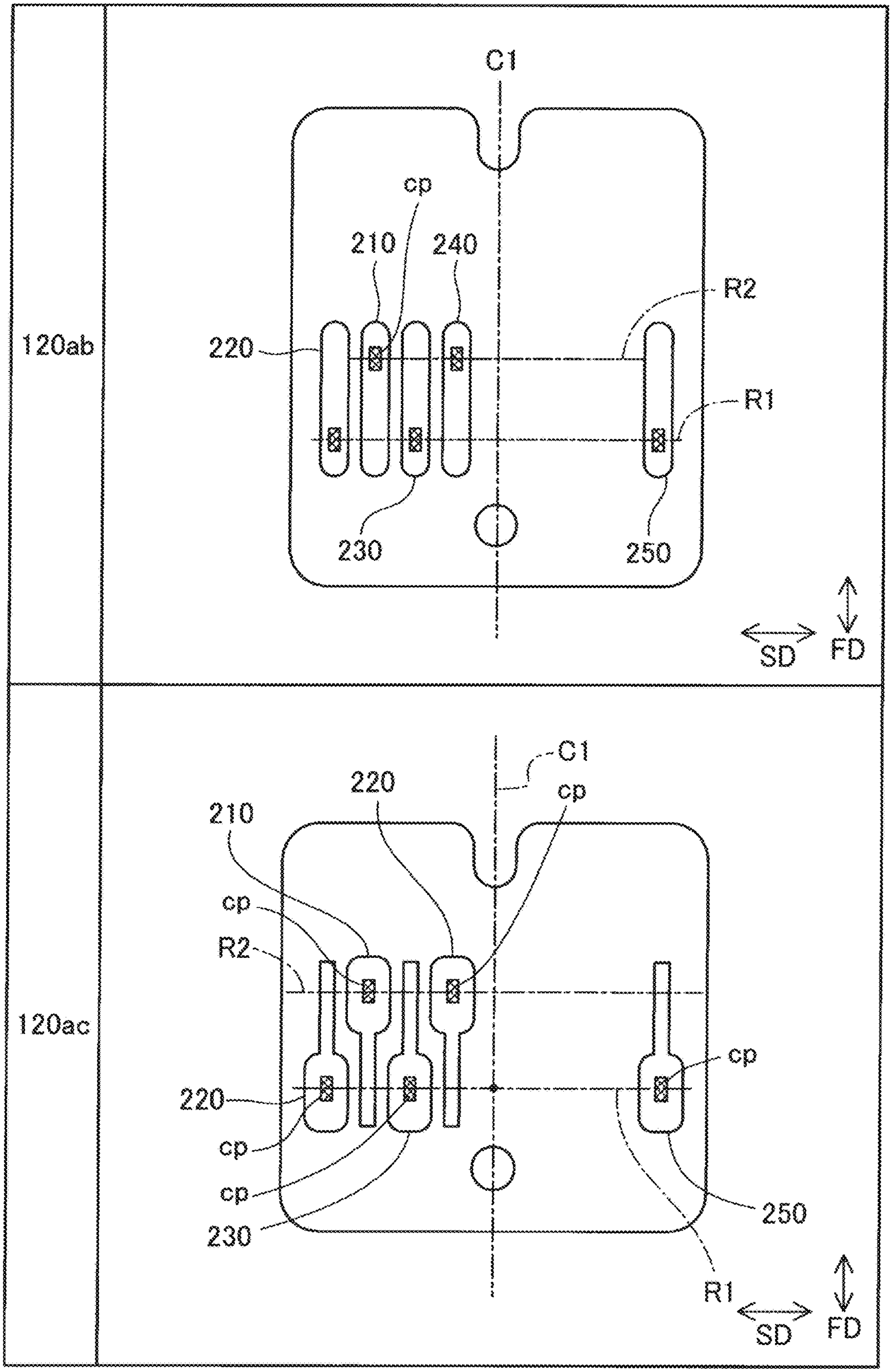
FIG. 24 is a diagram illustrating a board having two patterns as Embodiment 4.
Figure 25:
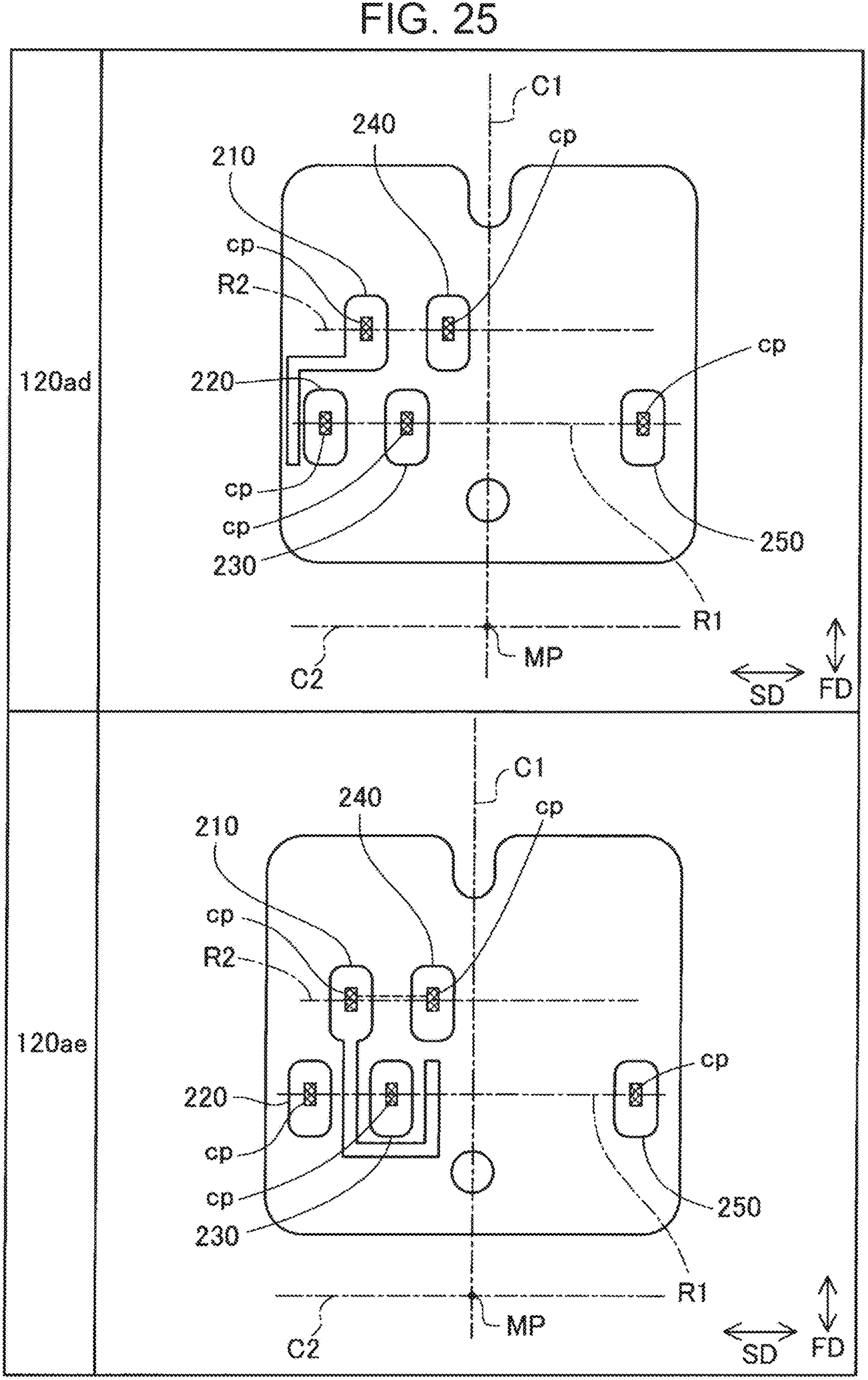
FIG. 25 is a diagram illustrating a board having two patterns as Embodiment 4.

FIG. 24 is a diagram illustrating boards 120*ab* and 120*ac* of two patterns as Embodiment 4. FIG. 25 is a diagram illustrating boards 120*ad* and 120*ae* of two patterns as Embodiment 4. The shapes of the terminals 210 to 250 are not limited to the above-described first embodiment, and other shapes may be used. As illustrated in FIG. 24, the terminals 210 to 250 of the board 120*ab* are formed to straddle the first row R1 and the second row R2, and have an elongated shape along the first virtual line C1. The terminals 210 to 250 of the board 120*ac* have a portion having an elongated shape along the first virtual line C1 in addition to a rectangular portion like the terminals 210 to 250 of the board 120. The data terminal 210 of the board 120*ad* has a portion bent in directions along the first virtual line C1 and the second virtual line C2. The data terminal 210 of the board 120*ae* has portions bent in a direction along the first virtual line C1 and the second virtual line C2 so as to surround a portion of the power source terminal 230. Even in this manner, the positional relation between the contact portions cp of the terminals 210 to 250 is the same as the positional relation between the contact portions cp illustrated in FIG. 5 in the first embodiment.

A4-5. Embodiment 5 of Board

Figure 26:
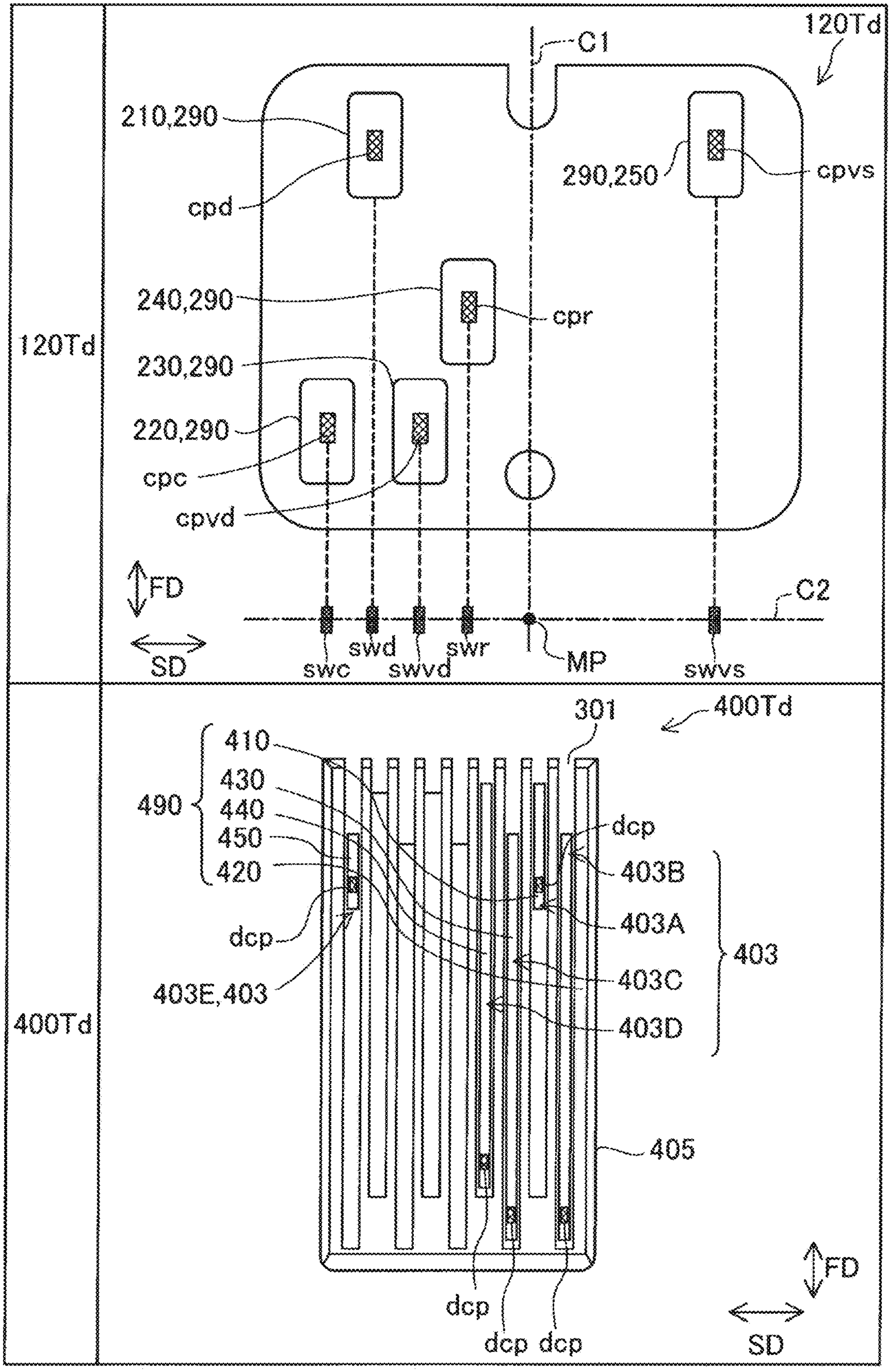
FIG. 26 is a diagram illustrating a board as Embodiment 5.

FIG. 26 is a diagram illustrating a board 120Td as Embodiment 5. The upper part of FIG. 26 illustrates the board 120Td. The lower part of FIG. 26 schematically illustrates a coupling mechanism 400Td corresponding to the board 120Td. In the board 120 in the first embodiment (FIG. 5), the plurality of contact portions cp are arranged to form two rows, but the present disclosure is not limited to this. In the board 120Td, the contact portions are arranged to form three rows. The data contact portion cpd and the ground contact portion cpvs form a third row. As described above, even though the contact portions cp are arranged to be different from the arrangement of the contact portions cp in the first embodiment in the direction along the first virtual line C1, the projection positions on the second virtual line C2 do not change. When the board 120Td is mounted in a direction along the gravity direction and is oriented in the corresponding mounting orientation, in the board 120Td, the clock contact portion cpc, the power-source contact portion cpvd, and the reset contact portion cpr are arranged on the +Z direction side being the gravity direction side of the data contact portion cpd (i.e., downwardly of the data contact portion cpd). At least one contact portion cpc, cpvd, or cpr among the clock contact portion cpc, the power-source contact portion cpvd, and the reset contact portion cpr is arranged to be projected between the projection position swd of the data contact portion cpd and the projection position swvs of the ground contact portion cpvs when the contact portions cp are projected onto the second virtual line C2. Similar to the data contact portion cpd and the ground contact portion cpvs in the present embodiment, the contact portions cp other than the data contact portion cpd and the ground contact portion cpvs may be arranged at positions different from the positions of the contact portions cp in the first embodiment, in the direction along the first virtual line C1. The positional relation between the contact portions cp described above is similar to the positional relation between the contact portions cp of the apparatus-side terminals 490. When the board 120Td is mounted in the direction along the gravity direction, the apparatus-side clock contact portion dcpc, the apparatus-side power-source contact portion dcpvd, and the apparatus-side reset contact portion dcpr are arranged on the +Z direction side being the gravity direction side of the apparatus-side data contact portion dcpd (i.e., downwardly of the apparatus-side data contact portion dcpd). At least one contact portion dcpc, dcpvd, or dcpr among the apparatus-side clock contact portion dcpc, the apparatus-side power-source contact portion dcpvd, and the apparatus-side reset contact portion dcpr is arranged to be projected between the projection position swd of the apparatus-side data contact portion dcpd and the projection position swvs of the apparatus-side ground contact portion dcpvs when the contact portions dcp are projected onto the second virtual line C2.

A4-6. Embodiment 6 of Board

Figure 27:
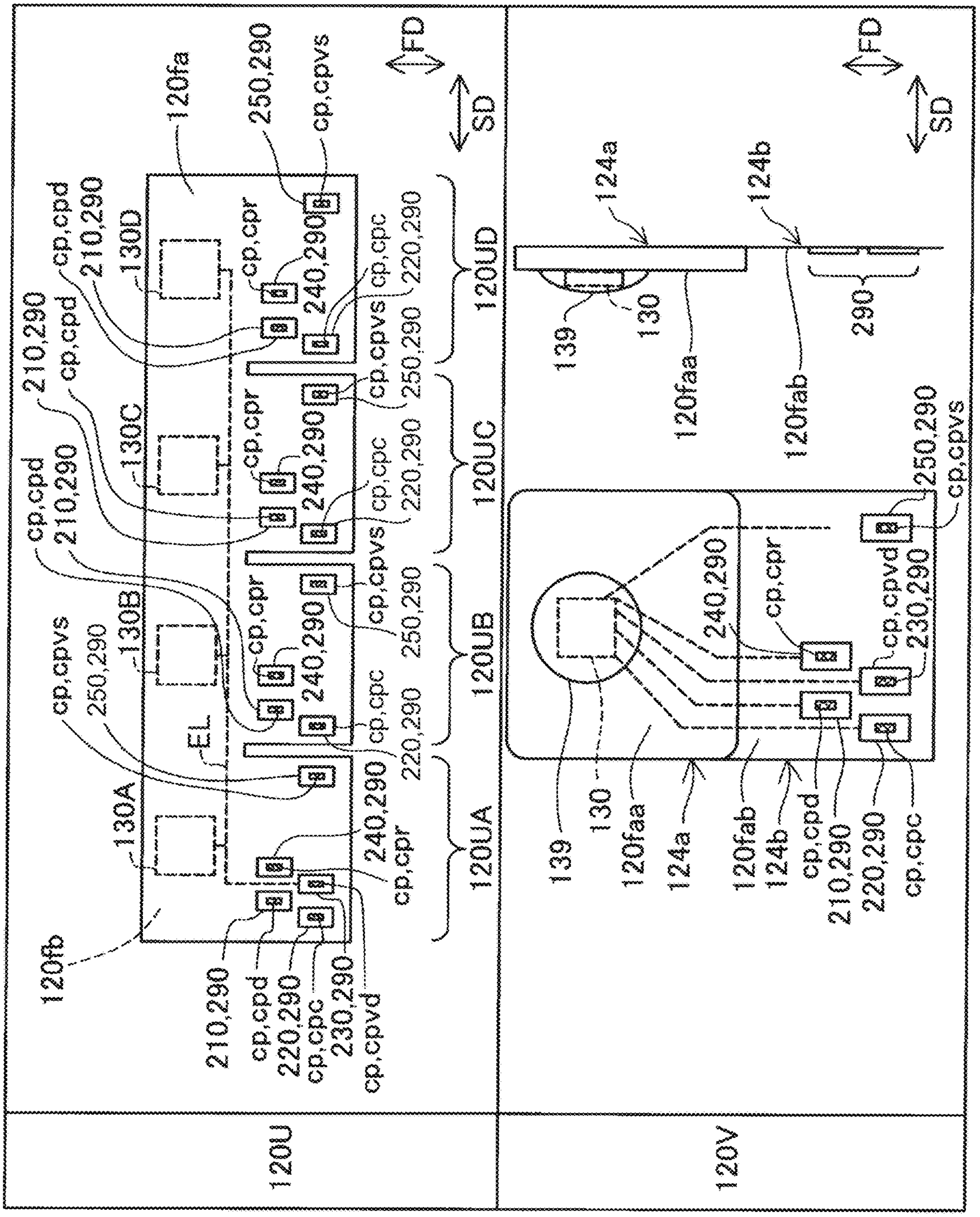
FIG. 27 is a diagram illustrating a board having two patterns as Embodiment 6.

FIG. 27 is a diagram illustrating boards 120U and 120V of two patterns as Embodiment 6 for the board. The form of the base member 120*bd* of the board 120 is not limited to the above-described first embodiment. The board 120U is commonly used by the four liquid accommodation containers 100A to 100D. In this case, the four liquid accommodation containers 100A to 100D may be integrally formed. The board 120U includes a first board region 120UA, a second board region 120UB, a third board region 120UC, and a fourth board region 120UD. The first board region 120UA is a region in which the terminals 290 used in the liquid accommodation container 100A are arranged. The second board region 120UB is a region in which the terminals 290 used in the liquid accommodation container 100B are arranged. The third board region 120UC is a region in which the terminals 290 used in the liquid accommodation container 100C are arranged. The fourth board region 120UD is a region in which the terminals 290 used in the liquid accommodation container 100D are arranged. For purposes of this disclosure, the first board region 120UA, second board region 120UB, third board region 120UC, and fourth board region 120UD are regarded as independent boards. Four devices 130A to 130D used in the four liquid accommodation containers 100A to 100D are provided on the back surface 120*fb* of the board 120U. The terminals 290 in each of the board regions 120UA to 120UD are coupled to the corresponding devices 130A to 130D via a wiring pattern layer (not illustrated) or a through-hole (not illustrated) in the board 120U. Here, the power source voltage VDD is supplied to each of the devices 130A to 130D via a common power source terminal 230. In the present embodiment, the common power source terminal 230 is provided in the terminals 290 of the first board region 120UA. Thus, in the board 120U, the power source terminal 230 is not provided in the terminals 290 in the second board region 120UB to the fourth board region 120UD. As described above, some of the terminals 290 may be commonly used by the plurality of devices 130A to 130D.

In the first embodiment, the base member 120*bd* of the board 120 is configured by a single member. The present disclosure is not limited to this, and the base member 120*bd* may be configured by a plurality of base members. In the board 120V, the device 130 and the terminals 290 are arranged on separate base members 124*a* and 124*b* instead of a single base member. The board 120V has a first base member 124*a* and a second base member 124*b*. The first base member 124*a* and the second base member 124*b* are electrically coupled to each other by a conductive line EL or the like. The materials of the first base member 124*a* and the second base member 124*b* can be different from each other. The first base member 124*a* is, for example, a rigid base member, and the second base member 124*b* is a sheet-like base member. The device 130 is encased by the resin 139 on the front surface 120*faa* of the first base member 124*a*. The terminals 290 are arranged on the front surface 120*fab* of the second base member 124*b*.

A4-7. Embodiment 7 of Board

Figure 28:
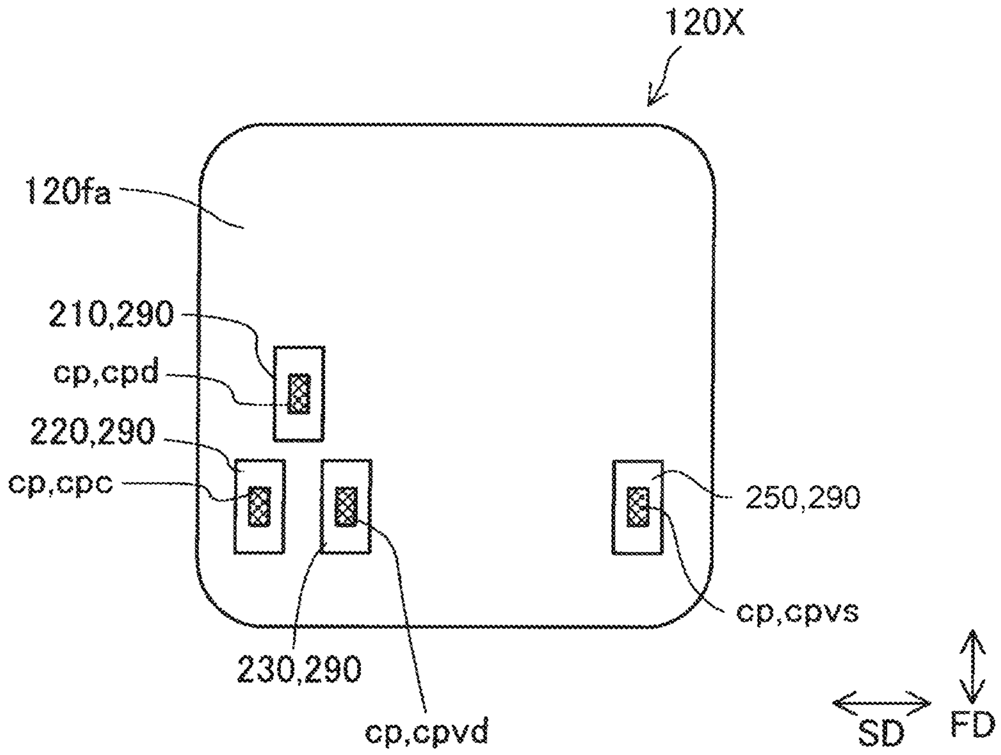
FIG. 28 is a diagram illustrating a board as Embodiment 7.

FIG. 28 is a diagram illustrating a board 120X in Embodiment 7 for the board. In the first embodiment, as illustrated in FIG. 5, the types of terminals 290 are five types: data terminal 210, clock terminal 220, power source terminal 230, reset terminal 240, and ground terminal 250. The present disclosure is not limited to this, and the number of types may be smaller than five. For example, the board 120X includes the data terminal 210, the clock terminal 220, the power source terminal 230, and the ground terminal 250. The board 120X does not include the reset terminal 240. In this case, the reset signal RST is generated by using the clock signal SCK, for example, in the processing unit 136 of the device 130. In other embodiments, the power source terminal 230 may not be provided at the board 120X. In this case, the power source voltage VDD is generated by using the clock signal SCK, for example, in the processing unit 136 of the device 130. In other embodiments, in the board 120X, the power source terminal 230 may be provided, and the reset terminal 240 may not be provided. As described above, the terminals 290 in the first embodiment described above may not include at least one of the reset terminal 240 and the power source terminal 230. In the case of the present embodiment, among the terminals 290 of the board 120, the terminals 290 other than the ground terminal 250 are referred to as an "other terminal group". In the present embodiment, the ground terminal 250 may also be referred to as the first terminal. The data terminal 210 may also be referred to as the second terminal. The clock terminal 220 may also be referred to as the third terminal. The ground contact portion cpvs may also be referred to as the first contact portion. The data contact portion cpd may also be referred to as the second contact portion. The clock contact portion cpc may also be referred to as the third contact portion.

A4-8. Embodiment 8 of Board

In the embodiments of the present disclosure, the arrangement of the terminals 290 or the contact portions cp may be changed with the first virtual line C1 interposed therebetween. The terminals forming the first row and the terminals forming the second row may be changed.

A4-9. Embodiment 1 of Liquid Accommodation Container

The liquid accommodation container in the present disclosure is not limited to the liquid accommodation container 100 illustrated in FIG. 3, and may have other configurations. Other embodiments of the liquid accommodation container 100 will be described below. The components similar to the components of the liquid accommodation container 100 in the first embodiment illustrated in FIGS. 3 and 4 and the similar components between other embodiments of the liquid accommodation container are denoted by the same reference signs, and description thereof will be omitted as appropriate. The component of the printing apparatus 20, such as the accommodation section 4 illustrated in FIG. 4, is changed in accordance with the configuration of the liquid accommodation container.

Figure 29:
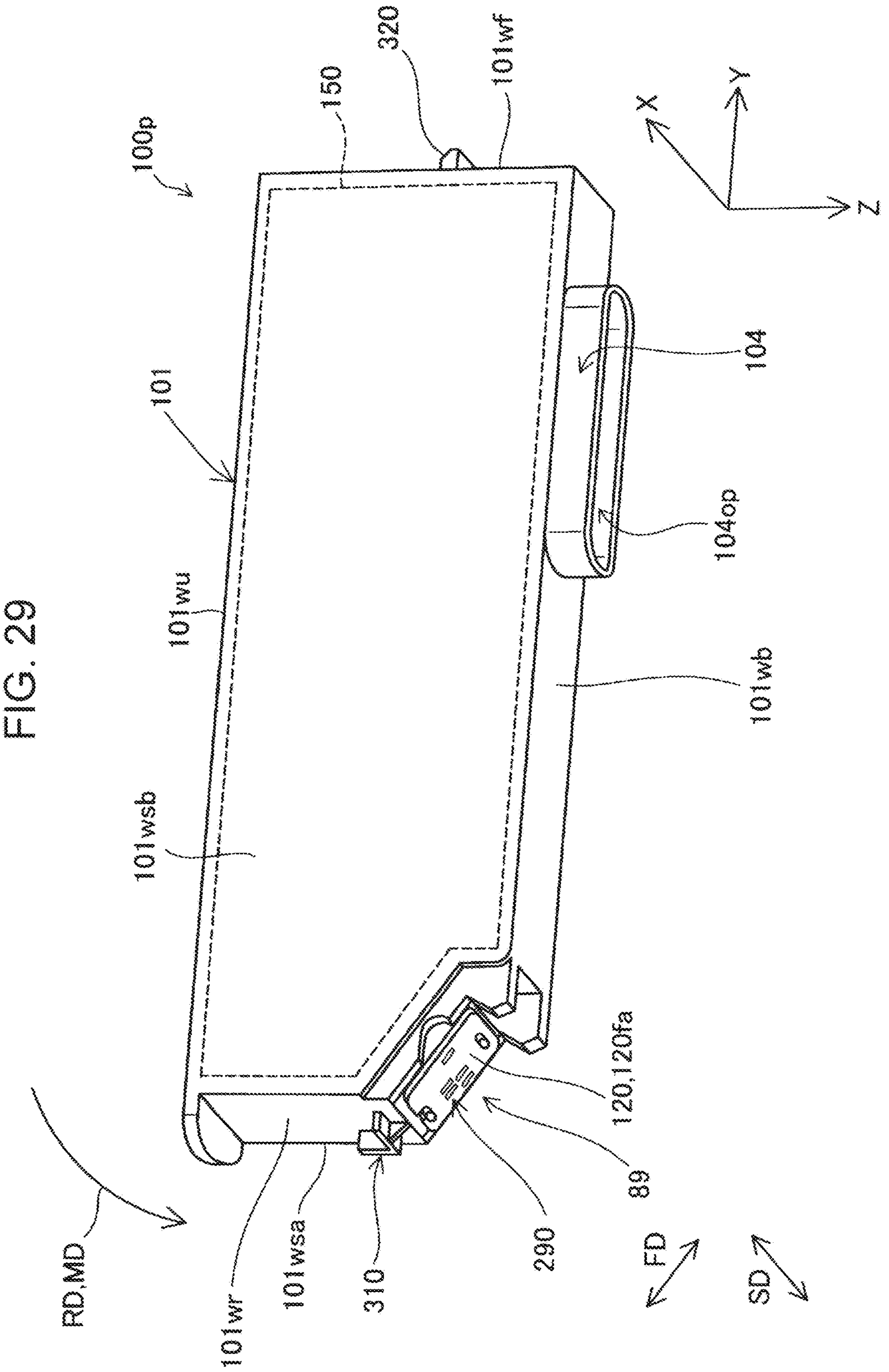
FIG. 29 is a perspective view illustrating a liquid accommodation container as Embodiment 1.

FIG. 29 is a perspective view illustrating a liquid accommodation container 100*p* as Embodiment 1 of the liquid accommodation container. The liquid accommodation container 100*p* includes the liquid accommodation body 101, the liquid supply portion 104 having the liquid supply port 104*op*, and the board 120. The liquid accommodation body 101 forms the ink chamber 150 that accommodates ink inside. The liquid supply portion 104 is formed at the bottom wall 101*wb* and communicates with the ink chamber 150. The board 120 is provided at a corner portion 89 where the third wall 101*wb* and the second wall 101*wr* of the liquid accommodation body 101 intersect with each other. The liquid accommodation container 100*p* is mounted on the accommodation section 4 in a manner that a protruding second container engagement portion 320 of the first wall 101*wf* is engaged with a recess portion of the accommodation section 4, and then the liquid accommodation container 100*p* is rotated and moved in a rotation mounting direction RD by using the second container engagement portion 320 as a fulcrum. In the mounting-completed state, a protruding first container engagement portion 310 of the second wall 101*wr* is engaged with a lever of the accommodation section 4. In the present embodiment, the mounting direction MD includes a +Z direction component and a −Y direction component, and the first direction FD includes both positive and negative Y direction components and both positive and negative Z direction components.

A4-10. Embodiment 2 of Liquid Accommodation Container

Figure 30:
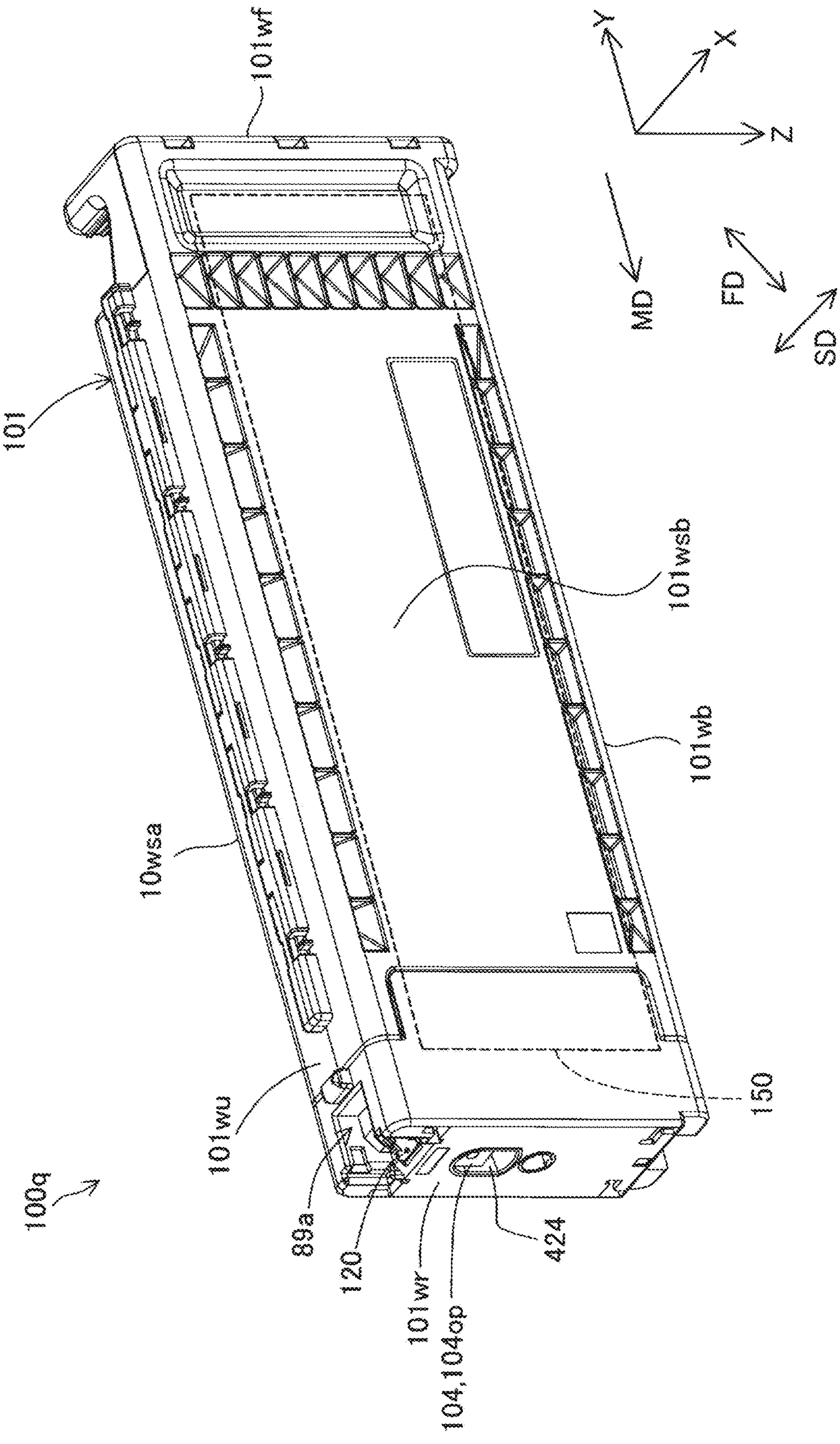
FIG. 30 is a perspective view illustrating a liquid accommodation container as Embodiment 2.
Figure 31:
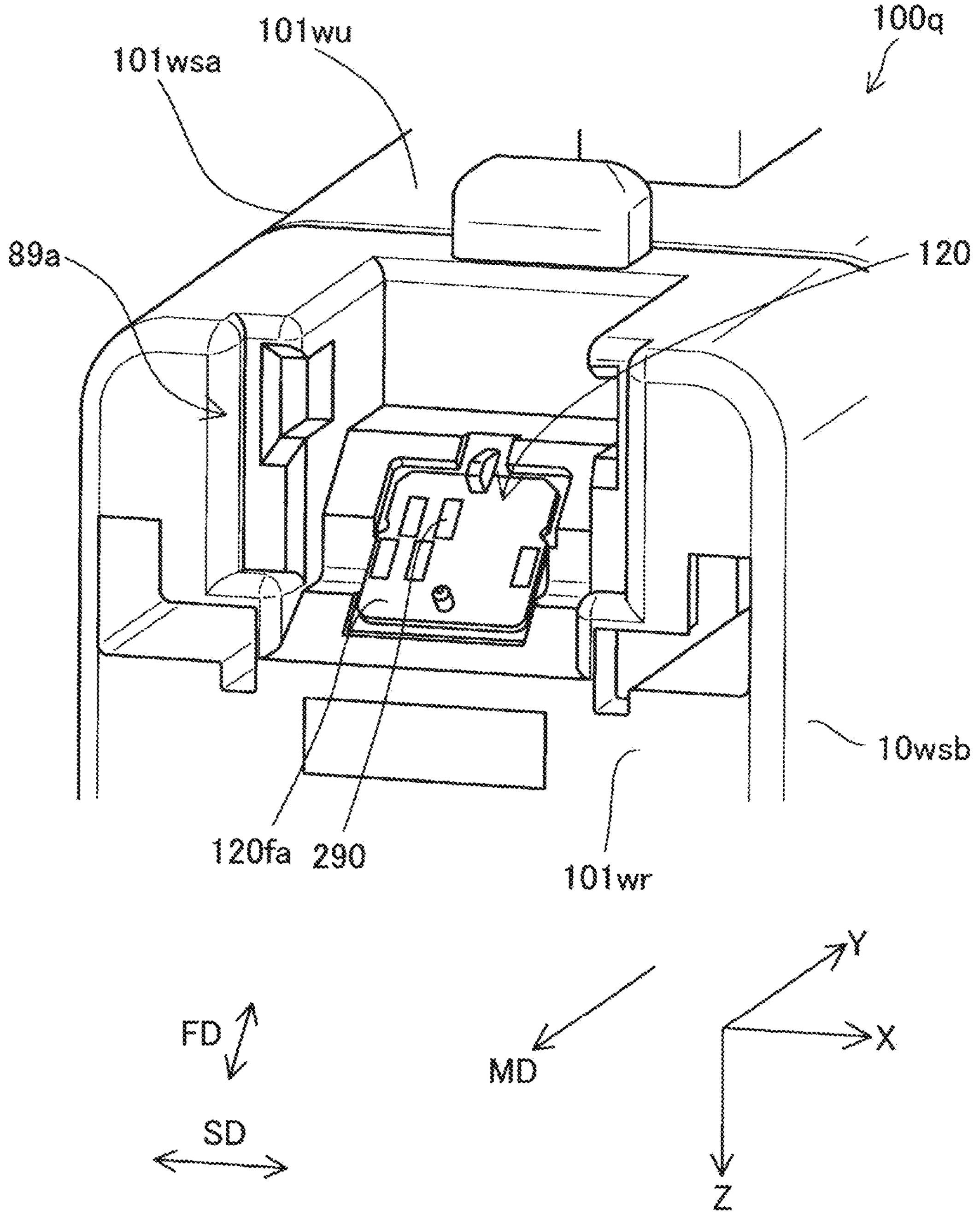
FIG. 31 is an enlarged view illustrating a periphery of the board of the liquid accommodation container.

FIG. 30 is a perspective view illustrating a liquid accommodation container 100*q* as Embodiment 2 of the liquid accommodation container. FIG. 31 is an enlarged view illustrating the periphery of the board 120 of the liquid accommodation container 100*q*. As illustrated in FIG. 30, the liquid accommodation container 100*q* includes the liquid accommodation body 101, the liquid supply portion 104 having the liquid supply port 104*op*, and the board 120. A liquid accommodation bag (not illustrated) that accommodates ink is disposed in the liquid accommodation body 101. The liquid accommodation bag is flexible and functions as the ink chamber 150. The liquid supply portion 104 is provided at the liquid accommodation bag and is arranged at an opening portion 424 formed in the front wall 101*wf* of the liquid accommodation body 101. The board 120 is provided at a corner portion 89*a* where the second wall 101*wr* and the fourth wall 101*wu* of the liquid accommodation body 101 intersect with each other. The corner portion 89*a* is a recess portion of the liquid accommodation body 101, which is recessed inward. In the present embodiment, the mounting direction MD is the −Y direction, and the first direction FD includes both positive and negative Y direction components, and both positive and negative Z direction components.

A4-11. Embodiment 3 of Liquid Accommodation Container

Figure 32:
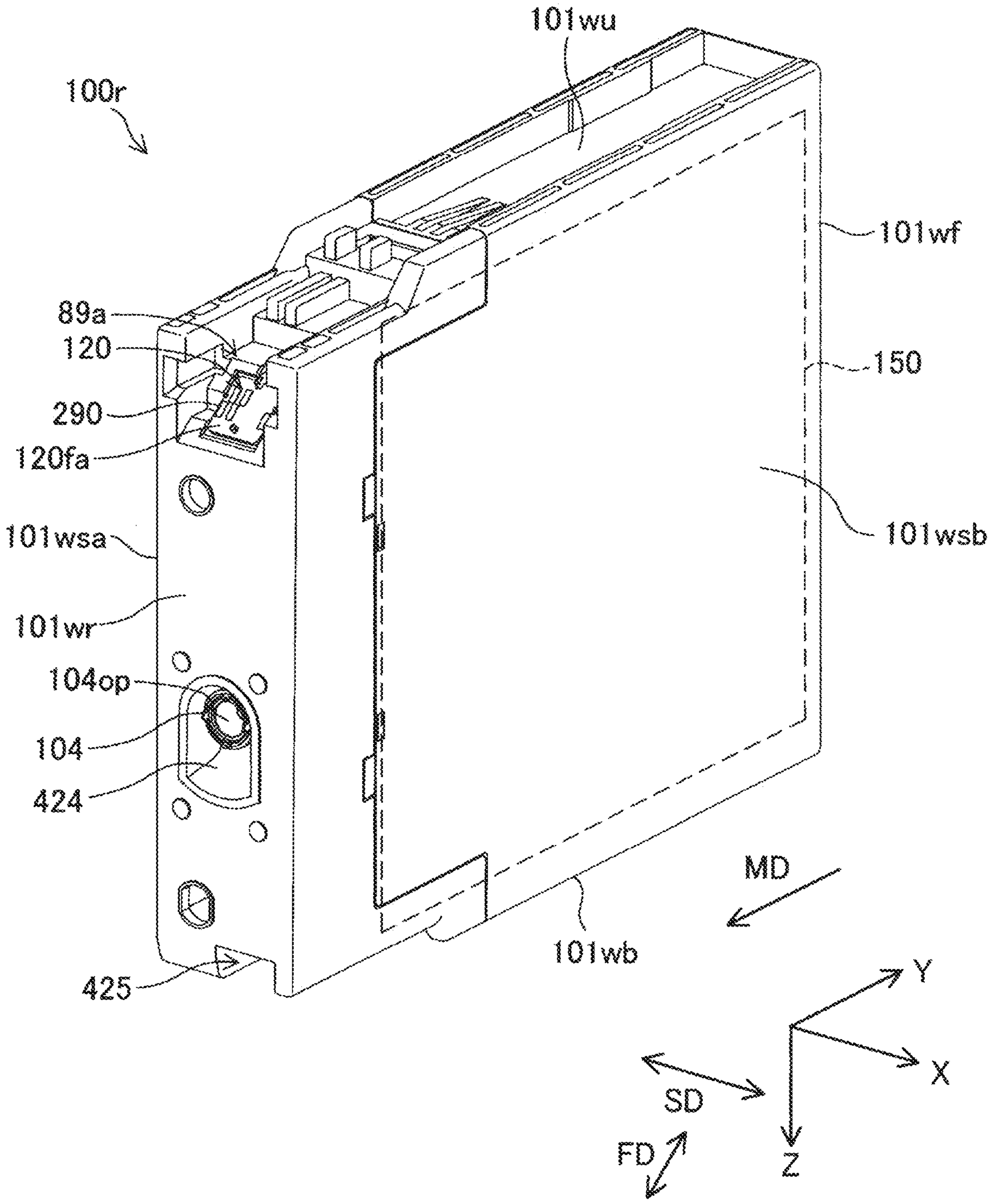
FIG. 32 is a perspective view illustrating a liquid accommodation container as Embodiment 3.

FIG. 32 is a perspective view illustrating a liquid accommodation container 100*r* as Embodiment 3 of the liquid accommodation container. In the liquid accommodation container 100*r*, the −Y direction is the mounting direction MD. The liquid accommodation container 100*r* includes the liquid accommodation body 101, the liquid supply portion 104 having the liquid supply port 104*op*, and the board 120. A liquid accommodation bag (not illustrated) that accommodates ink is disposed in the liquid accommodation body 101. The liquid accommodation bag is flexible and functions as the ink chamber 150. The liquid supply portion 104 is provided at the liquid accommodation bag and is arranged at the opening portion 424 formed in the second wall 101*wr* of the liquid accommodation body 101. The board 120 is provided at the corner portion 89*a* where the second wall 101*wr* and the fourth wall 101*wu* of the liquid accommodation body 101 intersect with each other. The corner portion 89*a* is a recess portion of the liquid accommodation body 101, which is recessed inward. A groove-like container-side engaging structure 425 is formed at the third wall 101*wb* of the liquid accommodation body 101. The container-side engaging structure 425 regulates a movement on the +Y direction side being a removal direction of the liquid accommodation container 100, by engaging with a protruding apparatus-side engaging structure of the accommodation section 4 in the mounting-completed state of the liquid accommodation container 100*r*. In the present embodiment, the mounting direction MD is the −Y direction, and the first direction FD includes both positive and negative Y direction components, and both positive and negative Z direction components.

A4-12. Embodiment 4 of Liquid Accommodation Container

Figure 33:
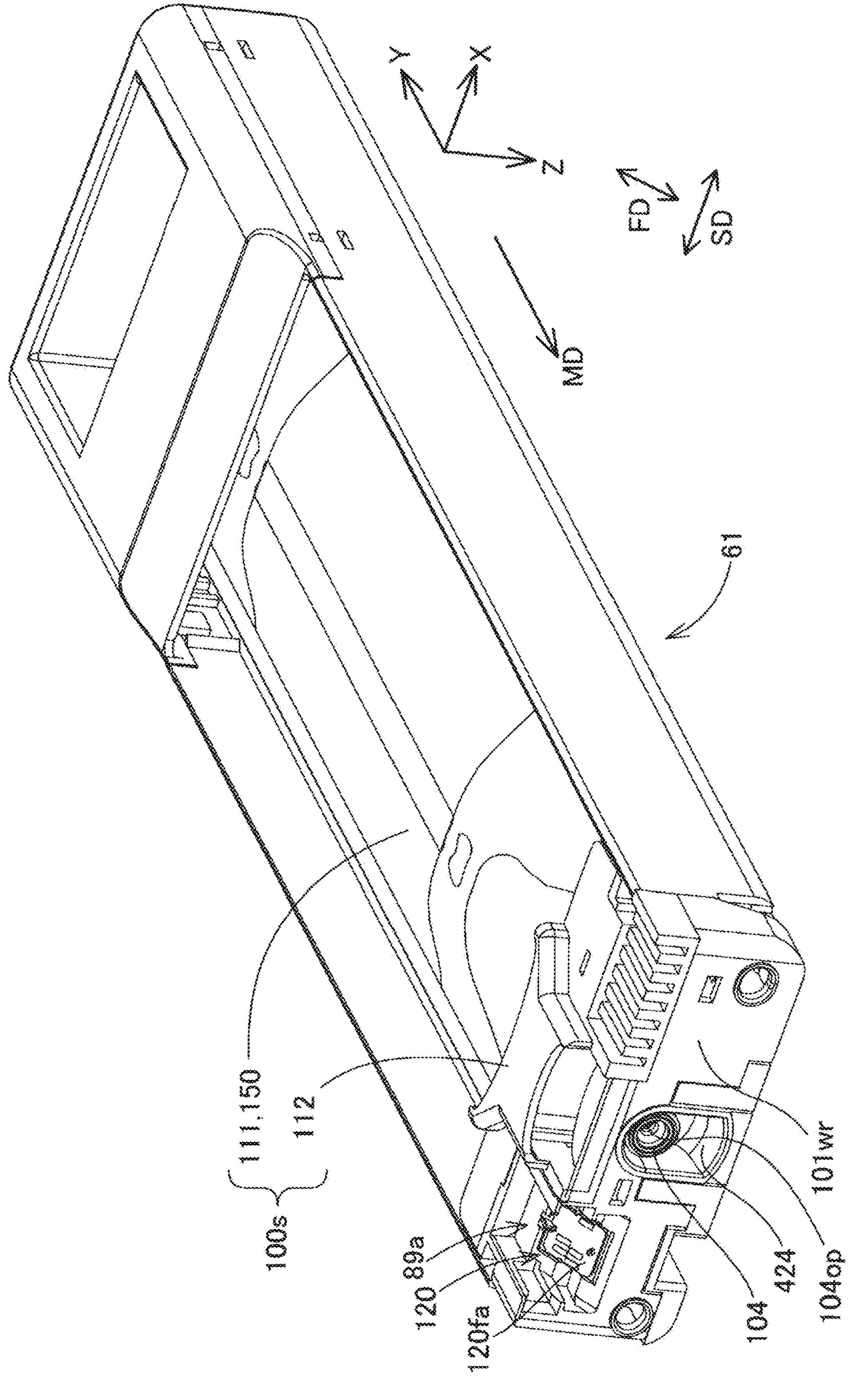
FIG. 33 is a perspective view illustrating a liquid accommodation container as Embodiment 4.

FIG. 33 is a perspective view illustrating a liquid accommodation container 100*s* as Embodiment 4 of the liquid accommodation container. The liquid accommodation container 100*s* is detachably accommodated in a case 61 provided in the printing apparatus 20 to be retractable, and then is mounted in the printing apparatus 20 together with the case 61. The liquid accommodation container 100*s* includes the liquid accommodation bag 111 and a coupling member 112 attached to one end portion of the liquid accommodation bag 111 on the −Y direction side. In the present embodiment, the liquid accommodation bag 111 and the coupling member 112 function as a liquid accommodation body. The liquid accommodation bag 111 is flexible. The liquid supply portion 104 having the liquid supply port 104*op* is provided on the −Y direction side of the liquid accommodation bag 111 that functions as the ink chamber 150. The liquid supply portion 104 is arranged at the opening portion 424 formed in the second wall 101*wr* of the coupling member 112. The board 120 is arranged at the corner portion 89*a* which is a recess portion formed at the second wall 101*wr* of the coupling member 112. In the present embodiment, the mounting direction MD is the −Y direction, and the first direction FD includes both positive and negative Y direction components, and both positive and negative Z direction components.

A4-13. Embodiment 5 of Liquid Accommodation Container

Figure 34:
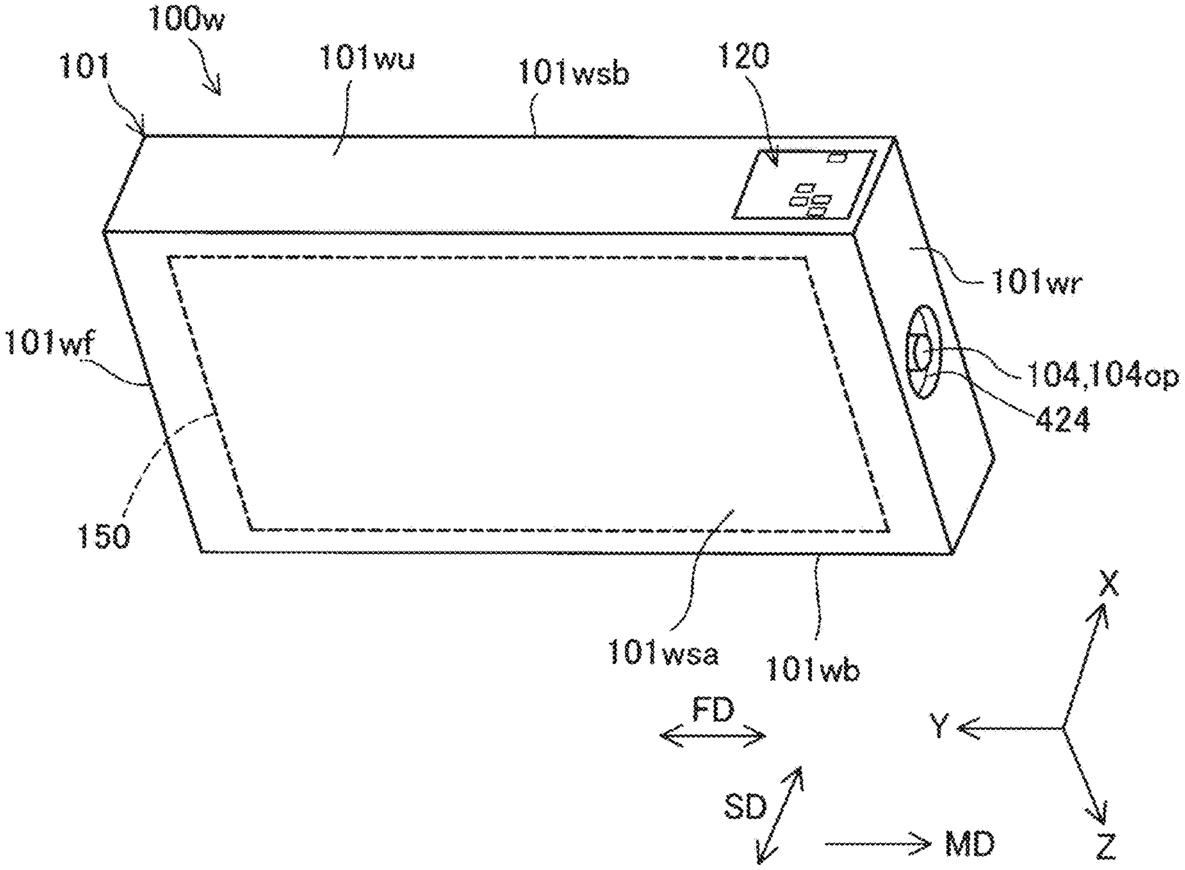
FIG. 34 is a perspective view illustrating a liquid accommodation container as Embodiment 5.

FIG. 34 is a perspective view illustrating a liquid accommodation container 100*w* as Embodiment 5 of the liquid accommodation container. In the liquid accommodation container 100*w*, the board 120 is arranged at the fourth wall 101*wu* which is a horizontal surface, in the mounting-completed state. The fourth wall 101*wu* forms the upper wall in the mounting-completed state. The liquid accommodation container 100*w* includes the liquid accommodation body 101 and the liquid supply portion 104 having the liquid supply port 104*op*, similarly to the liquid accommodation container 100 illustrated in FIGS. 3 and 4. A liquid accommodation bag (not illustrated) that has flexibility and accommodates ink is disposed in the liquid accommodation body 101. The liquid accommodation bag functions as the ink chamber 150. The liquid supply portion 104 is provided at the liquid accommodation bag and is arranged at the opening portion 424 formed in the second wall 101*wr* of the liquid accommodation body 101. In the present embodiment, the mounting direction MD is the −Y direction, and the first direction FD is both the positive and negative Y direction.

A4-14. Embodiment 6 of Liquid Accommodation Container

Figure 35:
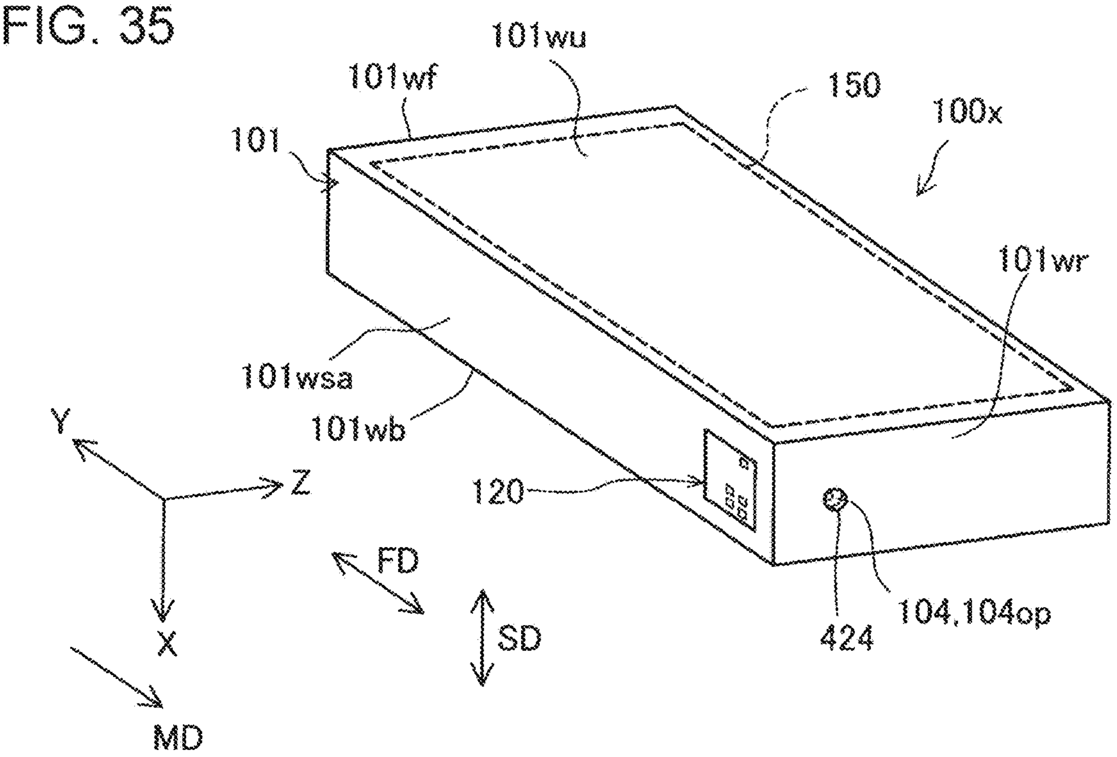
FIG. 35 is a perspective view illustrating a liquid accommodation container as Embodiment 6.

FIG. 35 is a perspective view illustrating a liquid accommodation container 100*x* as Embodiment 6 of the liquid accommodation container. In the liquid accommodation container 100*x*, the board 120 is arranged at the fifth wall 101*wsa* being a vertical surface in the mounting-completed state. The fifth wall 101*wsa* forms a side wall in the mounting-completed state. The liquid accommodation container 100*x* includes the liquid accommodation body 101 and the liquid supply portion 104 having the liquid supply port 104*op*, similarly to the liquid accommodation container 100 illustrated in FIGS. 3 and 4. A liquid accommodation bag (not illustrated) that has flexibility and accommodates ink is disposed in the liquid accommodation body 101. The liquid accommodation bag functions as the ink chamber 150. The liquid supply portion 104 is provided at the liquid accommodation bag and is arranged at the opening portion 424 formed in the second wall 101*wr* of the liquid accommodation body 101. In the present embodiment, the mounting direction MD is the −Y direction, and the first direction FD is both the positive and negative Y direction.

A4-15. Embodiment 7 of Liquid Accommodation Container

Figure 36:
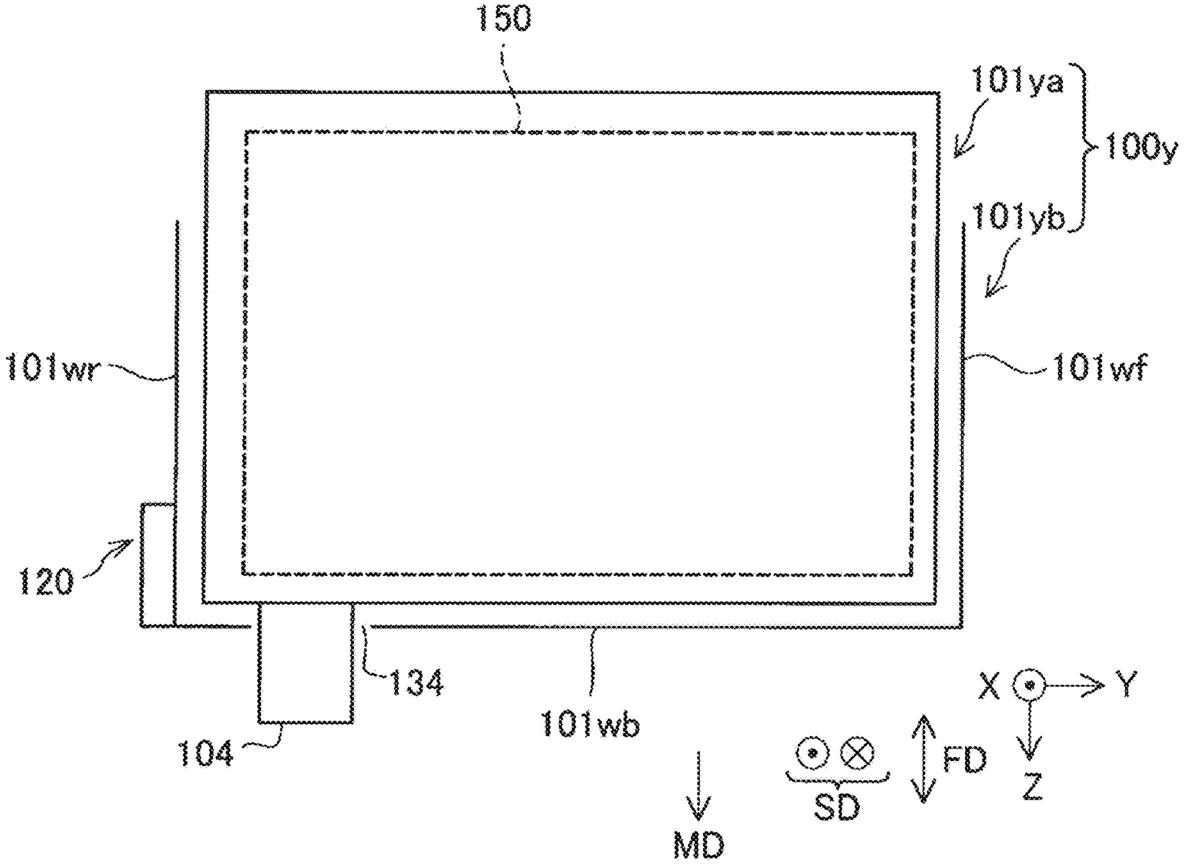
FIG. 36 is a diagram illustrating a liquid accommodation container as Embodiment 7.

FIG. 36 is a diagram illustrating a liquid accommodation container 100*y* as Embodiment 7 of the liquid accommodation container. As illustrated in FIGS. 3 and 4, in the liquid accommodation container 100 in the first embodiment, the board 120 is attached directly to a surface of the liquid accommodation body 101. The present disclosure is not limited to this. For example, the liquid accommodation container 100*y* includes a liquid accommodation body 101*ya* forming the ink chamber 150 and an adapter 101*yb* to which the board 120 is attached. The liquid supply portion 104 is formed in the liquid accommodation body 101*ya*. The liquid accommodation body 101*ya* is accommodated in the recessed adapter 101*yb* to be removable. The adapter 101*yb* functions as a case for accommodating the liquid accommodation body 101*ya*. An opening portion 134 into which the liquid supply portion 104 is inserted is formed in the third wall 101*wb* of the adapter 101*yb*. The liquid accommodation body 101*ya* may be fixed to the adapter 101*yb* by using a fixing member (not illustrated). Alternatively, the liquid accommodation body 101*ya* may not be fixed to the adapter 101*yb*.

A4-16. Embodiment 8 of Liquid Accommodation Container

Figure 37:
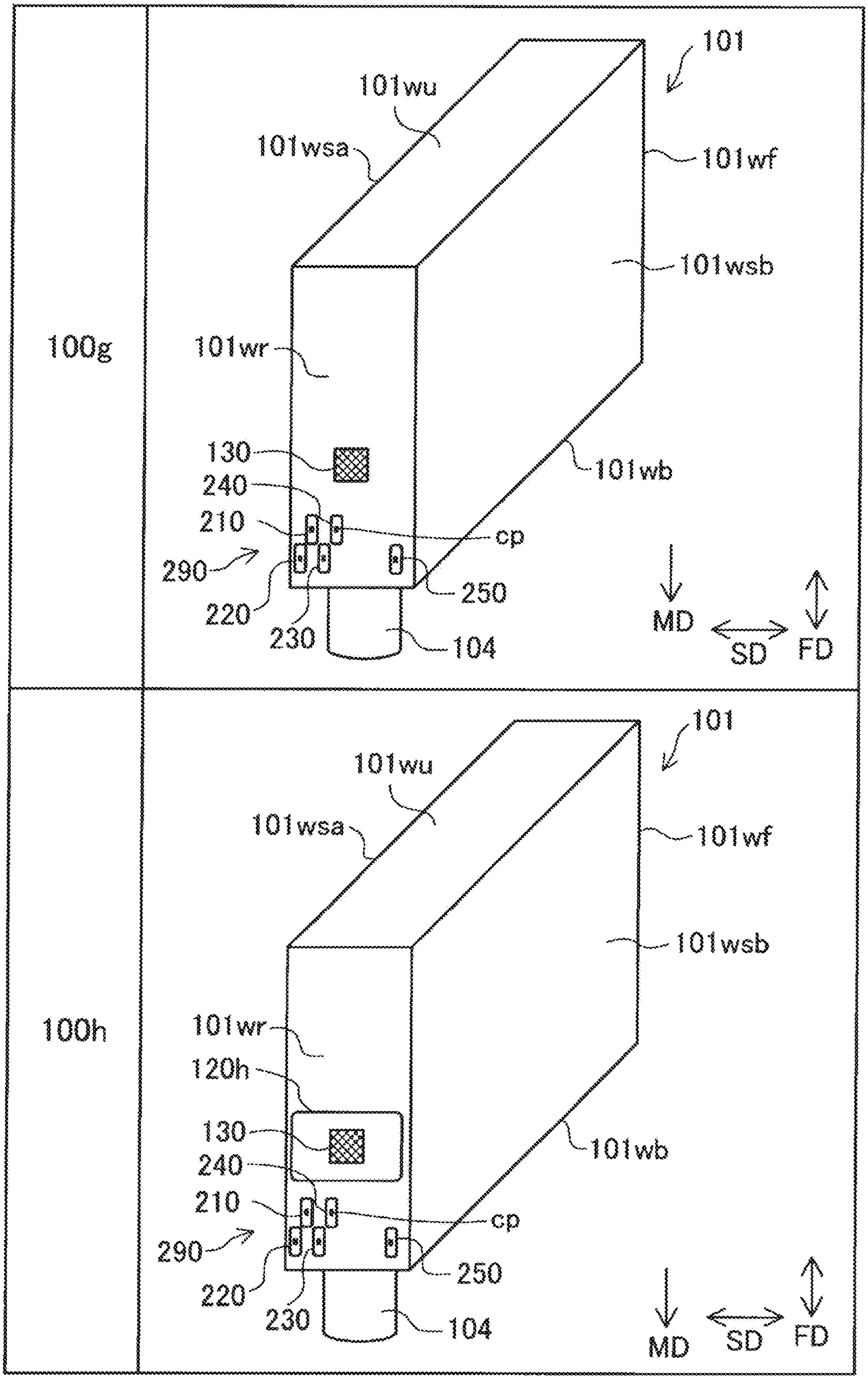
FIG. 37 is a diagram illustrating a liquid accommodation container as Embodiment 8.

FIG. 37 is a diagram illustrating liquid accommodation containers 100*g* and 100*h* as Embodiment 8 of the liquid accommodation container. As illustrated in FIGS. 4 to 6, in the liquid accommodation container 100 in the first embodiment, the plurality of terminals 290 and the device 130 are arranged at the base member 120*bd*. The present disclosure is not limited to this. In the liquid accommodation container 100*g*, the plurality of terminals 290 and the device 130 are directly disposed on the second wall 101*wr* of the liquid accommodation body 101 without interposing the base member 120*bd*. The plurality of terminals 290 and the device 130 are electrically coupled to each other by a wiring pattern (not illustrated) or the like. As described above, the liquid accommodation body 101, the plurality of terminals 290, and the device 130 may be integrally configured as the liquid accommodation container 100*g*.

In the liquid accommodation container 100*h*, the plurality of terminals 290 are directly disposed on the second wall 101*wr* of the liquid accommodation body 101 without interposing the base member 120*bd*. The device 130 is arranged at a mounting base member 120*h*, and is provided at the second wall 101*wr* of the liquid accommodation body 101 via the mounting base member 120*h*. The plurality of terminals 290 and the device 130 are electrically coupled to each other by a wiring pattern (not illustrated) or the like. As described above, the liquid accommodation body 101 and the plurality of terminals 290 may be integrally configured as the liquid accommodation container 100*h*, and the device 130 may be separately configured.

A4-17. Embodiment 9 of Liquid Accommodation Container

Figure 38:
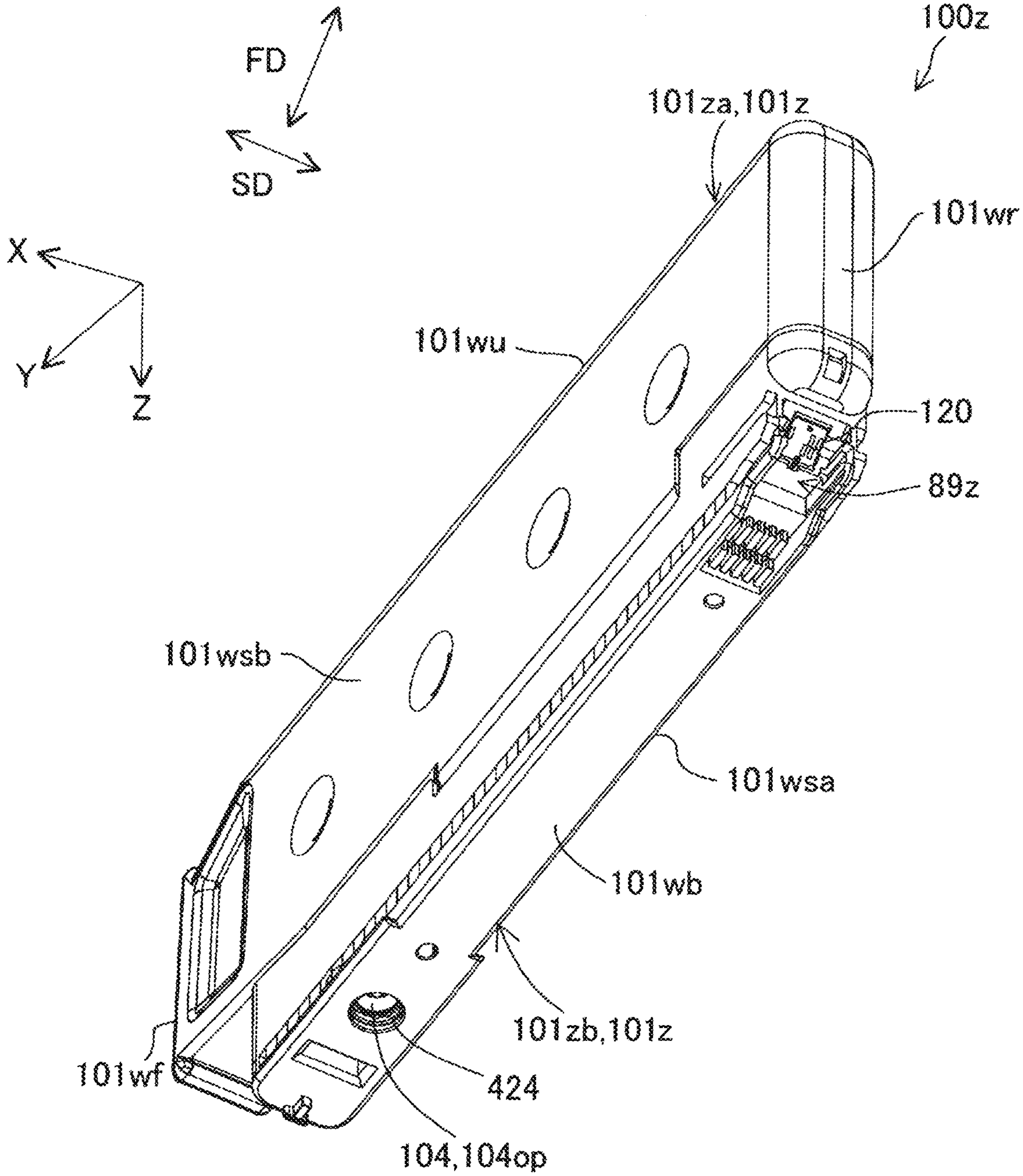
FIG. 38 is a perspective view illustrating a liquid accommodation container as Embodiment 9.
Figure 39:
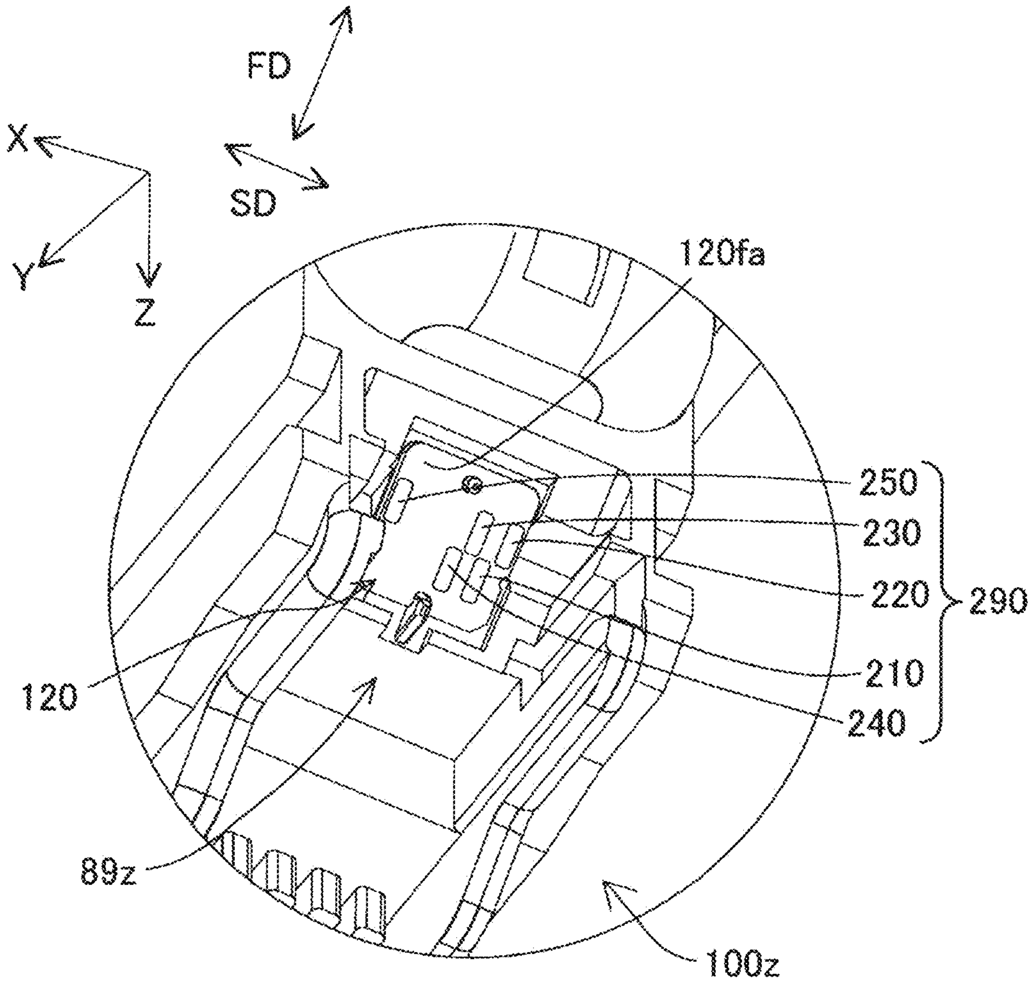
FIG. 39 is an enlarged view illustrating the periphery of the board.

FIG. 38 is a perspective view illustrating a liquid accommodation container 100*z* as Embodiment 9 of the liquid accommodation container. FIG. 39 is an enlarged view illustrating the periphery of the board 120 of the liquid accommodation container 100*z*. XYZ axes illustrated in FIGS. 38 and 39 in Embodiment 9 are based on the state when the liquid accommodation container 100*z* is completely inserted into the accommodation section described later in the printing apparatus. When the liquid accommodation container 100*z* is mounted in the printing apparatus, two mounting operations are performed. In the present embodiment, the first direction FD has a Y-direction component and a Z-direction component, and the second direction SD is the X-direction. As illustrated in FIG. 38, the liquid accommodation container 100*z* includes a liquid accommodation body 101*z*, the liquid supply portion 104 having the liquid supply port 104*op*, and the board 120. The liquid accommodation body 101*z* includes an accommodation main body 101*za* capable of accommodating a liquid and a cover member 101*zb* attached to the accommodation main body 101*za*. The liquid supply portion 104 is arranged at the opening portion 424 formed in the third wall 101*wb* of the liquid accommodation body 101*z* formed by the cover member 101*zb*. The board 120 is provided at a corner portion 89*z* at which the second wall 101*wr* and the third wall 101*wb* of the liquid accommodation body 101*z* intersect with each other. The corner portion 89*z* is a recess portion of the liquid accommodation body 101*z*, which is recessed inward.

As illustrated in FIG. 39, the orientation of the board 120 is different from the orientation in FIG. 5, and the data terminal 210 and the reset terminal 240 are located on the −Z direction side of the clock terminal 220, the power source terminal 230, and the ground terminal 250.

Figure 40:
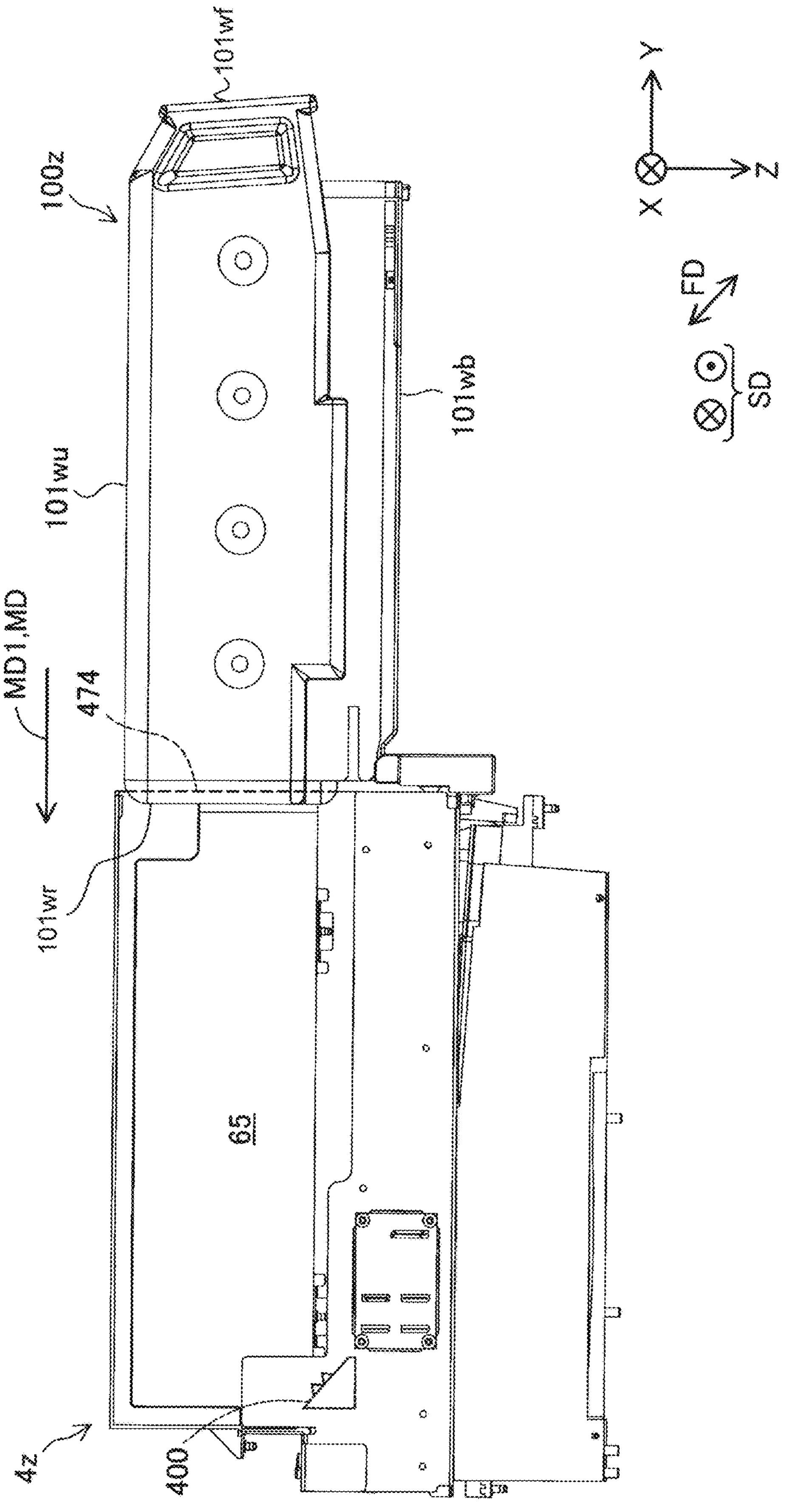
FIG. 40 is a first diagram illustrating a procedure of mounting the liquid accommodation container on an accommodation section of the printing apparatus.
Figure 41:
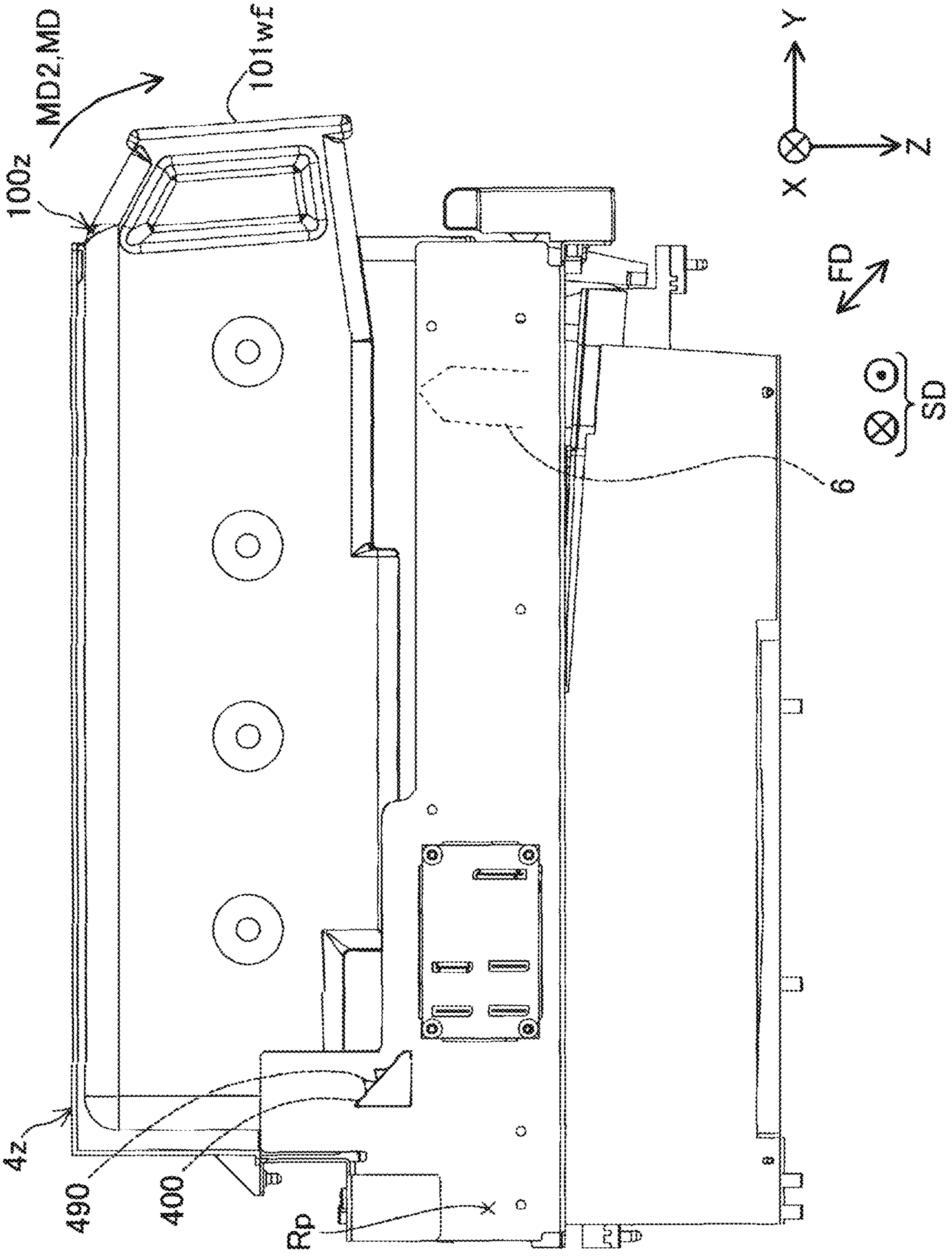
FIG. 41 is a second diagram illustrating the procedure of mounting the liquid accommodation container on the accommodation section of the printing apparatus.
Figure 42:
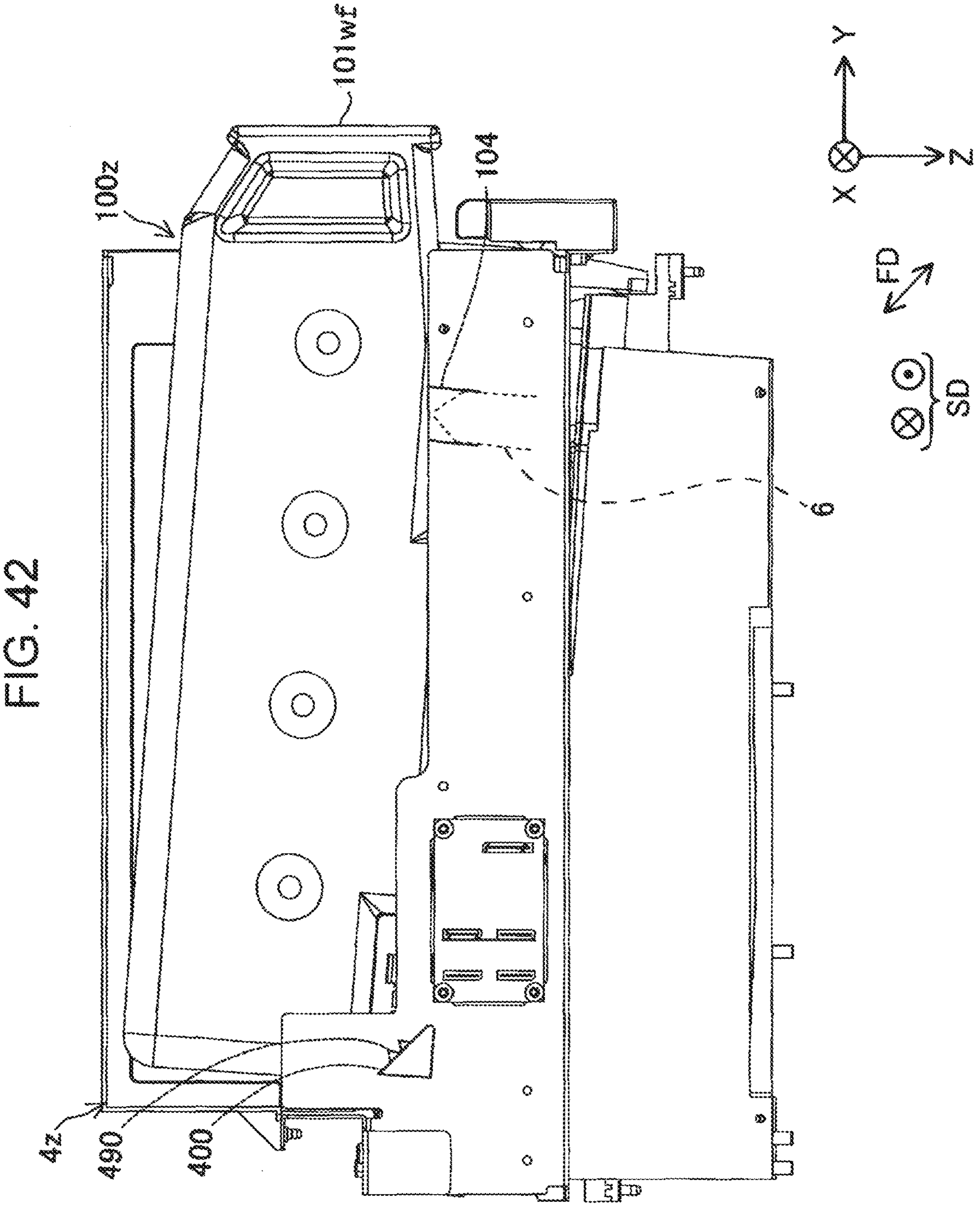
FIG. 42 is a diagram illustrating a state where mounting of the liquid accommodation container is completed.

FIG. 40 is a first diagram illustrating a procedure of mounting the liquid accommodation container 100*z* to an accommodation section 4*z* of the printing apparatus. FIG. 41 is a second diagram illustrating the procedure of mounting the liquid accommodation container 100*z* to the accommodation section 4*z* of the printing apparatus. FIG. 42 is a diagram illustrating the mounting-completed state of the liquid accommodation container 100*z*. The accommodation section 4*z* is arranged at a place different from the printing head (not illustrated). The accommodation section 4*z* and the printing head communicate with each other by a liquid flow tube (not illustrated). The liquid in the liquid accommodation container 100*z* mounted on the accommodation section 4*z* is supplied to the printing head through the liquid flow tube.

As illustrated in FIG. 40, regarding the liquid accommodation container 100*z*, by moving the liquid accommodation container 100*z* in a first mounting direction MD1 being a horizontal direction, the liquid accommodation container 100*z* is inserted into a mounting chamber 65 in the accommodation section 4*z* via an attachment/detachment opening portion 474 of the accommodation section 4*z*. The first mounting direction MD1 is the −Y direction.

As illustrated in FIG. 41, the liquid accommodation container 100*z* is pushed in the first mounting direction MD1, and the contact between the apparatus-side terminal 490 of the coupling mechanism 400 in the accommodation section 4*z* and the terminal 290 of the board 120 is completed. By pushing down the second wall 101*wr* side of the liquid accommodation container 100*z* illustrated in FIG. 41, the liquid accommodation container 100*z* rotates and moves in a second mounting direction MD2 having a gravity direction component, around a rotation fulcrum Rp provided in the accommodation section 4*z*. The second mounting direction MD2 has a +Z direction component and a +Y direction component.

As illustrated in FIG. 42, when the rotational movement of the liquid accommodation container 100*z* in the second mounting direction MD2 is completed, the liquid supply portion 104 of the liquid accommodation container 100*z* is coupled to the liquid introduction portion 6 of the accommodation section 4*z*. In the present embodiment, either of the first mounting direction MD1 and the second mounting direction MD2 is the mounting direction MD.

A4-18. Embodiment 10 of Liquid Accommodation Container

In the first embodiment and other embodiments, the liquid accommodation container 100 is an ink cartridge, but the present disclosure is not limited to this. The liquid accommodation container 100 may be, for example, a waste liquid accommodation container. The waste liquid accommodation container is, for example, a container that accommodates a waste liquid discharged from the nozzle of the printing head 5 when the printing apparatus 20 performs cleaning of the printing head 5.

A4-19. Embodiment 1 of Printing System

Figure 43:
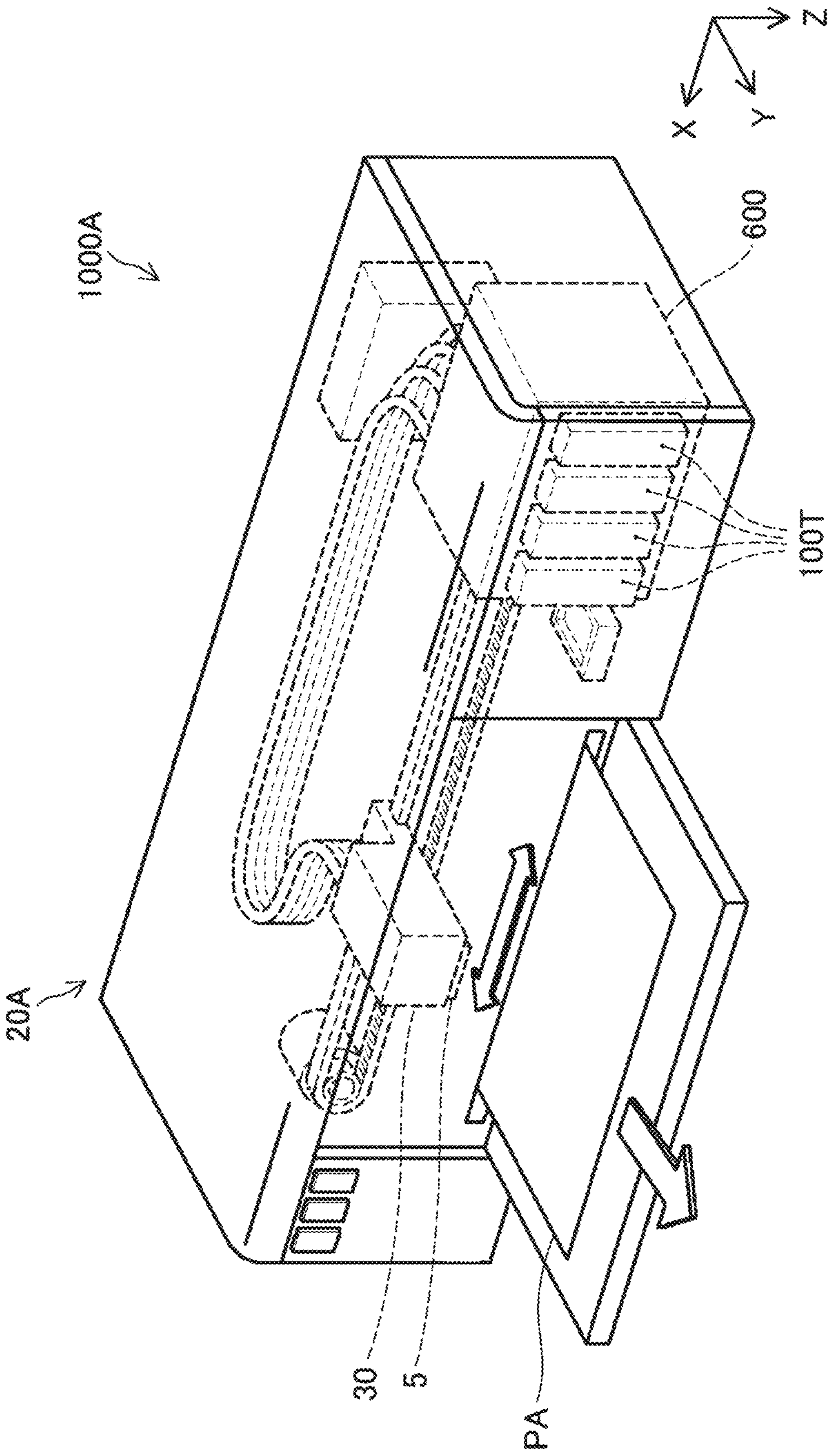
FIG. 43 is a diagram illustrating a printing system as Embodiment 1.

The printing system in the present disclosure is not limited to the printing system 1000 illustrated in FIG. 1. FIG. 43 is a diagram illustrating a printing system 1000A as Embodiment 1 of the printing system. In the first embodiment, as illustrated in FIG. 1, a configuration referred to as an on-carriage, in which the liquid accommodation container 100 is mounted on the carriage 30 is made, but the present disclosure is not limited to this. A configuration referred to as an off-carriage, in which the liquid accommodation container 100 is mounted in a place other than the carriage 30 may be made. The printing system 1000A is an off-carriage type printing system, and includes a printing apparatus 20A and a liquid accommodation container 100T. The printing apparatus 20A includes the carriage 30 including the printing head 5. The liquid accommodation container 100T is detachably mounted at a container mounting portion 600 arranged in a place different from the carriage 30. Similar to the liquid accommodation container 100 in the first embodiment, the liquid accommodation container 100T also includes a liquid accommodation body, a liquid accommodation section having an ink supply port, and a board. For example, the liquid accommodation containers 100*q* to 100*x* illustrated in FIGS. 30 to 35 are mounted in the printing apparatus 20A. The printing apparatus 20A executes the coupling state determination processing in the similar manner to the printing apparatus 20.

A4-20. Embodiment 2 of Printing System

Figure 44:
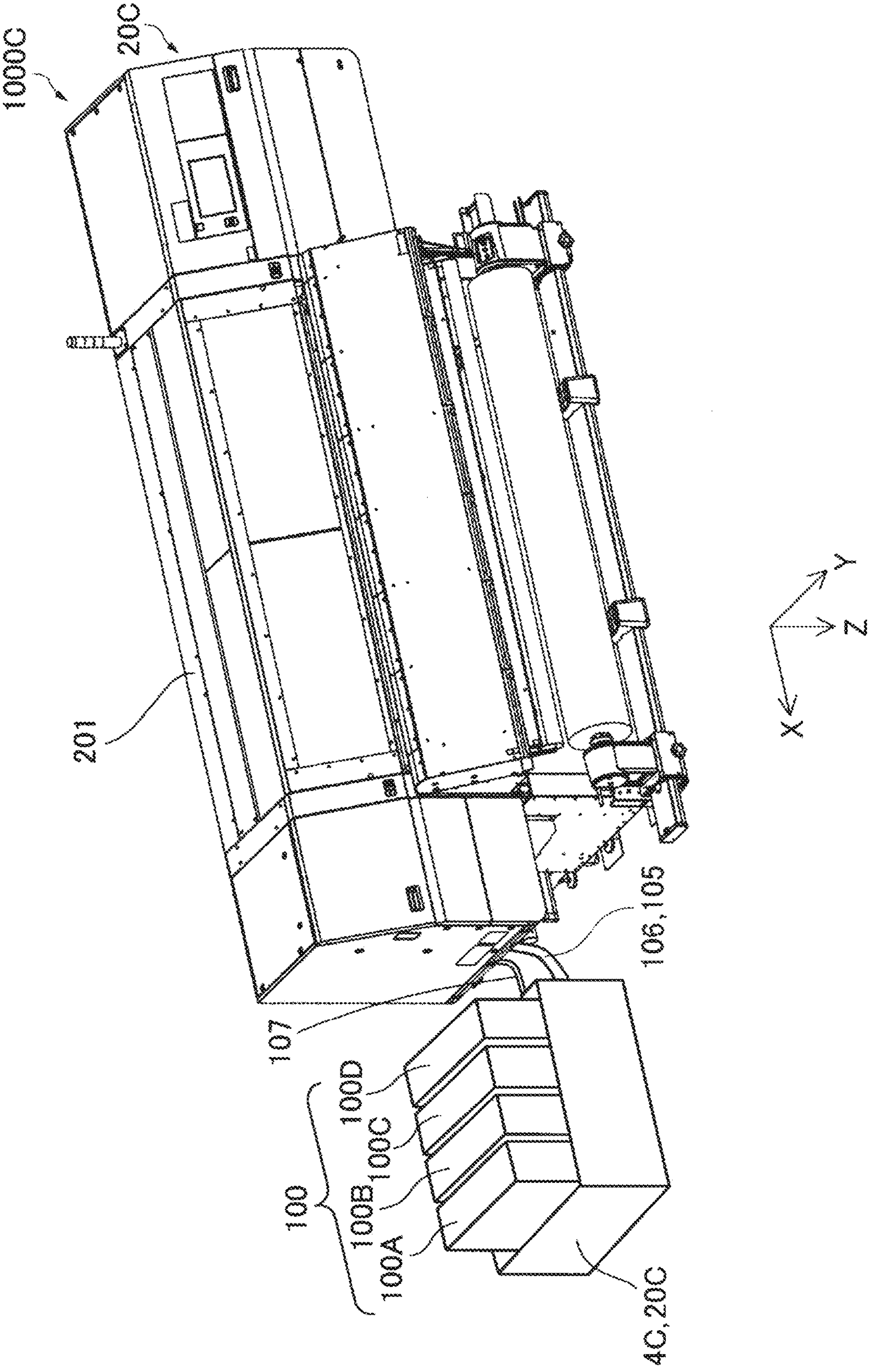
FIG. 44 is a diagram illustrating a printing system as Embodiment 2.

FIG. 44 is a diagram illustrating a printing system 1000C as Embodiment 2 of the printing system. In the first embodiment, as illustrated in FIG. 1, the accommodation section 4 on which the liquid accommodation container 100 is detachably mounted is arranged in the main body of the printing apparatus 20, but the position of the accommodation section 4 is not limited to this. In the printing system 1000C illustrated in FIG. 45, an accommodation section 4C of the printing apparatus 20C is arranged outside a main body 201 of the printing apparatus 20C. As illustrated in FIGS. 7A and 7C, the accommodation section 4C includes the liquid introduction portion 6, the coupling mechanism 400, and the sub-control board 500. The liquid introduction portion 6 and the printing head 5 arranged in the main body 201 communicate with each other by a flexible liquid flow tube 105. A plurality of liquid flow tubes 105 are provided corresponding to the number of liquid introduction portions 6. The plurality of liquid flow tubes 105 are accommodated in one protective tube 106. The printing apparatus 20C includes a bus 107 that couples the sub-control board 500 to the main control unit 40 (not illustrated) located in the main body 201 to transmit and receive various signals. Similar to the liquid accommodation container 100 in the first embodiment described above, the liquid accommodation container 100 illustrated in FIG. 44 also includes a liquid accommodation body, a liquid supply portion including a liquid supply port, and a board. The printing apparatus 20C executes the coupling state determination processing in the similar manner to the printing apparatus 20.

A4-21. Embodiment 3 of Printing System

Figure 45:
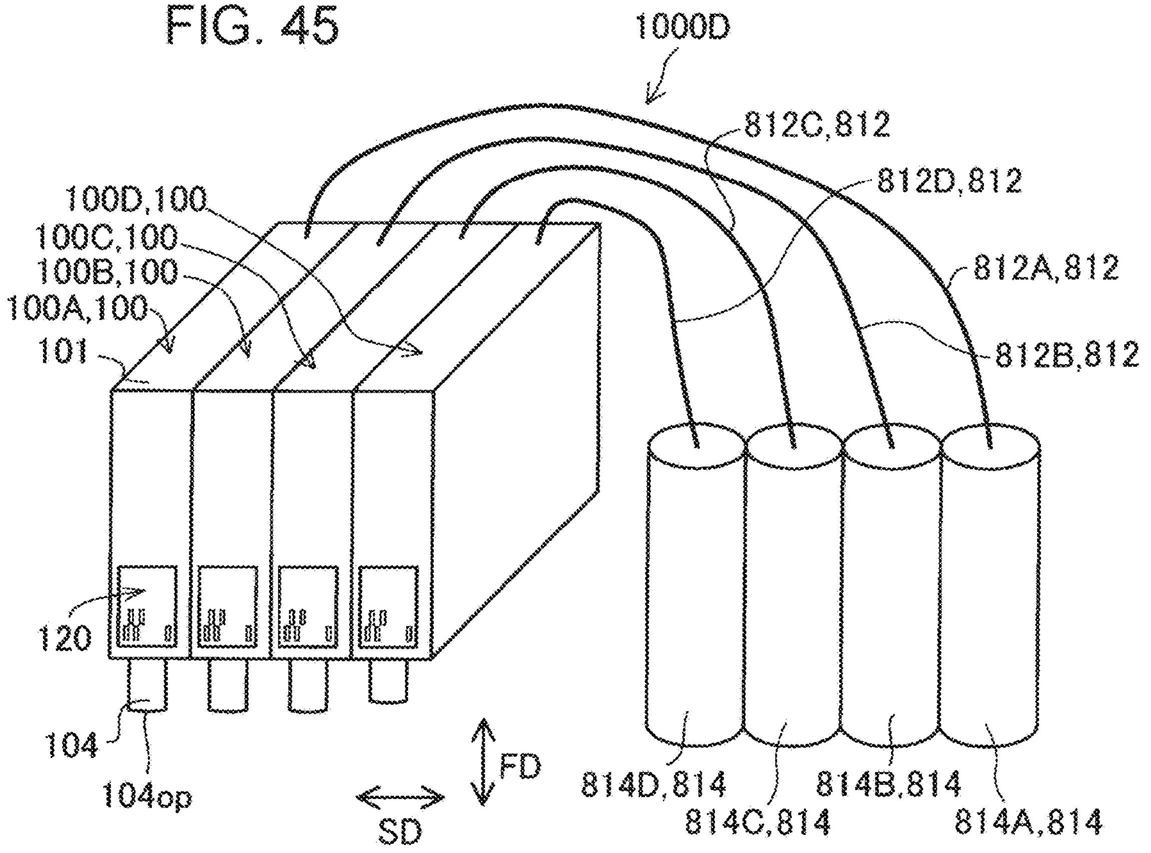
FIG. 45 is a diagram illustrating a printing system as Embodiment 3.

FIG. 45 is a diagram illustrating a printing system 1000D as Embodiment 3 of the printing system. The printing system 1000D includes the four liquid accommodation containers 100A, 100B, 100C, 100D and the printing apparatus 20 illustrated in FIG. 1, as in the first embodiment. The liquid accommodation containers 100A to 100D may be integrally formed or may be individually formed. The liquid accommodation containers 100A to 100D are replenished with liquids via an external liquid storage portion 814 and an external liquid flow tube 812, which are arranged outside the printing system 1000D. In FIG. 45, in the liquid storage portion 814 and the liquid flow tube 812, the elements corresponding to the respective liquid accommodation containers 100A to 100D are suffixed with “A” to “D”.

A4-22. Embodiment 4 of Printing System

Figure 46:
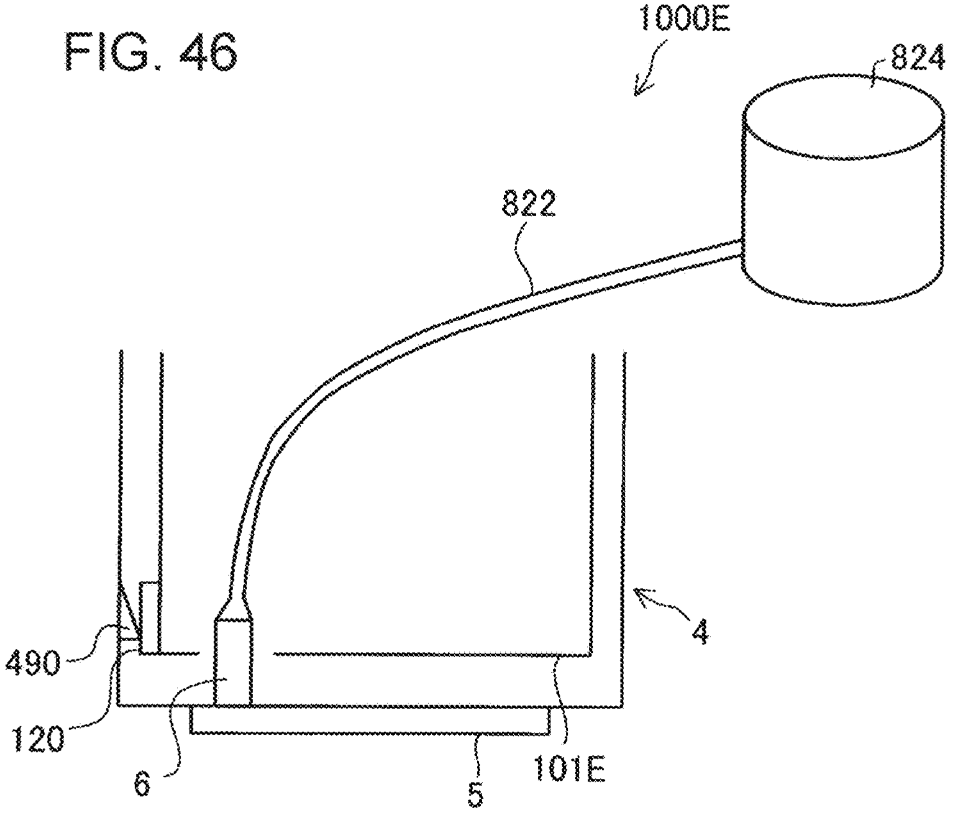
FIG. 46 is a diagram illustrating a printing system as Embodiment 4.

FIG. 46 is a diagram illustrating a printing system 1000E as Embodiment 4 of the printing system. The printing system 1000E includes an adapter 101E including the board 120, a liquid accommodation body 824 capable of accommodating a liquid, a liquid flow tube 822, and the printing apparatus 20 illustrated in FIG. 1. The adapter 101E may be detachably mounted on the accommodation section 4. The liquid flow tube 822 couples the liquid accommodation body 824 and the liquid introduction portion 6, and functions as a liquid supply portion. A portion of the liquid flow tube 822, which is coupled to the liquid introduction portion 6, functions as a liquid supply port. Four adapters 101E, four liquid flow tubes 822, and four liquid accommodation bodies 824 are provided. In the printing system 1000E, the “mounting-completed state” means a state in which the adapter 101E including the board 120 is mounted in the printing apparatus 20 and no short circuit occurs between the terminals 290. In the present embodiment, the sentence that “the board 120 is mounted in the printing apparatus 20” means that the board 120 is physically attached to the printing apparatus 20 and the contact portion cp of the terminal 290 is electrically coupled to the apparatus-side terminal 490. The data terminal 210 of the board 120 is used to detect whether or not the board 120 is mounted in the printing apparatus 20. The mounting determination unit 412 of the printing apparatus 20 determines whether or not the board 120 is mounted. The first response signal RT1 and the second response signal RT2 are signals used when the printing apparatus 20 determines that the board 120 is mounted in the printing apparatus 20.

Figure 47A:
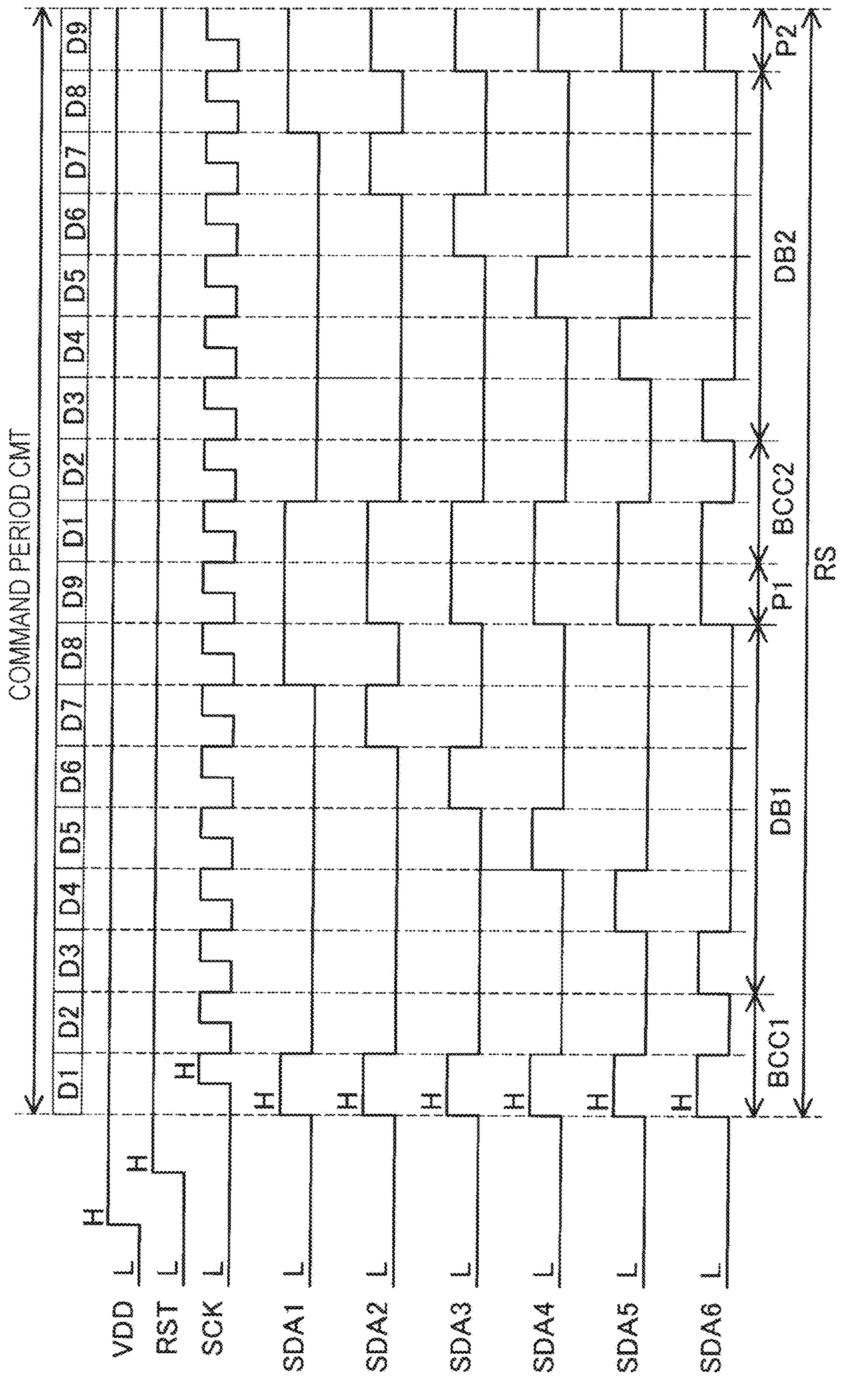
FIG. 47A is a first timing chart in a printing system including six liquid accommodation containers.
Figure 47B:
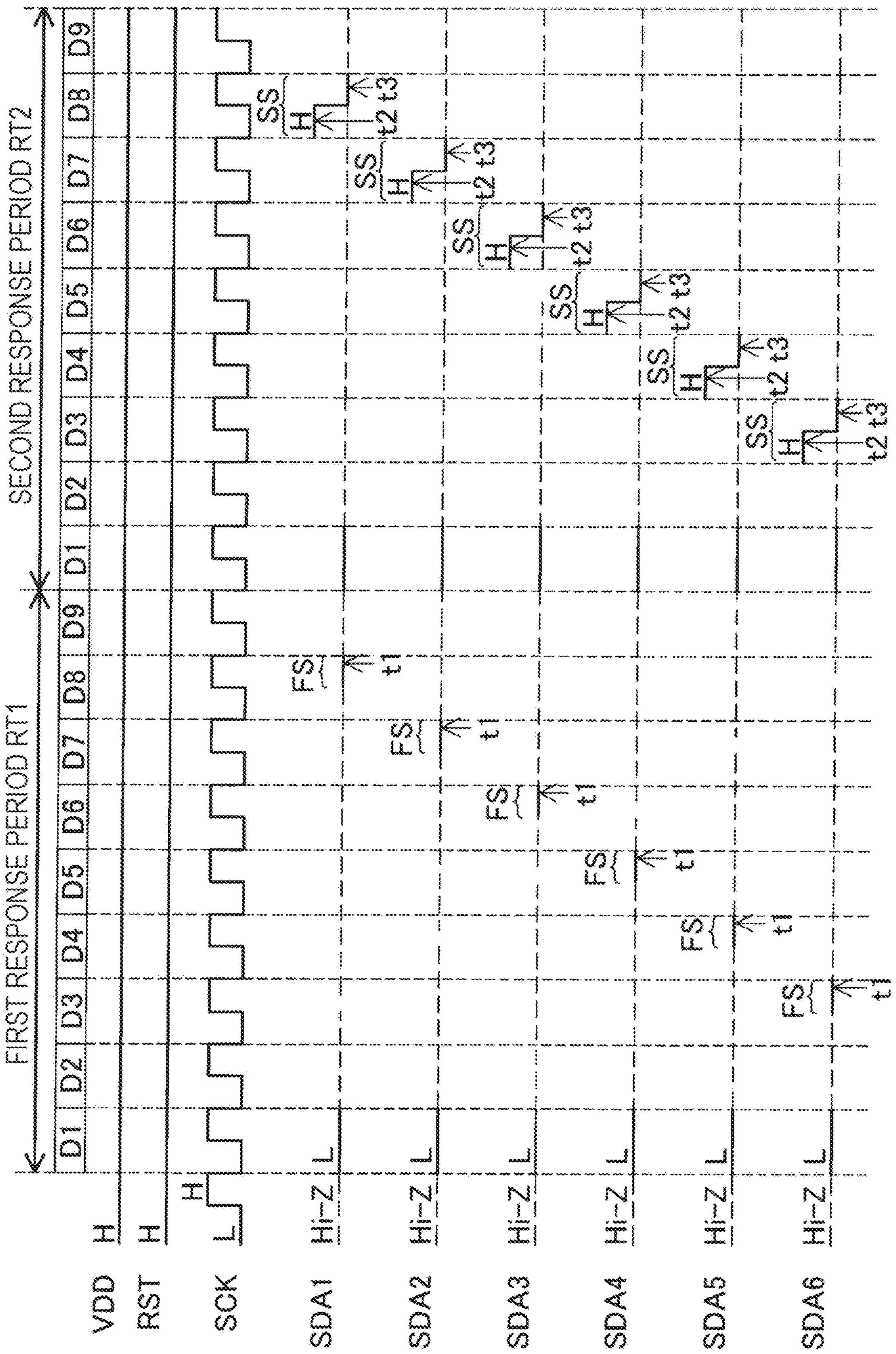
FIG. 47B is a second timing chart in the printing system including the six liquid accommodation containers.

A4-23. Other Embodiments for Electrical Configuration and Software Configuration In the first embodiment, as illustrated in FIG. 1, the four liquid accommodation containers 100A to 100D are detachably mounted on the accommodation section 4, but the number of liquid accommodation containers 100 detachably mounted on the accommodation section 4 is not limited to this. A timing chart of the coupling state determination processing in the printing system 1000 in which six liquid accommodation containers 100 are detachably mounted on the accommodation section 4 will be described below with reference to FIGS. 47A and 47B. The six liquid accommodation containers 100 accommodate, for example, inks of different colors. FIGS. 47A and 47B are timing charts schematically illustrating signals input/output to/from the terminals 290 of the liquid accommodation container 100 in the mounting-completed state. FIG. 47A is a first timing chart in the printing system 1000 including six liquid accommodation containers 100A to 100F. FIG. 47B is a second timing chart in the printing system 1000 including the six liquid accommodation containers 100A to 100F. FIG. 47A is a diagram corresponding to FIG. 11A, and FIG. 47B is a diagram corresponding to FIG. 11B. VDD, RST, SCK, and SDA1 to SDA6 illustrated in FIGS. 47A and 47B mean signals transmitted to and received via the corresponding terminal 290 or voltages supplied, by the corresponding lines LVDD, LRST, LSCK, and LSDA1 to LSDA6.

The request signal RS illustrated in FIG. 47A is different from the request signal RS illustrated in FIG. 11A in that bits of the cycles D4 and D3 in the command period CMT illustrated in FIG. 47A are assigned in order to designate the fifth liquid accommodation container 100E and the sixth liquid accommodation container 100F. Regarding the request signal RS transmitted via the data line LSDA5 coupled to a device 130E of the liquid accommodation container 100E, the second bit of the first identification data DB1 is at a high level, and the remaining bits are at a low level. For the request signal RS transmitted via the data line LSDA6 coupled to a device 130F of the liquid accommodation container 100F, the first bit of the first identification data DB1 is at a high level, and the remaining bits are at a low level.

The timing chart illustrated in FIG. 47B is different from the timing chart illustrated in FIG. 11B in that waveforms of the first response signal FS and the second response signal SS corresponding to the liquid accommodation containers 100E and 100F are added. The device 130E of the liquid accommodation container 100E outputs the first response signal FS to the data terminal 210 in the cycle D4 of the first response period RT1, and outputs the second response signal SS to the data terminal 210 in the cycle D4 of the second response period RT2. The device 130F of the liquid accommodation container 100F outputs the first response signal FS to the data terminal 210 in the cycle D3 of the first response period RT1, and outputs the second response signal SS to the data terminal 210 in the cycle D3 of the second response period RT2.

Figure 48:
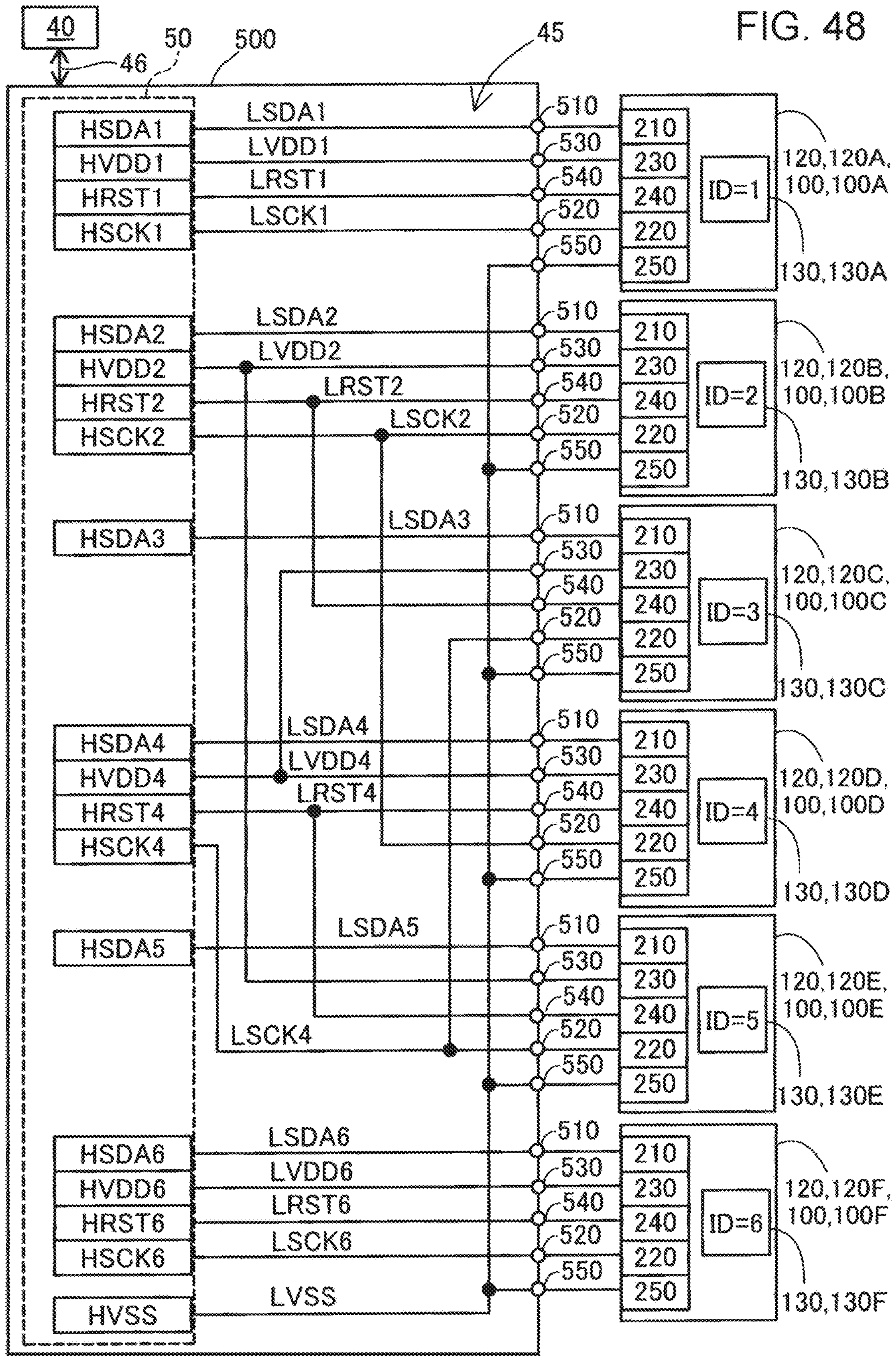
FIG. 48 is a schematic diagram illustrating an electrical configuration of the printing system including the six liquid accommodation containers.

FIG. 48 is a schematic diagram illustrating the electrical configuration of a printing system 1000 including the six liquid accommodation containers 100A to 100F. In FIG. 48, the components similar to the components in the electrical configuration illustrated in FIG. 8 are denoted by the same reference signs, and description thereof will be omitted as appropriate. The electrical configuration in FIG. 48 is different from the electrical configuration in FIG. 8 in that the lines LSDA, LRST, LSCK, and LVDD other than the ground line LVSS are independently provided corresponding to the four liquid accommodation containers 100A to 100D in FIG. 8, but the lines LRST, LSCK, and LVDD other than the data line LSDA are commonly used by a plurality of devices 130 in FIG. 48. Also in FIG. 48, the ground line LVSS is commonly used by the devices 130A to 130F of the six liquid accommodation containers 100A to 100F.

As illustrated in FIG. 48, a power source line LVDD2 electrically coupled to a host terminal HVDD2 of the sub-control unit 50 is electrically coupled to the two devices 130B and 130E in the mounting-completed state. A reset line LRST2 electrically coupled to a host terminal HRST2 of the sub-control unit 50 is electrically coupled to the two devices 130B and 130C in the mounting-completed state. A clock line LSCK2 electrically coupled to a host terminal HSCK2 of the sub-control unit 50 is electrically coupled to the two devices 130B and 130D in the mounting-completed state. A power source line LVDD4 electrically coupled to a host terminal HVDD4 of the sub-control unit 50 is electrically coupled to the two devices 130C and 130D in the mounting-completed state. A reset line LRST4 electrically coupled to a host terminal HRST4 of the sub-control unit 50 is electrically coupled to the two devices 130D and 130E in the mounting-completed state. A clock line LSCK4 electrically coupled to a host terminal HSCK4 of the sub-control unit 50 is electrically coupled to the two devices 130C and 130E in the mounting-completed state. The lines LSDA1, LVDD1, LRST1, and LSCK1 electrically coupled to the device 130A and the lines LSDA6, LVDD6, and LRST6, LSCK6 electrically coupled to the device 130F are independently used without being used in combination with other devices 130.

Regarding the electrical configuration of the printing system 1000 illustrated in FIG. 48, a partial configuration may be applied to the printing system 1000 illustrated in FIG. 1, that includes the four liquid accommodation containers 100A to 100D. For example, the liquid accommodation containers 100B to 100E illustrated in FIG. 48 may be replaced with the liquid accommodation containers 100A to 100D of the printing system 1000 illustrated in FIG. 1. For example, the liquid accommodation containers 100A, 100B, 100E, and 100F illustrated in FIG. 48 may be replaced with the liquid accommodation containers 100A to 100D of the printing system 1000 illustrated in FIG. 1.

A4-24. Embodiment 1 for Device

Figure 49:
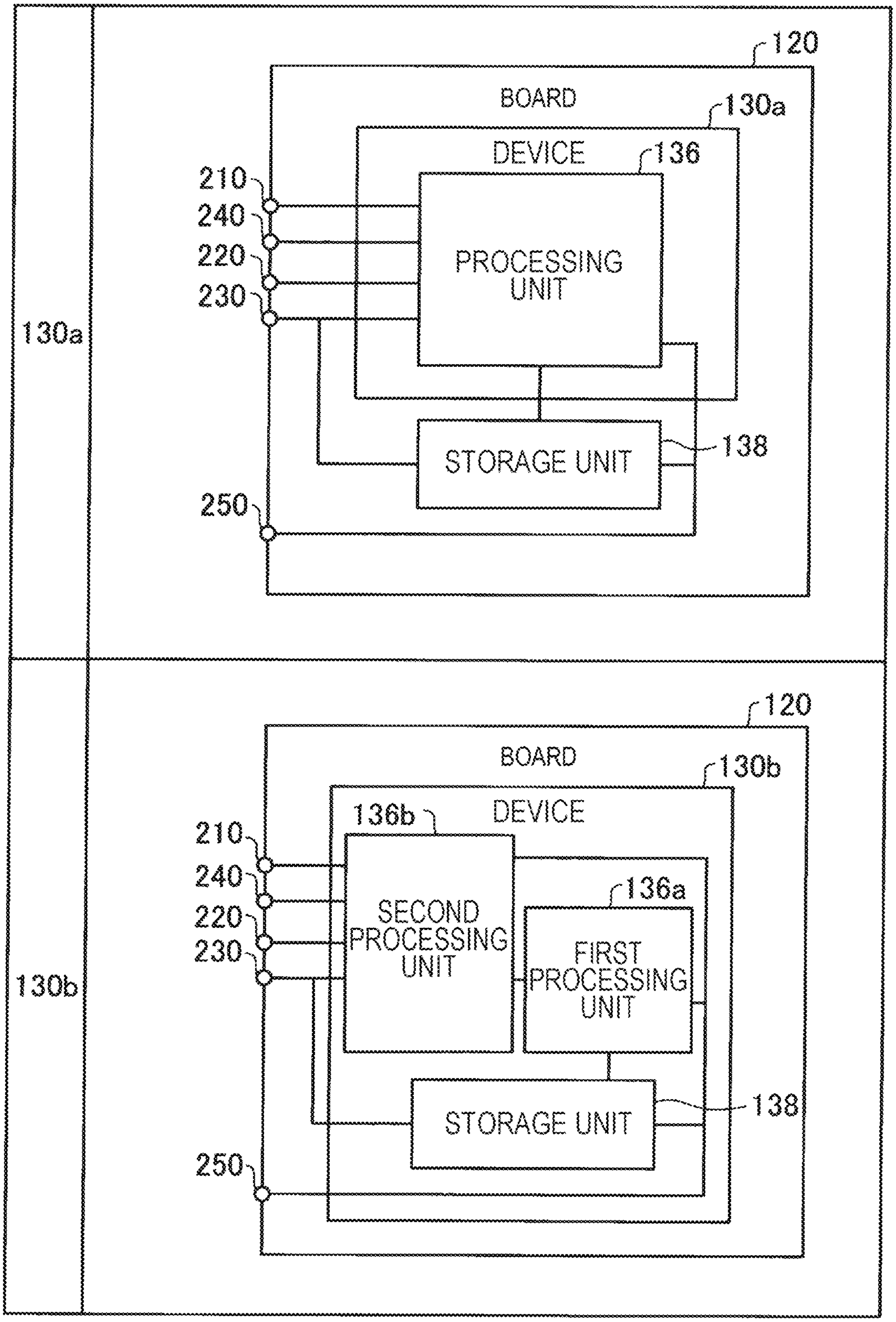
FIG. 49 is a diagram illustrating a device as Embodiment 1.

In the first embodiment, as illustrated in FIG. 6, the device 130 includes the processing unit 136 and the storage unit 138, but the present disclosure is not limited to this. FIG. 49 is a diagram illustrating devices 130*a* and 130*b* as Embodiment 1 for the device 130. The device 130*a* includes the processing unit 136, but does not include the storage unit 138. The storage unit 138 and the device 130 may be separately provided. In this case, the storage unit 138 is electrically coupled to the processing unit 136 of the device

130*b*. The device 130*b* includes a first processing unit 136*a*, a second processing unit 136*b*, and the storage unit 138. The first processing unit 136*a* is coupled to the storage unit 138. The second processing unit 136*b* is coupled to the first processing unit 136*a* and the terminals 210 to 250. In such a form, the first processing unit 136*a* and the second processing unit 136*b* function as the processing unit as a whole. As described above, the device 130*b* may include a plurality of processing units 136*a* and 136*b*.

A4-25. Embodiment 2 for Device

In the first embodiment, as illustrated in FIG. 11C, the first response signal FS is output in the entire period in which the clock signal SCK is at a high level, but the present disclosure is not limited to this. For example, the device 130 may output the first response signal FS to the data terminal 210 in a portion of the period in which the clock signal SCK is at a high level. For example, the device 130 may output the first response signal FS and then set the drive state of the data terminal 210 to the high impedance, in the period in which the clock signal SCK is at a high level. For example, the device 130 may output the first response signal FS containing a low level, in the period in which the clock signal SCK is at a low level and in the period in which the clock signal SCK is at a high level in one cycle of the clock signal SCK.

A4-26. Embodiment 3 for Device

In the first embodiment, the frequency of the clock signal SCK is constant in the coupling state determination processing, as illustrated in FIGS. 11A and 11B, but may not be constant. For example, the frequency of the clock signal SCK in the second response period RT2 may be set to be lower than the frequency of the clock signal SCK in the first response period RT1. The second response signal SS includes different voltages. In the second response period RT2, the frequency of the clock signal SCK may be set to be lower than the frequency in the first response period RT1, and the second response signal SS may be output in a period longer than a period for the first response signal FS.

A4-27. Embodiment 4 for Device

In the first embodiment, the processing unit 136 of the device 130 may repeatedly output the first response signal FS and the second response signal SS in a manner that the first response period RT1 FS and the second response period RT2 are repeatedly provided in this order during a period in which the reset signal RST is at a high level. When the processing unit 136 outputs a low level voltage in the second response signal SS to the data terminal 210, and then the request signal RS is input again to the data terminal 210, the processing unit 136 of the device 130 may output the first response signal FS and the second response signal SS to the data terminal 210.

A4-28. Embodiment 5 for Device

In the first embodiment, as illustrated in FIG. 11B, timings of the rising edge and the falling edge of the clock signal SCK are the same as timings of the rising edge and the falling edge of the signal such as the first response signal FS in the first response period RT1 and the signal such as the second response signal SS in the second response period RT2. The present disclosure is not limited to this. For example, the timings of the rising edge and the falling edge of the signal such as the first response signal FS in the first response period RT1 and the signal such as the second response signal SS in the second response period RT2 may be delayed from the timings of the rising edge and the falling edge of the clock signal SCK.

A4-29. Embodiment 6 for Device

In the first embodiment, the processing units 136A to 136D of the devices 130A to 130D output the first response signal FS and the second response signal SS to the data terminal 210 at different cycles of the clock signal SCK. The present disclosure is not limited to this. For example, the processing units 136A to 136D of the devices 130A to 130D may output the first response signal FS and the second response signal SS at the same cycle of the clock signal SCK. In the coupling state determination processing, the printing apparatus 20 transmits and receives signals via the individual data lines LSDA1 to LSDA4 electrically coupled to the devices 130A to 130D, respectively. Therefore, even though the first response signal FS and the second response signal SS are output to the data terminal 210 from the devices 130A to 130D in the same cycle in the first response period RT1 and the second response period RT2, the sub-control unit 50 of the printing apparatus 20 is able to detect the voltage output from the data terminal 210 at each of the first timing t1 to the third timing t3. In this case, the request signal RS is set to a high level at the corresponding bit in the command period CMT.

For example, the processing units 136A to 136D of the devices 130A to 130D may output the first response signal FS and the second response signal SS to the data terminal 210 in all of the cycles D3 to D8 of the first response period RT1 and the second response period RT2. In this case, the first timing t1 may be provided in all of the cycles D3 to D8 of the first response period RT1. The second timing t2 and the third timing t3 may be provided in all of the cycles D3 to D8 of the second response period RT2.

A4-30. Embodiment 7 for Device

In the first embodiment, the processing units 136A to 136D of the devices 130A to 130D output the first response signal FS and the second response signal SS to the data terminal 210 in the cycles D8 to D5 of the first response period. The present disclosure is not limited to this. For example, the processing units 136A to 136D of the devices 130A to 130D may output the first response signal FS and the second response signal SS to the data terminal 210 in the cycles D5 to D8 of the first response period. In this case, the request signal RS is set to a high level at the corresponding bit in the command period CMT.

A4-31. Embodiment 8 for Device

In the first embodiment, the device 130 is configured such that the request signal RS is input to the data terminal 210 and the first response signal FS and the second response signal SS are output to the data terminal 210. The terminal to which the request signal RS is input may be a terminal other than the data terminal 210. Similarly, the terminal that outputs the first response signal FS and the second response signal SS may be a terminal other than the data terminal 210. In this case, the device 130 is coupled to such a terminal.

B. Other Embodiments

The present disclosure is not limited to the above embodiments, and may be realized in various configurations without departing from the spirit thereof. For example, the technical features in the embodiments corresponding to the technical features in each form described below may be appropriately replaced and combined in order to solve some or all of the above problems or to achieve some or all of the above objects. Further, the technical features can be appropriately deleted so long as the technical features are not described as being essential in the present specification. Each form as follows does not need to have all the configurations in the present disclosure. Each form as follows may have a minimum configuration for solving the above problems or achieving the above objects. Unless otherwise stated, the effect corresponding to one form is independent of the effect corresponding to the other form. In the combined form, the effect corresponding to the combined form is exhibited.

1. According to a first aspect of the present disclosure, there is provided a device that is configured to be electrically coupled to a plurality of terminals of a liquid accommodation container mounted on an accommodation section of a printing apparatus including a printing head, a liquid introduction portion that introduces a liquid to the printing head, the accommodation section provided with the liquid introduction portion, and a plurality of apparatus-side terminals provided at the accommodation section. The device is configured to satisfy I, II, III, and IV as follows.

I: The device outputs a first signal containing a first low voltage and a second signal containing a second low voltage and a second high voltage higher than the second low voltage to a first terminal provided in the plurality of terminals.

II: The first signal and the second signal are used when the printing apparatus determines that the first terminal does not have a short circuit with other terminals other than the first terminal among the plurality of terminals and that the liquid accommodation container is being mounted in the printing apparatus.

III: The device outputs the first signal to the first terminal, and, after the device outputs the first signal, the device outputs the second signal to the first terminal.

IV: A clock signal in which a low voltage and a high voltage alternately repeat with a predetermined period is input to a second terminal provided in the other terminals. The device outputs the first low voltage to the first terminal at a first timing in a period in which a voltage input to the second terminal is the high voltage. After the device outputs the first low voltage, the device outputs the second high voltage to the first terminal at a second timing in a period in which the voltage input to the second terminal is the low voltage. After the device outputs the second high voltage, the device outputs the second low voltage to the first terminal at a third timing in a period in which the voltage input to the second terminal is the high voltage.

According to this aspect, the device outputs the first low voltage to the first terminal at the predetermined first timing in the period in which the voltage input to the second terminal is a high voltage. After the device outputs the first low voltage, the device outputs the second high voltage to the first terminal at the second timing in the period in which the voltage input to the second terminal is a low voltage. After the device outputs the second high voltage, the device outputs the second low voltage to the first terminal at the third timing in the period in which the voltage input to the second terminal is a high voltage. Thus, it is possible for the device to output the signal used to determine that the first terminal of the liquid accommodation container does not have a short circuit with other terminals, and that the liquid accommodation container is mounted in the printing apparatus. Regardless of determination that the liquid accommodation container is mounted in the printing apparatus, it is possible to reduce a possibility that the printing apparatus does not normally operate and a possibility that it is not possible to normally perform reading and writing of the liquid accommodation container from and into the device. The device in this aspect has improvements beyond the related art.

2. In the above aspect, when the first terminal does not have a short circuit with the other terminals, in one cycle of the clock signal, the device may output the first low voltage to the first terminal before the first timing in the period of the high voltage. Generally, the voltage after a predetermined period passed from the output is output more stably than the voltage immediately after the output. According to this aspect, since the device outputs the first low voltage to the first terminal before the first timing in the period of a high voltage in one cycle of the clock signal, it is possible for the device to output the signal to the printing apparatus at the first timing in a state where the first low voltage output to the first terminal is stable.

3. In the above aspect, when the first terminal does not have a short circuit with the other terminals, in one cycle of the clock signal, the device may output the second high voltage to the first terminal before the second timing in the period of the low voltage. According to this aspect, since the device outputs the first high voltage to the first terminal before the second timing in the period of a low voltage in one cycle of the clock signal, it is possible for the device to output the signal to the printing apparatus at the second timing in a state where the first high voltage output to the first terminal is stable.

4. In the above aspect, when the first terminal does not have a short circuit with the other terminals, in one cycle of the clock signal, the device may output the second low voltage to the first terminal before the third timing in the period of the high voltage. According to this aspect, since the device outputs the second low voltage to the first terminal before the third timing in the period of the high voltage in one cycle of the clock signal, it is possible for the device to output the signal to the printing apparatus at the third timing in a state where the second low voltage output to the first terminal is stable.

5. In the above aspect, when the first terminal does not have a short circuit with the other terminals, in one cycle of the clock signal, the device may output the second high voltage to the first terminal when the voltage input to the second terminal changes from the high voltage to the low voltage, and the device may output the second low voltage to the first terminal when the voltage input to the second terminal changes from the low voltage to the high voltage. According to this aspect, the voltage output to the first terminal is different from the voltage input to the second terminal. When the first terminal and the second terminal have a short circuit, the voltage of the first terminal is equal to the voltage of the second terminal. Thus, a case where the first terminal and the second terminal do not have a short circuit and a case where the first terminal and the second terminal have a short circuit are distinguished from each other. Thus, it is possible for the device to output the signal indicating that the first terminal does not have a short circuit with the other terminals and that the liquid accommodation container is being mounted in the printing apparatus.

6. In the above aspect, when the first terminal does not have a short circuit with the other terminals, and when the voltage input to the second terminal changes from the low voltage to the high voltage, the device may output the first low voltage to the first terminal. According to this aspect, the voltage output to the first terminal is different from the voltage input to the second terminal. When the first terminal and the second terminal have a short circuit, the voltage of the first terminal is equal to the voltage of the second terminal. Thus, a case where the first terminal and the second terminal do not have a short circuit and a case where the first terminal and the second terminal have a short circuit are distinguished from each other. Thus, it is possible for the device to output the signal indicating that the first terminal does not have a short circuit with the other terminals and that the liquid accommodation container is being mounted in the printing apparatus.

7. In the above aspect, III and IV may be performed a plurality of number of times. The first signal may not be input correctly from the printing apparatus due to an influence of static electricity or the like. According to this aspect, by performing III and IV described above a plurality of number of times, even though there is an influence of static electricity or the like, it is possible for the device to output the signal indicating that the first terminal does not have a short circuit with the other terminals and that the liquid accommodation container is being mounted.

8. In the above aspect, when the printing apparatus receives a second printing instruction during printing based on a first printing instruction, the device may output the first signal and the second signal to the first terminal before printing based on the second printing instruction is started after the printing based on the first printing instruction is ended. According to this aspect, the device output the first signal and the second signal to the first terminal before printing based on the second printing instruction is started after printing based on the first printing instruction is ended. Thus, even during the consecutive printing, it is possible for the device to output the signal indicating that the first terminal does not have a short circuit with the other terminals and that the liquid accommodation container is being mounted in the printing apparatus.

9. In the above aspect, when the printing apparatus receives a cleaning instruction of the printing head, the device may output the first signal and the second signal to the first terminal before cleaning is performed. According to this aspect, when the printing apparatus receives a cleaning instruction of the printing head, the device outputs the signal indicating that the first terminal does not have a short circuit with the other terminals and that the liquid accommodation container is being mounted in the printing apparatus. Thus, it is possible to suppress the failure of cleaning due to poor communication.

10. In the above aspect, the device may output the first signal and the second signal to the first terminal when the accommodation section is located at a replacement position at which replacement of the liquid accommodation container is possible. When the accommodation section moves from the replacement position to a standby position at which the replacement of the liquid accommodation container is not possible, the device may output the first signal and the second signal to the first terminal. According to this aspect, the mounting posture of the liquid accommodation container may be unstable immediately after the replacement of the liquid accommodation container. The mounting posture of the liquid accommodation container may change while moving to the standby position. The change in the mounting posture may cause an occurrence of a short circuit between the first terminal and the other terminals, or a poor contact between the liquid accommodation container and the printing apparatus. Thus, by outputting the first signal and the second signal to the first terminal even at the replacement position and outputting the first signal and the second signal to the first terminal even at the standby position immediately after, it is possible for the device to output the signal indicating that the first terminal does not have a short circuit with the other terminals and that the liquid accommodation container is being mounted in the printing apparatus. Alternatively, the replacement of the liquid accommodation container is not yet completed at the replacement position, but the accommodation section may move to the standby position by an operation of a user. In such a case, by outputting the first signal and the second signal to the first terminal when the accommodation section moves to the standby position, it is possible for the device to output the signal indicating that the first terminal does not have a short circuit with the other terminals and that the liquid accommodation container is being mounted in the printing apparatus.

11. In the above aspect, the first terminal may be a data terminal, the second terminal may be a clock terminal, the first signal may be a first response signal as a response to the printing apparatus, and the second signal may be a second response signal as a response to the printing apparatus.

12. In the above aspect, the device may store information regarding a liquid accommodated in the liquid accommodation container.

13. In the above aspect, a reset signal containing a low voltage and a high voltage may be input to a third terminal provided in the other terminals, and a power source voltage may be input to a fourth terminal provided in the other terminals.

14. In the above aspect, after the power source voltage is input to the fourth terminal, the high voltage may be input to the third terminal by the reset signal changing from the low voltage to the high voltage. After the high voltage of the reset signal is input to the third terminal, the clock signal may be input to the second terminal. After the high voltage of the reset signal is input to the third terminal, the first signal may be input to the first terminal.

15. In the above aspect, the power source voltage supplied to the fourth terminal may be used to drive the device.

16. In the above aspect, the third terminal may be a reset terminal, and the fourth terminal may be a power source terminal.

17. According to a second aspect of the present disclosure, there is provided a board that is mounted in a printing apparatus and is configured to come into contact with a plurality of apparatus-side terminals. The printing apparatus includes a printing head, a liquid introduction portion that introduces a liquid to the printing head, an accommodation section that accommodates a liquid accommodation container provided with the liquid introduction portion, and the plurality of apparatus-side terminals provided at the accommodation section. The board includes a base member, a device provided at the base member, and a plurality of terminals that are provided at the base member and are electrically coupled to the device. The plurality of terminals include a first terminal and other terminals including a second terminal, and the board is configured to satisfy I, II, III, and IV as follows.

I. The device outputs a first signal containing a first low voltage and a second signal containing a second low voltage and a second high voltage higher than the second low voltage, from the first terminal to the printing apparatus.

II: The first signal and the second signal are used when the printing apparatus determines that the first terminal does not have a short circuit with the other terminals and that the board is being mounted in the printing apparatus.

III: The device outputs the first signal to the first terminal, and then outputs the second signal to the first terminal.

IV: When the first terminal does not have a short circuit with the other terminals, a clock signal in which a low voltage and a high voltage alternately repeat with a predetermined period is input from the printing apparatus to the second terminal, and the device outputs the first low voltage as a first expected value from the first terminal to the printing apparatus at a first timing in a period in which a voltage input to the second terminal is the high voltage. After the device outputs the first low voltage, the device outputs the second high voltage as a second expected value from the first terminal to the printing apparatus at a second timing in a period in which the voltage input to the second terminal is the low voltage. After the device outputs the second high voltage, the device outputs the second low voltage as a third expected value from the first terminal to the printing apparatus at a third timing in a period in which the voltage input to the second terminal is the high voltage.

According to this aspect, the device outputs the first low voltage from the first terminal to the printing apparatus at the predetermined first timing in the period in which the voltage input to the second terminal is a high voltage. After the device outputs the first low voltage, the device outputs the second high voltage from the first terminal to the printing apparatus at the second timing in the period in which the voltage input to the second terminal is a low voltage. After the device outputs the second high voltage, the device outputs the second low voltage from the first terminal to the printing apparatus at the third timing in the period in which the voltage input to the second terminal is a high voltage. Thus, it is possible for the device to output the signal used to determine that the first terminal of the liquid accommodation container does not have a short circuit with the other terminals and that the liquid accommodation container is being mounted in the printing apparatus. The board outputs the signal output by the device from the first terminal to the printing apparatus. Regardless of determination that the liquid accommodation container is mounted in the printing apparatus, it is possible to reduce a possibility that the printing apparatus does not normally operate and a possibility that it is not possible to normally perform reading and writing of the liquid accommodation container from and into the device. The board in this aspect has improvements beyond the related art.

18. In the above aspect, when the first terminal and the second terminal have a short circuit, at the first timing, the device may output a voltage having a value different from the first expected value from the first terminal to the printing apparatus. At the second timing, the device may output a voltage having a value different from the second expected value from the first terminal to the printing apparatus. At the third timing, the device may output a voltage having a value different from the third expected value from the first terminal to the printing apparatus. According to this aspect, it is possible to output a voltage indicating that a short circuit occurs, from the board.

19. In the above aspect, when the first terminal and the second terminal have a short circuit in a period before the second timing after the first timing, at the first timing, the device may output a voltage having a value equal to the first expected value from the first terminal to the printing apparatus. At the second timing, the device may output a voltage having a value different from the second expected value from the first terminal to the printing apparatus. At the third timing, the device may output a voltage having a value different from the third expected value from the first terminal to the printing apparatus. According to this aspect, the effect similar to the effect in the above aspect (18) is exhibited.

20. In the above aspect, when the first terminal and the second terminal have a short circuit in a period before the third timing after the second timing, at the first timing, the device may output a voltage having a value equal to the first expected value from the first terminal to the printing apparatus. At the second timing, the device may output a voltage having a value equal to the second expected value from the first terminal to the printing apparatus. At the third timing, the device may output a voltage having a value different from the third expected value from the first terminal to the printing apparatus. According to this aspect, the effect similar to the effect in the above aspect (18) is exhibited.

21. In the above aspect, when a short circuit between the first terminal and the second terminal is eliminated in a period before the second timing after the first timing, at the first timing, the device may output a voltage having a value different from the first expected value from the first terminal to the printing apparatus. At the second timing, the device may output a voltage having a value equal to the second expected value from the first terminal to the printing apparatus. At the third timing, the device may output a voltage having a value equal to the third expected value from the first terminal to the printing apparatus. According to this aspect, the effect similar to the effect in the above aspect (18) is exhibited.

22. In the above aspect, when a short circuit between the first terminal and the second terminal is eliminated in a period before the third timing after the second timing, at the first timing, the device may output a voltage having a value different from the first expected value from the first terminal to the printing apparatus. At the second timing, the device may output a voltage having a value different from the second expected value from the first terminal to the printing apparatus. At the third timing, the device may output a voltage having a value equal to the third expected value from the first terminal to the printing apparatus. According to this aspect, the effect similar to the effect in the above aspect (18) is exhibited.

23. In the above aspect, the first terminal may be a data terminal, the second terminal may be a clock terminal, the first signal may be a first response signal as a response to the printing apparatus, and the second signal may be a second response signal as a response to the printing apparatus.

24. In the above aspect, the other terminals may include a third terminal and a fourth terminal, a reset signal containing a low voltage and a high voltage may be input to the third terminal, and a power source voltage may be input to the fourth terminal. According to this aspect, it is possible for the printing apparatus to determine that the first terminal does not have a short circuit with the second terminal, the third terminal, and the fourth terminal included in the other terminals, and that the liquid accommodation container is mounted in the printing apparatus, by using the device.

25. In the above aspect, in at least one of a case where the first terminal and the third terminal have a short circuit and a case where the first terminal and the fourth terminal have a short circuit, at the first timing, the device may output a voltage having a value different from the first expected value from the first terminal to the printing apparatus. At the second timing, the device may output a voltage having a value equal to the second expected value from the first terminal to the printing apparatus. At the third timing, the device may output a voltage having a value different from the third expected value from the first terminal to the printing apparatus. According to this aspect, the effect similar to the effect in the above aspect (18) is exhibited.

26. In the above aspect, in a period before the second timing after the first timing, in at least one of a case where the first terminal and the third terminal have a short circuit and a case where the first terminal and the fourth terminal have a short circuit, at the first timing, the device may output a voltage having a value equal to the first expected value from the first terminal to the printing apparatus. At the second timing, the device may output a voltage having a value equal to the second expected value from the first terminal to the printing apparatus. At the third timing, the device may output a voltage having a value different from the third expected value from the first terminal to the printing apparatus. According to this aspect, the effect similar to the effect in the above aspect (18) is exhibited.

27. In the above aspect, in a period before the third timing after the second timing, in at least one of a case where the first terminal and the third terminal have a short circuit and a case where the first terminal and the fourth terminal have a short circuit, at the first timing, the device may output a voltage having a value equal to the first expected value from the first terminal to the printing apparatus. At the second timing, the device may output a voltage having a value equal to the second expected value from the first terminal to the printing apparatus. At the third timing, the device may output a voltage having a value different from the third expected value from the first terminal to the printing apparatus. According to this aspect, the effect similar to the effect in the above aspect (18) is exhibited.

28. In the above aspect, in a period before the second timing after the first timing, when a short circuit between the first terminal and the third terminal is eliminated and a short circuit between the first terminal and the fourth terminal is eliminated, at the first timing, the device may output a voltage having a value different from the first expected value from the first terminal to the printing apparatus. At the second timing, the device may output a voltage having a value equal to the second expected value from the first terminal to the printing apparatus. At the third timing, the device may output a voltage having a value equal to the third expected value from the first terminal to the printing apparatus. According to this aspect, the effect similar to the effect in the above aspect (18) is exhibited.

29. In the above aspect, in a period before the third timing after the second timing, when a short circuit between the first terminal and the third terminal is eliminated and a short circuit between the first terminal and the fourth terminal is eliminated, at the first timing, the device may output a voltage having a value different from the first expected value from the first terminal to the printing apparatus. At the second timing, the device may output a voltage having a value equal to the second expected value from the first terminal to the printing apparatus. At the third timing, the device may output a voltage having a value equal to the third expected value from the first terminal to the printing apparatus. According to this aspect, the effect similar to the effect in the above aspect (18) is exhibited.

The present disclosure can be realized in forms such as a liquid accommodation container, a system, a use of a board or a liquid accommodation container, a device, a board, and a control method of a system, in addition to the above-described aspects.

C. Exemplary Embodiments

Exemplary embodiments of the present disclosure are described below.

1. A device that is configured to be electrically coupled to a plurality of terminals of a liquid accommodation container mounted on an accommodation section of a printing apparatus including a printing head, a liquid introduction portion that introduces a liquid to the printing head, the accommodation section provided with the liquid introduction portion, and a plurality of apparatus-side terminals provided at the accommodation section, wherein the device is configured to satisfy I, II, III, and IV as follows, I: the device outputs a first signal containing a first low voltage and a second signal containing a second low voltage and a second high voltage higher than the second low voltage to a first terminal provided in the plurality of terminals, II: the first signal and the second signal are used when the printing apparatus determines that the first terminal does not have a short circuit with other terminals other than the first terminal among the plurality of terminals and that the liquid accommodation container is being mounted in the printing apparatus, III: the device outputs the first signal to the first terminal, and after the device outputs the first signal, the device outputs the second signal to the first terminal, and IV: a clock signal in which a low voltage and a high voltage alternately repeat with a predetermined period is input to a second terminal provided in the other terminals, the device outputs the first low voltage to the first terminal at a first timing in a period in which a voltage input to the second terminal is the high voltage, after the device outputs the first low voltage, the device outputs the second high voltage to the first terminal at a second timing in a period in which the voltage input to the second terminal is the low voltage, and after the device outputs the second high voltage, the device outputs the second low voltage to the first terminal at a third timing in a period in which the voltage input to the second terminal is the high voltage.

2. The device according to Exemplary embodiment 1, wherein when the first terminal does not have a short circuit with the other terminals, in one cycle of the clock signal, the device outputs the first low voltage to the first terminal before the first timing in the period of the high voltage.

3. The device according to Exemplary embodiment 1 or Exemplary embodiment 2, wherein when the first terminal does not have a short circuit with the other terminals, in one cycle of the clock signal, the device outputs the second high voltage to the first terminal before the second timing in the period of the low voltage.

4. The device according to any one of Exemplary embodiments 1 to 3, wherein when the first terminal does not have a short circuit with the other terminals, in one cycle of the clock signal, the device outputs the second low voltage to the first terminal before the third timing in the period of the high voltage.

5. The device according to any one of Exemplary embodiments 1 to 4, wherein when the first terminal does not have a short circuit with the other terminals, in one cycle of the clock signal, the device outputs the second high voltage to the first terminal when the voltage input to the second terminal changes from the high voltage to the low voltage, and the device outputs the second low voltage to the first terminal when the voltage input to the second terminal changes from the low voltage to the high voltage.

6. The device according to any one of Exemplary embodiments 1 to 5, wherein when the first terminal does not have a short circuit with the other terminals, and when the voltage input to the second terminal changes from the low voltage to the high voltage, the device outputs the first low voltage to the first terminal.

7. The device according to any one of Exemplary embodiments 1 to 6, wherein

III and IV are performed a plurality of number of times.

8. The device according to any one of Exemplary embodiments 1 to 7, wherein when the printing apparatus receives a second printing instruction during printing based on a first printing instruction, the device outputs the first signal and the second signal to the first terminal before printing based on the second printing instruction is started after the printing based on the first printing instruction is ended.

9. The device according to any one of Exemplary embodiments 1 to 8, wherein when the printing apparatus receives a cleaning instruction of the printing head, the device outputs the first signal and the second signal to the first terminal before cleaning is performed.

10. The device according to any one of Exemplary embodiments 1 to 9, wherein the device outputs the first signal and the second signal to the first terminal when the accommodation section is located at a replacement position at which replacement of the liquid accommodation container is possible, and when the accommodation section moves from the replacement position to a standby position at which the replacement of the liquid accommodation container is not possible, the device outputs the first signal and the second signal to the first terminal.

11. The device according to any one of Exemplary embodiments 1 to 10, wherein the first terminal is a data terminal, the second terminal is a clock terminal, the first signal is a first response signal as a response to the printing apparatus, and the second signal is a second response signal as a response to the printing apparatus.

12. The device according to any one of Exemplary embodiments 1 to 11, wherein the device stores information regarding a liquid accommodated in the liquid accommodation container.

13. The device according to any one of Exemplary embodiments 1 to 12, wherein a reset signal containing a low voltage and a high voltage is input to a third terminal provided in the other terminals, and a power source voltage is input to a fourth terminal provided in the other terminals.

14. The device according to Exemplary embodiment 13, wherein after the power source voltage is input to the fourth terminal, the high voltage is input to the third terminal by the reset signal changing from the low voltage to the high voltage, after the high voltage of the reset signal is input to the third terminal, the clock signal is input to the second terminal, and after the high voltage of the reset signal is input to the third terminal, the first signal is input to the first terminal.

15. The device according to Exemplary embodiment 13 or Exemplary embodiment 14, wherein the power source voltage supplied to the fourth terminal is used to drive the device.

16. The device according to any one of Exemplary embodiments 13 to 15, wherein the third terminal is a reset terminal, and the fourth terminal is a power source terminal.

17. A board that is mounted in a printing apparatus and is configured to come into contact with a plurality of apparatus-side terminals, the printing apparatus including a printing head, a liquid introduction portion that introduces a liquid to the printing head, an accommodation section that accommodates a liquid accommodation container provided with the liquid introduction portion, and the plurality of apparatus-side terminals provided at the accommodation section, the board comprising:

a base member;

a device provided at the base member; and a plurality of terminals that are provided at the base member and are electrically coupled to the device, wherein the plurality of terminals include a first terminal and other terminals including a second terminal, and the board is configured to satisfy I, II, III, and IV as follows, I: the device outputs a first signal containing a first low voltage and a second signal containing a second low voltage and a second high voltage higher than the second low voltage, from the first terminal to the printing apparatus, II: the first signal and the second signal are used when the printing apparatus determines that the first terminal does not have a short circuit with the other terminals and that the board is being mounted in the printing apparatus, III: the device outputs the first signal to the first terminal, and then outputs the second signal to the first terminal, and IV: when the first terminal does not have a short circuit with the other terminals, a clock signal in which a low voltage and a high voltage alternately repeat with a predetermined period is input from the printing apparatus to the second terminal, the device outputs the first low voltage as a first expected value from the first terminal to the printing apparatus at a first timing in a period in which a voltage input to the second terminal is the high voltage, after the device outputs the first low voltage, the device outputs the second high voltage as a second expected value from the first terminal to the printing apparatus at a second timing in a period in which the voltage input to the second terminal is the low voltage, and after the device outputs the second high voltage, the device outputs the second low voltage as a third expected value from the first terminal to the printing apparatus at a third timing in a period in which the voltage input to the second terminal is the high voltage.

18. The board according to Exemplary embodiment 17, wherein when the first terminal does not have a short circuit with the other terminals, in one cycle of the clock signal, the device outputs the first low voltage to the first terminal before the first timing in the period of the high voltage.

19. The board according to Exemplary embodiment 17 or Exemplary embodiment 18, wherein when the first terminal does not have a short circuit with the other terminals, in one cycle of the clock signal, the device outputs the second high voltage to the first terminal before the second timing in the period of the low voltage.

20. The board according to any one of Exemplary embodiments 17 to 19, wherein when the first terminal does not have a short circuit with the other terminals, in one cycle of the clock signal, the device outputs the second low voltage to the first terminal before the third timing in the period of the high voltage.

21. The board according to any one of Exemplary embodiments 17 to 20, wherein when the first terminal does not have a short circuit with the other terminals, in one cycle of the clock signal, the device outputs the second high voltage to the first terminal when the voltage input to the second terminal changes from the high voltage to the low voltage, and the device outputs the second low voltage to the first terminal when the voltage input to the second terminal changes from the low voltage to the high voltage.

22. The board according to any one of Exemplary embodiments 17 to 21, wherein when the first terminal does not have a short circuit with the other terminals, and when the voltage input to the second terminal changes from the low voltage to the high voltage, the device outputs the first low voltage to the first terminal.

23. The board according to any one of Exemplary embodiments 17 to 22, wherein when the first terminal and the second terminal have a short circuit, at the first timing, the device outputs a voltage having a value different from the first expected value from the first terminal to the printing apparatus, at the second timing, the device outputs a voltage having a value different from the second expected value from the first terminal to the printing apparatus, and at the third timing, the device outputs a voltage having a value different from the third expected value from the first terminal to the printing apparatus.

24. The board according to any one of Exemplary embodiments 17 to 23, wherein when the first terminal and the second terminal have a short circuit in a period before the second timing after the first timing, at the first timing, the device outputs a voltage having a value equal to the first expected value from the first terminal to the printing apparatus, at the second timing, the device outputs a voltage having a value different from the second expected value from the first terminal to the printing apparatus, and at the third timing, the device outputs a voltage having a value different from the third expected value from the first terminal to the printing apparatus.

25. The board according to any one of Exemplary embodiments 17 to 24, wherein when the first terminal and the second terminal have a short circuit in a period before the third timing after the second timing, at the first timing, the device outputs a voltage having a value equal to the first expected value from the first terminal to the printing apparatus, at the second timing, the device outputs a voltage having a value equal to the second expected value from the first terminal to the printing apparatus, and at the third timing, the device outputs a voltage having a value different from the third expected value from the first terminal to the printing apparatus.

26. The board according to any one of Exemplary embodiments 17 to 25, wherein when a short circuit between the first terminal and the second terminal is eliminated in a period before the second timing after the first timing, at the first timing, the device outputs a voltage having a value different from the first expected value from the first terminal to the printing apparatus, at the second timing, the device outputs a voltage having a value equal to the second expected value from the first terminal to the printing apparatus, and at the third timing, the device outputs a voltage having a value equal to the third expected value from the first terminal to the printing apparatus.

27. The board according to any one of Exemplary embodiments 17 to 26, wherein when a short circuit between the first terminal and the second terminal is eliminated in a period before the third timing after the second timing, at the first timing, the device outputs a voltage having a value different from the first expected value from the first terminal to the printing apparatus, at the second timing, the device outputs a voltage having a value different from the second expected value from the first terminal to the printing apparatus, and at the third timing, the device outputs a voltage having a value equal to the third expected value from the first terminal to the printing apparatus.

28. The board according to any one of Exemplary embodiments 17 to 27, wherein the first terminal is a data terminal, the second terminal is a clock terminal, the first signal is a first response signal as a response to the printing apparatus, and the second signal is a second response signal as a response to the printing apparatus.

29. The board according to any one of Exemplary embodiments 17 to 28, wherein the other terminals include a third terminal and a fourth terminal, a reset signal containing a low voltage and a high voltage is input to the third terminal, and a power source voltage is input to the fourth terminal.

30. The board according to Exemplary embodiment 29, wherein in at least one of a case where the first terminal and the third terminal have a short circuit and a case where the first terminal and the fourth terminal have a short circuit, at the first timing, the device outputs a voltage having a value different from the first expected value from the first terminal to the printing apparatus, at the second timing, the device outputs a voltage having a value equal to the second expected value from the first terminal to the printing apparatus, and at the third timing, the device outputs a voltage having a value different from the third expected value from the first terminal to the printing apparatus.

31. The board according to Exemplary embodiment 29 or Exemplary embodiment 30, wherein in a period before the second timing after the first timing, in at least one of a case where the first terminal and the third terminal have a short circuit and a case where the first terminal and the fourth terminal have a short circuit, at the first timing, the device outputs a voltage having a value equal to the first expected value from the first terminal to the printing apparatus, at the second timing, the device outputs a voltage having a value equal to the second expected value from the first terminal to the printing apparatus, and at the third timing, the device outputs a voltage having a value different from the third expected value from the first terminal to the printing apparatus.

32. The board according to any one of Exemplary embodiments 29 to 31, wherein in a period before the third timing after the second timing, in at least one of a case where the first terminal and the third terminal have a short circuit and a case where the first terminal and the fourth terminal have a short circuit, at the first timing, the device outputs a voltage having a value equal to the first expected value from the first terminal to the printing apparatus, at the second timing, the device outputs a voltage having a value equal to the second expected value from the first terminal to the printing apparatus, and at the third timing, the device outputs a voltage having a value different from the third expected value from the first terminal to the printing apparatus.

33. The board according to any one of Exemplary embodiments 29 to 32, wherein in a period before the second timing after the first timing, when a short circuit between the first terminal and the third terminal is eliminated and a short circuit between the first terminal and the fourth terminal is eliminated, at the first timing, the device outputs a voltage having a value different from the first expected value from the first terminal to the printing apparatus, at the second timing, the device outputs a voltage having a value equal to the second expected value from the first terminal to the printing apparatus, and at the third timing, the device outputs a voltage having a value equal to the third expected value from the first terminal to the printing apparatus.

34. The board according to any one of Exemplary embodiments 29 to 33, wherein in a period before the third timing after the second timing, when a short circuit between the first terminal and the third terminal is eliminated and a short circuit between the first terminal and the fourth terminal is eliminated, at the first timing, the device outputs a signal having a value different from the first expected value from the first terminal to the printing apparatus, at the second timing, the device outputs a signal having a value equal to the second expected value from the first terminal to the printing apparatus, and at the third timing, the device outputs a signal having a value equal to the third expected value from the first terminal to the printing apparatus.

35. The board according to any one of Exemplary embodiments 29 to 34, wherein after the power source voltage is input to the fourth terminal, the high voltage is input to the third terminal by the reset signal changing from the low voltage to the high voltage, after the high voltage of the reset signal is input to the third terminal, the clock signal is input to the second terminal, and after the high voltage of the reset signal is input to the third terminal, the first signal is input to the first terminal.

36. The board according to any one of Exemplary embodiments 29 to 35, wherein the power source voltage supplied to the fourth terminal is used to drive the device.

37. The board according to any one of Exemplary embodiments 29 to 36, wherein the third terminal is a reset terminal, and the fourth terminal is a power source terminal.

38. The board according to any one of Exemplary embodiments 17 to 37, wherein

III and IV are performed a plurality of number of times in a case of at least one of (i) to (iii), (i) case where, at the first timing, the device outputs a voltage having a value different from the first expected value from the first terminal to the printing apparatus, (ii) case where, at the second timing, the device outputs a voltage having a value different from the second expected value from the first terminal to the printing apparatus, and (iii) case where, at the third timing, the device outputs a voltage having a value different from the third expected value from the first terminal to the printing apparatus.

39. The board according to any one of Exemplary embodiments 17 to 38, wherein when the printing apparatus receives a second printing instruction in the middle of performing printing based on a first printing instruction, the device outputs the first signal and the second signal to the first terminal before printing based on the second printing instruction is started after the printing based on the first printing instruction is ended.

40. The board according to any one of Exemplary embodiments 17 to 39, wherein when the printing apparatus receives a cleaning instruction of the printing head, the device outputs the first signal and the second signal to the first terminal before cleaning is performed.

41. The board according to any one of Exemplary embodiments 17 to 40, wherein the device outputs the first signal and the second signal to the first terminal when the accommodation section is located at a replacement position at which replacement of the liquid accommodation container is possible, and when the accommodation section moves from the replacement position to a standby position at which the replacement of the liquid accommodation container is not possible, the device outputs the first signal and the second signal to the first terminal.

42. The board according to any one of Exemplary embodiments 17 to 41, wherein the device stores information regarding a liquid accommodated in the liquid accommodation container.

43. A liquid accommodation container that is mounted on an accommodation section of a printing apparatus including a printing head, a liquid introduction portion that introduces a liquid to the printing head, the accommodation section provided with the liquid introduction portion, and a plurality of apparatus-side terminals provided at the accommodation section, the liquid accommodation container comprising:

a liquid accommodation body configured to accommodate a liquid;

a liquid supply portion that is mounted at the liquid introduction portion of the printing apparatus and includes a liquid supply port for supplying a liquid from the liquid accommodation body to the liquid introduction portion of the printing apparatus;

a device; and a plurality of terminals that are electrically coupled to the device, wherein the plurality of terminals include a first terminal and other terminals including a second terminal, and the liquid accommodation container is configured to satisfy I, II, III, and IV as follows, I: the device outputs a first signal containing a first low voltage and a second signal containing a second low voltage and a second high voltage higher than the second low voltage, from the first terminal to the printing apparatus, II: the first signal and the second signal are used when the printing apparatus determines that the first terminal does not have a short circuit with the other terminals and that the liquid accommodation container is being mounted in the printing apparatus, III: the device outputs the first signal from the first terminal to the printing apparatus, and then outputs the second signal from the first terminal to the printing apparatus, and IV: when the first terminal does not have a short circuit with the other terminals, a clock signal in which a low voltage and a high voltage alternately repeat with a predetermined period is input from the printing apparatus to the second terminal, the device outputs the first low voltage as a first expected value from the first terminal to the printing apparatus at a first timing in a period in which a voltage input to the second terminal is the high voltage, after the device outputs the first low voltage, the device outputs the second high voltage as a second expected value from the first terminal to the printing apparatus at a second timing in a period in which the voltage input to the second terminal is the low voltage, and after the device outputs the second high voltage, the device outputs the second low voltage as a third expected value from the first terminal to the printing apparatus at a third timing in a period in which the voltage input to the second terminal is the high voltage.

44. The liquid accommodation container according to Exemplary embodiment 43, wherein when the first terminal does not have a short circuit with the other terminals, in one cycle of the clock signal, the device outputs the first low voltage to the first terminal before the first timing in the period of the high voltage.

45. The liquid accommodation container according to Exemplary embodiment 43 or Exemplary embodiment 44, wherein when the first terminal does not have a short circuit with the other terminals, in one cycle of the clock signal, the device outputs the second high voltage to the first terminal before the second timing in the period of the low voltage.

46. The liquid accommodation container according to any one of Exemplary embodiments 43 to 45, wherein when the first terminal does not have a short circuit with the other terminals, in one cycle of the clock signal, the device outputs the second low voltage to the first terminal before the third timing in the period of the high voltage.

47. The liquid accommodation container according to any one of Exemplary embodiments 43 to 46, wherein when the first terminal does not have a short circuit with the other terminals, in one cycle of the clock signal, the device outputs the second high voltage to the first terminal when the voltage input to the second terminal changes from the high voltage to the low voltage, and the device outputs the second low voltage to the first terminal when the voltage input to the second terminal changes from the low voltage to the high voltage.

48. The liquid accommodation container according to any one of Exemplary embodiments 43 to 47, wherein when the first terminal does not have a short circuit with the other terminals, and when the voltage input to the second terminal changes from the low voltage to the high voltage, the device outputs the first low voltage to the first terminal.

49. The liquid accommodation container according to any one of Exemplary embodiments 43 to 48, wherein when the first terminal and the second terminal have a short circuit, at the first timing, the device outputs a voltage having a value different from the first expected value from the first terminal to the printing apparatus, at the second timing, the device outputs a voltage having a value different from the second expected value from the first terminal to the printing apparatus, and at the third timing, the device outputs a voltage having a value different from the third expected value from the first terminal to the printing apparatus.

50. The liquid accommodation container according to any one of Exemplary embodiments 43 to 49, wherein when the first terminal and the second terminal have a short circuit in a period before the second timing after the first timing, at the first timing, the device outputs a voltage having a value equal to the first expected value from the first terminal to the printing apparatus, at the second timing, the device outputs a voltage having a value different from the second expected value from the first terminal to the printing apparatus, and at the third timing, the device outputs a voltage having a value different from the third expected value from the first terminal to the printing apparatus.

51. The liquid accommodation container according to any one of Exemplary embodiments 43 to 50, wherein when the first terminal and the second terminal have a short circuit in a period before the third timing after the second timing, at the first timing, the device outputs a voltage having a value equal to the first expected value from the first terminal to the printing apparatus, at the second timing, the device outputs a voltage having a value equal to the second expected value from the first terminal to the printing apparatus, and at the third timing, the device outputs a voltage having a value different from the third expected value from the first terminal to the printing apparatus.

52. The liquid accommodation container according to any one of Exemplary embodiments 43 to 51, wherein when a short circuit between the first terminal and the second terminal is eliminated in a period before the second timing after the first timing, at the first timing, the device outputs a voltage having a value different from the first expected value from the first terminal to the printing apparatus, at the second timing, the device outputs a voltage having a value equal to the second expected value from the first terminal to the printing apparatus, and at the third timing, the device outputs a voltage having a value equal to the third expected value from the first terminal to the printing apparatus.

53. The liquid accommodation container according to any one of Exemplary embodiments 43 to 52, wherein when a short circuit between the first terminal and the second terminal is eliminated in a period before the third timing after the second timing, at the first timing, the device outputs a voltage having a value different from the first expected value from the first terminal to the printing apparatus, at the second timing, the device outputs a voltage having a value different from the second expected value from the first terminal to the printing apparatus, and at the third timing, the device outputs a voltage having a value equal to the third expected value from the first terminal to the printing apparatus.

54. The liquid accommodation container according to any one of Exemplary embodiments 43 to 53, wherein the first terminal is a data terminal, the second terminal is a clock terminal, the first signal is a first response signal as a response to the printing apparatus, and the second signal is a second response signal as a response to the printing apparatus.

55. The liquid accommodation container according to any one of Exemplary embodiments 43 to 54, wherein the other terminals include a third terminal and a fourth terminal, a reset signal containing a low voltage and a high voltage is input to the third terminal, and a power source voltage is input to the fourth terminal.

56. The liquid accommodation container according to Exemplary embodiment 55, wherein in at least one of a case where the first terminal and the third terminal have a short circuit and a case where the first terminal and the fourth terminal have a short circuit, at the first timing, the device outputs a voltage having a value different from the first expected value from the first terminal to the printing apparatus, at the second timing, the device outputs a voltage having a value equal to the second expected value from the first terminal to the printing apparatus, and at the third timing, the device outputs a voltage having a value different from the third expected value from the first terminal to the printing apparatus.

57. The liquid accommodation container according to Exemplary embodiment 55 or Exemplary embodiment 56, wherein in a period before the second timing after the first timing, in at least one of a case where the first terminal and the third terminal have a short circuit and a case where the first terminal and the fourth terminal have a short circuit, the liquid accommodation container at the first timing, the device outputs a voltage having a value equal to the first expected value, from the first terminal to the printing apparatus, at the second timing, the device outputs a voltage having a value equal to the second expected value, from the first terminal to the printing apparatus, and at the third timing, the device outputs a voltage having a value different from the third expected value, from the first terminal to the printing apparatus.

58. The liquid accommodation container according to any one of Exemplary embodiments 55 to 57, wherein in a period before the third timing after the second timing, in at least one of a case where the first terminal and the third terminal have a short circuit and a case where the first terminal and the fourth terminal have a short circuit, at the first timing, the device outputs a voltage having a value equal to the first expected value from the first terminal to the printing apparatus, at the second timing, the device outputs a voltage having a value equal to the second expected value from the first terminal to the printing apparatus, and at the third timing, the device outputs a voltage having a value different from the third expected value from the first terminal to the printing apparatus.

59. The liquid accommodation container according to any one of Exemplary embodiments 55 to 58, wherein in a period before the second timing after the first timing, when a short circuit between the first terminal and the third terminal is eliminated and a short circuit between the first terminal and the fourth terminal is eliminated, at the first timing, the device outputs a voltage having a value different from the first expected value from the first terminal to the printing apparatus, at the second timing, the device outputs a voltage having a value equal to the second expected value from the first terminal to the printing apparatus, and at the third timing, the device outputs a voltage having a value equal to the third expected value from the first terminal to the printing apparatus.

60. The liquid accommodation container according to any one of Exemplary embodiments 55 to 59, wherein in a period before the third timing after the second timing, when a short circuit between the first terminal and the third terminal is eliminated and a short circuit between the first terminal and the fourth terminal is eliminated, at the first timing, the device outputs a voltage having a value different from the first expected value from the first terminal to the printing apparatus, at the second timing, the device outputs a voltage having a value equal to the second expected value from the first terminal to the printing apparatus, and at the third timing, the device outputs a voltage having a value equal to the third expected value from the first terminal to the printing apparatus.

61. The liquid accommodation container according to any one of Exemplary embodiments 55 to 60, wherein after the power source voltage is input to the fourth terminal, the high voltage is input to the third terminal by the reset signal changing from the low voltage to the high voltage, after the high voltage of the reset signal is input to the third terminal, the clock signal is input to the second terminal, and after the high voltage of the reset signal is input to the third terminal, the first signal is input to the first terminal.

62. The liquid accommodation container according to any one of Exemplary embodiments 55 to 61, wherein the power source voltage supplied to the fourth terminal is used to drive the device.

63. The liquid accommodation container according to any one of Exemplary embodiments 55 to 62, wherein the third terminal is a reset terminal, and the fourth terminal is a power source terminal.

64. The liquid accommodation container according to any one of Exemplary embodiments 43 to 63, wherein III and IV are performed a plurality of number of times in a case of at least one of (i) to (iii), (i) case where, at the first timing, the device outputs a voltage having a value different from the first expected value from the first terminal to the printing apparatus, (ii) case where, at the second timing, the device outputs a voltage having a value different from the second expected value from the first terminal to the printing apparatus, and (iii) case where, at the third timing, the device outputs a voltage having a value different from the third expected value from the first terminal to the printing apparatus.

65. The liquid accommodation container according to any one of Exemplary embodiments 43 to 64, wherein when the printing apparatus receives a second printing instruction in the middle of performing printing based on a first printing instruction, the device outputs the first signal and the second signal to the first terminal before printing based on the second printing instruction is started after the printing based on the first printing instruction is ended.

66. The liquid accommodation container according to any one of Exemplary embodiments 43 to 65, wherein when the printing apparatus receives a cleaning instruction of the printing head, the device outputs the first signal and the second signal to the first terminal before cleaning is performed.

67. The liquid accommodation container according to any one of Exemplary embodiments 43 to 66, wherein the device outputs the first signal and the second signal to the first terminal when the accommodation section is located at a replacement position at which replacement of the liquid accommodation container is possible, and when the accommodation section moves from the replacement position to a standby position at which the replacement of the liquid accommodation container is not possible, the device outputs the first signal and the second signal to the first terminal.

68. The liquid accommodation container according to any one of Exemplary embodiments 43 to 67, wherein the device stores information regarding a liquid accommodated in the liquid accommodation container.

69. A printing system comprising:

a printing apparatus;

a liquid accommodation body configured to accommodate a liquid;

a liquid supply portion that includes a liquid supply port;

a device;

a plurality of terminals coupled to the device; and a board provided with the device and the plurality of terminals, wherein the printing apparatus includes a printing head, a liquid introduction portion that introduces a liquid to the printing head, and a plurality of apparatus-side terminals, the liquid supply port in the liquid accommodation body supplies the liquid from the liquid accommodation body to the liquid introduction portion of the printing apparatus, the board is configured to be mounted in the printing apparatus and come into contact with the plurality of apparatus-side terminals, the plurality of terminals include a first terminal and other terminals including a second terminal, and the printing system is configured to satisfy I, II, III, and IV as follows, I: the device outputs a first signal containing a first low voltage and a second signal containing a second low voltage and a second high voltage higher than the second low voltage, from the first terminal to the printing apparatus, II: the first signal and the second signal are used when the printing apparatus determines that the first terminal does not have a short circuit with the other terminals and that the board is being mounted in the printing apparatus, III: the device outputs the first signal from the first terminal to the printing apparatus, and then outputs the second signal from the first terminal to the printing apparatus, and IV: when the first terminal does not have a short circuit with the other terminals, a clock signal in which a low voltage and a high voltage alternately repeat with a predetermined period is input from the printing apparatus to the second terminal, the device outputs the first low voltage as a first expected value from the first terminal to the printing apparatus at a first timing in a period in which a voltage input to the second terminal is the high voltage, after the device outputs the first low voltage, the device outputs the second high voltage as a second expected value from the first terminal to the printing apparatus at a second timing in a period in which the voltage input to the second terminal is the low voltage, and after the device outputs the second high voltage, the device outputs the second low voltage as a third expected value from the first terminal to the printing apparatus at a third timing in a period in which the voltage input to the second terminal is the high voltage.

70. The printing system according to Exemplary embodiment 69, wherein when the first terminal does not have a short circuit with the other terminals, in one cycle of the clock signal, the device outputs the first low voltage to the first terminal before the first timing in the period of the high voltage.

71. The printing system according to Exemplary embodiment 69 or Exemplary embodiment 70, wherein when the first terminal does not have a short circuit with the other terminals, in one cycle of the clock signal, the device outputs the second high voltage to the first terminal before the second timing in the period of the low voltage.

72. The printing system according to any one of Exemplary embodiments 69 to 71, wherein when the first terminal does not have a short circuit with the other terminals, in one cycle of the clock signal, the device outputs the second low voltage to the first terminal before the third timing in the period of the high voltage.

73. The printing system according to any one of Exemplary embodiments 69 to 72, wherein when the first terminal does not have a short circuit with the other terminals, in one cycle of the clock signal, the device outputs the second high voltage to the first terminal when the voltage input to the second terminal changes from the high voltage to the low voltage, and the device outputs the second low voltage to the first terminal when the voltage input to the second terminal changes from the low voltage to the high voltage.

74. The printing system according to any one of Exemplary embodiments 69 to 73, wherein when the first terminal does not have a short circuit with the other terminals, and when the voltage input to the second terminal changes from the low voltage to the high voltage, the device outputs the first low voltage to the first terminal.

75. The printing system according to any one of Exemplary embodiments 69 to 74, wherein when the first terminal and the second terminal have a short circuit, at the first timing, the device outputs a voltage having a value different from the first expected value from the first terminal to the printing apparatus, at the second timing, the device outputs a voltage having a value different from the second expected value from the first terminal to the printing apparatus, and at the third timing, the device outputs a voltage having a value different from the third expected value from the first terminal to the printing apparatus.

76. The printing system according to any one of Exemplary embodiments 69 to 75, wherein when the first terminal and the second terminal have a short circuit in a period before the second timing after the first timing, at the first timing, the device outputs a voltage having a value equal to the first expected value from the first terminal to the printing apparatus, at the second timing, the device outputs a voltage having a value different from the second expected value from the first terminal to the printing apparatus, and at the third timing, the device outputs a voltage having a value different from the third expected value from the first terminal to the printing apparatus.

77. The printing system according to any one of Exemplary embodiments 69 to 76, wherein when the first terminal and the second terminal have a short circuit in a period before the third timing after the second timing, at the first timing, the device outputs a voltage having a value equal to the first expected value from the first terminal to the printing apparatus, at the second timing, the device outputs a voltage having a value equal to the second expected value from the first terminal to the printing apparatus, and at the third timing, the device outputs a voltage having a value different from the third expected value from the first terminal to the printing apparatus.

78. The printing system according to any one of Exemplary embodiments 69 to 77, wherein when a short circuit between the first terminal and the second terminal is eliminated in a period before the second timing after the first timing, at the first timing, the device outputs a voltage having a value different from the first expected value from the first terminal to the printing apparatus, at the second timing, the device outputs a voltage having a value equal to the second expected value from the first terminal to the printing apparatus, and at the third timing, the device outputs a voltage having a value equal to the third expected value from the first terminal to the printing apparatus.

79. The printing system according to any one of Exemplary embodiments 69 to 78, wherein when a short circuit between the first terminal and the second terminal is eliminated in a period before the third timing after the second timing, at the first timing, the device outputs a voltage having a value different from the first expected value from the first terminal to the printing apparatus, at the second timing, the device outputs a voltage having a value different from the second expected value from the first terminal to the printing apparatus, and at the third timing, the device outputs a voltage having a value equal to the third expected value from the first terminal to the printing apparatus.

80. The printing system according to any one of Exemplary embodiments 69 to 79, wherein the first terminal is a data terminal, the second terminal is a clock terminal, the first signal is a first response signal as a response to the printing apparatus, and the second signal is a second response signal as a response to the printing apparatus.

81. The printing system according to any one of Exemplary embodiments 69 to 80, wherein the other terminals include a third terminal and a fourth terminal, a reset signal containing a low voltage and a high voltage is input to the third terminal, and a power source voltage is input to the fourth terminal.

82. The printing system according to Exemplary embodiment 81, wherein in at least one of a case where the first terminal and the third terminal have a short circuit and a case where the first terminal and the fourth terminal have a short circuit, at the first timing, the device outputs a voltage having a value different from the first expected value from the first terminal to the printing apparatus, at the second timing, the device outputs a voltage having a value equal to the second expected value from the first terminal to the printing apparatus, and at the third timing, the device outputs a voltage having a value different from the third expected value from the first terminal to the printing apparatus.

83. The printing system according to Exemplary embodiment 81 or Exemplary embodiment 82, wherein in a period before the second timing after the first timing, in at least one of a case where the first terminal and the third terminal have a short circuit and a case where the first terminal and the fourth terminal have a short circuit, at the first timing, the device outputs a voltage having a value equal to the first expected value from the first terminal to the printing apparatus, at the second timing, the device outputs a voltage having a value equal to the second expected value from the first terminal to the printing apparatus, and at the third timing, the device outputs a voltage having a value different from the third expected value from the first terminal to the printing apparatus.

84. The printing system according to any one of Exemplary embodiments 81 to 83, wherein in a period before the third timing after the second timing, in at least one of a case where the first terminal and the third terminal have a short circuit and a case where the first terminal and the fourth terminal have a short circuit, at the first timing, the device outputs a voltage having a value equal to the first expected value from the first terminal to the printing apparatus, at the second timing, the device outputs a voltage having a value equal to the second expected value from the first terminal to the printing apparatus, and at the third timing, the device outputs a voltage having a value different from the third expected value from the first terminal to the printing apparatus.

85. The printing system according to any one of Exemplary embodiments 81 to 84, wherein in a period before the second timing after the first timing, when a short circuit between the first terminal and the third terminal is eliminated and a short circuit between the first terminal and the fourth terminal is eliminated, at the first timing, the device outputs a voltage having a value different from the first expected value from the first terminal to the printing apparatus, at the second timing, the device outputs a voltage having a value equal to the second expected value from the first terminal to the printing apparatus, and at the third timing, the device outputs a voltage having a value equal to the third expected value from the first terminal to the printing apparatus.

86. The printing system according to any one of Exemplary embodiments 81 to 85, wherein in a period before the third timing after the second timing, when a short circuit between the first terminal and the third terminal is eliminated and a short circuit between the first terminal and the fourth terminal is eliminated, at the first timing, the device outputs a voltage having a value different from the first expected value from the first terminal to the printing apparatus, at the second timing, the device outputs a voltage having a value equal to the second expected value from the first terminal to the printing apparatus, and at the third timing, the device outputs a voltage having a value equal to the third expected value from the first terminal to the printing apparatus.

87. The printing system according to any one of Exemplary embodiments 81 to 86, wherein after the power source voltage is input to the fourth terminal, the high voltage is input to the third terminal by the reset signal changing from the low voltage to the high voltage, after the high voltage of the reset signal is input to the third terminal, the clock signal is input to the second terminal, and after the high voltage of the reset signal is input to the third terminal, the first signal is input to the first terminal.

88. The printing system according to any one of Exemplary embodiments 81 to 87, wherein the power source voltage supplied to the fourth terminal is used to drive the device.

89. The printing system according to any one of Exemplary embodiments 81 to 88, wherein the third terminal is a reset terminal, and the fourth terminal is a power source terminal.

90. The printing system according to any one of Exemplary embodiments 69 to 89, wherein III and IV are performed a plurality of number of times in a case of at least one of (i) to (iii), (i) case where, at the first timing, the device outputs a voltage having a value different from the first expected value from the first terminal to the printing apparatus, (ii) case where, at the second timing, the device outputs a voltage having a value different from the second expected value from the first terminal to the printing apparatus, and (iii) case where, at the third timing, the device outputs a voltage having a value different from the third expected value from the first terminal to the printing apparatus.

91. The printing system according to any one of Exemplary embodiments 69 to 90, wherein when the printing apparatus receives a second printing instruction in the middle of performing printing based on a first printing instruction, the device outputs the first signal and the second signal to the first terminal before printing based on the second printing instruction is started after the printing based on the first printing instruction is ended.

92. The printing system according to any one of Exemplary embodiments 69 to 91, wherein when the printing apparatus receives a cleaning instruction of the printing head, the device outputs the first signal and the second signal to the first terminal before cleaning is performed.

93. The printing system according to any one of Exemplary embodiments 69 to 92, wherein the printing apparatus further includes an accommodation section that is provided with the liquid introduction portion and accommodates the board, the device outputs the first signal and the second signal to the first terminal when the accommodation section is located at a replacement position at which replacement of the board is possible, and when the accommodation section moves from the replacement position to a standby position at which the replacement of the board is not possible, the device outputs the first signal and the second signal to the first terminal.

94. The printing system according to any one of Exemplary embodiments 69 to 93, wherein the device stores information regarding the liquid.

95. A printing system comprising:

a printing apparatus; and a liquid accommodation container mounted in the printing apparatus, wherein the printing apparatus includes a printing head, a liquid introduction portion that introduces a liquid to the printing head, and a plurality of apparatus-side terminals, the liquid accommodation container includes a liquid accommodation body configured to accommodate a liquid, a liquid supply portion that includes a liquid supply port for supplying the liquid from the liquid accommodation body to the liquid introduction portion in the printing apparatus, a device, and a plurality of terminals coupled to the device, the plurality of terminals include a first terminal and other terminals including a second terminal, and the printing system is configured to satisfy I, II, III, and IV as follows, I: the device outputs a first signal containing a first low voltage and a second signal containing a second low voltage and a second high voltage higher than the second low voltage, from the first terminal to the printing apparatus, II: the first signal and the second signal are used when the printing apparatus determines that the first terminal does not have a short circuit with the other terminals and that the liquid accommodation container is being mounted in the printing apparatus, III: the device outputs the first signal from the first terminal to the printing apparatus, and then outputs the second signal from the first terminal to the printing apparatus, and IV: when the first terminal does not have a short circuit with the other terminals, a clock signal in which a low voltage and a high voltage alternately repeat with a predetermined period is input from the printing apparatus to the second terminal, the device outputs the first low voltage as a first expected value from the first terminal to the printing apparatus at a first timing in a period in which a voltage input to the second terminal is the high voltage, after the device outputs the first low voltage, the device outputs the second high voltage as a second expected value from the first terminal to the printing apparatus at a second timing in a period in which the voltage input to the second terminal is the low voltage, and after the device outputs the second high voltage, the device outputs the second low voltage as a third expected value from the first terminal to the printing apparatus at a third timing in a period in which the voltage input to the second terminal is the high voltage.

96. The printing system according to Exemplary embodiment 95, wherein when the first terminal does not have a short circuit with the other terminals, in one cycle of the clock signal, the device outputs the first low voltage to the first terminal before the first timing in the period of the high voltage.

97. The printing system according to Exemplary embodiment 95 or Exemplary embodiment 96, wherein when the first terminal does not have a short circuit with the other terminals, in one cycle of the clock signal, the device outputs the second high voltage to the first terminal before the second timing in the period of the low voltage.

98. The printing system according to any one of Exemplary embodiments 95 to 97, wherein when the first terminal does not have a short circuit with the other terminals, in one cycle of the clock signal, the device outputs the second low voltage to the first terminal before the third timing in the period of the high voltage.

99. The printing system according to any one of Exemplary embodiments 95 to 98, wherein when the first terminal does not have a short circuit with the other terminals, in one cycle of the clock signal, the device outputs the second high voltage to the first terminal when the voltage input to the second terminal changes from the high voltage to the low voltage, and the device outputs the second low voltage to the first terminal when the voltage input to the second terminal changes from the low voltage to the high voltage.

100. The printing system according to any one of Exemplary embodiments 95 to 99, wherein when the first terminal does not have a short circuit with the other terminals, and when the voltage input to the second terminal changes from the low voltage to the high voltage, the device outputs the first low voltage to the first terminal.

101. The printing system according to any one of Exemplary embodiments 95 to 100, wherein when the first terminal and the second terminal have a short circuit, at the first timing, the device outputs a voltage having a value different from the first expected value from the first terminal to the printing apparatus, at the second timing, the device outputs a voltage having a value different from the second expected value from the first terminal to the printing apparatus, and at the third timing, the device outputs a voltage having a value different from the third expected value from the first terminal to the printing apparatus.

102. The printing system according to any one of Exemplary embodiments 95 to 101, wherein when the first terminal and the second terminal have a short circuit in a period before the second timing after the first timing, at the first timing, the device outputs a voltage having a value equal to the first expected value from the first terminal to the printing apparatus, at the second timing, the device outputs a voltage having a value different from the second expected value from the first terminal to the printing apparatus, and at the third timing, the device outputs a voltage having a value different from the third expected value from the first terminal to the printing apparatus.

103. The printing system according to any one of Exemplary embodiments 95 to 102, wherein when the first terminal and the second terminal have a short circuit in a period before the third timing after the second timing, at the first timing, the device outputs a voltage having a value equal to the first expected value from the first terminal to the printing apparatus, at the second timing, the device outputs a voltage having a value equal to the second expected value from the first terminal to the printing apparatus, and at the third timing, the device outputs a voltage having a value different from the third expected value from the first terminal to the printing apparatus.

104. The printing system according to any one of Exemplary embodiments 95 to 103, wherein when a short circuit between the first terminal and the second terminal is eliminated in a period before the second timing after the first timing, at the first timing, the device outputs a voltage having a value different from the first expected value from the first terminal to the printing apparatus, at the second timing, the device outputs a voltage having a value equal to the second expected value from the first terminal to the printing apparatus, and at the third timing, the device outputs a voltage having a value equal to the third expected value from the first terminal to the printing apparatus.

105. The printing system according to any one of Exemplary embodiments 95 to 104, wherein when a short circuit between the first terminal and the second terminal is eliminated in a period before the third timing after the second timing, at the first timing, the device outputs a voltage having a value different from the first expected value from the first terminal to the printing apparatus, at the second timing, the device outputs a voltage having a value different from the second expected value from the first terminal to the printing apparatus, and at the third timing, the device outputs a voltage having a value equal to the third expected value from the first terminal to the printing apparatus.

106. The printing system according to any one of Exemplary embodiments 95 to 105, wherein the first terminal is a data terminal, the second terminal is a clock terminal, the first signal is a first response signal as a response to the printing apparatus, and the second signal is a second response signal as a response to the printing apparatus.

107. The printing system according to any one of Exemplary embodiments 95 to 106, wherein the other terminals include a third terminal and a fourth terminal, a reset signal containing a low voltage and a high voltage is input to the third terminal, and a power source voltage is input to the fourth terminal.

108. The printing system according to Exemplary embodiment 107, wherein in at least one of a case where the first terminal and the third terminal have a short circuit and a case where the first terminal and the fourth terminal have a short circuit, at the first timing, the device outputs a voltage having a value different from the first expected value from the first terminal to the printing apparatus, at the second timing, the device outputs a voltage having a value equal to the second expected value from the first terminal to the printing apparatus, and at the third timing, the device outputs a voltage having a value different from the third expected value from the first terminal to the printing apparatus.

109. The printing system according to Exemplary embodiment 107 or Exemplary embodiment 108, wherein in a period before the second timing after the first timing, in at least one of a case where the first terminal and the third terminal have a short circuit and a case where the first terminal and the fourth terminal have a short circuit, at the first timing, the device outputs a voltage having a value equal to the first expected value from the first terminal to the printing apparatus, at the second timing, the device outputs a voltage having a value equal to the second expected value from the first terminal to the printing apparatus, and at the third timing, the device outputs a voltage having a value different from the third expected value from the first terminal to the printing apparatus.

110. The printing system according to any one of Exemplary embodiments 107 to 109, wherein in a period before the third timing after the second timing, in at least one of a case where the first terminal and the third terminal have a short circuit and a case where the first terminal and the fourth terminal have a short circuit, at the first timing, the device outputs a voltage having a value equal to the first expected value from the first terminal to the printing apparatus, at the second timing, the device outputs a voltage having a value equal to the second expected value from the first terminal to the printing apparatus, and at the third timing, the device outputs a voltage having a value different from the third expected value from the first terminal to the printing apparatus.

111. The printing system according to any one of Exemplary embodiments 107 to 110, wherein in a period before the second timing after the first timing, when a short circuit between the first terminal and the third terminal is eliminated and a short circuit between the first terminal and the fourth terminal is eliminated, at the first timing, the device outputs a voltage having a value different from the first expected value from the first terminal to the printing apparatus, at the second timing, the device outputs a voltage having a value equal to the second expected value from the first terminal to the printing apparatus, and at the third timing, the device outputs a voltage having a value equal to the third expected value from the first terminal to the printing apparatus.

112. The printing system according to any one of Exemplary embodiments 107 to 111, wherein in a period before the third timing after the second timing, when a short circuit between the first terminal and the third terminal is eliminated and a short circuit between the first terminal and the fourth terminal is eliminated, at the first timing, the device outputs a voltage having a value different from the first expected value from the first terminal to the printing apparatus, at the second timing, the device outputs a voltage having a value equal to the second expected value from the first terminal to the printing apparatus, and at the third timing, the device outputs a voltage having a value equal to the third expected value from the first terminal to the printing apparatus.

113. The printing system according to any one of Exemplary embodiments 107 to 112, wherein after the power source voltage is input to the fourth terminal, the high voltage is input to the third terminal by the reset signal changing from the low voltage to the high voltage, after the high voltage of the reset signal is input to the third terminal, the clock signal is input to the second terminal, and after the high voltage of the reset signal is input to the third terminal, the first signal is input to the first terminal.

114. The printing system according to any one of Exemplary embodiments 107 to 113, wherein the power source voltage supplied to the fourth terminal is used to drive the device.

115. The printing system according to any one of Exemplary embodiments 107 to 114, wherein the third terminal is a reset terminal, and the fourth terminal is a power source terminal.

116. The printing system according to any one of Exemplary embodiments 95 to 115, wherein III and IV are performed a plurality of number of times in a case of at least one of (i) to (iii), (i) case where, at the first timing, the device outputs a voltage having a value different from the first expected value from the first terminal to the printing apparatus, (ii) case where, at the second timing, the device outputs a voltage having a value different from the second expected value from the first terminal to the printing apparatus, and (iii) case where, at the third timing, the device outputs a voltage having a value different from the third expected value from the first terminal to the printing apparatus.

117. The printing system according to any one of Exemplary embodiments 95 to 116, wherein when the printing apparatus receives a second printing instruction in the middle of performing printing based on a first printing instruction, the device outputs the first signal and the second signal to the first terminal before printing based on the second printing instruction is started after the printing based on the first printing instruction is ended.

118. The printing system according to any one of Exemplary embodiments 95 to 117, wherein when the printing apparatus receives a cleaning instruction of the printing head, the device outputs the first signal and the second signal to the first terminal before cleaning is performed.

119. The printing system according to any one of Exemplary embodiments 95 to 118, wherein the printing apparatus further includes an accommodation section that is provided with the liquid introduction portion and accommodates the liquid accommodation container, the device outputs the first signal and the second signal to the first terminal when the accommodation section is located at a replacement position at which replacement of the liquid accommodation container is possible, and when the accommodation section moves from the replacement position to a standby position at which the replacement of the liquid accommodation container is not possible, the device outputs the first signal and the second signal to the first terminal.

120. The printing system according to any one of Exemplary embodiments 95 to 119, wherein the device stores information regarding a liquid accommodated in the liquid accommodation container.

What is claimed is:

1. A device for use with a liquid accommodation container that is configured to be mounted in an accommodation section of a printing apparatus having a printing head, the device configured to electrically couple to a plurality of terminals associated with the liquid accommodation container, the device comprising:

a processing unit;

wherein, when the liquid accommodation container is mounted in the accommodation section and a data terminal of the plurality of terminals does not have a short circuit with other terminals of the plurality of terminals, the processing unit is configured to:

receive from a clock terminal of the plurality of terminals a clock signal that alternates between a low clock voltage and a high clock voltage at the clock terminal; and set a combination of data voltages at the data terminal at a first time, a second time, and a third time associated with the clock signal;

wherein the first time is during a period in which the clock signal at the clock terminal is the high clock voltage, the second time is later than the first time and is during a period in which the clock signal at the clock terminal is the low clock voltage, and the third time is later than the second time and is during a period in which the clock signal at the clock terminal is the high clock voltage;

wherein the combination of data voltages includes a first data voltage lower than a reference data voltage at the first time, a second data voltage higher than the reference data voltage at the second time, and a third data voltage lower than the reference data voltage at the third time; and wherein the combination of data voltages indicates to the printing apparatus that the liquid accommodation container is mounted in the accommodation section and that the data terminal does not have a short circuit with the other terminals.

2. The device according to claim 1, wherein when the data terminal has a short circuit with one or more other terminals of the plurality of terminals, there is a different combination of data voltages at the data terminal at one or more of the first time, the second time, or the third time.

3. The device according to claim 1, wherein when the liquid accommodation container is mounted in the accommodation section and the data terminal does not have a short circuit with the other terminals, the processing unit is configured to set the first data voltage at the data terminal before the first time during a period in which the clock signal at the clock terminal is the high clock voltage in one cycle of the clock signal.

4. The device according to claim 1, wherein when the liquid accommodation container is mounted in the accommodation section and the data terminal does not have a short circuit with the other terminals, the processing unit is configured to set the second data voltage at the data terminal before the second time during a period in which the clock signal at the clock terminal is the low clock voltage in one cycle of the clock signal.

5. The device according to claim 1, wherein when the liquid accommodation container is mounted in the accommodation section and the data terminal does not have a short circuit with the other terminals, the processing unit is configured to set the third data voltage at the data terminal before the third time during a period in which the clock signal at the clock terminal is the high clock voltage in one cycle of the clock signal.

6. The device according to claim 1, wherein when the liquid accommodation container is mounted in the accommodation section and the data terminal does not have a short circuit with the other terminals, the processing unit is configured to set the first data voltage at the data terminal when the clock signal changes from the low clock voltage to the high clock voltage at the clock terminal.

7. The device according to claim 1, wherein when the liquid accommodation container is mounted in the accommodation section and the data terminal does not have a short circuit with the other terminals, the processing unit is configured to set the second data voltage at the data terminal when clock signal changes from the high clock voltage to the low clock voltage at the clock terminal; and the processing unit is configured to set the third data voltage at the data terminal when the clock signal changes from the low clock voltage to the high clock voltage at the clock terminal.

8. The device according to claim 1, wherein the processing unit is configured to set the combination of the data voltages a plurality of times.

9. The device according to claim 1, wherein the processing unit is configured to:

receive from a reset terminal of the plurality of terminals a reset signal that switches between a low reset voltage and a high reset voltage at the reset terminal, and receive power from a power source terminal of the plurality of terminals when the power source terminal has a power source voltage;

wherein the processing unit is configured to set the combination of data voltages while the power source terminal has the power source voltage and after the reset signal changes from the low reset voltage to the high reset voltage at the reset terminal.

10. A board for use with a liquid accommodation container that is configured to be mounted in an accommodation section of a printing apparatus having a printing head, the accommodation section including a liquid introduction portion that introduces a liquid to the printing head, and a plurality of apparatus-side terminals, the board comprising:

a device configured with a processing unit; and a plurality of terminals electrically coupled to the device and configured to contact the plurality of apparatus-side terminals, wherein, when the liquid accommodation container is mounted in the accommodation section and a data terminal of the plurality of terminals does not have a short circuit with other terminals of the plurality of terminals, the processing unit is configured to:

receive from a clock terminal of the plurality of terminals a clock signal that alternates between a low clock voltage and a high clock voltage at the clock terminal; and set a combination of data voltages at the data terminal at a first time, a second time, and a third time associated with the clock signal;

wherein the first time is during a period in which the clock signal at the clock terminal is the high clock voltage, the second time is later than the first time and is during a period in which the clock signal at the clock terminal is the low clock voltage, and the third time is later than the second time and is during a period in which the clock signal at the clock terminal is the high clock voltage;

wherein the combination of data voltages includes a first data voltage lower than a reference data voltage at the first time, a second data voltage higher than the reference data voltage at the second time, and a third data voltage lower than the reference data voltage at the third time; and wherein the combination of data voltages indicates to the printing apparatus that the liquid accommodation container is mounted in the accommodation section and that the data terminal does not have a short circuit with the other terminals.

11. The board according to claim 10, wherein when the data terminal has a short circuit with one or more other terminals of the plurality of terminals, there is a different combination of data voltages at the data terminal at one or more of the first time, the second time, or the third time.

12. The board according to claim 10, wherein when the liquid accommodation container is mounted in the accommodation section and the data terminal does not have a short circuit with the other terminals, the processing unit is configured to set the first data voltage at the data terminal before the first time during a period in which the clock signal at the clock terminal is the high clock voltage in one cycle of the clock signal.

13. The board according to claim 10, wherein when the liquid accommodation container is mounted in the accommodation section and the data terminal does not have a short circuit with the other terminals, the processing unit is configured to set the second data voltage at the data terminal before the second time during a period in which the clock signal at the clock terminal is the low clock voltage in one cycle of the clock signal.

14. The board according to claim 10, wherein when the liquid accommodation container is mounted in the accommodation section and the data terminal does not have a short circuit with the other terminals, the processing unit is configured to set the third data voltage at the data terminal before the third time during a period in which the clock signal at the clock terminal is the high clock voltage in one cycle of the clock signal.

15. The board according to claim 10, wherein when the liquid accommodation container is mounted in the accommodation section and the data terminal does not have a short circuit with the other terminals, the processing unit is configured to set the first data voltage at the data terminal when the clock signal at the clock terminal changes from the low clock voltage to the high clock voltage.

16. The board according to claim 10, wherein when the liquid accommodation container is mounted in the accommodation section and the data terminal does not have a short circuit with the other terminals, the processing unit is configured to set the second data voltage at the data terminal when the clock signal at the clock terminal changes from the high clock voltage to the low clock voltage; and the processing unit is configured to set the third data voltage at the data terminal when the clock signal at the clock terminal changes from the low clock voltage to the high clock voltage.

17. The board according to claim 10, wherein the processing unit of the device is configured to set the combination of data voltages a plurality of times.

18. The board according to claim 10, wherein the plurality of terminals includes:

a reset terminal configured to receive a reset signal that switches between a low reset voltage and a high reset voltage at the reset terminal, and a power source terminal configured to have a power source voltage to provide power to the processing unit;

wherein the processing unit is configured to set the combination of data voltages while the power source terminal has the power source voltage and after the reset signal changes from the low reset voltage to the high reset voltage at the reset terminal.

19. A liquid accommodation container that is configured to be mounted in an accommodation section of a printing apparatus having a printing head, the accommodation section including a liquid introduction portion that introduces a liquid to the printing head, and a plurality of apparatus-side terminals, the liquid accommodation container comprising:

a liquid accommodation body configured to accommodate a liquid;

a liquid supply portion that is mounted at the liquid introduction portion of the printing apparatus and includes a liquid supply port for supplying a liquid to the liquid introduction portion from the liquid accommodation body;

a device configured with a processing unit; and a plurality of terminals electrically coupled to the device and configured to contact the plurality of apparatus-side terminals, wherein, when the liquid accommodation container is mounted in the accommodation section and a data terminal of the plurality of terminals does not have a short circuit with other terminals of the plurality of terminals, the processing unit is configured to:

receive from a clock terminal of the plurality of terminals a clock signal that alternates between a low clock voltage and a high clock voltage at the clock terminal; and set a combination of data voltages at the data terminal at a first time, a second time, and a third time associated with the clock signal;

wherein the first time is during a period in which the clock signal at the clock terminal is the high clock voltage, the second time is later than the first time and is during a period in which the clock signal at the clock terminal is the low clock voltage, and the third time is later than the second time and is during a period in which the clock signal at the clock terminal is the high clock voltage;

wherein the combination of data voltages includes a first data voltage lower than a reference data voltage at the first time, a second data voltage higher than the reference data voltage at the second time, and a third data voltage lower than the reference data voltage at the third time; and wherein the combination of data voltages indicates to the printing apparatus that the liquid accommodation container is mounted in the accommodation section and that the data terminal does not have a short circuit with the other terminals.

20. The liquid accommodation container according to claim 19, wherein when the data terminal has a short circuit with one or more other terminals of the plurality of terminals, there is a different combination of data voltages at the data terminal at one or more of the first time, the second time, or the third time.

21. The liquid accommodation container according to claim 19, wherein when the liquid accommodation container is mounted in the accommodation section and the data terminal does not have a short circuit with the other terminals, the processing unit is configured to set the first data voltage at the data terminal before the first time during a period in which the clock signal at the clock terminal is the high clock voltage in one cycle of the clock signal.

22. The liquid accommodation container according to claim 19, wherein when the liquid accommodation container is mounted in the accommodation section and the data terminal does not have a short circuit with the other terminals, the processing unit is configured to set the second data voltage at the data terminal before the second time during a period in which the clock signal at the clock terminal is the low clock voltage in one cycle of the clock signal.

23. The liquid accommodation container according to claim 19, wherein when the liquid accommodation container is mounted in the accommodation section and the data terminal does not have a short circuit with the other terminals, the processing unit is configured to set the third data voltage at the data terminal before the third time during a period in which the clock signal at the clock terminal is the high clock voltage in one cycle of the clock signal.

24. The liquid accommodation container according to claim 19, wherein when the liquid accommodation container is mounted in the accommodation section and the data terminal does not have a short circuit with the other terminals, the processing unit is configured to set the first data voltage at the data terminal when the clock signal at the clock terminal changes from the low clock voltage to the high clock voltage.

25. The liquid accommodation container according to claim 19, wherein when the liquid accommodation container is mounted in the accommodation section and the data terminal does not have a short circuit with the other terminals, the processing unit is configured to set the second data voltage at the data terminal when the clock signal at the clock terminal changes from the high clock voltage to the low clock voltage; and the processing unit is configured to set the third data voltage at the data terminal when the clock signal at the clock terminal changes from the low clock voltage to the high clock voltage.

26. The liquid accommodation container according to claim 19, wherein the processing unit of the device is configured to set the combination of data voltages a plurality of times.

27. The liquid accommodation container according to claim 19, wherein the plurality of terminals includes:

a reset terminal configured to receive a reset signal that switches between a low reset voltage and a high reset voltage at the reset terminal, and a power source terminal configured to have a power source voltage to provide power to the processing unit;

wherein the processing unit is configured to set the combination of data voltages while the power source terminal has the power source voltage and after the reset signal changes from the low reset voltage to the high reset voltage at the reset terminal.

* * * * *